United States Patent
Shalev-Shwartz et al.

(10) Patent No.: US 11,820,365 B2
(45) Date of Patent: Nov. 21, 2023

(54) SYSTEMS AND METHODS FOR NAVIGATING A VEHICLE

(71) Applicant: Mobileye Vision Technologies Ltd., Jerusalem (IL)

(72) Inventors: Shai Shalev-Shwartz, Jerusalem (IL); Shaked Shammah, Jerusalem (IL); Amnon Shashua, Mevaseret Zion (IL)

(73) Assignee: Mobileye Vision Technologies Ltd., Jersualem (IL)

( * ) Notice: Subject to any disclaimer, the term of this patent is extended or adjusted under 35 U.S.C. 154(b) by 169 days.

(21) Appl. No.: 17/182,702

(22) Filed: Feb. 23, 2021

(65) Prior Publication Data
US 2021/0171023 A1    Jun. 10, 2021

Related U.S. Application Data

(63) Continuation of application No. 16/429,901, filed on Jun. 3, 2019, now Pat. No. 10,933,868, which is a
(Continued)

(51) Int. Cl.
*B60W 30/09* (2012.01)
*B60W 10/18* (2012.01)
(Continued)

(52) U.S. Cl.
CPC ........... *B60W 30/09* (2013.01); *B60W 10/06* (2013.01); *B60W 10/18* (2013.01); *B60W 10/20* (2013.01);
(Continued)

(58) Field of Classification Search
CPC .................................................. B60W 30/09
See application file for complete search history.

(56) References Cited

U.S. PATENT DOCUMENTS

| | | | |
|---|---|---|---|
| 5,375,059 | A | 12/1994 | Kyrtsos |
| 5,555,503 | A | 9/1996 | Kyrtsos |

(Continued)

FOREIGN PATENT DOCUMENTS

| | | |
|---|---|---|
| CN | 104228836 A | 12/2014 |
| CN | 107650907 A | 2/2018 |

(Continued)

OTHER PUBLICATIONS

Eshed, Ohn-bar, On surveillance for safety critical events: In-vehicle video networks for predictive driver assistance systems, Computer Vision and Image Understanding, Science Direct, vol. 134, 2015 (Year: 2015).*

(Continued)

*Primary Examiner* — Jean Paul Cass
(74) *Attorney, Agent, or Firm* — FINNEGAN, HENDERSON, FARABOW, GARRETT & DUNNER, LLP

(57) ABSTRACT

A system for a host vehicle includes a processor programmed to receive, from an image capture device, an image representative of an environment of the host vehicle, detect at least one obstacle in the environment of the host vehicle based on an analysis of the at least one image, determine a velocity of the host vehicle and a predicted path for the host vehicle, monitor a driver input to at least one of a throttle control, a brake control, or a steering control associated with the host vehicle, and determine whether the driver input would result in the host vehicle navigating within a proximity buffer relative to the at least one obstacle, wherein the proximity buffer is determined based on the determined velocity, a maximum acceleration capacity of the host vehicle, and a maximum braking capacity of the host vehicle, and a reaction time associated with the host vehicle.

18 Claims, 73 Drawing Sheets

Related U.S. Application Data continuation of application No. 16/359,488, filed on Mar. 20, 2019.

(60) Provisional application No. 62/777,914, filed on Dec. 11, 2018, provisional application No. 62/772,366, filed on Nov. 28, 2018, provisional application No. 62/724,355, filed on Aug. 29, 2018, provisional application No. 62/718,554, filed on Aug. 14, 2018, provisional application No. 62/646,579, filed on Mar. 22, 2018, provisional application No. 62/645,479, filed on Mar. 20, 2018.

(51) Int. Cl.
| | | |
|---|---|---|
| *B60W 10/20* | (2006.01) | |
| *B60W 40/06* | (2012.01) | |
| *B60W 40/105* | (2012.01) | |
| *B60W 50/08* | (2020.01) | |
| *B60W 30/18* | (2012.01) | |
| *B60W 30/095* | (2012.01) | |
| *B60W 50/12* | (2012.01) | |
| *B60W 10/06* | (2006.01) | |
| *B60W 30/165* | (2020.01) | |

(52) U.S. Cl.
CPC .... *B60W 30/0953* (2013.01); *B60W 30/0956* (2013.01); *B60W 30/165* (2013.01); *B60W 30/18154* (2013.01); *B60W 30/18163* (2013.01); *B60W 40/06* (2013.01); *B60W 40/105* (2013.01); *B60W 50/087* (2013.01); *B60W 50/12* (2013.01); *B60W 2420/42* (2013.01); *B60W 2420/52* (2013.01); *B60W 2510/18* (2013.01); *B60W 2520/10* (2013.01); *B60W 2520/105* (2013.01); *B60W 2552/00* (2020.02); *B60W 2554/00* (2020.02); *B60W 2554/80* (2020.02); *B60W 2555/20* (2020.02); *B60W 2710/18* (2013.01); *B60W 2710/20* (2013.01); *B60W 2754/30* (2020.02)

(56) References Cited

U.S. PATENT DOCUMENTS

| | | | |
|---|---|---|---|
| 6,737,963 B2 | 5/2004 | Gutta | |
| 7,124,027 B1 | 10/2006 | Ernst, Jr. | |
| 7,164,117 B2 | 1/2007 | Breed | |
| 7,243,945 B2 | 7/2007 | Breed | |
| 7,415,126 B2 | 8/2008 | Breed | |
| 7,663,502 B2 | 2/2010 | Breed | |
| 7,941,261 B2 | 5/2011 | Johnsen | |
| 8,849,494 B1* | 9/2014 | Herbach | B60W 60/0015 701/24 |
| 8,884,782 B2 | 11/2014 | Rubin | |
| 8,996,224 B1 | 3/2015 | Herbach | |
| 9,020,697 B2 | 4/2015 | Ricci | |
| 9,082,239 B2 | 7/2015 | Ricci | |
| 9,587,952 B1* | 3/2017 | Slusar | G01C 21/3623 |
| 9,767,366 B1 | 9/2017 | Fairfield | |
| 9,849,852 B1* | 12/2017 | Larner | B60R 21/0134 |
| 9,934,440 B1 | 4/2018 | Kim | |
| 9,950,722 B2 | 4/2018 | Kumar | |
| 9,953,535 B1* | 4/2018 | Canavor | G08G 1/123 |
| 10,421,453 B1* | 9/2019 | Ferguson | B60W 30/0953 |
| 2003/0195703 A1 | 10/2003 | Ibrahim | |
| 2007/0106475 A1 | 5/2007 | Kondoh | |
| 2009/0295601 A1 | 12/2009 | Villaume | |
| 2010/0256852 A1 | 10/2010 | Mudalige | |
| 2013/0110368 A1* | 5/2013 | Zagorski | B60T 7/22 701/70 |
| 2014/0032023 A1 | 1/2014 | Kumar | |
| 2015/0158495 A1 | 6/2015 | Duncan | |
| 2015/0161893 A1 | 6/2015 | Duncan | |
| 2015/0161894 A1* | 6/2015 | Duncan | B60W 30/00 701/1 |
| 2015/0234045 A1 | 8/2015 | Rosenblum | |
| 2016/0016566 A1 | 1/2016 | Kumar | |
| 2016/0075332 A1 | 3/2016 | Edo-Ros | |
| 2016/0082885 A1 | 3/2016 | Rashid | |
| 2016/0170021 A1 | 6/2016 | Rashid | |
| 2016/0172842 A1 | 6/2016 | Panosyan | |
| 2017/0057520 A1 | 3/2017 | Letwin et al. | |
| 2017/0220876 A1 | 8/2017 | Gao | |
| 2018/0001893 A1 | 2/2018 | Trombley et al. | |
| 2018/0029592 A1 | 2/2018 | Trombley et al. | |
| 2018/0297567 A1 | 10/2018 | Gonidec | |
| 2018/0307925 A1 | 10/2018 | Wisniowski | |
| 2018/0321686 A1 | 11/2018 | Kanzawa | |
| 2018/0329035 A1 | 11/2018 | Pacala | |
| 2019/0011556 A1 | 1/2019 | Pacala | |
| 2019/0092318 A1 | 3/2019 | Mei | |
| 2019/0156485 A1 | 5/2019 | Pfeiffer | |
| 2019/0179028 A1 | 6/2019 | Pacala | |

FOREIGN PATENT DOCUMENTS

| | | |
|---|---|---|
| JP | H08310359 A | 8/2004 |
| JP | 2013-206297 | 10/2013 |
| KR | 101703144 B1 | 2/2017 |
| KR | 101728406 B1 | 4/2017 |
| KR | 1020170054186 A | 5/2017 |
| KR | 1020170126909 A | 11/2017 |
| KR | 1020180008593 A | 1/2018 |
| WO | WO 2016/130719 A2 | 8/2016 |

OTHER PUBLICATIONS

Richard Bellman, "Mathematical Theory of Control Processes," Departments of Mathematics and Electrical Engineering, University of Southern California, vol. II Nonlinear Process, 1971, Academic Press, New York and London, ISBN-13: 978-0120848027.

Shai Shalev-Shwartz, et al., "On a Formal Model of Safety and Scalable Self-Driving Cars," Aug. 21, 2017, available at https://arxiv.org/abs/1708.06374.

IIHS, GM Front Crash prevention systems cut police-reported crashes, Nov. 13, 2018, IHSS News, available at https://www.iihs.org/iihs/news/desktopnews/gm-front-crash-prevention-systems-cut-police-reported-crashes.

Shai Shalev-Shwartz, et al., "Vision Zero: on a Provable Method for Eliminating Roadway Accidents without Compromising Traffic Throughput," Dec. 9, 2018, available at https://arxiv.org/abs/1901.05022v2.

Ratings Group Report: "Euro NCAP Rating Review 2015," Mar. 2015, available at https://cdn.euroncap.com/media/16470/ratings-group-report-2015-version-10-with-appendix.pdf.

Paul Seredynski, "As Early Autonomy Questions Roil the Industry, Toyota Hews to Driver-Enhancement Philosophy," Jun. 11, 2018, available at https://www.sae.org/news/2018/06/tu-auto-interview-with-toyotas-ryan-eustice.

Leemon C Baird, "Reinforcement Learning in Continuous Time: Advantage Updating In Neural Networks," IEEE World Congress on Computational Intelligence., 1994 IEEE International Conference on Neural Networks, vol. 4, pp. 2448-2453. IEEE, 1994.

Richard Bellman, "Dynamic Programming and Lagrange Multipliers," Proceedings of the National Academy of Sciences of the United States of America, 42(10): 767, 1956.

Peng Lin, et al., Discrete Element Crowd Model for Pedestrian Evacuation Through an Exit, Chinese Physics B, 25(3):034501, Oct. 24, 2015, available at https://arxiv.org/abs/1510.07126.

Volodymyr Mnih, et al., "Human-Level Control Through Deep Reinforcement Learning," Nature, 518(7540):529-533, Feb. 25, 2015, available at https://web.stanford.edu/class/psych209/Readings/MnihEtAlHassibis15NatureControlDeepRL.pdf.

Shai Shalev-Shwartz, et al., "Safe, Multi-Agent, Reinforcement Learning for Autonomous Driving," Oct. 11, 2016, available at https://arxiv.org/abs/1610.03295.

(56) References Cited

OTHER PUBLICATIONS

Richard S Sutton, et al., "Between MDPs and semi-MDPs: A framework for Temporal Abstraction in Reinforcement Learning," Artificial intelligence, 112(1):181-211, Dec. 1, 1998, available at http://www-anw.cs.umass.edu/~barto/courses/cs687/Sutton-Precup-Singh-AIJ99.pdf.
L.G. Valiant, "A Theory of the Learnable," Communications of the ACM, 27(11): 1134-1142 Nov. 1984, available at https://people.mpi-inf.mpg.de/~mehlhorn/SeminarEvolvability/ValiantLearnable.pdf.
Richard Bellman, "Introduction to the Mathematical Theory of Control Processes, vol. 2." IMA, 1971.
International Search Report and Written Opinion in PCT/IB2019/000281, dated Jun. 3, 2020 (8 pages).
Search Report from Korean Intellectual Property Office dated Oct. 25, 2019 for Korean application No. 10-2019-7030686 (7 pages).
Office Action issued in Japanese Patent Application No. 2022-074527, dated Aug. 16, 2022 (5 pages).
Office Action issued in Japanese Patent Application No. 2022-074462, dated Aug. 16, 2022 (9 pages).
Office Action issued in Chinese Patent Application No. 201980002445.4, dated Sep. 1, 2022 and English translation thereof (34 pages).

\* cited by examiner

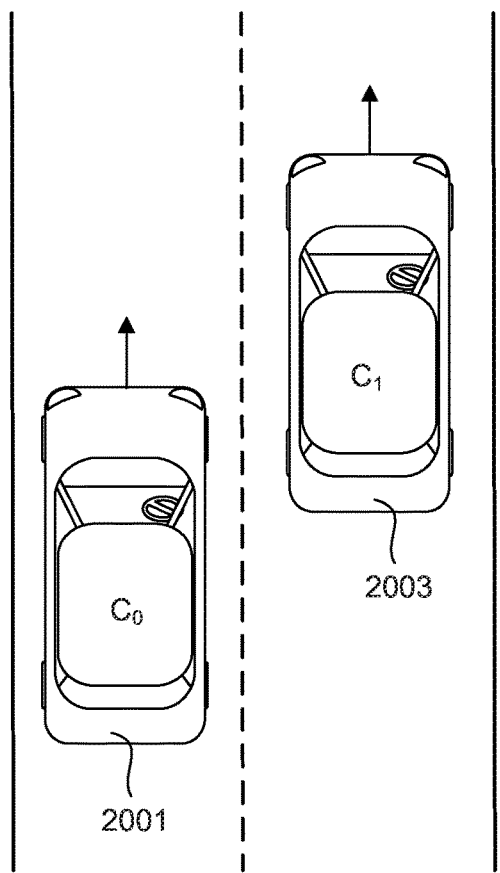 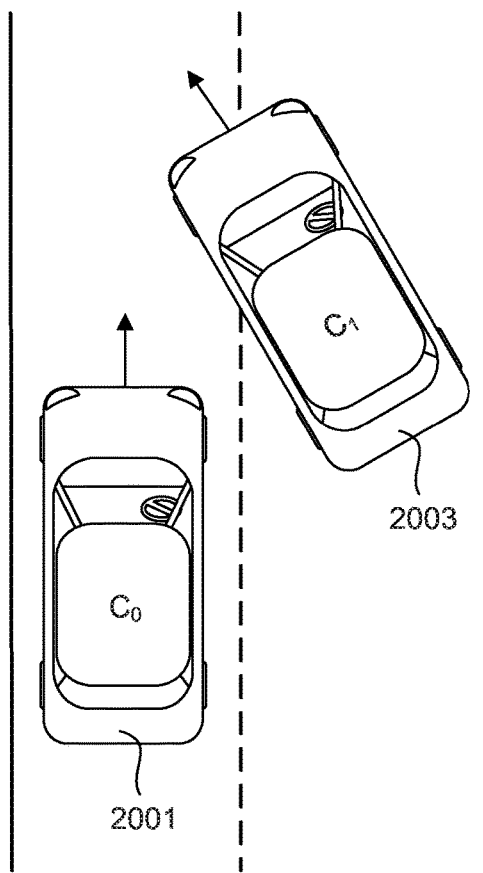
*Fig. 20A*  *Fig. 20B*

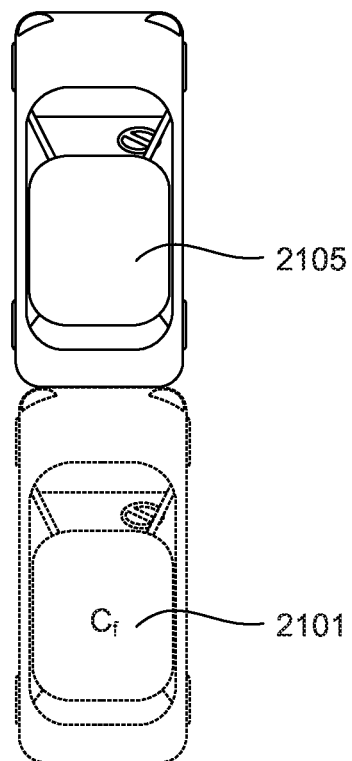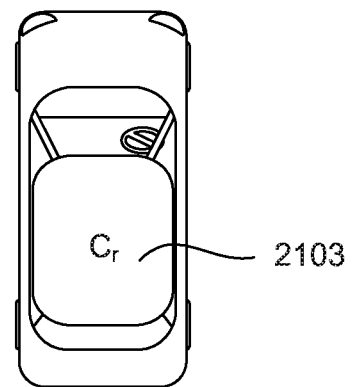
Fig. 21

SYSTEMS AND METHODS FOR NAVIGATING A VEHICLE

CROSS REFERENCES TO RELATED APPLICATIONS

This application is a continuation of U.S. patent application Ser. No. 16/429,901, filed Jun. 3, 2019, which claims the benefit of priority of U.S. Provisional Patent Application No. 62/645,479, filed on Mar. 20, 2018; U.S. Provisional Patent Application No. 62/646,579, filed on Mar. 22, 2018; U.S. Provisional Patent Application No. 62/718,554, filed on Aug. 14, 2018; U.S. Provisional Patent Application No. 62/724,355, filed on Aug. 29, 2018; U.S. Provisional Patent Application No. 62/772,366, filed on Nov. 28, 2018; and U.S. Provisional Patent Application No. 62/777,914, filed on Dec. 11, 2018. All of the foregoing applications are incorporated herein by reference in their entirety.

BACKGROUND

Technical Field

The present disclosure relates generally to autonomous vehicle navigation. Additionally, this disclosure relates to systems and methods for navigating according to potential accident liability constraints.

Background Information

As technology continues to advance, the goal of a fully autonomous vehicle that is capable of navigating on roadways is on the horizon. Autonomous vehicles may need to take into account a variety of factors and make appropriate decisions based on those factors to safely and accurately reach an intended destination. For example, an autonomous vehicle may need to process and interpret visual information (e.g., information captured from a camera), information from radar or lidar, and may also use information obtained from other sources (e.g., from a GPS device, a speed sensor, an accelerometer, a suspension sensor, etc.). At the same time, in order to navigate to a destination, an autonomous vehicle may also need to identify its location within a particular roadway (e.g., a specific lane within a multi-lane road), navigate alongside other vehicles, avoid obstacles and pedestrians, observe traffic signals and signs, travel from one road to another road at appropriate intersections or interchanges, and respond to any other situation that occurs or develops during the vehicle's operation. Moreover, the navigational system may need to adhere to certain imposed constraints. In some cases, those constraints may relate to interactions between a host vehicle and one or more other objects, such as other vehicles, pedestrians, etc. In other cases, the constraints may relate to liability rules to be followed in implementing one or more navigational actions for a host vehicle.

In the field of autonomous driving, there are two important considerations for viable autonomous vehicle systems. The first is a standardization of safety assurance, including requirements that every self-driving car must satisfy to ensure safety, and how those requirements can be verified. The second is scalability, as engineering solutions that lead to unleashed costs will not scale to millions of cars and may prevent widespread or even not so widespread adoption of autonomous vehicles. Thus, there is a need for an interpretable, mathematical model for safety assurance and a design of a system that adheres to safety assurance requirements while being scalable to millions of cars.

SUMMARY

Embodiments consistent with the present disclosure provide systems and methods for autonomous vehicle navigation. The disclosed embodiments may use cameras to provide autonomous vehicle navigation features. For example, consistent with the disclosed embodiments, the disclosed systems may include one, two, or more cameras that monitor the environment of a vehicle. The disclosed systems may provide a navigational response based on, for example, an analysis of images captured by one or more of the cameras. The navigational response may also take into account other data including, for example, global positioning system (GPS) data, sensor data (e.g., from an accelerometer, a speed sensor, a suspension sensor, etc.), and/or other map data.

In an embodiment, a system for navigating a host vehicle may include at least one processing device programmed to receive at least one image representative of an environment of the host vehicle. The at least one image may be received from an image capture device. The at least one processing device may be programmed to determine, based on at least one driving policy, a planned navigational action for accomplishing a navigational goal of the host vehicle. The at least one processing device may be further programmed to analyze the at least one image to identify a target vehicle in the environment of the host vehicle and to determine a next-state distance between the host vehicle and the target vehicle that would result if the planned navigational action was taken. The at least one processing device may be programmed to determine a maximum braking capability of the host vehicle, a maximum acceleration capability of the host vehicle, and a current speed of the host vehicle. The at least one processing device may also be programmed to determine a current stopping distance for the host vehicle based on the current maximum braking capability of the host vehicle, the current maximum acceleration capability of the host vehicle, and the current speed of the host vehicle. The at least one processing device may be further programmed to determine a current speed of the target vehicle and to assume a maximum braking capability of the target vehicle based on at least one recognized characteristic of the target vehicle. The at least one processing device may also be programmed to implement the planned navigational action if the determined current stopping distance for the host vehicle is less than the determined next-state distance summed together with a target vehicle travel distance determined based on the current speed of the target vehicle and the assumed maximum braking capability of the target vehicle.

In an embodiment, a system for navigating a host vehicle may include at least one processing device. The at least one processing device may be programmed to receive, from an image capture device, at least one image representative of an environment of the host vehicle. The at least one processing device may also be programmed to determine a planned navigational action for accomplishing a navigational goal of the host vehicle. The planned navigational action may be based on at least one driving policy. The at least one processing device may be programmed to analyze the at least one image to identify a target vehicle in the environment of the host vehicle. The at least one processing device may be further programmed to determine a next-state distance between the host vehicle and the target vehicle that would result if the planned navigational action was taken. The at least one processing device may be programmed to determine a current speed of the host vehicle and a current speed of the target vehicle. The at least one processing deice may be programmed to assume a maximum braking rate capability of the target vehicle based on at least one recognized characteristic of the target vehicle. The at least one processing device may be further configured to implement the planned navigational action if, for the determined current speed of the host vehicle and at a predetermined sub-maximal braking rate that is less than a maximum braking rate capability of the host vehicle, the host vehicle can be stopped within a host vehicle stopping distance that is less than the determined next-state distance summed together with a target vehicle travel distance determined based on the current speed of the target vehicle and the assumed maximum braking rate capability of the target vehicle.

In an embodiment, a system for navigating a host vehicle may include at least one processing device. The at least one processing device may be programmed to receive, from an image capture device, at least one image representative of an environment of the host vehicle. The at least one processing device may also be programmed to determine a planned navigational action for accomplishing a navigational goal of the host vehicle. The planned navigational action may be based on at least one driving policy. The at least one processing device may be programmed to analyze the at least one image to identify a target vehicle in the environment of the host vehicle. The at least one processing device may be further programmed to determine a next-state distance between the host vehicle and the target vehicle that would result if the planned navigational action was taken. The at least one processing device may be programmed to determine a current speed of the host vehicle. The at least one processing deice may be programmed to determine a current speed of the target vehicle and to assume a maximum braking rate capability of the target vehicle based on at least one recognized characteristic of the target vehicle. The at least one processing device may be programmed to implement the planned navigational action if, for the determined current speed of the host vehicle and for a predetermined braking rate profile, the host vehicle can be stopped within a host vehicle stopping distance that is less than the determined next-state distance summed together with a target vehicle travel distance determined based on the current speed of the target vehicle and the assumed maximum braking rate capability of the target vehicle, wherein the predetermined braking rate profile progressively increases from a sub-maximal braking rate to a maximal braking rate for the host vehicle.

In an embodiment, a system for braking a host vehicle may include at least one processing device programmed to perform one or more operations. The at least one processing device may be programmed to receive, from at least one sensor, an output representative of an environment of the host vehicle. The at least one processing device may further be programmed to detect, based on the output, a target vehicle in the environment of the host vehicle. The at least one processing device may be programmed to determine a current speed of the host vehicle and a current distance between the host vehicle and the target vehicle. Based on at least upon the current speed of the host vehicle and the current distance between the host vehicle and the target vehicle, the at least one processor may be programmed to determine whether a braking condition exists. If a braking condition is determined to exist, the at least one processor may be programmed to cause application of a braking device associated with the host vehicle according to a predetermined braking profile including a segment beginning at a sub-maximal braking rate for the host vehicle and progressively increasing up to a maximum braking rate of the host vehicle.

In an embodiment, an autonomous system for selectively displacing human driver control of a host vehicle may include at least one processing device. The at least one processing device may be programmed to receive, from an image capture device, at least one image representative of an environment of the host vehicle and to detect at least one obstacle in the environment of the host vehicle based on analysis of the at least one image. The at least one processing device may be programmed to monitor a driver input to at least one of a throttle control, a brake control, or a steering control associated with the host vehicle. The at least one processing device may also be programmed to determine whether the driver input would result in the host vehicle navigating within a proximity buffer relative to the at least one obstacle. If the at least one processing device determines that the driver input would not result in the host vehicle navigating within the proximity buffer relative to the at least one obstacle, the at least one processing device may be programmed to allow the driver input to cause a corresponding change in one or more host vehicle motion control systems. If the at least one processing device determines that the driver input would result in the host vehicle navigating within the proximity buffer relative to the at least one obstacle, the at least one processing device may be programmed to prevent the driver input from causing the corresponding change in the one or more host vehicle motion control systems.

In an embodiment, a navigation system for navigating an autonomous host vehicle according to at least one navigational goal of the host vehicle may include at least one processor. The at least one processor may be programmed to receive, from one or more sensors, a sensor output indicative of at least one aspect of motion of the host vehicle relative to an environment of the host vehicle. The sensor output may be generated at a first time that is later than a data acquisition time, when a measurement or data acquisition on which the sensor output is based is acquired, and earlier than a second time at which the sensor output is received by the at least one processor. The at least one processor may be programmed to generate, for a motion prediction time, a prediction of at least one aspect of host vehicle motion based, at least in part, on the received sensor output and an estimation of how the at least one aspect of host vehicle motion changes over a time interval between the data acquisition time and the motion prediction time. The at least one processor may be programmed to determine a planned navigational action for the host vehicle based, at least in part, on the at least one navigational goal of the host vehicle and based on the generated prediction of the at least one aspect of host vehicle motion. The at least one processor may be further configured to generate a navigational command for implementing at least a portion of the planned navigational action. The at least one processor may be programmed to provide the navigational command to at least one actuation system of the host vehicle. The navigational command may be provided such that the at least one actuation system receives the navigational command at a third time that is later than the second time and earlier or substantially the same as an actuation time at which a component of the at least one actuation system responds to the received command. In some embodiments, the motion prediction time is after the data acquisition time and earlier than or equal to the actuation time.

Consistent with other disclosed embodiments, non-transitory computer-readable storage media may store program instructions, which are executable by at least one processing device and perform any of the steps and/or methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this disclosure, illustrate various disclosed embodiments. In the drawings:

FIGS. 20A and 20B illustrate examples of a vehicle cutting in in front of another vehicle consistent with the disclosed embodiments.

FIG. 21 illustrates an example of a vehicle following another vehicle consistent with the disclosed embodiments.

DETAILED DESCRIPTION

Figure 1:
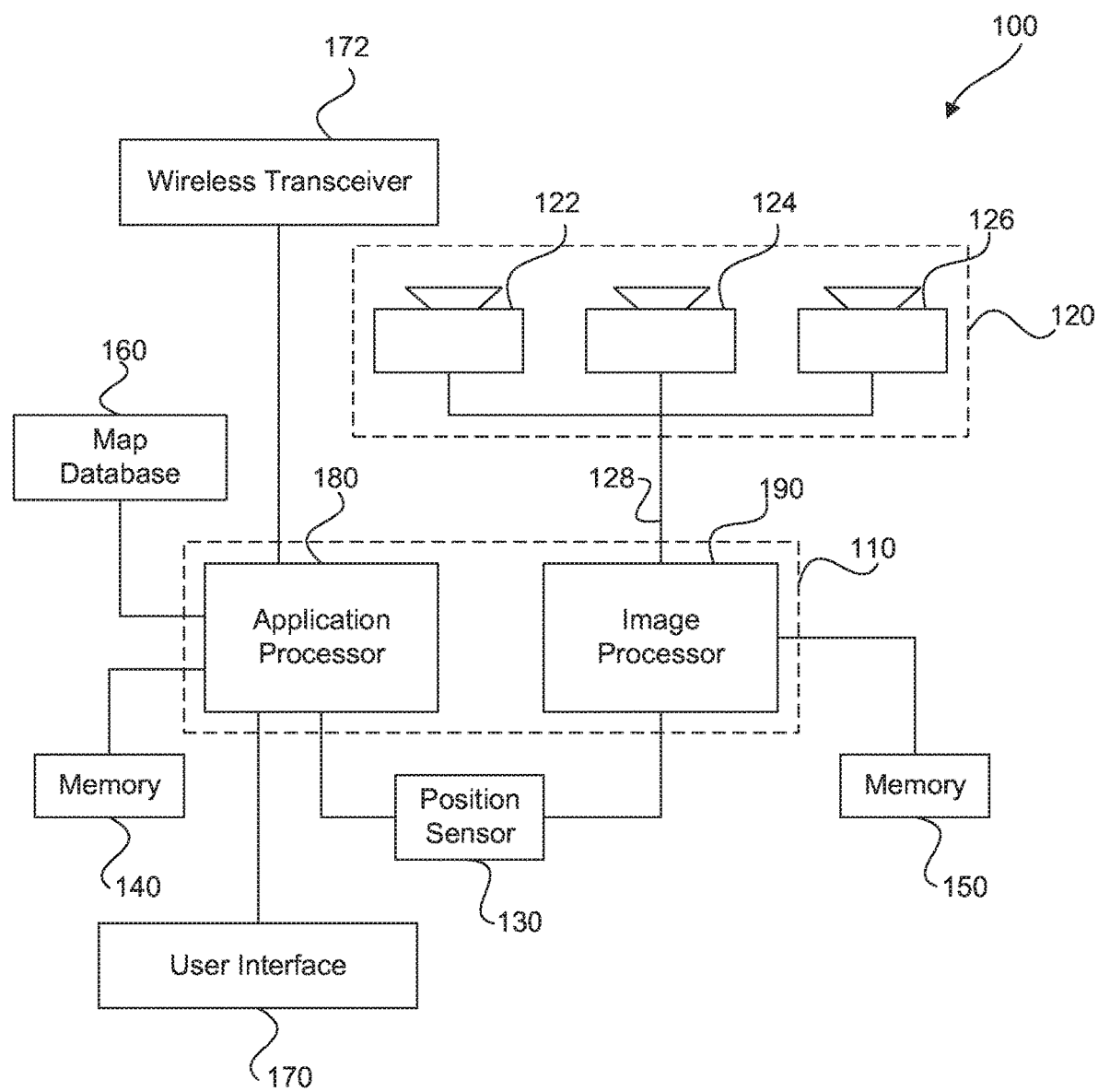
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

Autonomous Vehicle Overview

As used throughout this disclosure, the term "autonomous vehicle" refers to a vehicle capable of implementing at least one navigational change without driver input. A "navigational change" refers to a change in one or more of steering, braking, or acceleration/deceleration of the vehicle. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or braking under certain circumstances). In some cases, autonomous vehicles may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights designed to provide visual information to drivers. In view of these design characteristics of transportation infrastructures, an autonomous vehicle may include a camera and a processing unit that analyzes visual information captured from the environment of the vehicle. The visual information may include, for example, images representing components of the transportation infrastructure (e.g., lane markings, traffic signs, traffic lights, etc.)

that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model. Some vehicles can also be capable of communication among them, sharing information, altering the peer vehicle of hazards or changes in the vehicles' surroundings, etc.

System Overview

FIG. 1 is a block diagram representation of a system 100 consistent with the exemplary disclosed embodiments. System 100 may include various components depending on the requirements of a particular implementation. In some embodiments, system 100 may include a processing unit 110, an image acquisition unit 120, a position sensor 130, one or more memory units 140, 150, a map database 160, a user interface 170, and a wireless transceiver 172. Processing unit 110 may include one or more processing devices. In some embodiments, processing unit 110 may include an applications processor 180, an image processor 190, or any other suitable processing device. Similarly, image acquisition unit 120 may include any number of image acquisition devices and components depending on the requirements of a particular application. In some embodiments, image acquisition unit 120 may include one or more image capture devices (e.g., cameras. CCDs, or ally other type of image sensor), such as image capture device 122, image capture device 124, and image capture device 126. System 100 may also include a data interface 128 communicatively connecting processing unit 110 to image acquisition unit 120. For example, data interface 128 may include any wired and/or wireless link or links for transmitting image data acquired by image acquisition unit 120 to processing unit 110.

Wireless transceiver 172 may include one or more devices configured to exchange transmissions over an air interface to one or more networks (e.g., cellular, the Internet, etc.) by use of a radio frequency, infrared frequency, magnetic field, or an electric field. Wireless transceiver 172 may use any known standard to transmit and/or receive data (e.g., Wi-Fi, Bluetooth®, Bluetooth Smart, 802.15.4, ZigBee, etc.). Such transmissions can include communications from the host vehicle to one or more remotely located servers. Such transmissions may also include communications (one-way or two-way) between the host vehicle and one or more target vehicles in an environment of the host vehicle (e.g., to facilitate coordination of navigation of the host vehicle in view of or together with target vehicles in the environment of the host vehicle), or even a broadcast transmission to unspecified recipients in a vicinity of the transmitting vehicle.

Both applications processor 180 and image processor 190 may include various types of hardware-based processing devices. For example, either or both of applications processor 180 and image processor 190 may include a microprocessor, preprocessors (such as an image preprocessor), graphics processors, a central processing unit (CPU), support circuits, digital signal processors, integrated circuits, memory, or any other types of devices suitable for running applications and for image processing and analysis. In some embodiments, applications processor 180 and/or image processor 190 may include any type of single or multi-core processor, mobile device microcontroller, central processing unit, etc. Various processing devices may be used, including, for example, processors available from manufacturers such as Intel®, AMD®, etc. and may include various architectures (e.g., x86 processor, ARM®, etc.).

In some embodiments, applications processor 180 and/or image processor 190 may include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture consists of two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics interconnect, dual 16-bit Video input and 18-bit Video output controllers, 16 channels DMA and several peripherals. The MIPS34K. CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third generation processor and is six times more powerful that the EyeQ2®, may be used in the disclosed embodiments. In other examples, the EyeQ4® and/or the EyeQ5® may be used in the disclosed embodiments. Of course, any newer or future EyeQ processing devices may also be used together with the disclosed embodiments.

Any of the processing devices disclosed herein may be configured to perform certain functions. Configuring a processing device, such as any of the described EyeQ processors or other controller or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation. In either case, the processing device configured to perform the sensing, image analysis, and/or navigational functions disclosed herein represents a specialized hardware-based system in control of multiple hardware based components of a host vehicle.

While FIG. 1 depicts two separate processing devices included in processing unit 110, more or fewer processing devices may be used. For example, in some embodiments, a single processing device may be used to accomplish the tasks of applications processor 180 and image processor 190. In other embodiments, these tasks may be performed by more than two processing devices. Further, in some embodiments, system 100 may include one or more of processing unit 110 without including other components, such as image acquisition unit 120.

Processing unit 110 may comprise various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor may include a video processor fix capturing, digitizing and processing the imagery from the image sensors. The CPU may comprise any number of microcontrollers or microprocessors. The support circuits may be any number of circuits generally well known in the art, including cache, power supply, clock and input-output circuits. The memory may store software that, when executed by the processor, controls the operation of the system. The memory may include databases and image processing software. The memory may comprise any number of random access memories, read only memories, flash memories, disk drives, optical storage, tape storage, removable storage and other types of storage. In one instance, the memory may be separate from the processing unit 110. In another instance, the memory may be integrated into the processing unit 110.

Each memory 140, 150 may include software instructions that when executed by a processor (e.g., applications processor 180 and/or image processor 190), may control operation of various aspects of system 100. These memory units may include various databases and image processing software, as well as a trained system, such as a neural network, or a deep neural network, for example. The memory units may include random access memory, read only memory, flash memory, disk drives, optical storage, tape storage, removable storage and/or any other types of storage. In some embodiments, memory units 140, 150 may be separate from the applications processor 180 and/or image processor 190. In other embodiments, these memory units may be integrated into applications processor 180 and/or image processor 190.

Position sensor 130 may include any type of device suitable for determining a location associated with at least one component of system 100. In some embodiments, position sensor 130 may include a GPS receiver. Such receivers can determine a user position and velocity by processing signals broadcasted by global positioning system satellites. Position information from position sensor 130 may be made available to applications processor 180 and/or image processor 190.

In some embodiments, system 100 may include components such as a speed sensor (e.g., a speedometer) for measuring a speed of vehicle 200. System 100 may also include one or more accelerometers (either single axis or multiaxis) for measuring accelerations of vehicle 200 along one or more axes.

The memory units 140, 150 may include a database, or data organized in any other form, that indication a location of known landmarks. Sensory information (such as images, radar signal, depth information from lidar or stereo processing of two or more images) of the environment may be processed together with position information, such as a GPS coordinate, vehicle's ego motion, etc. to determine a current location of the vehicle relative to the known landmarks, and refine the vehicle location. Certain aspects of this technology are included in a localization technology known as REM", which is being marketed by the assignee of the present application.

User interface 170 may include any device suitable for providing information to or for receiving inputs from one or more users of system 100. In some embodiments, user interface 170 may include user input devices, including, for example, a touchscreen, microphone, keyboard, pointer devices, track wheels, cameras, knobs, buttons, etc. With such input devices, a user may be able to provide information inputs or commands to system 100 by typing instructions or information, providing voice commands, selecting menu options on a screen using buttons, pointers, or eye-tracking capabilities, or through any other suitable techniques for communicating information to system 100.

User interface 170 may be equipped with one or more processing devices configured to provide and receive information to or from a user and process that information for use by, for example, applications processor 180. In some embodiments, such processing devices may execute instructions for recognizing and tracking eye movements, receiving and interpreting voice commands, recognizing and interpreting touches and/or gestures made on a touchscreen, responding to keyboard entries or menu selections, etc. In some embodiments, user interface 170 may include a display, speaker, tactile device, and/or any other devices for providing output information to a user.

Map database 160 may include any type of database for storing map data useful to system 100. In some embodiments, map database 160 may include data relating to the position, in a reference coordinate system, of various items, including roads, water features, geographic features, businesses, points of interest, restaurants, gas stations, etc. Map database 160 may store not only the locations of such items, but also descriptors relating to those items, including, for example, names associated with any of the stored features. In some embodiments, map database 160 may be physically located with other components of system 100. Alternatively or additionally, map database 160 or a portion thereof may be located remotely with respect to other components of system 100 (e.g., processing unit 110). In such embodiments, information from map database 160 may be downloaded over a wired or wireless data connection to a network (e.g., over a cellular network and/or the Internet, etc.). In some cases, map database 160 may store a sparse data model including polynomial representations of certain road features (e.g., lane markings) or target trajectories for the host vehicle. Map database 160 may also include stored representations of various recognized landmarks that may be used to determine or update a known position of the host vehicle with respect to a target trajectory. The landmark representations may include data fields such as landmark type, landmark location, among other potential identifiers.

Image capture devices 122, 124, and 126 may each include any type of device suitable for capturing at least one image from an environment. Moreover, any number of image capture devices may be used to acquire images for input to the image processor. Some embodiments may include only a single image capture device, while other embodiments may include two, three, or even four or more image capture devices. Image capture devices 122, 124, and 126 will be further described with reference to FIGS. 2B-2E, below.

One or more cameras (e.g., image capture devices 122, 124, and 126) may be part of a sensing block included on a vehicle. Various other sensors may be included in the sensing block, and any or all of the sensors may be relied upon to develop a sensed navigational state of the vehicle. In addition to cameras (forward, sideward, rearward, etc), other sensors such as RADAR, LIDAR, and acoustic sensors may be included in the sensing block. Additionally, the sensing block may include one or more components configured to communicate and transmit/receive information relating to the environment of the vehicle. For example, such components may include wireless transceivers (RE, etc.) that may receive from a source remotely located with respect to the host vehicle sensor based information or any other type of information relating to the environment of the host vehicle. Such information may include sensor output information, or related information, received from vehicle systems other than the host vehicle. In some embodiments, such information may include information received from a remote computing device, a centralized server, etc. Furthermore, the cameras may take on many different configurations: single camera units, multiple cameras, camera clusters, long FOV, short FOV, wide angle, fisheye, etc.

Figure 2A:
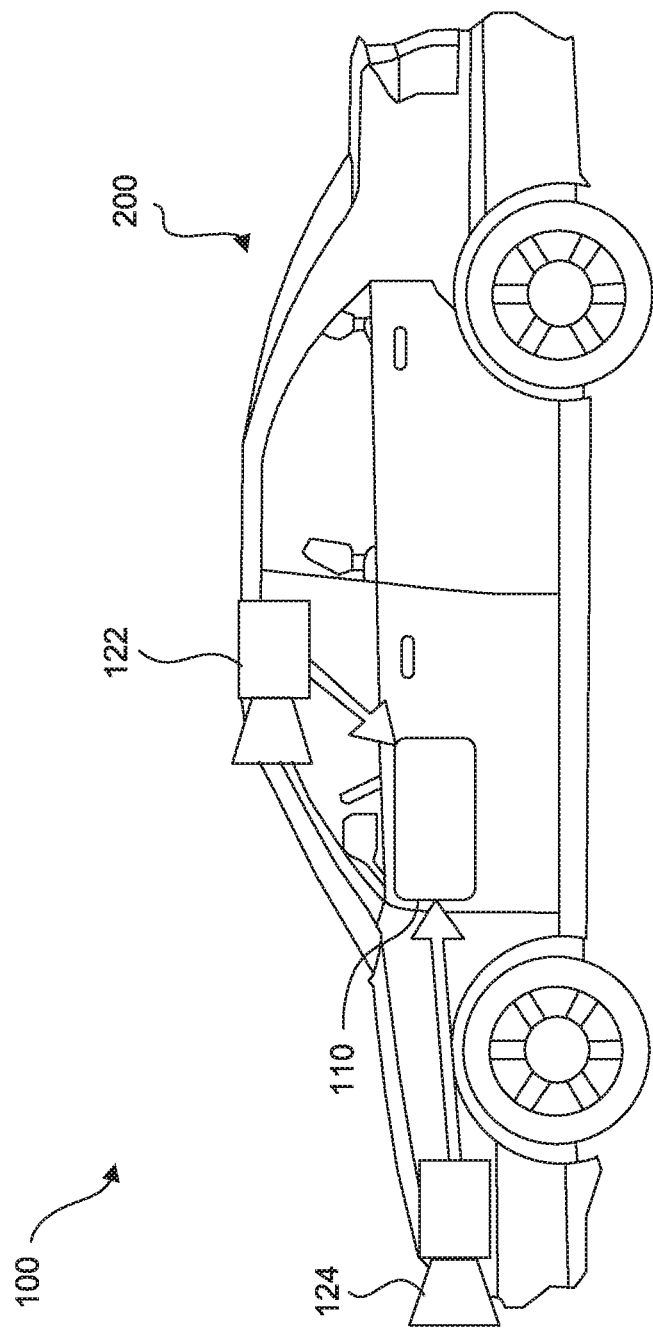
FIG. 2A is a diagrammatic side view representation of an exemplary vehicle including a system consistent with the disclosed embodiments.

System 100, or various components thereof, may be incorporated into various different platforms. In some embodiments, system 100 may be included on a vehicle 200, as shown in FIG. 2A. For example, vehicle 200 may be equipped with a processing unit 110 and any of the other components of system 100, as described above relative to FIG. 1. While in some embodiments vehicle 200 may be equipped with only a single image capture device (e.g., camera), in other embodiments, such as those discussed in connection with FIGS. 2B-2E, multiple image capture devices may be used. For example, either of image capture devices 122 and 124 of vehicle 200, as shown in FIG. 2A, may be part of an ADAS (Advanced Driver Assistance Systems) imaging set.

The image capture devices included on vehicle 200 as part of the image acquisition unit 120 may be positioned at any suitable location. In some embodiments, as shown in FIGS. 2A-2E and 3A-3C, image capture device 122 may be located in the vicinity of the rearview mirror. This position may provide a line of sight similar to that of the driver of vehicle 200, which may aid in determining what is and is not visible to the driver. Image capture device 122 may be positioned at any location near the rearview mirror, but placing image capture device 122 on the driver side of the mirror may further aid in obtaining images representative of the driver's field of view and/or line of sight.

Other locations for the image capture devices of image acquisition unit 120 may also be used. For example, image capture device 124 may be located on or in a bumper of vehicle 200. Such a location may be especially suitable for image capture devices having a wide field of view. The line of sight of bumper-located image capture devices can be different from that of the driver and, therefore, the bumper image capture device and driver may not always see the same objects. The image capture devices (e.g., image capture devices 122, 124, and 126) may also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light fixtures on the front and/or back of vehicle 200, etc.

In addition to image capture devices, vehicle 200 may include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

As discussed earlier, wireless transceiver 172 may and/or receive data over one or more networks (e.g., cellular networks, the Internet, etc.). For example, wireless transceiver 172 may upload data collected by system 100 to one or more servers, and download data from the one or more servers. Via wireless transceiver 172, system 100 may receive, for example, periodic or on demand updates to data stored in map database 160, memory 140, and/or memory 150. Similarly, wireless transceiver 172 may upload any data (e.g., images captured by image acquisition unit 120, data received by position sensor 130 or other sensors, vehicle control systems, etc.) from system 100 and/or any data processed by processing unit 110 to the one or more servers.

System 100 may upload data to a server (e.g., to the cloud) based on a privacy level setting. For example, system 100 may implement privacy level settings to regulate or limit the types of data (including metadata) sent to the server that may uniquely identify a vehicle and or driver/owner of a vehicle. Such settings may be set by user via, for example, wireless transceiver 172, be initialized by factory default settings, or by data received by wireless transceiver 172.

In some embodiments, system 100 may upload data according to a "high" privacy level, and under setting a setting, system 100 may transmit data (e.g., location information related to a route, captured images, etc.) without any details about the specific vehicle and/or driver/owner. For example, when uploading data according to a "high" privacy setting, system 100 may not include a vehicle identification number (VIN) or a name of a driver or owner of the vehicle, and may instead transmit data, such as captured images and/or limited location information related to a route.

Other privacy levels are contemplated as well. For example, system 100 may transmit data to a server according to an "intermediate" privacy level and include additional information not included under a "high" privacy level, such as a make and/or model of a vehicle and/or a vehicle type (e.g., a passenger vehicle, sport utility vehicle, truck, etc.). In some embodiments, system 100 may upload data according to a "low" privacy level. Under a "low" privacy level setting, system 100 may upload data and include information sufficient to uniquely identify a specific vehicle, owner/driver, and/or a portion or entirely of a route traveled by the vehicle. Such "low" privacy level data may include one or more of, for example, a VIN, a driver/owner name, an origination point of a vehicle prior to departure, an intended destination of the vehicle, a make and/or model of the vehicle, a type of the vehicle, etc.

Figure 2B:
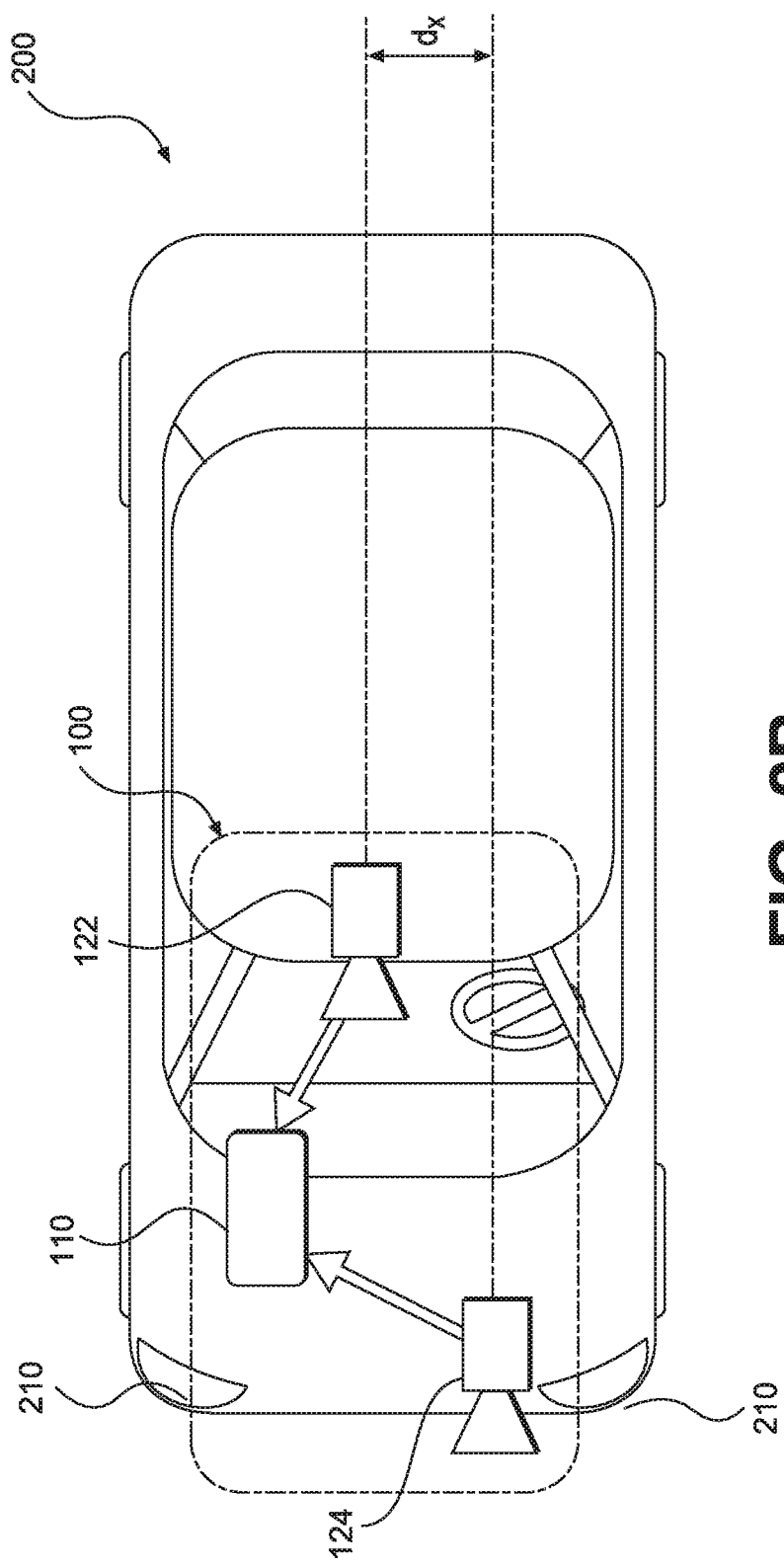
FIG. 2B is a diagrammatic top view representation of the vehicle and system shown in FIG. 2A consistent with the disclosed embodiments.

FIG. 2A is a diagrammatic side view representation of an exemplary vehicle imaging system consistent with the disclosed embodiments. FIG. 2B is a diagrammatic top view illustration of the embodiment shown in FIG. 2A. As illustrated in FIG. 2B, the disclosed embodiments may include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing unit 110.

Figure 2C:
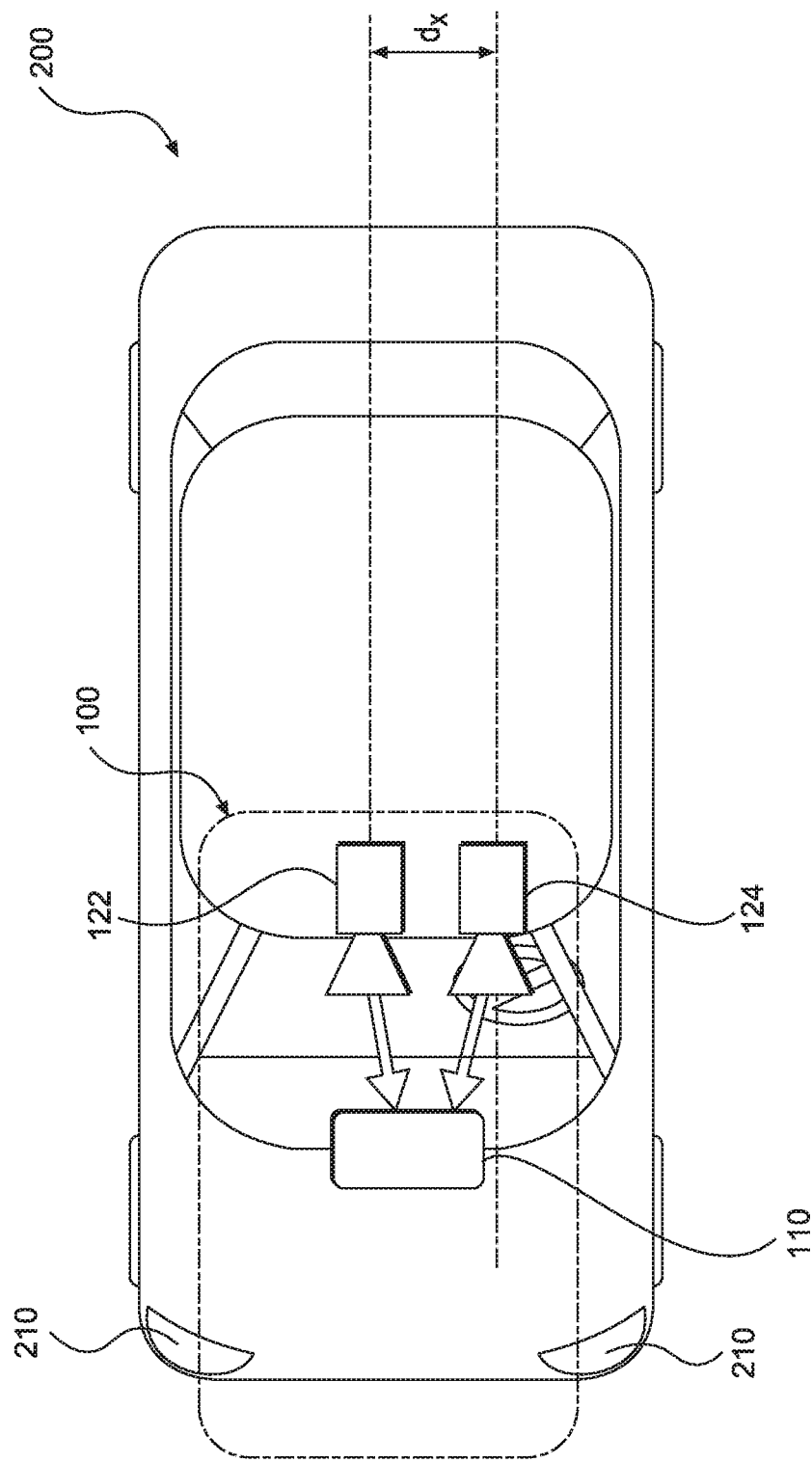
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiments shown in FIGS. 2D and 2E, first, second, and third image capture devices 122, 124, and 126, are included in the system 100 of vehicle 200.

Figure 2D:
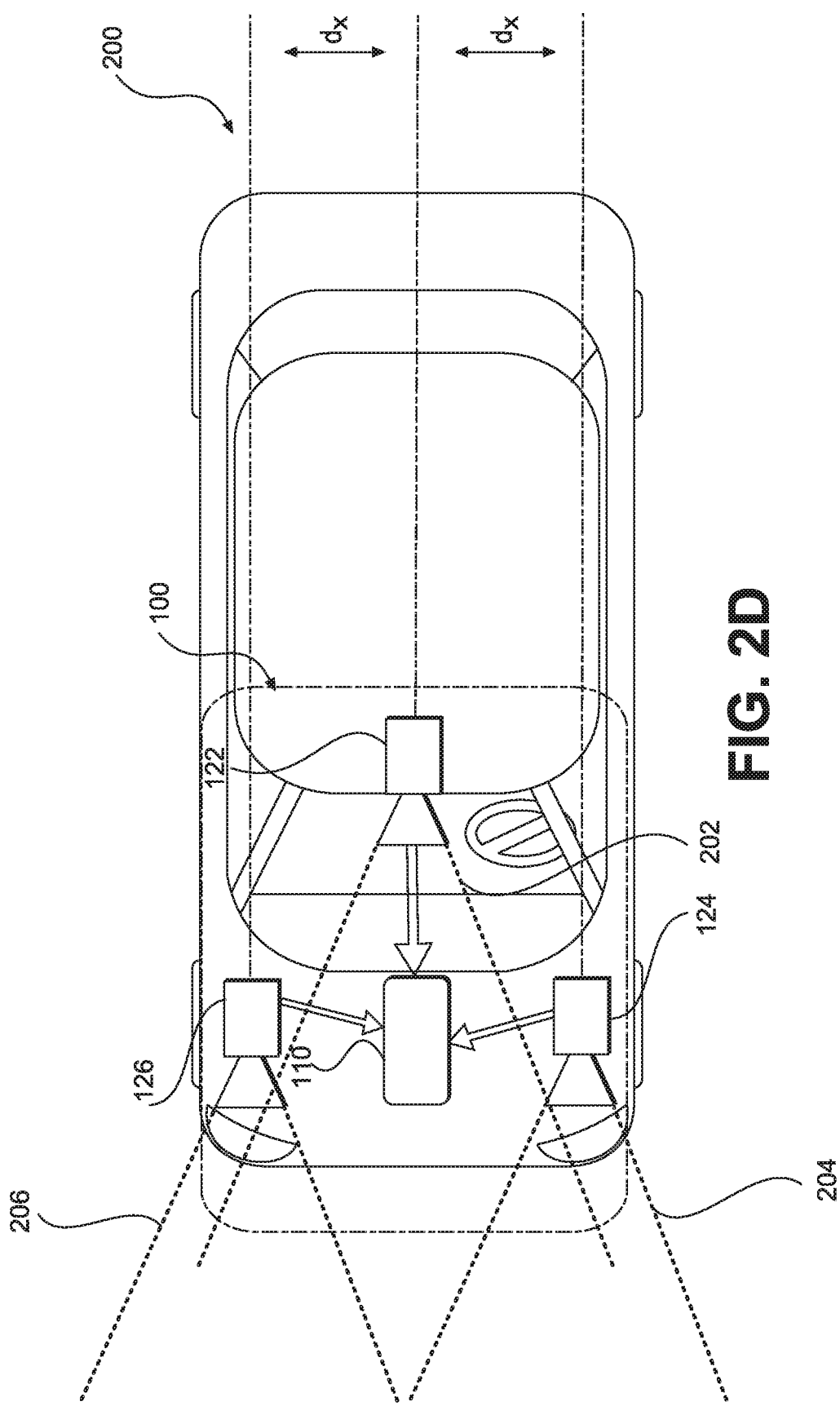
FIG. 2D is a diagrammatic top view representation of yet another embodiment of a vehicle including a system consistent with the disclosed embodiments.
Figure 2E:
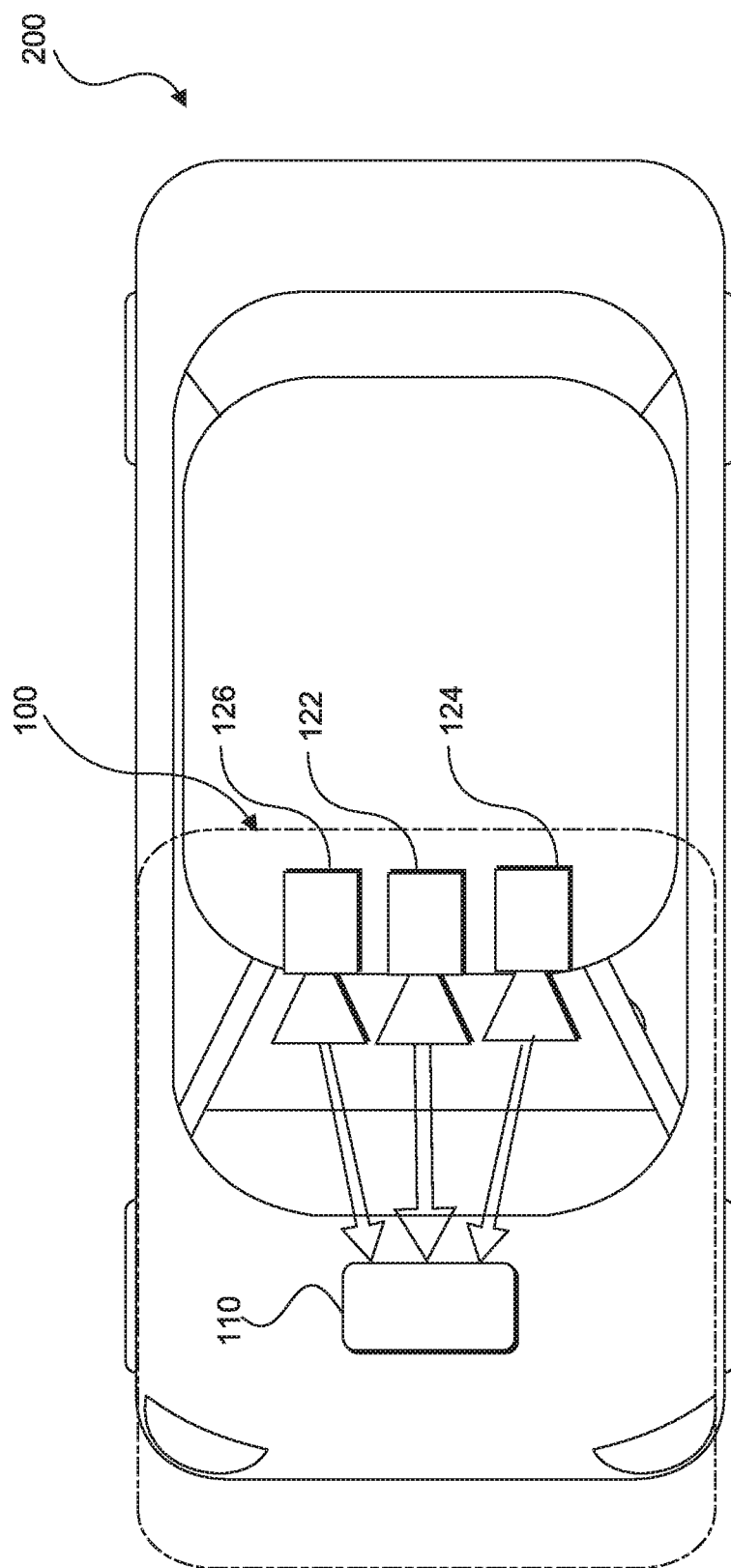
FIG. 2E is a diagrammatic top view representation of yet another embodiment of a vehicle including a system consistent with the disclosed embodiments.

As illustrated in FIG. 2D, image capture device 122 may be positioned in the vicinity of the rearview mirror and/or near the driver of vehicle 200, and image capture devices 124 and 126 may be positioned on or in a bumper region (e.g., one of bumper regions 210) of vehicle 200. And as shown in FIG. 2E, image capture devices 122, 124, and 126 may be positioned in the vicinity of the rearview mirror and/or near the driver seat of vehicle 200. The disclosed embodiments are not limited to any particular number and configuration of the image capture devices, and the image capture devices may be positioned in any appropriate location within and/or on vehicle 200.

It is to be understood that the disclosed embodiments are not limited to vehicles and could be applied in other contexts. It is also to be understood that disclosed embodiments are not limited to a particular type of vehicle 200 and may be applicable to all types of vehicles including automobiles, trucks, trailers, and other types of vehicles.

The first image capture device 122 may include any suitable type of image capture device. Image capture device 122 may include an optical axis. In one instance, the image capture device 122 may include an Aptina M9V024 WVGA sensor with a global shutter. In other embodiments, image capture device 122 may provide a resolution of 1280×960 pixels and may include a rolling shutter. Image capture device 122 may include various optical elements. In some embodiments one or more lenses may be included, for example, to provide a desired focal length and field of view for the image capture device. In some embodiments, image capture device 122 may be associated with a 6 mm lens or a 12 mm lens. In some embodiments, image capture device 122 may be configured to capture images having a desired field-of-view (FOV) 202, as illustrated in FIG. 2D. For example, image capture device 122 may be configured to have a regular FOV, such as within a range of 40 degrees to 56 degrees, including a 46 degree FOV, 50 degree FOV, 52 degree FOV, or greater. Alternatively, image capture device 122 may be configured to have a narrow FOV in the range of 23 to 40 degrees, such as a 28 degree FOV or 36 degree FOV. In addition, image capture device 122 may be configured to have a wide FOV in the range of 100 to 180 degrees. In some embodiments, image capture device 122 may include a wide angle bumper camera or one with up to a 180 degree FOV. In some embodiments, image capture device 122 may be a 7.2M pixel image capture device with an aspect ratio of about 2:1 (e.g., H×V=3800×1900 pixels) with about 100 degree horizontal FOV. Such an image capture device may be used in place of a three image capture device configuration. Due to significant lens distortion, the vertical FOV of such an image capture device may be significantly less than 50 degrees in implementations in which the image capture device uses a radially symmetric lens. For example, such a lens may not be radially symmetric which would allow for a vertical FOV greater than 50 degrees with 100 degree horizontal FOV.

The first image capture device 122 may acquire a plurality of first images relative to a scene associated with vehicle 200. Each of the plurality of first images may be acquired as a series of image scan lines, which may be captured using a rolling shutter. Each scan line may include a plurality of pixels.

The first image capture device 122 may have a scan rate associated with acquisition of each of the first series of image scan lines. The scan rate may refer to a rate at which an image sensor can acquire image data associated with each pixel included in a particular scan line.

Image capture devices 122, 124, and 126 may contain any suitable type and number of image sensors, including CCD sensors or CMOS sensors, for example. In one embodiment, a CMOS image sensor may be employed along with a rolling shutter, such that each pixel in a row is read one at a time, and scanning of the rows proceeds on a row-by-row basis until an entire image frame has been captured. In some embodiments, the rows may be captured sequentially from top to bottom relative to the frame.

In some embodiments, one or more of the image capture devices (e.g., image capture devices 122, 124, and 126) disclosed herein may constitute a high resolution imager and may have a resolution greater than 5M pixel, 7M pixel, 10M pixel, or greater.

The use of a rolling shutter may result in pixels in different rows being exposed and captured at different times, which may cause skew and other image artifacts in the captured image frame. On the other hand, when the image capture device 122 is configured to operate with a global or synchronous shutter, all of the pixels may be exposed for the same amount of time and during a common exposure period. As a result, the image data in a frame collected from a system employing a global shutter represents a snapshot of the entire FOV (such as FOV 202) at a particular time. In contrast, in a rolling shutter application, each row in a frame is exposed and data is capture at different times. Thus, moving objects may appear distorted in an image capture device having a rolling shutter. This phenomenon will be described in greater detail below.

The second image capture device 124 and the third image capturing device 126 may be any type of image capture device. Like the first image capture device 122, each of image capture devices 124 and 126 may include an optical axis. In one embodiment, each of image capture devices 124 and 126 may include an Aptina M9V024 WVGA sensor with a global shutter. Alternatively, each of image capture devices 124 and 126 may include a rolling shutter. Like image capture device 122, image capture devices 124 and 126 may be configured to include various lenses and optical elements. In some embodiments, lenses associated with image capture devices 124 and 126 may provide FOV's (such as FM's 204 and 206) that are the same as, or narrower than, a FOV (such as FOV 202) associated with image capture device 122. For example, image capture devices 124 and 126 may have FOVs of 40 degrees, 30 degrees, 26 degrees, 23 degrees, 20 degrees, or less.

Image capture devices 124 and 126 may acquire a plurality of second and third images relative to a scene associated with vehicle 200. Each of the plurality of second and third images may be acquired as a second and third series of image scan lines, which may be captured using a rolling shutter. Each scan line or row may have a plurality of pixels. Image capture devices 124 and 126 may have second and third scan rates associated with acquisition of each of image scan lines included in the second and third series.

Each image capture device 122, 124, and 126 may be positioned at any suitable position and orientation relative to vehicle 200. The relative positioning of the image capture devices 122, 124, and 126 may be selected to aid in fusing together the information acquired from the image capture devices. For example, in some embodiments, a FOV (such as FOV 204) associated with image capture device 124 may overlap partially or fully with a FOV (such as FOV 202) associated with image capture device 122 and a FOV (such as FOV 206) associated with image capture device 126.

Image capture devices 122, 124, and 126 may be located on vehicle 200 at any suitable relative heights. In one instance, there may be a height difference between the image capture devices 122, 124, and 126, which may provide sufficient parallax information to enable stereo analysis. For example, as shown in FIG. 2A, the two image capture devices 122 and 124 are at different heights. There may also be a lateral displacement difference between image capture devices 122, 124, and 126, giving additional parallax information for stereo analysis by processing unit 110, for example. The difference in the lateral displacement may be denoted by $d_x$, as shown in FIGS. 2C and 2D. In some embodiments, fore or aft displacement (e.g., range displacement) may exist between image capture devices 122, 124, and 126. For example, image capture device 122 may be located 0.5 to 2 meters or more behind image capture device 124 and/or image capture device 126. This type of displacement may enable one of the image capture devices to cover potential blind spots of the other image capture device(s).

Image capture devices 122 may have any suitable resolution capability (e.g., number of pixels associated with the image sensor), and the resolution of the image sensor(s) associated with the image capture device 122 may be higher, lower, or the same as the resolution of the image sensor(s) associated with image capture devices 124 and 126. In some embodiments, the image sensor(s) associated with image capture device 122 and/or image capture devices 124 and 126 may have a resolution of 640×480, 1024×768, 1280×960, or any other suitable resolution.

The frame rate (e.g., the rate at which an image capture device acquires a set of pixel data of one image frame before moving on to capture pixel data associated with the next image frame) may be controllable. The frame rate associated with image capture device 122 may be higher, lower, or the same as the frame rate associated with image capture devices 124 and 126. The frame rate associated with image capture devices 122, 124, and 126 may depend on a variety of factors that may affect the timing of the frame rate. For example, one or more of image capture devices 122, 124, and 126 may include a selectable pixel delay period imposed before or after acquisition of image data associated with one or more pixels of an image sensor in image capture device 122, 124, and/or 126. Generally, image data corresponding to each pixel may be acquired according to a clock rate for the device (e.g., one pixel per clock cycle). Additionally, in embodiments including a rolling shutter, one or more of image capture devices 122, 124, and 126 may include a selectable horizontal blanking period imposed before or after acquisition of image data associated with a row of pixels of an image sensor in image capture device 122, 124, and/or 126. Further, one or more of image capture devices 122, 124, and/or 126 may include a selectable vertical blanking period imposed before or after acquisition of image data associated with an image frame of image capture device 122, 124, and 126.

These timing controls may enable synchronization of frame rates associated with image capture devices 122, 124, and 126, even where the line scan rates of each are different. Additionally, as will be discussed in greater detail below, these selectable timing controls, among other factors (e.g., image sensor resolution, maximum line scan rates, etc.) may enable synchronization of image capture from an area where the FOV of image capture device 122 overlaps with one or more FOVs of image capture devices 124 and 126, even where the field of view of image capture device 122 is different from the FOVs of image capture devices 124 and 126.

Frame rate timing in image capture device 122, 124, and 126 may depend on the resolution of the associated image sensors. For example, assuming similar line scan rates for both devices, if one device includes an image sensor having a resolution of 640×480 and another device includes an image sensor with a resolution of 1280×960, then more time will be required to acquire a frame of image data from the sensor having the higher resolution.

Another factor that may affect the timing of image data acquisition in image capture devices 122, 124, and 126 is the maximum line scan rate. For example, acquisition of a row of image data from an image sensor included in image capture device 122, 124, and 126 will require some minimum amount of time. Assuming no pixel delay periods are added, this minimum amount of time for acquisition of a row of image data will be related to the maximum line scan rate for a particular device. Devices that offer higher maximum line scan rates have the potential to provide higher frame rates than devices with lower maximum line scan rates. In some embodiments, one or more of image capture devices 124 and 126 may have a maximum line scan rate that is higher than a maximum line scan rate associated with image capture device 122. In some embodiments, the maximum line scan rate of image capture device 124 and/or 126 may be 1.25, 1.5, 1.75, or 2 times or more than a maximum line scan rate of image capture device 122.

In another embodiment, image capture devices 122, 124, and 126 may have the same maximum line scan rate, but image capture device 122 may be operated at a scan rate less than or equal to its maximum scan rate. The system may be configured such that one or more of image capture devices 124 and 126 operate at a line scan rate that is equal to the line scan rate of image capture device 122. In other instances, the system may be configured such that the line scan rate of image capture device 124 and/or image capture device 126 may be 1.25, 1.5, 1.75, or 2 times or more than the line scan rate of image capture device 122.

In some embodiments, image capture devices 122, 124, and 126 may be asymmetric. That is, they may include cameras having different fields of view (FOV) and focal lengths. The fields of view of image capture devices 122, 124, and 126 may include any desired area relative to an environment of vehicle 200, for example. In some embodiments, one or more of image capture devices 122, 124, and 126 may be configured to acquire image data from an environment in front of vehicle 200, behind vehicle 200, to the sides of vehicle 200, or combinations thereof.

Further, the focal length associated with each image capture device 122, 124, and/or 126 may be selectable (e.g., by inclusion of appropriate lenses etc.) such that each device acquires images of objects at a desired distance range relative to vehicle 200. For example, in some embodiments image capture devices 122, 124, and 126 may acquire images of close-up objects within a few meters from the vehicle. Image capture devices 122, 124, and 126 may also be configured to acquire images of objects at ranges more distant from the vehicle (e.g., 25 m, 50 m, 100 m, 150 m, or more). Further, the focal lengths of image capture devices 122, 124, and 126 may be selected such that one image capture device (e.g., image capture device 122) can acquire images of objects relatively close to the vehicle (e.g., within 10 m or within 20 m) while the other image capture devices (e.g., image capture devices 124 and 126) can acquire images of more distant objects (e.g., greater than 20 m, 50 m, 100 m, 150 m, etc.) from vehicle 200.

According to some embodiments, the FOV of one or more image capture devices 122, 124, and 126 may have a wide angle. For example, it may be advantageous to have a FOV of 140 degrees, especially for image capture devices 122, 124, and 126 that may be used to capture images of the area in the vicinity of vehicle 200. For example, image capture device 122 may be used to capture images of the area to the right or left of vehicle 200 and, in such embodiments, it may be desirable for image capture device 122 to have a wide FOV (e.g., at least 140 degrees).

The field of view associated with each of image capture devices 122, 124, and 126 may depend on the respective focal lengths. For example, as the focal length increases, the corresponding field of view decreases.

Image capture devices 122, 124, and 126 may be configured to have any suitable fields of view. In one particular example, image capture device 122 may have a horizontal FOV of 46 degrees, image capture device 124 may have a horizontal FOV of 23 degrees, and image capture device 126 may have a horizontal FOV in between 23 and 46 degrees. In another instance, image capture device 122 may have a horizontal FOV of 52 degrees, image capture device 124 may have a horizontal FOV of 26 degrees, and image capture device 126 may have a horizontal FOV in between 26 and 52 degrees. In some embodiments, a ratio of the FOV of image capture device 122 to the FOVs of image capture device 124 and/or image capture device 126 may vary from 1.5 to 2.0. In other embodiments, this ratio may vary between 1.25 and 2.25.

System 100 may be configured so that a field of view of image capture device 122 overlaps, at least partially or fully, with a field of view of image capture device 124 and/or image capture device 126. In some embodiments, system 100 may be configured such that the fields of view of image capture devices 124 and 126, for example, fall within (e.g., are narrower than) and share a common center with the field of view of image capture device 122. In other embodiments, the image capture devices 122, 124, and 126 may capture adjacent FOVs or may have partial overlap in their FOVs. In some embodiments, the fields of view of image capture devices 122, 124, and 126 may be aligned such that a center of the narrower FOY image capture devices 124 and/or 126 may be located in a lower half of the field of view of the wider FOV device 122.

Figure 2F:
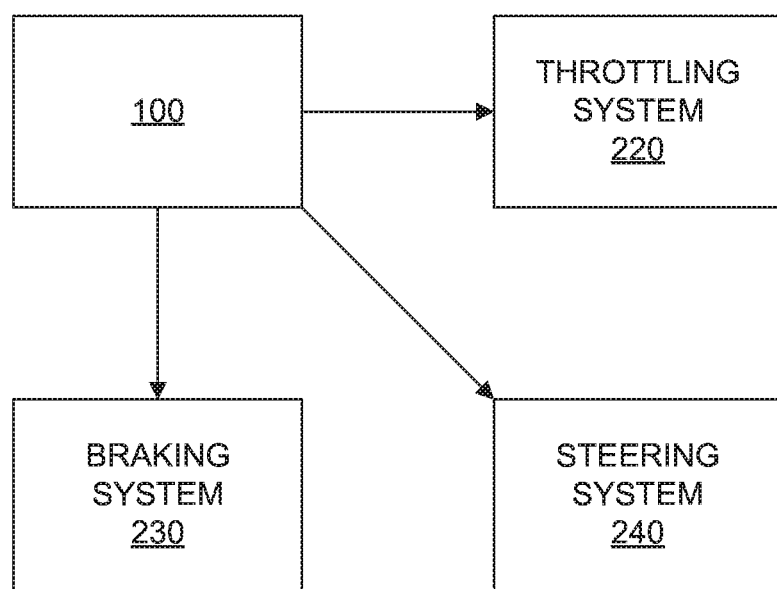
FIG. 2F is a diagrammatic representation of exemplary vehicle control systems consistent with the disclosed embodiments.

FIG. 2F is a diagrammatic representation of exemplary vehicle control systems, consistent with the disclosed embodiments. As indicated in FIG. 2F, vehicle 200 may include throttling system 220, braking system 230, and steering system 240. System 100 may provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 may provide control signals to one or more of throttling system 220, braking system 230, and steering system 240 to navigate vehicle 200 (e.g., by causing an acceleration, a turn, a lane shift, etc.). Further, system 100 may receive inputs from one or more of throttling system 220, braking system 230, and steering system 24 indicating operating conditions of vehicle 200 (e.g., speed, whether vehicle 200 is braking and/or turning, etc.). Further details are provided in connection with FIGS. 4-7, below.

Figure 3A:
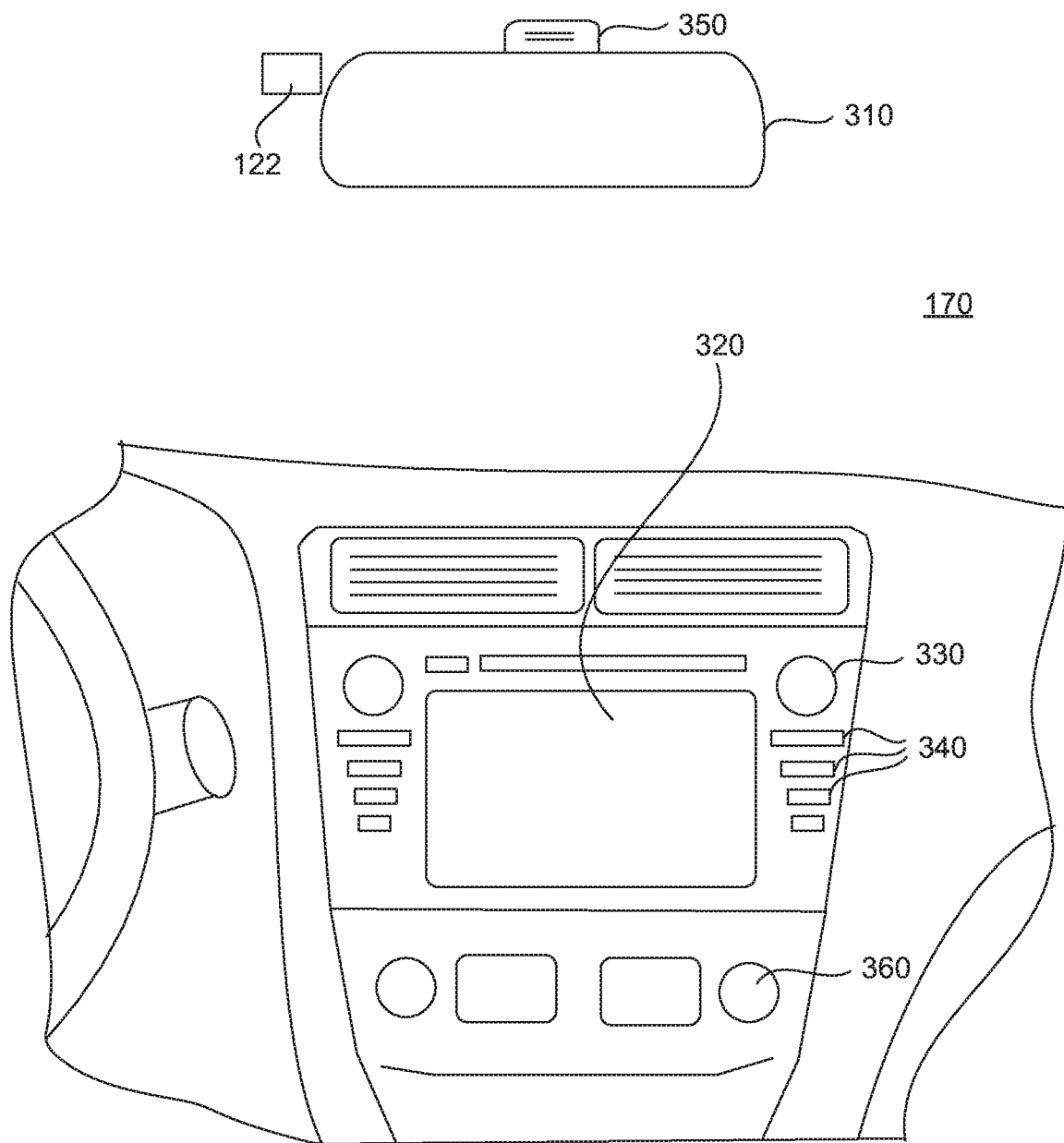
FIG. 3A is a diagrammatic representation of an interior of a vehicle including a rearview mirror and a user interface for a vehicle imaging system consistent with the disclosed embodiments.

As shown in FIG. 3A, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

Figure 3B:
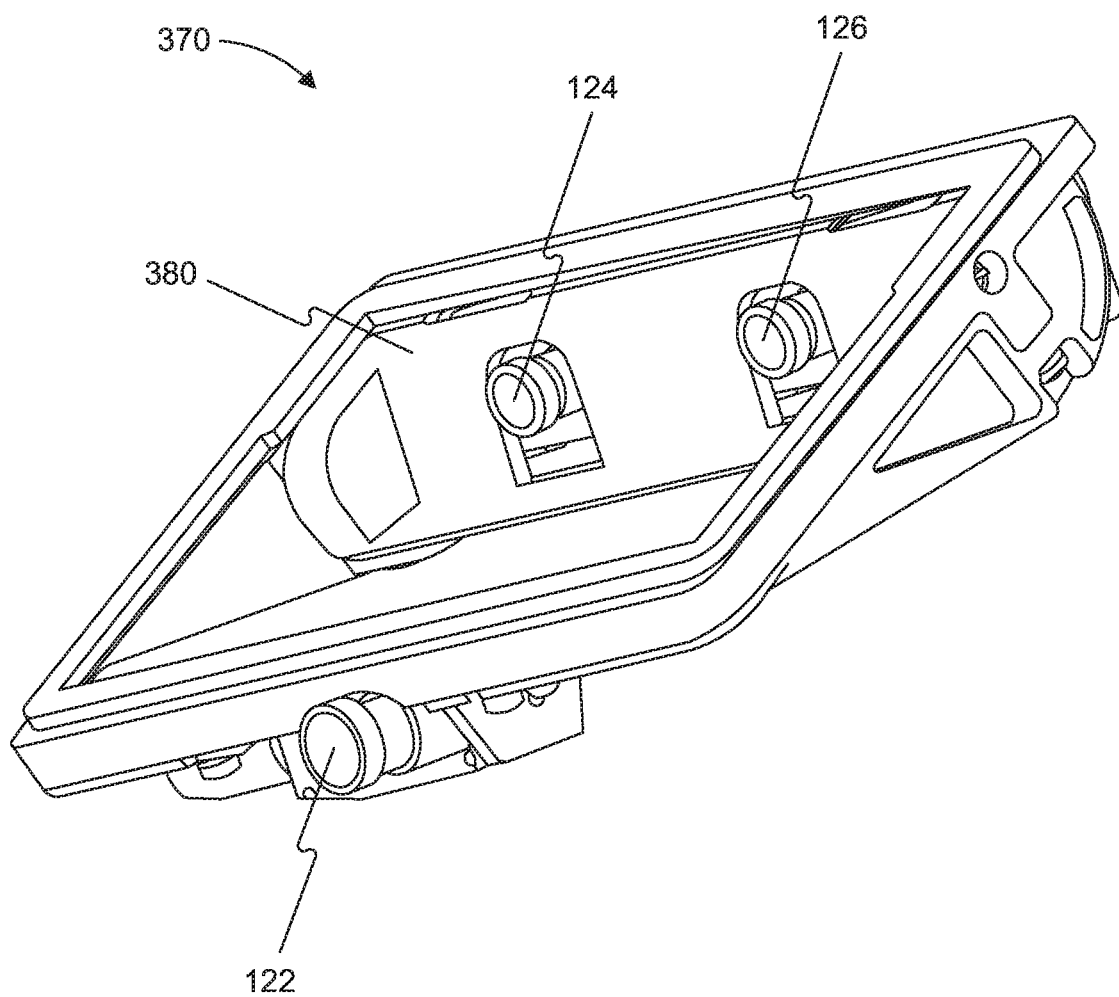
FIG. 3B is an illustration of an example of a camera mount that is configured to be positioned behind a rearview mirror and against a vehicle windshield consistent with the disclosed embodiments.
Figure 3C:
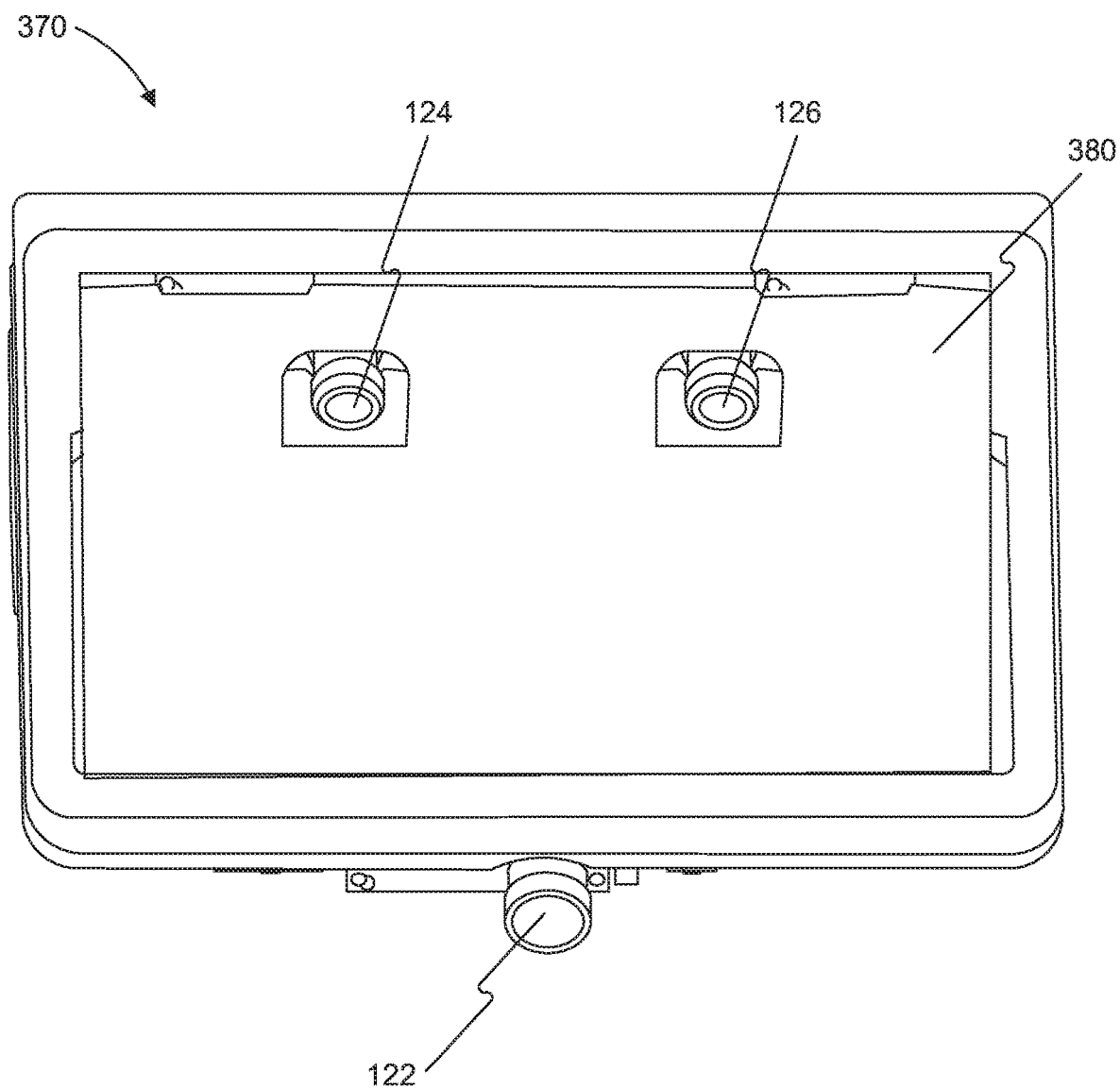
FIG. 3C is an illustration of the camera mount shown in FIG. 3B from a different perspective consistent with the disclosed embodiments.
Figure 3D:
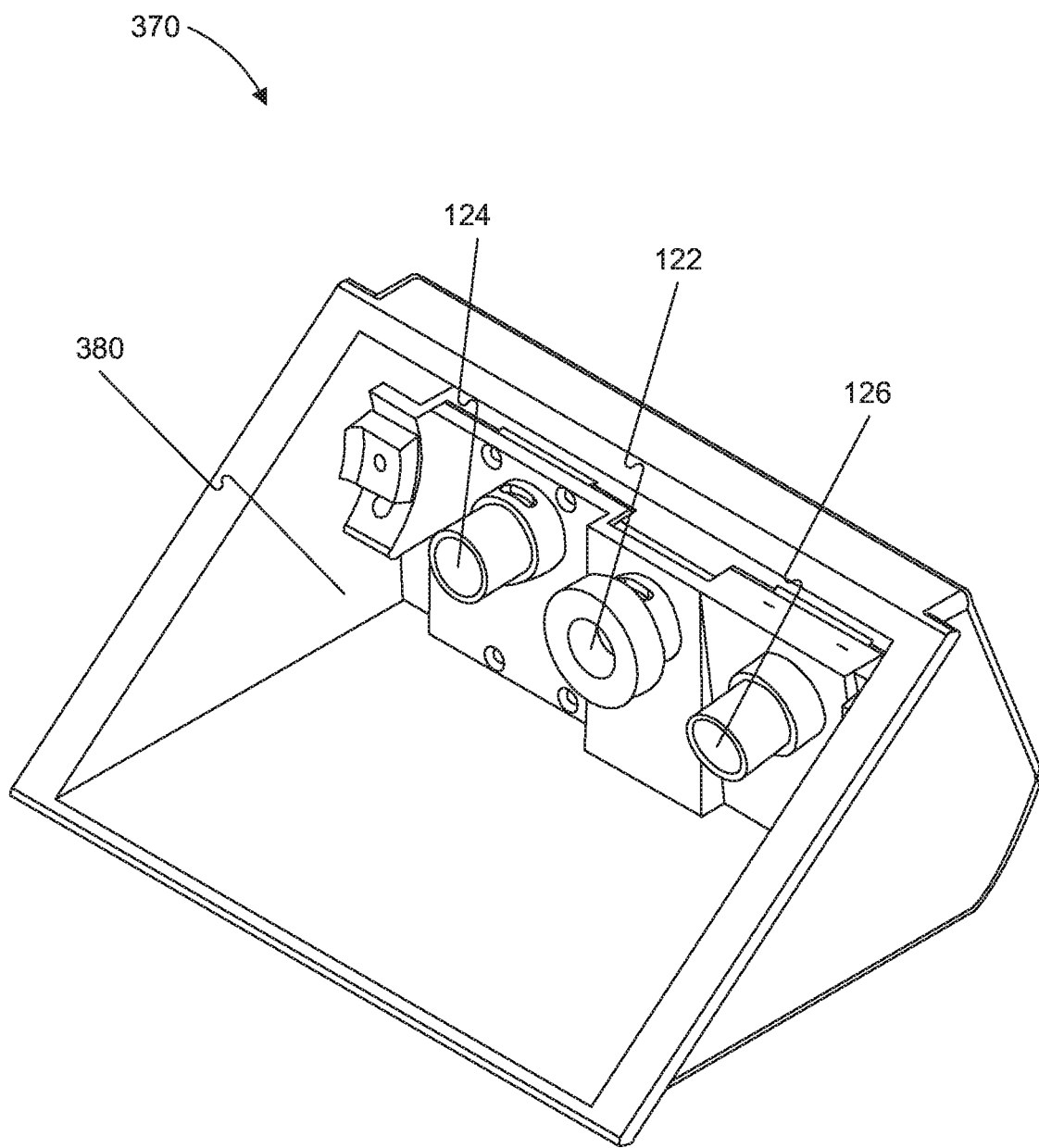
FIG. 3D is an illustration of an example of a camera mount that is configured to be positioned behind a rearview mirror and against a vehicle windshield consistent with the disclosed embodiments.

FIGS. 3B-3D are illustrations of an exemplary camera mount 370 configured to be positioned behind a rearview mirror (e.g., rearview mirror 310) and against a vehicle windshield, consistent with disclosed embodiments. As shown in FIG. 3B, camera mount 370 may include image capture devices 122, 124, and 126. Image capture devices 124 and 126 may be positioned behind a glare shield 380, which may be flush against the vehicle windshield and include a composition of film and/or anti-reflective materials. For example, glare shield 380 may be positioned such that it aligns against a vehicle windshield having a matching slope. In some embodiments, each of image capture devices 122, 124, and 126 may be positioned behind glare shield 380, as depicted, for example, in FIG. 3D. The disclosed embodiments arc not limited to any particular configuration of image capture devices 122, 124, and 126, camera mount 370, and glare shield 380. FIG. 3C is an illustration of camera mount 370 shown in FIG. 3B from a front perspective.

As will be appreciated by a person skilled in the art having the benefit of this disclosure, numerous variations and/or modifications may be made to the foregoing disclosed embodiments. For example, not ail components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and navigate vehicle 200 in response to the analysis.

As discussed below in further detail and consistent with various disclosed embodiments, system 100 may provide a variety of features related to autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings and/or alerts to vehicle occupants based on the analysis of the collected data. Additional details regarding the various embodiments that are provided by system 100 are provided below.

Forward-Facing Multi-Imaging System

As discussed above, system 100 may provide drive assist functionality that uses a multi-camera system. The multi-camera system may use one or more cameras facing in the forward direction of a vehicle. In other embodiments, the multi-camera system may include one or more cameras facing to the side of a vehicle or to the rear of the vehicle. In one embodiment, for example, system 100 may use a two-camera imaging system, where a first camera and a second camera (e.g., image capture devices 122 and 124) may be positioned at the front and/or the sides of a vehicle (e.g., vehicle 200). Other camera configurations are consistent with the disclosed embodiments, and the configurations disclosed herein are examples. For example, system 100 may include a configuration of any number of cameras (e.g., one, two, three, four, five, six, seven, eight, etc.) Furthermore, system 100 may include "clusters" of cameras. For example, a cluster of cameras (including any appropriate number of cameras, e.g., one, four, eight, etc.) may be forward-facing relative to a vehicle, or may be facing any other direction (e.g., reward-facing, side-facing, at an angle, etc.) Accordingly, system 100 may include multiple clusters of cameras, with each cluster oriented in a particular direction to capture images from a particular region of a vehicle's environment.

The first camera may have a field of view that is greater than, less than, or partially overlapping with, the field of view of the second camera. In addition, the first camera may be connected to a first image processor to perform monocular image analysis of images provided by the first camera, and the second camera may be connected to a second image processor to perform monocular image analysis of images provided by the second camera. The outputs (e.g., processed information) of the first and second image processors may be combined. In some embodiments, the second image processor may receive images from both the first camera and second camera to perform stereo analysis. In another embodiment, system 100 may use a three-camera imaging system where each of the cameras has a different field of view. Such a system may, therefore, make decisions based on information derived from objects located at varying distances both forward and to the sides of the vehicle. References to monocular image analysis may refer to instances where image analysis is performed based on images captured from a single point of view (e.g., from a single camera). Stereo image analysis may refer to instances where image analysis is performed based on two or more images captured with one or more variations of an image capture parameter. For example, captured images suitable for performing stereo image analysis may include images captured: from two or more different positions, from different fields of view, using different focal lengths, along with parallax information, etc.

For example, in one embodiment, system 100 may implement a three camera configuration using image capture devices 122-126. In such a configuration, image capture device 122 may provide a narrow field of view (e.g., 34 degrees, or other values selected from a range of about 20 to 45 degrees, etc.), image capture device 124 may provide a wide field of view (e.g., 150 degrees or other values selected from a range of about 100 to about 180 degrees), and image capture device 126 may provide an intermediate field of view (e.g., 46 degrees or other values selected from a range of about 35 to about 60 degrees). In some embodiments, image capture device 126 may act as a main or primary camera. Image capture devices 122-126 may be positioned behind rearview mirror 310 and positioned substantially side-by-side (e.g., 6 cm apart). Further, in some embodiments, as discussed above, one or more of image capture devices 122-126 may be mounted behind glare shield 380 that is flush with the windshield of vehicle 200. Such shielding may act to minimize the impact of any reflections from inside the car on image capture devices 122-126.

In another embodiment, as discussed above in connection with FIGS. 3B and 3C, the wide field of view camera (e.g., image capture device 124 in the above example) may be mounted lower than the narrow and main field of view cameras (e.g., image devices 122 and 126 in the above example). This configuration may provide a free line of sight from the wide field of view camera. To reduce reflections, the cameras may be mounted close to the windshield of vehicle 200, and may include polarizers on the cameras to damp reflected light.

A three camera system may provide certain performance characteristics. For example, some embodiments may include an ability to validate the detection of objects by one camera based on detection results from another camera. In the three camera configuration discussed above, processing unit 110 may include, for example, three processing devices (e.g., three EyeQ series of processor chips, as discussed above), with each processing device dedicated to processing images captured by one or more of image capture devices 122-126.

In a three camera system, a first processing device may receive images from both the main camera and the narrow field of view camera, and perform vision processing of the narrow FOV camera to, for example, detect other vehicles, pedestrians, lane marks, traffic signs, traffic lights, and other road objects. Further, the first processing device may calculate a disparity of pixels between the images from the main camera and the narrow camera and create a 3D reconstruction of the environment of vehicle 200. The first processing device may then combine the 3D reconstruction with 3D map data or with 3D information calculated based on information from another camera.

The second processing device may receive images from the main camera and perform vision processing to detect other vehicles, pedestrians, lane marks, traffic signs, traffic lights, and other road objects. Additionally, the second processing device may calculate a camera displacement and, based on the displacement, calculate a disparity of pixels between successive images and create a 3D reconstruction of the scene (e.g., a structure from motion). The second processing device may send the structure from motion based 3D reconstruction to the first processing device to be combined with the stereo 3D images.

The third processing device may receive images from the wide FOV camera and process the images to detect vehicles, pedestrians, lane marks, traffic signs, traffic lights, and other road objects. The third processing device may further execute additional processing instructions to analyze images to identify objects moving in the image, such as vehicles changing lanes, pedestrians, etc.

In some embodiments, having streams of image-based information captured and processed independently may provide an opportunity for providing redundancy in the system. Such redundancy may include, for example, using a first image capture device and the images processed from that device to validate and/or supplement information obtained by capturing and processing image information from at least a second image capture device.

In some embodiments, system 100 may use two image capture devices (e.g., image capture devices 122 and 124) in providing navigation assistance for vehicle 200 and use a third image capture device (e.g., image capture device 126) to provide redundancy and validate the analysis of data received from the other two image capture devices. For example, in such a configuration, image capture devices 122 and 124 may provide images for stereo analysis by system 100 for navigating vehicle 200, while image capture device 126 may provide images for monocular analysis by system 100 to provide redundancy and validation of information obtained based on images captured from image capture device 122 and/or image capture device 124. That is, image capture device 126 (and a corresponding processing device) may be considered to provide a redundant sub-system for providing a check on the analysis derived from image capture devices 122 and 124 (e.g., to provide an automatic emergency braking (AEB) system). Furthermore, in some embodiments, redundancy and validation of received data may be supplemented based on information received from one more sensors (e.g., radar, lidar, acoustic sensors, information received from one or more transceivers outside of a vehicle, etc.).

One of skill in the art will recognize that the above camera configurations, camera placements, number of cameras, camera locations, etc., are examples only. These components and others described relative to the overall system may be assembled and used in a variety of different configurations without departing from the scope of the disclosed embodiments. Further details regarding usage of a multi-camera system to provide driver assist and/or autonomous vehicle functionality follow below.

Figure 4:
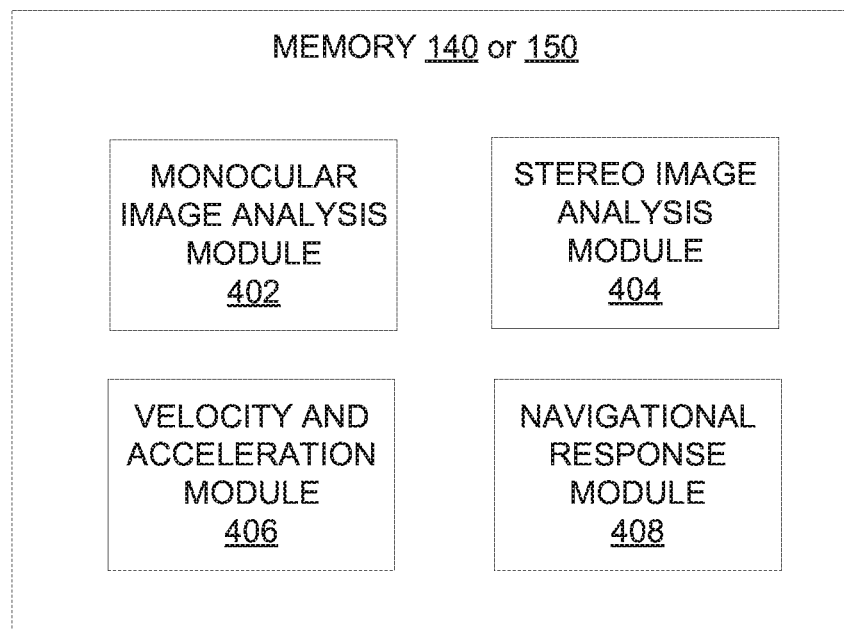
FIG. 4 is an exemplary block diagram of a memory configured to store instructions for performing one or more operations consistent with the disclosed embodiments.

FIG. 4 is an exemplary functional block diagram of memory 140 and/or 150, which may be stored/programmed with instructions for performing one or more operations consistent with the disclosed embodiments. Although the following refers to memory 140, one of skill in the art will recognize that instructions may be stored in memory 140 and/or 150.

As shown in FIG. 4, memory 140 may store a monocular image analysis module 402, a stereo image analysis module 404, a velocity and acceleration module 406, and a navigational response module 408. The disclosed embodiments are not limited to any particular configuration of memory 140. Further, applications processor 180 and/or image processor 190 may execute the instructions stored in any of modules 402-408 included in memory 140. One of skill in the art will understand that references in the following discussions to processing unit 110 may refer to applications processor 180 and image processor 190 individually or collectively. Accordingly, steps of any of the following processes may be performed by one or more processing devices.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with navigational response module 408.

In one embodiment, monocular image analysis module 402 may store instructions (such as computer vision software) which, when executed by processing unit 110, performs monocular image analysis of a set of images acquired by one of image capture devices 122, 124, and 126. In some embodiments, processing unit 110 may combine information from a set of images with additional sensory information (e.g., information from radar, lidar, etc.) to perform the monocular image analysis. As described in connection with FIGS. 5A-5D below, monocular image analysis module 402 may include instructions for detecting a set of features within the set of images, such as lane markings, vehicles, pedestrians, road signs, highway exit ramps, traffic lights, hazardous objects, and any other feature associated with an environment of a vehicle. Based on the analysis, system 100 (e.g., via processing unit 110) may cause one or more navigational responses in vehicle 200, such as a turn, a lane shift, a change in acceleration, and the like, as discussed below in connection with determining a navigational response.

In one embodiment, stereo image analysis module 404 may store instructions (such as computer vision software) which, when executed by processing unit 110, performs stereo image analysis of first and second sets of images acquired by a combination of image capture devices selected from any of image capture devices 122, 124, and 126. In some embodiments, processing unit 110 may combine information from the first and second sets of images with additional sensory information (e.g., information from radar) to perform the stereo image analysis. For example, stereo image analysis module 404 may include instructions for performing stereo image analysis based on a first set of images acquired by image capture device 124 and a second set of images acquired by image capture device 126. As described in connection with FIG. 6 below, stereo image analysis module 404 may include instructions for detecting a set of features within the first and second sets of images, such as lane markings, vehicles, pedestrians, road signs, highway exit ramps, traffic lights, hazardous objects, and the like. Based on the analysis, processing unit 110 may cause one or more navigational responses in vehicle 200, such as a turn, a lane shift, a change in acceleration, and the like, as discussed below in connection with navigational response module 408. Furthermore, in some embodiments, stereo image analysis module 404 may implement techniques associated with a trained system (such as a neural network or a deep neural network) or an untrained system.

In one embodiment, velocity and acceleration module 406 may store software configured to analyze data received from one or more computing and electromechanical devices in vehicle 200 that are configured to cause a change in velocity and/or acceleration of vehicle 200. For example, processing unit 110 may execute instructions associated with velocity and acceleration module 406 to calculate a target speed for vehicle 200 based on data derived from execution of monocular image analysis module 402 and/or stereo image analysis module 404. Such data may include, for example, a target position, velocity, and/or acceleration, the position and/or speed of vehicle 200 relative to a nearby vehicle, pedestrian, or road object, position information for vehicle 200 relative to lane markings of the road, and the like. In addition, processing unit 110 may calculate a target speed for vehicle 200 based on sensory input (e.g., information from radar) and input from other systems of vehicle 200, such as throttling system 220, braking system 230, and/or steering system 240 of vehicle 200. Based on the calculated target speed, processing unit 110 may transmit electronic signals to throttling system 220, braking system 230, and/or steering system 240 of vehicle 200 to trigger a change in velocity and/or acceleration by, for example, physically depressing the brake or easing up off the accelerator of vehicle 200.

In one embodiment, navigational response module 408 may store software executable by processing unit 110 to determine a desired navigational response based on data derived from execution of monocular image analysis module 402 and/or stereo image analysis module 404. Such data may include position and speed information associated with nearby vehicles, pedestrians, and road objects, target position information for vehicle 200, and the like. Additionally, in some embodiments, the navigational response may be based (partially or fully) on map data, a predetermined position of vehicle 200, and/or a relative velocity or a relative acceleration between vehicle 200 and one or more objects detected from execution of monocular image analysis module 402 and/or stereo image analysis module 404. Navigational response module 408 may also determine a desired navigational response based on sensory input (e.g., information from radar) and inputs from other systems of vehicle 200, such as throttling system 220, braking system 230, and steering system 240 of vehicle 200. Based on the desired navigational response, processing unit 110 may transmit electronic signals to throttling system 220, braking system 230, and steering system 240 of vehicle 200 to trigger a desired navigational response by, for example, turning the steering wheel of vehicle 200 to achieve a rotation of a predetermined angle. In some embodiments, processing unit 110 may use the output of navigational response module 408 (e.g., the desired navigational response) as an input to execution of velocity and acceleration module 406 for calculating a change in speed of vehicle 200.

Furthermore, any of the modules (e.g., modules 402, 404, and 406) disclosed herein may implement techniques associated with a trained system (such as a neural network or a deep neural network) or an untrained system.

Figure 5A:
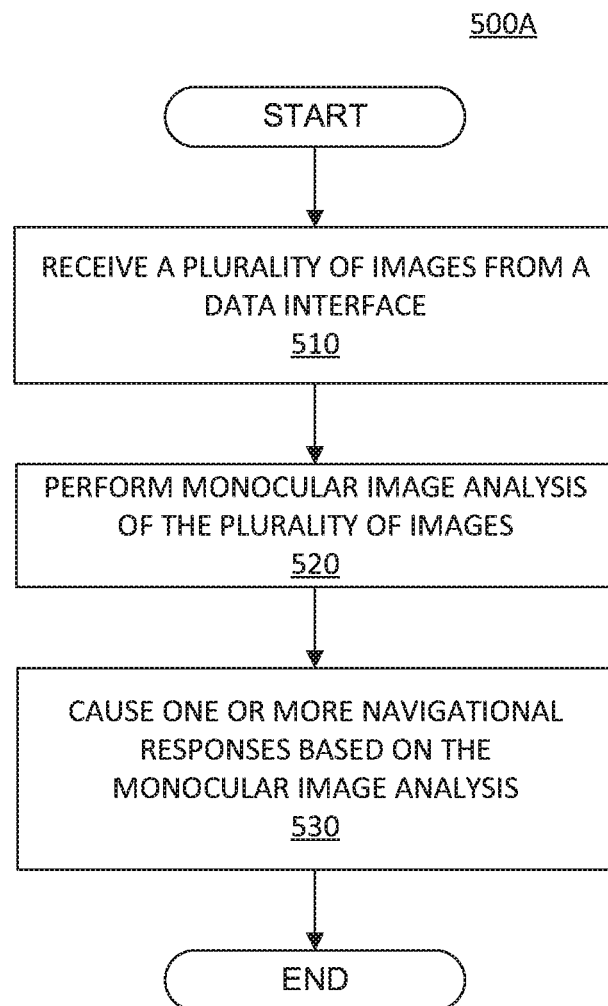
FIG. 5A is a flowchart showing an exemplary process for causing one or more navigational responses based on monocular image analysis consistent with disclosed embodiments.

FIG. 5A is a flowchart showing an exemplary process 500A for causing one or more navigational responses based on monocular image analysis, consistent with disclosed embodiments. At step 510, processing unit 110 may receive a plurality of images via data interface 128 between processing unit 110 and image acquisition unit 120. For instance, a camera included in image acquisition unit 120 (such as image capture device 122 having field of view 202) may capture a plurality of images of an area forward of vehicle 200 (or to the sides or rear of a vehicle, for example) and transmit them over a data connection (e.g., digital, wired, USB, wireless, Bluetooth, etc.) to processing unit 110. Processing unit 110 may execute monocular image analysis module 402 to analyze the plurality of images at step 520, as described in further detail in connection with FIGS. 5B-5D below. By performing the analysis, processing unit 110 may detect a set of features within the set of images, such as lane markings, vehicles, pedestrians, road signs, highway exit ramps, traffic lights, and the like.

Processing unit 110 may also execute monocular image analysis module 402 to detect various road hazards at step 520, such as, for example, parts of a truck tire, fallen road signs, loose cargo, small animals, and the like. Road hazards may vary in structure, shape, size, and color, which may make detection of such hazards more challenging. In some embodiments, processing unit 110 may execute monocular image analysis module 402 to perform multi-frame analysis on the plurality of images to detect road hazards. For example, processing unit 110 may estimate camera motion between consecutive image frames and calculate the disparities in pixels between the frames to construct a 3D-map of the road. Processing unit 110 may then use the 3D-map to detect the road surface, as well as hazards existing above the road surface.

At step 530, processing unit 110 may execute navigational response module 408 to cause one or more navigational responses in vehicle 200 based on the analysis performed at step 520 and the techniques as described above in connection with FIG. 4. Navigational responses may include, for example, a turn, a lane shift, a change in acceleration, and the like. In some embodiments, processing unit 110 may use data derived from execution of velocity and acceleration module 406 to cause the one or more navigational responses. Additionally, multiple navigational responses may occur simultaneously, in sequence, or any combination thereof. For instance, processing unit 110 may cause vehicle 200 to shift one lane over and then accelerate by, for example, sequentially transmitting control signals to steering system 240 and throttling system 220 of vehicle 200. Alternatively, processing unit 110 may cause vehicle 200 to brake while at the same time shifting lanes by, for example, simultaneously transmitting control signals to braking system 230 and steering system 240 of vehicle 200.

Figure 5B:
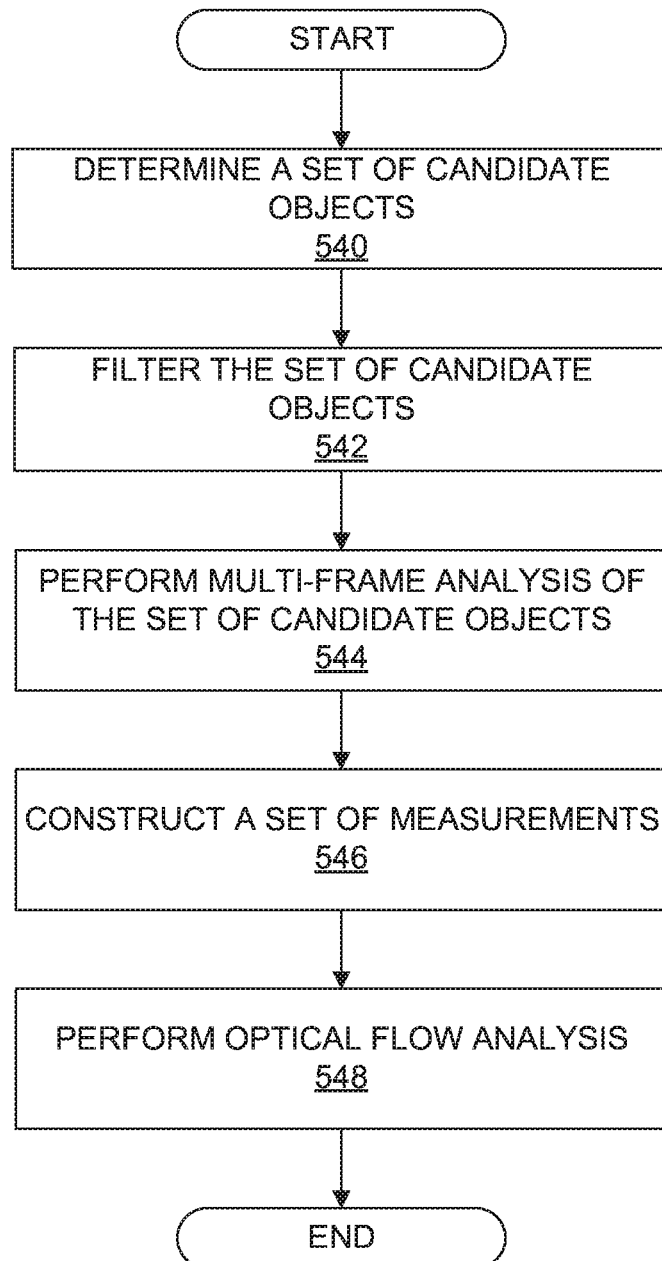
FIG. 5B is a flowchart showing an exemplary process for detecting one or more vehicles and/or pedestrians in a set of images consistent with the disclosed embodiments.

FIG. 5B is a flowchart showing an exemplary process 500B for detecting one or more vehicles and/or pedestrians in a set of images, consistent with disclosed embodiments. Processing unit 110 may execute monocular image analysis module 402 to implement process 500B. At step 540, processing unit 110 may determine a set of candidate objects representing possible vehicles and/or pedestrians. For example, processing unit 110 may scan one or more images, compare the images to one or more predetermined patterns, and identify within each image possible locations that may contain objects of interest (e.g., vehicles, pedestrians, or portions thereof). The predetermined patterns may be designed in such a way to achieve a high rate of "false hits" and a low rate of "misses." For example, processing unit 110 may use a low threshold of similarity to predetermined patterns for identifying candidate objects as possible vehicles or pedestrians. Doing so may allow processing unit 110 to reduce the probability of missing (e.g., not identifying) a candidate object representing a vehicle or pedestrian.

At step 542, processing unit 110 may filter the set of candidate objects to exclude certain candidates (e.g., irrelevant or less relevant objects) based on classification criteria. Such criteria may be derived from various properties associated with object types stored in a database (e.g., a database stored in memory 140). Properties may include object shape, dimensions, texture, position (e.g., relative to vehicle 200), and the like. Thus, processing unit 110 may use one or more sets of criteria to reject false candidates from the set of candidate objects.

At step 544, processing unit 110 may analyze multiple frames of images to determine whether objects in the set of candidate objects represent vehicles and/or pedestrians. For example, processing unit 110 may track a detected candidate object across consecutive frames and accumulate frame-by-frame data associated with the detected object (e.g., size, position relative to vehicle 200, etc.). Additionally, processing unit 110 may estimate parameters for the detected object and compare the object's frame-by-frame position data to a predicted position.

At step 546, processing unit 110 may construct a set of measurements for the detected objects. Such measurements may include, for example, position, velocity, and acceleration values (relative to vehicle 200) associated with the detected objects. In some embodiments, processing unit 110 may construct the measurements based on estimation techniques using a series of time-based observations such as Kalman filters or linear quadratic estimation (LQE), and/or based on available modeling data for different object types (e.g., cars, trucks, pedestrians, bicycles, road signs, etc.). The Kalman filters may be based on a measurement of an object's scale, where the scale measurement is proportional to a time to collision (e.g., the amount of time for vehicle 200 to reach the object). Thus, by performing steps 540-546, processing unit 110 may identify vehicles and pedestrians appearing within the set of captured images and derive information (e.g., position, speed, size) associated with the vehicles and pedestrians. Based on the identification and the derived information, processing unit 110 may cause one or more navigational responses in vehicle 200, as described in connection with FIG. 5A, above.

At step 548, processing unit 110 may perform an optical flow analysis of one or more images to reduce the probabilities of detecting a "false hit" and missing a candidate object that represents a vehicle or pedestrian. The optical flow analysis may refer to, for example, analyzing motion patterns relative to vehicle 200 in the one or more images associated with other vehicles and pedestrians, and that are distinct from road surface motion. Processing unit 110 may calculate the motion of candidate objects by observing the different positions of the objects across multiple image frames, which are captured at different times. Processing unit 110 may use the position and time values as inputs into mathematical models for calculating the motion of the candidate objects. Thus, optical flow analysis may provide another method of detecting vehicles and pedestrians that are nearby vehicle 200. Processing unit 110 may perform optical flow analysis in combination with steps 540-546 to provide redundancy for detecting vehicles and pedestrians and increase the reliability of system 100.

Figure 5C:
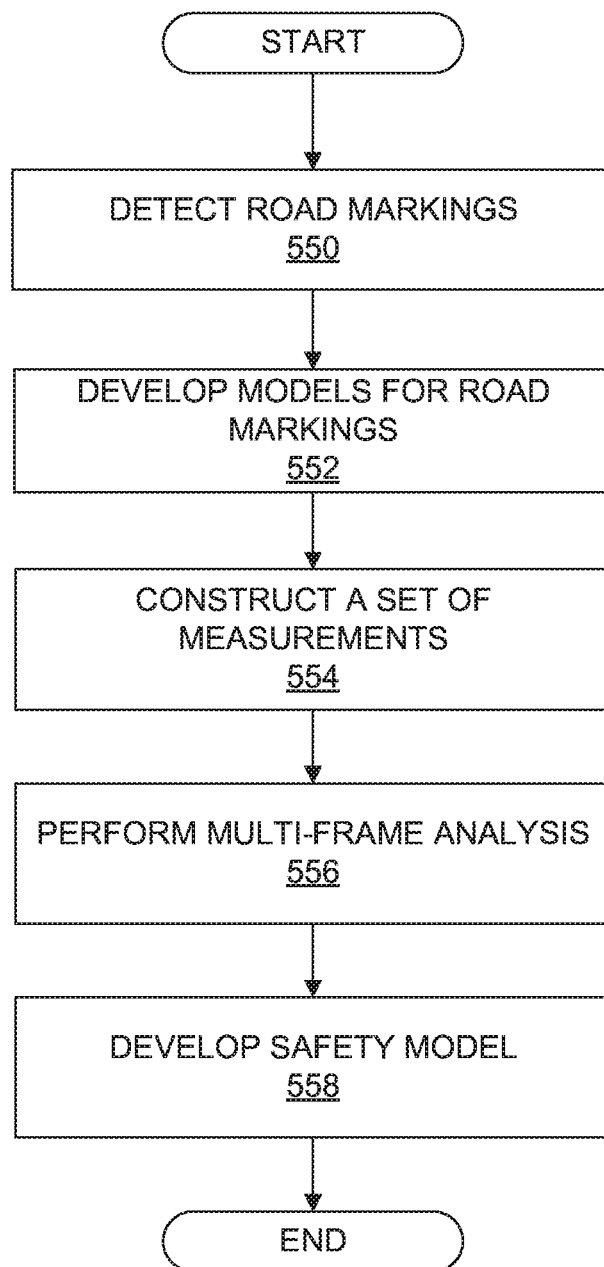
FIG. 5C is a flowchart showing an exemplary process for detecting road marks and/or lane geometry information in a set of images consistent with the disclosed embodiments.

FIG. 5C is a flowchart showing an exemplary process 500C for detecting road marks and/or lane geometry information in a set of images, consistent with disclosed embodiments. Processing unit 110 may execute monocular image analysis module 402 to implement process 500C. At step 550, processing unit 110 may detect a set of objects by scanning one or more images. To detect segments of lane markings, lane geometry information, and other pertinent road marks, processing unit 110 may filter the set of objects to exclude those determined to be irrelevant (e.g., minor potholes, small rocks, etc.). At step 552, processing unit 110 may group together the segments detected in step 550 belonging to the same road mark or lane mark. Based on the grouping, processing unit 110 may develop a model to represent the detected segments, such as a mathematical model.

At step 554, processing unit 110 may construct a set of measurements associated with the detected segments. In some embodiments, processing unit 110 may create a projection of the detected segments from the image plane onto the real-world plane. The projection may be characterized using a 3rd-degree polynomial having coefficients corresponding to physical properties such as the position, slope, curvature, and curvature derivative of the detected road. In generating the projection, processing unit 110 may take into account changes in the road surface, as well as pitch and roll rates associated with vehicle 200. In addition, processing unit 110 may model the road elevation by analyzing position and motion cues present on the road surface. Further, processing unit 110 may estimate the pitch and roll rates associated with vehicle 200 by tracking a set of feature points in the one or more images.

At step 556, processing unit 110 may perform multi-frame analysis by, for example, tracking the detected segments across consecutive image frames and accumulating frame-by-frame data associated with detected segments. As processing unit 110 performs multi-frame analysis, the set of measurements constructed at step 554 may become more reliable and associated with an increasingly higher confidence level. Thus, by performing steps 550-556, processing unit 110 may identify road marks appearing within the set of captured images and derive lane geometry information. Based on the identification and the derived information, processing unit 110 may cause one or more navigational responses in vehicle 200, as described in connection with FIG. 5A, above.

At step 558, processing unit 110 may consider additional sources of information to further develop a safety model for vehicle 200 in the context of its surroundings. Processing unit 110 may use the safety model to define a context in which system 100 may execute autonomous control of vehicle 200 in a safe manner. To develop the safety model, in some embodiments, processing unit 110 may consider the position and motion of other vehicles, the detected road edges and barriers, and/or general road shape descriptions extracted from map data (such as data from map database 160). By considering additional sources of information, processing unit 110 may provide redundancy for detecting road marks and lane geometry and increase the reliability of system 100.

Figure 5D:
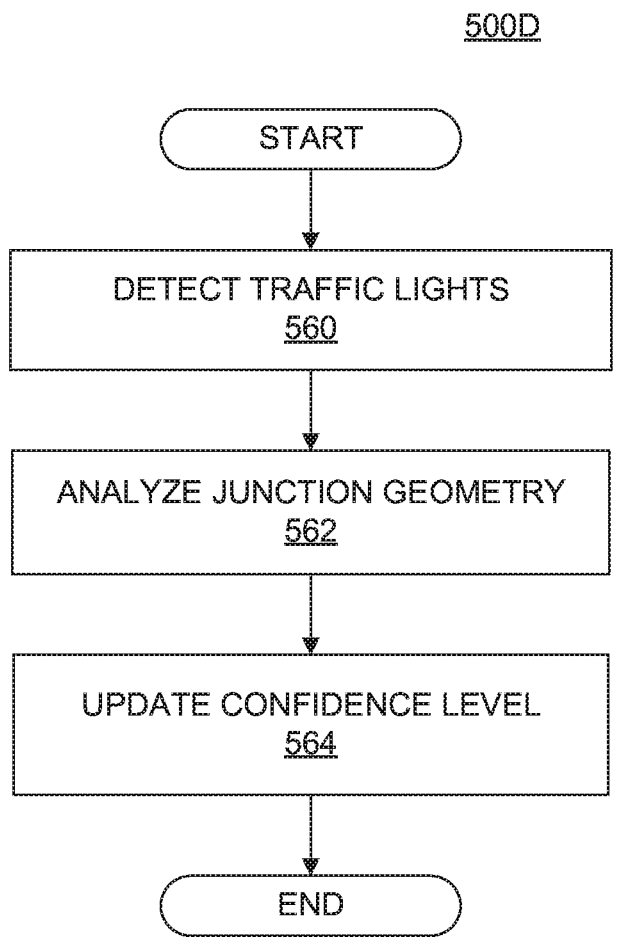
FIG. 5D is a flowchart showing an exemplary process for detecting traffic lights in a set of images consistent with the disclosed embodiments.

FIG. 5D is a flowchart showing an exemplary process 500D for detecting traffic lights in a set of images, consistent with disclosed embodiments. Processing unit 110 may execute monocular image analysis module 402 to implement process 500D. At step 560, processing unit 110 may scan the set of images and identify objects appearing at locations in the images likely to contain traffic lights. For example, processing unit 110 may filter the identified objects to construct a set of candidate objects, excluding those objects unlikely to correspond to traffic lights. The filtering may be done based on various properties associated with traffic lights, such as shape, dimensions, texture, position (e.g., relative to vehicle 200), and the like. Such properties may be based on multiple examples of traffic lights and traffic control signals and stored in a database. In some embodiments, processing unit 110 may perform multi-frame analysis on the set of candidate objects reflecting possible traffic lights. For example, processing unit 110 may track the candidate objects across consecutive image frames, estimate the real-world position of the candidate objects, and filter out those objects that are moving (which are unlikely to be traffic lights). In some embodiments, processing unit 110 may perform color analysis on the candidate objects and identify the relative position of the detected colors appearing inside possible traffic lights.

At step 562, processing unit 110 may analyze the geometry of a junction. The analysis may be based on any combination of: (i) the number of lanes detected on either side of vehicle 200, (ii) markings (such as arrow marks) detected on the road, and (iii) descriptions of the junction extracted from map data (such as data from map database 160). Processing unit 110 may conduct the analysis using information derived from execution of monocular analysis module 402. In addition, Processing unit 110 may determine a correspondence between the traffic lights detected at step 560 and the lanes appearing near vehicle 200.

As vehicle 200 approaches the junction, at step 564, processing unit 110 may update the confidence level associated with the analyzed junction geometry and the detected traffic lights. For instance, the number of traffic lights estimated to appear at the junction as compared with the number actually appearing at the junction may impact the confidence level. Thus, based on the confidence level, processing unit 110 may delegate control to the driver of vehicle 200 in order to improve safety conditions. By performing steps 560-564, processing unit 110 may identify traffic lights appearing within the set of captured images and analyze junction geometry information. Based on the identification and the analysis, processing unit 110 may cause one or more navigational responses in vehicle 200, as described in connection with FIG. 5A, above.

Figure 5E:
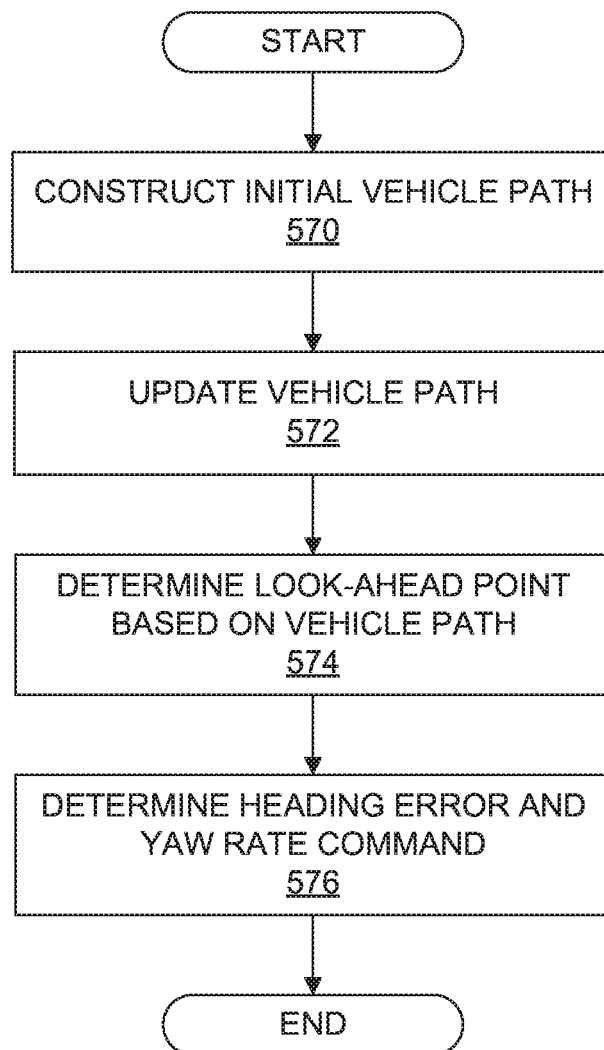
FIG. 5E is a flowchart showing an exemplary process for causing one or more navigational responses based on a vehicle path consistent with the disclosed embodiments.

FIG. 5E is a flowchart showing an exemplary process 500E for causing one or more navigational responses in vehicle 200 based on a vehicle path, consistent with the disclosed embodiments. At step 570, processing unit 110 may construct an initial vehicle path associated with vehicle 200. The vehicle path may be represented using a set of points expressed in coordinates (x, z), and the distance d between two points in the set of points may fall in the range of 1 to 5 meters. In one embodiment, processing unit 110 may construct the initial vehicle path using two polynomials, such as left and right road polynomials. Processing unit 110 may calculate the geometric midpoint between the two polynomials and offset each point included in the resultant vehicle path by a predetermined offset (e.g., a smart lane offset), if any (an offset of zero may correspond to travel in the middle of a lane). The offset may be in a direction perpendicular to a segment between any two points in the vehicle path. In another embodiment, processing unit 110 may use one polynomial and an estimated lane width to offset each point of the vehicle path by half the estimated lane width plus a predetermined offset (e.g., a smart lane offset).

At step 572, processing unit 110 may update the vehicle path constructed at step 570. Processing unit 110 may reconstruct the vehicle path constructed at step 570 using a higher resolution, such that the distance $d_k$ between two points in the set of points representing the vehicle path is less than the distance $d_i$ described above. For example, the distance $d_k$ may fall in the range of 0.1 to 0.3 meters. Processing unit 110 may reconstruct the vehicle path using a parabolic spline algorithm, which may yield a cumulative distance vector S corresponding to the total length of the vehicle path (i.e., based on the set of points representing the vehicle path).

At step 574, processing unit 110 may determine a look-ahead point (expressed in coordinates as $(x_1, z_1)$) based on the updated vehicle path constructed at step 572. Processing unit 110 may extract the look-ahead point from the cumulative distance vector S, and the look-ahead point may be associated with a look-ahead distance and look-ahead time. The look-ahead distance, which may have a lower bound ranging from 10 to 20 meters, may be calculated as the product of the speed of vehicle 200 and the look-ahead time. For example, as the speed of vehicle 200 decreases, the look-ahead distance may also decrease (e.g., until it reaches the lower bound). The look-ahead time, which may range from 0.5 to 1.5 seconds, may be inversely proportional to the gain of one or more control loops associated with causing a navigational response in vehicle 200, such as the heading error tracking control loop. For example, the gain of the heading error tracking control loop may depend on the bandwidth of a yaw rate loop, a steering actuator loop, car lateral dynamics, and the like. Thus, the higher the gain of the heading error tracking control loop, the lower the look-ahead time.

At step 576, processing unit 110 may determine a heading error and yaw rate command based on the look-ahead point determined at step 574. Processing unit 110 may determine the heading error by calculating the arctangent of the look-ahead point, e.g., arctan $(x_1/z_1)$. Processing unit 110 may determine the yaw rate command as the product of the heading error and a high-level control gain. The high-level control gain may be equal to: (2/look-ahead time), if the look-ahead distance is not at the lower bound. Otherwise, the high-level control gain may be equal to: (2*speed of vehicle 200/look-ahead distance).

Figure 5F:
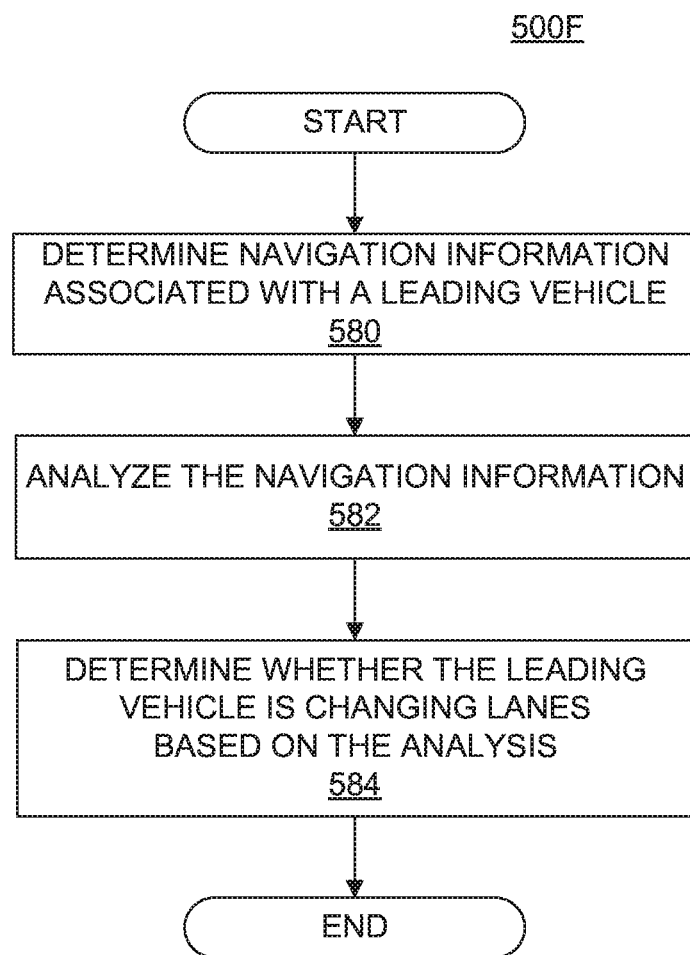
FIG. 5F is a flowchart showing an exemplary process for determining whether a leading vehicle is changing lanes consistent with the disclosed embodiments.

FIG. 5F is a flowchart showing an exemplary process 500F for determining whether a leading vehicle is changing lanes, consistent with the disclosed embodiments. At step 580, processing unit 110 may determine navigation information associated with a leading vehicle (e.g., a vehicle traveling ahead of vehicle 200). For example, processing unit 110 may determine the position, velocity (e.g., direction and speed), and/or acceleration of the leading vehicle, using the techniques described in connection with FIGS. 5A and 5B, above. Processing unit 110 may also determine one or more road polynomials, a look-ahead point (associated with vehicle 200), and/or a snail trail (e.g., a set of points describing a path taken by the leading vehicle), using the techniques described in connection with FIG. 5E, above.

At step 582, processing unit 110 may analyze the navigation information determined at step 580. In one embodiment, processing unit 110 may calculate the distance between a snail trail and a road polynomial (e.g., along the trail). If the variance of this distance along the trail exceeds a predetermined threshold (for example, 0.1 to 0.2 meters on a straight road, 0.3 to 0.4 meters on a moderately curvy road, and 0.5 to 0.6 meters on a road with sharp curves), processing unit 110 may determine that the leading vehicle is likely changing lanes. In the case where multiple vehicles are detected traveling ahead of vehicle 200, processing unit 110 may compare the snail trails associated with each vehicle. Based on the comparison, processing unit 110 may determine that a vehicle whose snail trail does not match with the snail trails of the other vehicles is likely changing lanes. Processing unit 110 may additionally compare the curvature of the snail trail (associated with the leading vehicle) with the expected curvature of the road segment in which the leading vehicle is traveling. The expected curvature may be extracted from map data (e.g., data from map database 160), from road polynomials, from other vehicles' snail trails, from prior knowledge about the road, and the like. If the difference in curvature of the snail trail and the expected curvature of the road segment exceeds a predetermined threshold, processing unit 110 may determine that the leading vehicle is likely changing lanes.

In another embodiment, processing unit 110 may compare the leading vehicle's instantaneous position with the look-ahead point (associated with vehicle 200) over a specific period of time (e.g., 0.5 to 1.5 seconds). If the distance between the leading vehicle's instantaneous position and the look-ahead point varies during the specific period of time, and the cumulative sum of variation exceeds a predetermined threshold (for example, 0.3 to 0.4 meters on a straight road, 0.7 to 0.8 meters on a moderately curvy road, and 1.3 to 1.7 meters on a road with sharp curves), processing unit 110 may determine that the leading vehicle is likely changing lanes. In another embodiment, processing unit 110 may analyze the geometry of the snail trail by comparing the lateral distance traveled along the trail with the expected curvature of the snail trail. The expected radius of curvature may be determined according to the calculation: $(\delta_z^2+\delta_x^2)/2(\delta_x)$, where $\delta_x$ represents the lateral distance traveled and $\delta_z$ represents the longitudinal distance traveled. If the difference between the lateral distance traveled and the expected curvature exceeds a predetermined threshold (e.g., 500 to 700 meters), processing unit 110 may determine that the leading vehicle is likely changing lanes. In another embodiment, processing unit 110 may analyze the position of the leading vehicle. If the position of the leading vehicle obscures a road polynomial (e.g., the leading vehicle is overlaid on top of the road polynomial), then processing unit 110 may determine that the leading vehicle is likely changing lanes. In the case where the position of the leading vehicle is such that, another vehicle is detected ahead of the leading vehicle and the snail trails of the two vehicles are not parallel, processing unit 110 may determine that the (closer) leading vehicle is likely changing lanes.

At step 584, processing unit 110 may determine whether or not leading vehicle 200 is changing lanes based on the analysis performed at step 582. For example, processing unit 110 may make the determination based on a weighted average of the individual analyses performed at step 582. Under such a scheme, for example, a decision by processing unit 110 that the leading vehicle is likely changing lanes based on a particular type of analysis may be assigned a value of "1" (and "0" to represent a determination that the leading vehicle is not likely changing lanes). Different analyses performed at step 582 may be assigned different weights, and the disclosed embodiments are not limited to any particular combination of analyses and weights. Furthermore, in some embodiments, the analysis may make use of trained system (e.g., a machine learning or deep learning system), which may, for example, estimate a future path ahead of a current location of a vehicle based on an image captured at the current location.

Figure 6:
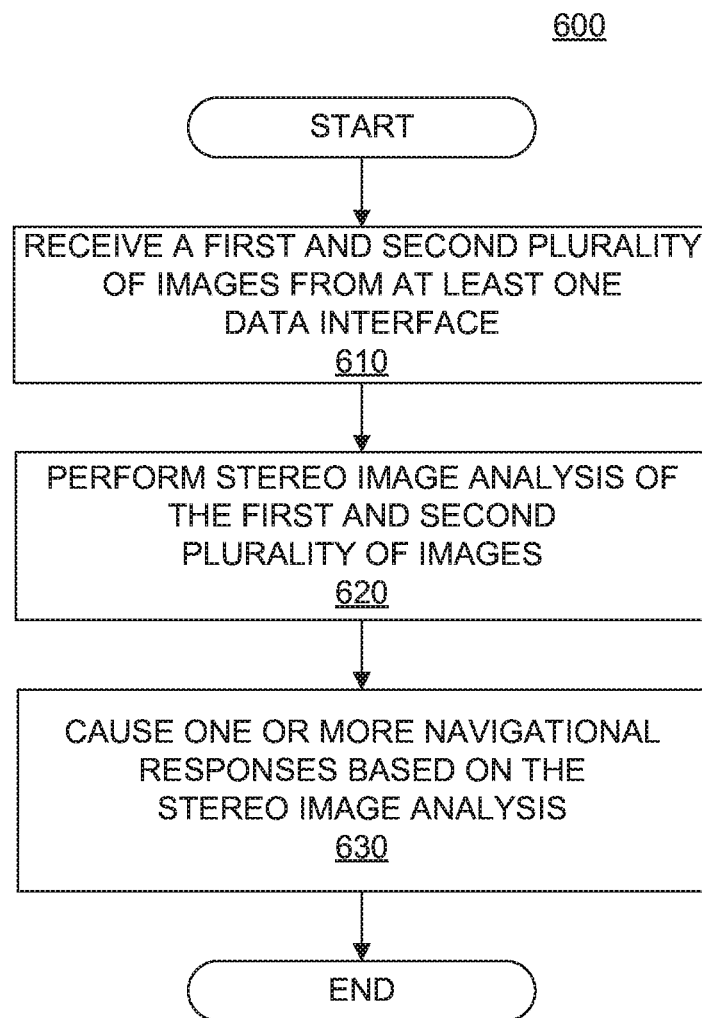
FIG. 6 is a flowchart showing an exemplary process for causing one or more navigational responses based on stereo image analysis consistent with the disclosed embodiments.

FIG. 6 is a flowchart showing an exemplary process 600 for causing one or more navigational responses based on stereo image analysis, consistent with disclosed embodiments. At step 610, processing unit 110 may receive a first and second plurality of images via data interface 128. For example, cameras included in image acquisition unit 120 (such as image capture devices 122 and 124 having fields of view 202 and 204) may capture a first and second plurality of images of an area forward of vehicle 200 and transmit them over a digital connection (e.g., USB, wireless, Bluetooth, etc.) to processing unit 110. In some embodiments, processing unit 110 may receive the first and second plurality of images via two or more data interfaces. The disclosed embodiments are not limited to any particular data interface configurations or protocols.

At step 620, processing unit 110 may execute stereo image analysis module 404 to perform stereo image analysis of the first and second plurality of images to create a 3D map of the road in front of the vehicle and detect features within the images, such as lane markings, vehicles, pedestrians, road signs, highway exit ramps, traffic lights, road hazards, and the like. Stereo image analysis may be performed in a manner similar to the steps described in connection with FIGS. 5A-5D, above. For example, processing unit 110 may execute stereo image analysis module 404 to detect candidate objects (e.g., vehicles, pedestrians, road marks, traffic lights, road hazards, etc.) within the first and second plurality of images, filter out a subset of the candidate objects based on various criteria, and perform multi-frame analysis, construct measurements, and determine a confidence level for the remaining candidate objects. In performing the steps above, processing unit 110 may consider information from both the first and second plurality of images, rather than information from one set of images alone. For example, processing unit 110 may analyze the differences in pixel-level data (or other data subsets from among the two streams of captured images) for a candidate object appearing in both the first and second plurality of images. As another example, processing unit 110 may estimate a position and/or velocity of a candidate object (e.g., relative to vehicle 200) by observing that the object appears in one of the plurality of images but not the other or relative to other differences that may exist relative to objects appearing in the two image streams. For example, position, velocity, and/or acceleration relative to vehicle 200 may be determined based on trajectories, positions, movement characteristics, etc. of features associated with an object appearing in one or both of the image streams.

At step 630, processing unit 110 may execute navigational response module 408 to cause one or more navigational responses in vehicle 200 based on the analysis performed at step 620 and the techniques as described above in connection with FIG. 4. Navigational responses may include, for example, a turn, a lane shift, a change in acceleration, a change in velocity, braking, and the like. In some embodiments, processing unit 110 may use data derived from execution of velocity and acceleration module 406 to cause the one or more navigational responses. Additionally, multiple navigational responses may occur simultaneously, in sequence, or any combination thereof.

Figure 7:
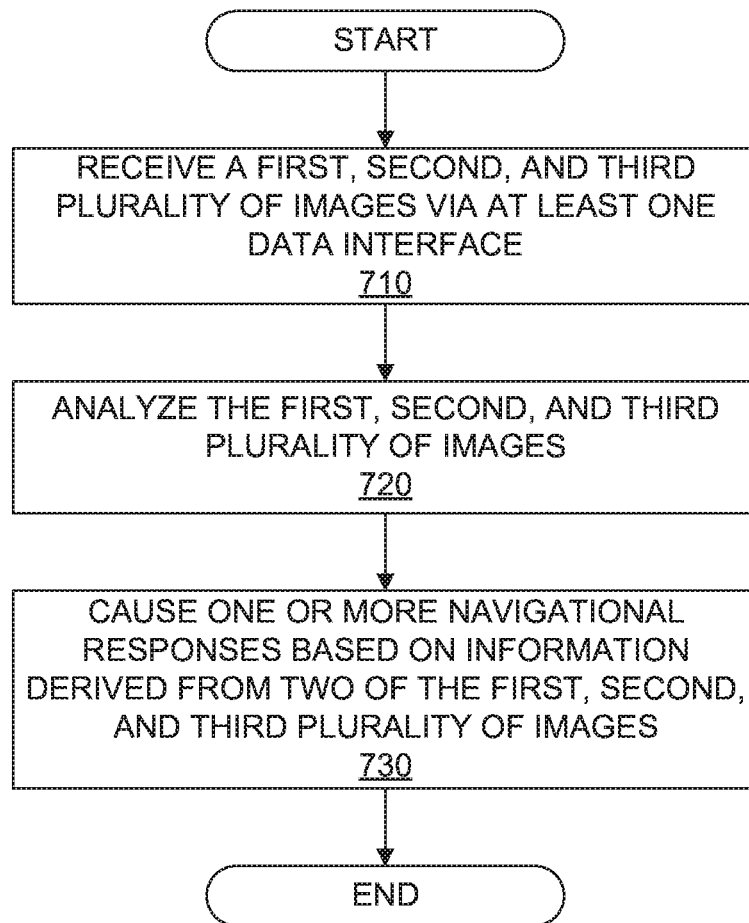
FIG. 7 is a flowchart showing an exemplary process for causing one or more navigational responses based on an analysis of three sets of images consistent with the disclosed embodiments.

FIG. 7 is a flowchart showing an exemplary process 700 for causing one or more navigational responses based on an analysis of three sets of images, consistent with disclosed embodiments. At step 710, processing unit 110 may receive a first, second, and third plurality of images via data interface 128. For instance, cameras included in image acquisition unit 120 (such as image capture devices 122, 124, and 126 having fields of view 202, 204, and 206) may capture a first, second, and third plurality of images of an area forward and/or to the side of vehicle 200 and transmit them over a digital connection (e.g., USB, wireless, Bluetooth, etc.) to processing unit 110. In some embodiments, processing unit 110 may receive the first, second, and third plurality of images via three or more data interfaces. For example, each of image capture devices 122, 124, 126 may have an associated data interface for communicating data to processing unit 110. The disclosed embodiments are not limited to any particular data interface configurations or protocols.

At step 720, processing unit 110 may analyze the first, second, and third plurality of images to detect features within the images, such as lane markings, vehicles, pedestrians, road signs, highway exit ramps, traffic lights, road hazards, and the like. The analysis may be performed in a manner similar to the steps described in connection with FIGS. 5A-5D and 6, above. For instance, processing unit 110 may perform monocular image analysis (e.g., via execution of monocular image analysis module 402 and based on the steps described in connection with FIGS. 5A-5D, above) on each of the first, second, and third plurality of images. Alternatively, processing unit 110 may perform stereo image analysis (e.g., via execution of stereo image analysis module 404 and based on the steps described in connection with FIG. 6, above) on the first and second plurality of images, the second and third plurality of images, and/or the first and third plurality of images. The processed information corresponding to the analysis of the first, second, and/or third plurality of images may be combined. In some embodiments, processing unit 110 may perform a combination of monocular and stereo image analyses. For example, processing unit 110 may perform monocular image analysis (e.g., via execution of monocular image analysis module 402) on the first plurality of images and stereo image analysis (e.g., via execution of stereo image analysis module 404) on the second and third plurality of images. The configuration of image capture devices 122, 124, and 126 including their respective locations and fields of view 202, 204, and 206—may influence the types of analyses conducted on the first, second, and third plurality of images. The disclosed embodiments are not limited to a particular configuration of image capture devices 122, 124, and 126, or the types of analyses conducted on the first, second, and third plurality of images.

In some embodiments, processing unit 110 may perform testing on system 100 based on the images acquired and analyzed at steps 710 and 720. Such testing may provide an indicator of the overall performance of system 100 for certain configurations of image capture devices 122, 124, and 126. For example, processing unit 110 may determine the proportion of "false hits" (e.g., cases where system 100 incorrectly determined the presence of a vehicle or pedestrian) and "misses."

At step 730, processing unit 110 may cause one or more navigational responses in vehicle 200 based on information derived from two of the first, second, and third plurality of images. Selection of two of the first, second, and third plurality of images may depend on various factors, such as, for example, the number, types, and sizes of objects detected in each of the plurality of images. Processing unit 110 may also make the selection based on image quality and resolution, the effective field of view reflected in the images, the number of captured frames, the extent to which one or more objects of interest actually appear in the frames (e.g., the percentage of frames in which an object appears, the proportion of the object that appears in each such frame, etc.), and the like.

In some embodiments, processing unit 110 may select information derived from two of the first, second, and third plurality of images by determining the extent to which information derived from one image source is consistent with information derived from other image sources. For example, processing unit 110 may combine the processed information derived from each of image capture devices 122, 124, and 126 (whether by monocular analysis, stereo analysis, or any combination of the two) and determine visual indicators (e.g., lane markings, a detected vehicle and its location and/or path, a detected traffic light, etc.) that are consistent across the images captured from each of image capture devices 122, 124, and 126. Processing unit 110 may also exclude information that is inconsistent across the captured images (e.g., a vehicle changing lanes, a lane model indicating a vehicle that is too close to vehicle 200, etc.). Thus, processing unit 110 may select information derived from two of the first, second, and third plurality of images based on the determinations of consistent and inconsistent information.

Figure 8:
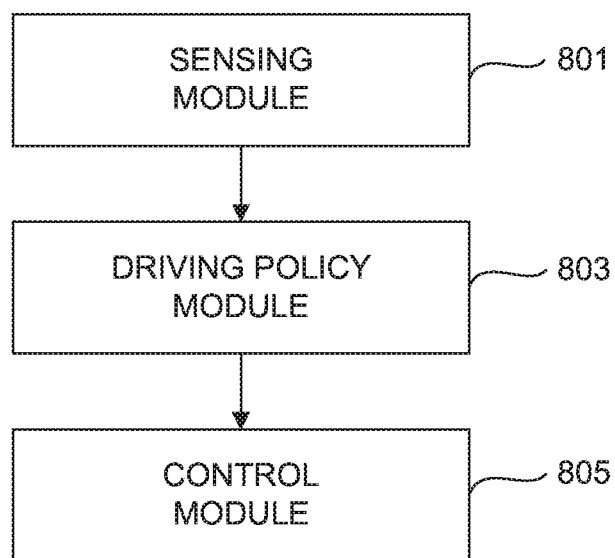
FIG. 8 is a block diagram representation of modules that may be implemented by one or more specifically programmed processing devices of a navigation system for an autonomous vehicle consistent with the disclosed embodiments.

Navigational responses may include, for example, a turn, a lane shift, a change in acceleration, and the like. Processing unit 110 may cause the one or more navigational responses based on the analysis performed at step 720 and the techniques as described above in connection with FIG. 4. Processing unit 110 may also use data derived from execution of velocity and acceleration module 406 to cause the one or more navigational responses. In some embodiments, processing unit 110 may cause the one or more navigational responses based on a relative position; relative velocity, and/or relative acceleration between vehicle 200 and an object detected within any of the first, second, and third plurality of images. Multiple navigational responses may occur simultaneously, in sequence, or any combination thereof Reinforcement Learning and Trained Navigational Systems The sections that follow discuss autonomous driving along with systems and methods for accomplishing autonomous control of a vehicle, whether that control is fully autonomous (a self-driving vehicle) or partially autonomous (e.g., one or more driver assist systems or functions). As shown in FIG. 8, the autonomous driving task can be partitioned into three main modules, including a sensing module 801, a driving policy module 803, and a control module 805. In some embodiments, modules 801, 803, and 805 may be stored in memory unit 140 and/or memory unit 150 of system 100, or modules 801, 803, and 805 (or portions thereof) may be stored remotely from system 100 (e.g., stored in a server accessible to system 100 via, for example, wireless transceiver 172). Furthermore, any of the modules (e.g., modules 801, 803, and 805) disclosed herein may implement techniques associated with a trained system (such as a neural network or a deep neural network) or an untrained system.

Sensing module 801, which may be implemented using processing unit 110, may handle various tasks relating to sensing of a navigational state in an environment of a host vehicle. Such tasks may rely upon input from various sensors and sensing systems associated with the host vehicle. These inputs may include images or image streams from one or more onboard cameras, GPS position information, accelerometer outputs, user feedback, or user inputs to one or more user interface devices, radar, lidar, etc. Sensing, which may include data from cameras and/or any other available sensors, along with map information, may be collected, analyzed, and formulated into a "sensed state," describing information extracted from a scene in the environment of the host vehicle. The sensed state may include sensed information relating to target vehicles, lane markings, pedestrians, traffic lights, road geometry, lane shape, obstacles, distances to other objects/vehicles, relative velocities, relative accelerations, among any other potential sensed information. Supervised machine learning may be implemented in order to produce a sensing state output based on sensed data provided to sensing module 801. The output of the sensing module may represent a sensed navigational "state" of the host vehicle, which may be passed to driving policy module 803.

While a sensed state may be developed based on image data received from one or more cameras or image sensors associated with a host vehicle, a sensed state for use in navigation may be developed using any suitable sensor or combination of sensors. In some embodiments, the sensed state may be developed without reliance upon captured image data. In fact, any of the navigational principles described herein may be applicable to sensed states developed based on captured image data as well as sensed states developed using other non-image based sensors. The sensed state may also be determined via sources external to the host vehicle. For example, a sensed state may be developed in full or in part based on information received from sources remote from the host vehicle (e.g., based on sensor information, processed state information, etc. shared from other vehicles, shared from a central server, or from any other source of information relevant to a navigational state of the host vehicle).

Driving policy module 803, which is discussed in more detail below and which may be implemented using processing unit 110, may implement a desired driving policy in order to decide on one or more navigational actions for the host vehicle to take in response to the sensed navigational state. If there are no other agents (e.g., target vehicles or pedestrians) present in the environment of the host vehicle, the sensed state input to driving policy module 803 may be handled in a relatively straightforward manner. The task becomes more complex when the sensed state requires negotiation with one or more other agents. The technology used to generate the output of driving policy module 803 may include reinforcement learning (discussed in more detail below). The output of driving policy module 803 may include at least one navigational action for the host vehicle and may include a desired acceleration (which may translate to an updated speed for the host vehicle), a desired yaw rate for the host vehicle, a desired trajectory, among other potential desired navigational actions.

Based on the output from the driving policy module 803, control module 805, which may also be implemented using processing unit 110, may develop control instructions for one or more actuators or controlled devices associated with the host vehicle. Such actuators and devices may include an accelerator, one or more steering controls, a brake, a signal transmitter, a display, or any other actuator or device that may be controlled as part of a navigation operation associated with a host vehicle. Aspects of control theory may be used to generate the output of control module 805. Control module 805 may be responsible for developing and outputting instructions to controllable components of the host vehicle in order to implement the desired navigational goals or requirements of driving policy module 803.

Returning to driving policy module 803, in some embodiments, a trained system trained through reinforcement learning may be used to implement driving policy module 803. In other embodiments, driving policy module 803 may be implemented without a machine learning approach, by using specified algorithms to "manually" address the various scenarios that may arise during autonomous navigation. Such an approach, however, while viable, may result in a driving policy that is too simplistic and may lack the flexibility of a trained system based on machine learning. A trained system, for example, may be better equipped to handle complex navigational states and may better determine whether a taxi is parking or is stopping to pick up or drop off a passenger; determine whether a pedestrian intends to cross the street ahead of the host vehicle; balance unexpected behavior of other drivers with defensiveness; negotiate in dense traffic involving target vehicles and/or pedestrians; decide when to suspend certain navigational rules or augment other rules; anticipate unsensed, but anticipated conditions (e.g., whether a pedestrian will emerge from behind a car or obstacle); etc. A trained system based on reinforcement learning may also be better equipped to address a state space that is continuous and high-dimensional along with an action space that is continuous.

Training of the system using reinforcement learning may involve learning a driving policy in order to map from sensed states to navigational actions. A driving policy is a function $\pi:S \to A$, where S is a set of states and $A \subset \mathbb{R}^2$ is the action space (e.g., desired speed, acceleration, yaw commands, etc.). The state space is $S=S_s \times S_p$, where $S_s$ is the sensing state and $S_p$ is additional information on the state saved by the policy. Working in discrete time intervals, at time t, the current state $S_t \in S$ may be observed, and the policy may be applied to obtain a desired action, $a_t = \pi(S_t)$.

The system may be trained through exposure to various navigational states, having the system apply the policy, providing a reward (based on a reward function designed to reward desirable navigational behavior). Based on the reward feedback, the system may "learn" the policy and becomes trained in producing desirable navigational actions. For example, the learning system may observe the current state $S_t \in S$ and decide on an action $a_t \in A$ based on a policy $\pi:S \to \mathbb{D}$ (A). Based on the decided action (and implementation of the action), the environment moves to the next state $S_{t+1} \in S$ for observation by the learning system. For each action developed in response to the observed state, the feedback to the learning system is a reward signal $r_1$, $r_2$, ....

The goal of Reinforcement Learning (RL) is to find a policy $\pi$. It is usually assumed that at time t, there is a reward function re which measures the instantaneous quality of being at state $s_t$ and taking action $a_t$. However, taking the action $a_t$ at time t affects the environment and therefore affects the value of the future states. As a result, when deciding on what action to take, not only should the current reward be taken into account, but future rewards should also be considered. In some instances the system should take a certain action, even though it is associated with a reward lower than another available option, when the system determines that in the future a greater reward may be realized if the lower reward option is taken now. To formalize this, observe that a policy, $\pi$, and an initial state, s, induces a distribution over $\mathbb{R}^T$, where the probability of a vector $(r_1, \ldots, r_T)$ is the probability of observing the rewards $r_1, \ldots, r_T$, if the agent starts at state $s_0=s$ and from there on follows the policy $\pi$. The value of the initial state s may be defined as:

$$V^\pi(s) = \mathbb{E}\left[\sum_{t=1}^T \{r_t | s_0\} = s, \forall t \geq 1, a_t = \pi(s_t)\right]$$

Instead of restricting the time horizon to T, the future rewards may be discounted to define, for some fixed $\gamma \in (0,1)$:

$$V^\pi(s) = \mathbb{E}\left[\sum_{t=1}^\infty \gamma^t r^t | s_0 = s, \forall t \geq 1, a_t = \pi(s_t)\right]$$

In any case, the optimal policy is the solution of $$\frac{\text{argmax}}{\pi} \mathbb{E}[V^\pi(s)]$$

where the expectation is over the initial state, s.

There are several possible methodologies for training the driving policy system. For example, an imitation approach (e.g., behavior cloning) may be used in which the system learns from state/action pairs where the actions are those that would be chosen by a good agent (e.g., a human) in response to a particular observed state. Suppose a human driver is observed. Through this observation, many examples of the form $(s_t, a_t)$, where $s_t$ is the state and $a_t$ is the action of the human driver could be obtained, observed, and used as a basis for training the driving policy system. For example, supervised learning can be used to learn a policy $\pi$ such that $\pi(s_t) \approx a_t$. There are many potential advantages of this approach. First, there is no requirement to define a reward function. Second, the learning is supervised and happens offline (there is no need to apply the agent in the learning process). A disadvantage of this method is that different human drivers, and even the same human drivers, are not deterministic in their policy choices. Hence, learning a function for which $\|\pi(s_t)-a_t\|$ is very small is often infeasible. And, even small errors may accumulate over time to yield large errors.

Another technique that may be employed is policy based learning. Here, the policy may be expressed in parametric form and directly optimized using a suitable optimization technique (e.g., stochastic gradient descent). The approach is to directly solve the problem given in $$\underset{\pi}{\operatorname{argmax}} \mathbb{E}[V^{\pi}(s)].$$

There are or course many ways to solve the problem. One advantage of this approach is that it tackles the problem directly, and therefore often leads to good practical results. One potential disadvantage is that it often requires an "on-policy" training, namely, the learning of $\pi$ is an iterative process, where at iteration j we have a non-perfect policy, $\pi_j$, and to construct the next policy $\pi_j$, we must interact with the environment while acting based on $\pi_j$.

The system may also be trained through value based learning (learning Q or V functions). Suppose a good approximation can be learned to the optimal value function V*. An optimal policy may be constructed (e.g., by relying on the Bellman equation). Some versions of value based learning can be implemented offline (called "off-policy" training). Some disadvantages of the value-based approach may result from its strong dependence on Markovian assumptions and required approximation of a complicated function (it may be more difficult to approximate the value function than to approximate the policy directly).

Another technique may include model based learning and planning (learning the probability of state transitions and solving the optimization problem of finding the optimal V). Combinations of these techniques may also be used to train the learning system. In this approach, the dynamics of the process may be learned, namely, the function that takes $(s_t, a_t)$ and yields a distribution over the next state $s_{t+1}$. Once this function is learned, the optimization problem may be solved to find the policy $\pi$ whose value is optimal. This is called "planning". One advantage of this approach may be that the learning part is supervised and can be applied offline by observing triplets $(s_t, a_t, s_{t+1})$. One disadvantage of this approach, similar to the "imitation" approach, may be that small errors in the learning process can accumulate and to yield inadequately performing policies.

Another approach for training driving policy module 803 may include decomposing the driving policy function into semantically meaningful components. This allows implementation of parts of the policy manually, which may ensure the safety of the policy, and implementation of other parts of the policy using reinforcement learning techniques, which may enable adaptivity to many scenarios, a human-like balance between defensive/aggressive behavior, and a human-like negotiation with other drivers. From the technical perspective, a reinforcement learning approach may combine several methodologies and offer a tractable training procedure, where most of the training can be performed using either recorded data or a self-constructed simulator.

In some embodiments, training of driving policy module 803 may rely upon an "options" mechanism. To illustrate, consider a simple scenario of a driving policy for a two-lane highway. In a direct RL approach, a policy $\pi$ that maps the state into $A \subset \mathbb{R}^2$, where the first component of $\pi(s)$ is the desired acceleration command and the second component of $\pi(s)$ is the yaw rate. In a modified approach, the following policies can be constructed:

Automatic Cruise Control (ACC) policy, $O_{ACC}:S \rightarrow A$: this policy always outputs yaw rate of 0 and only changes the speed so as to implement smooth and accident-free driving.

ACC+Left policy, $O_L:S \rightarrow A$: the longitudinal command of this policy is the same as the ACC command. The yaw rate is a straightforward implementation of centering the vehicle toward the middle of the left lane, while ensuring a safe lateral movement (e.g., don't move left if there's a car on the left side).

ACC+Right policy, $O_R:S \rightarrow A$: Same as $o_L$, but the vehicle may be centered toward the middle of the right lane.

These policies may be referred to as "options". Relying on these "options", a policy can be learned that selects options, $\pi_o:S \rightarrow O$, where O is the set of available options. In one case, $O=\{O_{ACC}, O_L, O_R\}$. The option-selector policy, $\pi_o$, defines an actual policy, $\pi; S \rightarrow A$, by setting, for every s, $\pi(s)=o_{\pi_o(s)}(s)$.

Figure 9:
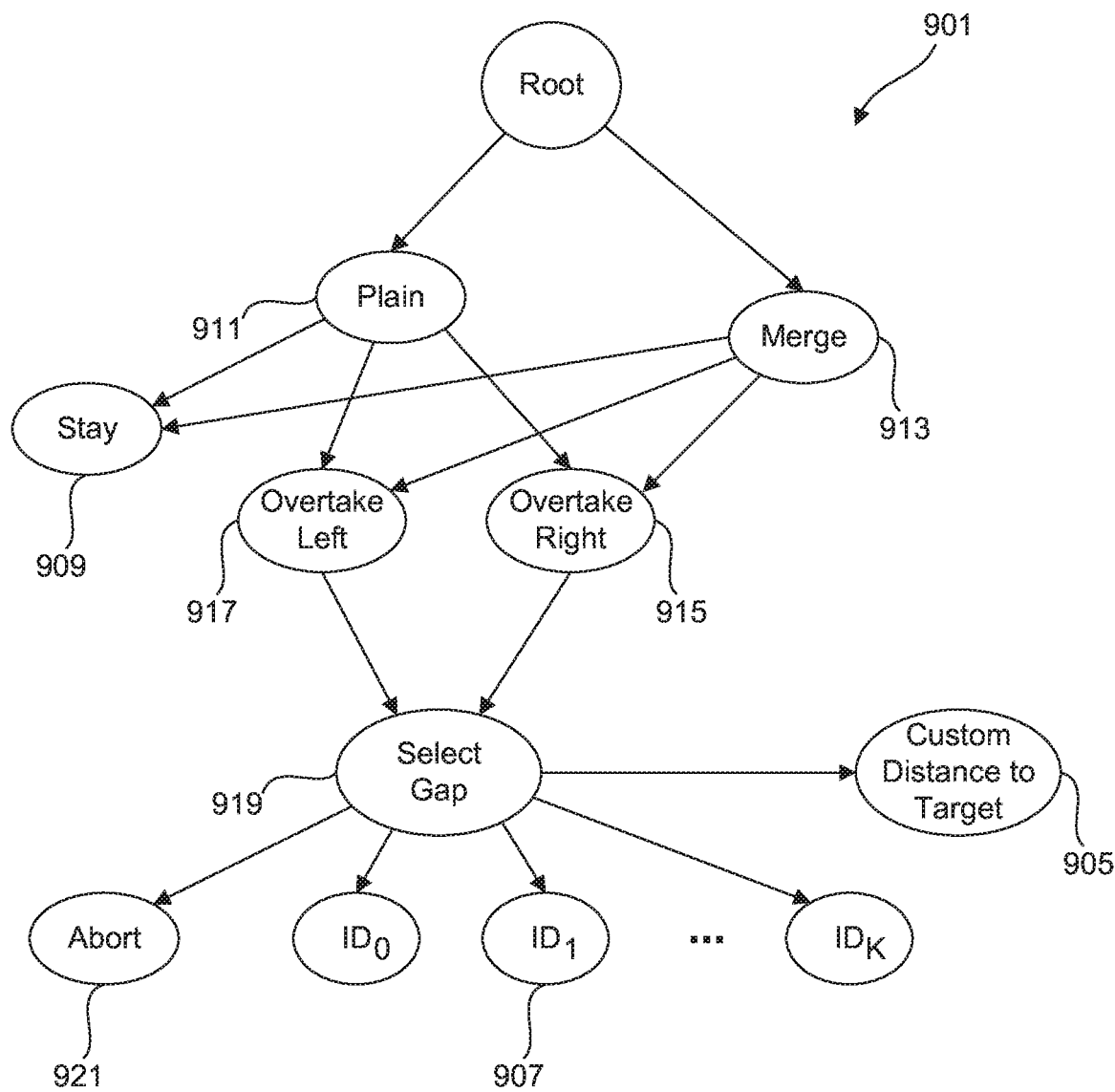
FIG. 9 is a navigation options graph consistent with the disclosed embodiments.
Figure 10:
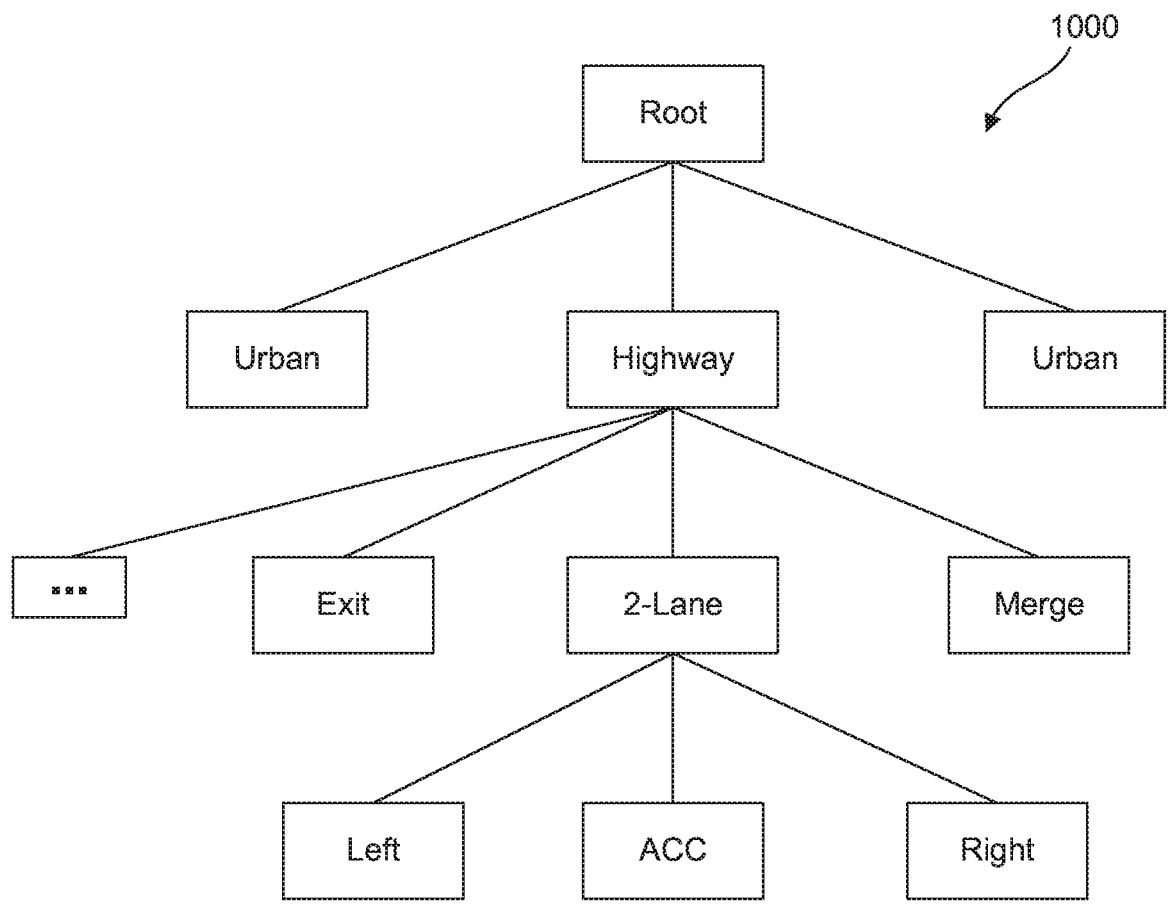
FIG. 10 is a navigation options graph consistent with the disclosed embodiments.

In practice, the policy function may be decomposed into an Options graph 901, as shown in FIG. 9. Another example options graph 1000 is shown in FIG. 10. The options graph can represent a hierarchical set of decisions organized as a Directed Acyclic Graph (DAG). There is a special node called the root node 903 of the graph. This node has no incoming nodes. The decision process traverses through the graph, starting from the root node, until it reaches a "leaf" node, which refers to a node that has no outgoing decision lines. As shown in FIG. 9, leaf nodes may include nodes 905, 907, and 909, for example. Upon encountering a leaf node, driving policy module 803 may output the acceleration and steering commands associated with a desired navigational action associated with the leaf node.

Internal nodes, such as nodes 911, 913, and 915, for example, may result in implementation of a policy that chooses a child among its available options. The set of available children of an internal node include all of the nodes associated with a particular internal node via decision lines. For example, internal node 913 designated as "Merge" in FIG. 9 includes three children nodes 909, 915, and 917 ("Stay," "Overtake Right," and "Overtake Left," respectively) each joined to node 913 by a decision line.

Flexibility of the decision making system may be gained by enabling nodes to adjust their position in the hierarchy of the options graph. For example, any of the nodes may be allowed to declare themselves as "critical." Each node may implement a function "is critical," that outputs "True" if the node is in a critical section of its policy implementation. For example, a node that is responsible for a take-over, may declare itself as critical while in the middle of a maneuver. This may impose constraints on the set of available children of a node u, which may include all nodes v which are children of node u and for which there exists a path from v to a leaf node that goes through all nodes designated as critical. Such an approach may allow, on one hand, declaration of the desired path on the graph at each time step, while on the other hand, stability of a policy may be preserved, especially while critical portions of the policy are being implemented.

By defining an options graph, the problem of learning the driving policy $\pi:S \rightarrow A$ may be decomposed into a problem of defining a policy for each node of the graph, where the policy at internal nodes should choose from among available children nodes. For some of the nodes, the respective policy may be implemented manually (e.g., through if-then type algorithms specifying a set of actions in response to an observed state) while for others the policies may be implemented using a trained system built through reinforcement learning. The choice between manual or trained/learned approaches may depend on safety aspects associated with the task and on its relative simplicity. The option graphs may be constructed in a manner such that some of the nodes are straightforward to implement, while other nodes may rely on trained models. Such an approach can ensure safe operation of the system.

The following discussion provides further details regarding the role of the options graph of FIG. 9 within driving policy module 803. As discussed above, the input to the driving policy module is a "sensed state," which summarizes the environment map, for example, as obtained from available sensors. The output of driving policy module 803 is a set of desires (optionally, together with a set of hard constraints) that define a trajectory as a solution of an optimization problem.

As described above, the options graph represents a hierarchical set of decisions organized as a DAG. There is a special node called the "root" of the graph. The root node is the only node that has no incoming edges (e.g., decision lines). The decision process traverses the graph, starting from the root node, until it reaches a "leaf" node, namely, a node that has no outgoing edges. Each internal node should implement a policy that picks a child among its available children. Every leaf node should implement a policy that, based on the entire path from the root to the leaf, defines a set of Desires (e.g., a set of navigational goals for the host vehicle). The set of Desires, together with a set of hard constraints that are defined directly based on the sensed state, establish an optimization problem whose solution is the trajectory for the vehicle. The hard constraints may be employed to further increase the safety of the system, and the Desires can be used to provide driving comfort and human-like driving behavior of the system. The trajectory provided as a solution to the optimization problem, in turn, defines the commands that should be provided to the steering, braking, and/or engine actuators in order to accomplish the trajectory.

Returning to FIG. 9, options graph 901 represents an options graph for a two-lane highway, including with merging lanes (meaning that at some points, a third lane is merged into either the right or the left lane of the highway). The root node 903 first decides if the host vehicle is in a plain road scenario or approaching a merge scenario. This is an example of a decision that can be implemented based on the sensing state. Plain road node 911 includes three child nodes: stay node 909, overtake left node 917, and overtake right node 915. Stay refers to a situation in which the host vehicle would like to keep driving in the same lane. The stay node is a leaf node (no outgoing edges/lines). Therefore, it the stay node defines a set of Desires. The first Desire it defines may include the desired lateral position—e.g., as close as possible to the center of the current lane of travel. There may also be a desire to navigate smoothly (e.g., within predefined or allowable acceleration maximums). The stay node may also define how the host vehicle is to react to other vehicles. For example, the stay node may review sensed target vehicles and assign each a semantic meaning, which can be translated into components of the trajectory.

Various semantic meanings may be assigned to target vehicles in an environment of the host vehicle. For example, in some embodiments the semantic meaning may include any of the following designations: 1) not relevant: indicating that the sensed vehicle in the scene is currently not relevant; 2) next lane: indicating that the sensed vehicle is in an adjacent lane and an appropriate offset should be maintained relative to this vehicle (the exact offset may be calculated in the optimization problem that constructs the trajectory given the Desires and hard constraints, and can potentially be vehicle dependent—the stay leaf of the options graph sets the target vehicle's semantic type, which defines the Desire relative to the target vehicle); 3) give way: the host vehicle will attempt to give way to the sensed target vehicle by, for example, reducing speed (especially where the host vehicle determines that the target vehicle is likely to cut into the lane of the host vehicle); 4) take way: the host vehicle will attempt to take the right of way by, for example, increasing speed; 5) follow: the host vehicle desires to maintain smooth driving following after this target vehicle; 6) takeover left/right: this means the host vehicle would like to initiate a lane change to the left or right lane. Overtake left node 917 and overtake right node 915 are internal nodes that do not yet define Desires.

The next node in options graph 901 is the select gap node 919. This node may be responsible for selecting a gap between two target vehicles in a particular target lane that host vehicle desires to enter. By choosing a node of the form IDj, for some value of j, the host vehicle arrives at a leaf that designates a Desire for the trajectory optimization problem—e.g., the host vehicle wishes to make a maneuver so as to arrive at the selected gap. Such a maneuver may involve first accelerating/braking in the current lane and then heading to the target lane at an appropriate time to enter the selected gap. If the select gap node 919 cannot find an appropriate gap, it moves to the abort node 921, which defines a desire to move back to the center of the current lane and cancel the takeover.

Figure 11A:
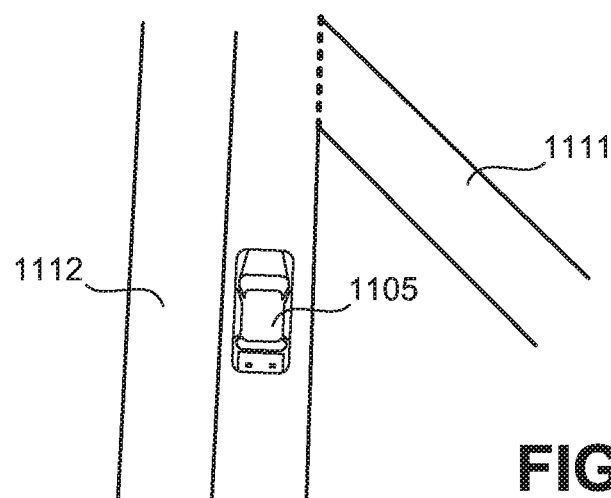
FIGS. 11A, 11B, and 11C provide a schematic representation of navigational options of a host vehicle in a merge zone consistent with the disclosed embodiments.

Returning to merge node 913, when the host vehicle approaches a merge, it has several options that may depend on a particular situation. For example, as shown in FIG. 11A, host vehicle 1105 is traveling along a two-lane road with no other target vehicles detected, either in the primary lanes of the two-lane road or in the merge lane 1111. In this situation, driving policy module 803, upon reaching merge node 913, may select stay node 909. That is, staying within its current lane may be desired where no target vehicles are sensed as merging onto the roadway.

Figure 11B:
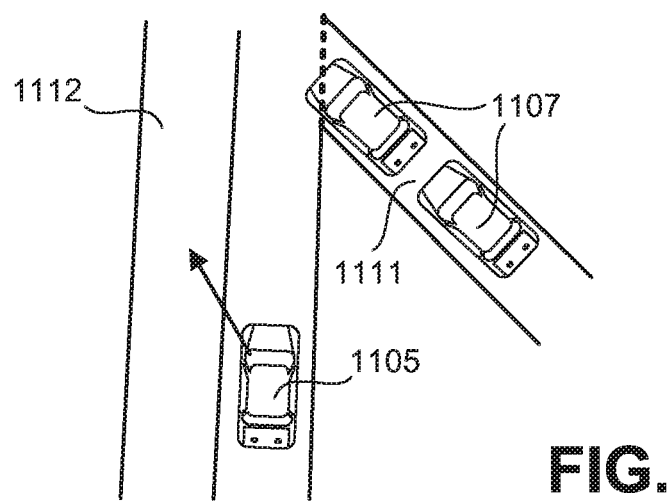

In FIG. 11B, the situation is slightly different. Here, host vehicle 1105 senses one or more target vehicles 1107 entering the main roadway 1112 from merge lane 1111. In this situation, once driving policy module 803 encounters merge node 913, it may choose to initiate an overtake left maneuver in order to avoid the merging situation.

Figure 11C:
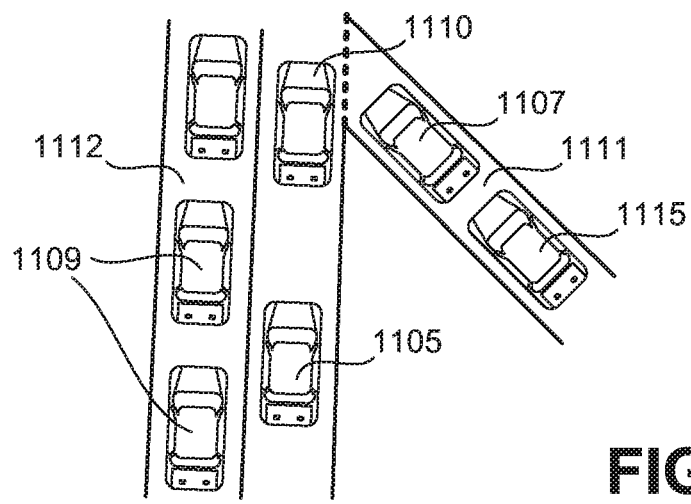

In FIG. 11C, host vehicle 1105 encounters one or more target vehicles 1107 entering main roadway 1112 from merge lane 1111. Host vehicle 1105 also detects target vehicles 1109 traveling in a lane adjacent to the lane of the host vehicle. The host vehicle also detects one or more target vehicles 1110 traveling in the same lane as host vehicle 1105. In this situation, driving policy module 803 may decide to adjust the speed of host vehicle 1105 to give way to target vehicle 1107 and to proceed ahead of target vehicle 1115. This can be accomplished, for example, by progressing to select gap node 919, which, in turn, will select a gap between ID0 (vehicle 1107) and ID1 (vehicle 1115) as the appropriate merging gap. In such a case, the appropriate gap of the merging situation defines the objective for a trajectory planner optimization problem.

As discussed above, nodes of the options graph may declare themselves as "critical," which may ensure that the selected option passes through the critical nodes. Formally, each node may implement a function IsCritical. After performing a forward pass on the options graph, from the root to a leaf, and solving the optimization problem of the trajectory planner, a backward pass may be performed from the leaf back to the root. Along this backward pass, the IsCritical function of all nodes in the pass may be called, and a list of all critical nodes may be saved. In the forward path corresponding to the next time frame, driving policy module 803 may be required to choose a path from the root node to a leaf that goes through all critical nodes.

FIGS. 11A-11C may be used to show a potential benefit of this approach. For example, in a situation where an overtake action is initiated, and driving policy module 803 arrives at the leaf corresponding to IDk, it would be undesirable to choose, for example, the stay node 909 when the host vehicle is in the middle of the takeover maneuver. To avoid such jumpiness, the IDj node can designate itself as critical. During the maneuver, the success of the trajectory planner can be monitored, and function IsCritical will return a "True" value if the overtake maneuver progresses as intended. This approach may ensure that in the next time frame, the takeover maneuver will be continued (rather than jumping to another, potentially inconsistent maneuver prior to completion of the initially selected maneuver). If, on the other hand, monitoring of the maneuver indicates that the selected maneuver is not progressing as intended, or if the maneuver has become unnecessary or impossible, the function IsCritical can return a "False" value. This can allow the select gap node to select a different gap in the next time frame, or to abort the overtake maneuver altogether. This approach may allow, on one hand, declaration of the desired path on the options graph at each time step, while on the other hand, may help to promote stability of the policy while in critical parts of the execution.

Hard constraints, which will be discussed in more detail below, may be differentiated from navigational desires. For example, hard constraints may ensure safe driving by applying an added layer of filtering of a planned navigational action. The implicated hard constraints, which may be programmed and defined manually, rather than through use of a trained system built upon reinforcement learning, can be determined from the sensed state. In some embodiments, however, the trained system may learn the applicable hard constraints to be applied and followed. Such an approach may promote driving policy module 803 arriving at a selected action that is already in compliance with the applicable hard constraints, which may reduce or eliminate selected actions that may require later modification to comply with applicable hard constraints. Nevertheless, as a redundant safety measure, hard constraints may be applied to the output of driving policy module 803 even where driving policy module 803 has been trained to account for predetermined hard constraints.

There are many examples of potential hard constraints. For example, a hard constraint may be defined in conjunction with a guardrail on an edge of a road. In no situation may the host vehicle be allowed to pass the guardrail. Such a rule induces a hard lateral constraint on the trajectory of the host vehicle. Another example of a hard constraint may include a road bump (e.g., a speed control bump), which may induce a hard constraint on the speed of driving before the bump and while traversing the bump. Hard constraints may be considered safety critical and, therefore, may be defined manually rather than relying solely on a trained system learning the constraints during training.

In contrast to hard constraints, the goal of desires may be to enable or achieve comfortable driving. As discussed above, an example of a desire may include a goal of positioning the host vehicle at a lateral position within a lane that corresponds to the center of the host vehicle lane. Another desire may include the ID of a gap to fit into. Note that there is not a requirement for the host vehicle to be exactly in the center of the lane, but instead a desire to be as close as possible to it may ensure that the host vehicle tends to migrate to the center of the lane even in the event of deviations from the center of the lane. Desires may not be safety critical. In some embodiments, desires may require negotiation with other drivers and pedestrians. One approach for constructing the desires may rely on the options graph, and the policy implemented in at least some nodes of the graph may be based on reinforcement learning.

For the nodes of options graph 901 or 1000 implemented as nodes trained based on learning, the training process may include decomposing the problem into a supervised learning phase and a reinforcement learning phase. In the supervised learning phase, a differentiable mapping from $(s_t, a_t)$ to $\hat{s}_{t+1}$ can be learned such that $\hat{s}_{t+1} \approx s_{t+1}$. This may be similar to "model-based" reinforcement learning. However, in the forward loop of the network, $\hat{s}_{t+1}$ may be replaced by the actual value of $s_{t+1}$, therefore eliminating the problem of error accumulation. The role of prediction of $\hat{s}_{t+1}$ is to propagate messages from the future back to past actions. In this sense, the algorithm may be a combination of "model-based" reinforcement learning with "policy-based learning."

An important element that may be provided in some scenarios is a differentiable path from future losses rewards back to decisions on actions. With the option graph structure, the implementation of options that involve safety constraints are usually not differentiable. To overcome this issue, the choice of a child in a learned policy node may be stochastic. That is, a node may output a probability vector, p, that assigns probabilities used in choosing each of the children of the particular node. Suppose that a node has k children and let $a^{(1)}, \ldots, a^{(k)}$ be the actions of the path from each child to a leaf. The resulting predicted action is therefore $\hat{a} = E_{i=1}^{k} p_i a^{(i)}$, which may result in a differentiable path from the action to p. In practice, an action a may be chosen to be $a^{(i)}$ for i~p, and the difference between a and â may be referred to as additive noise.

For the training of $\hat{s}_{t+1}$ given $s_t, a_t,$ supervised learning may be used together with real data. For training the policy of nodes simulators can be used. Later, fine tuning of a policy can be accomplished using real data. Two concepts may make the simulation more realistic. First, using imitation, an initial policy can be constructed using the "behavior cloning" paradigm, using large real world data sets. In some cases, the resulting agents may be suitable. In other cases, the resulting agents at least form very good initial policies for the other agents on the roads. Second, using self-play, our own policy may be used to augment the training. For example, given an initial implementation of the other agents (cars/pedestrians) that may be experienced, a policy may be trained based on a simulator. Some of the other agents may be replaced with the new policy, and the process may be repeated. As a result, the policy can continue to improve as it should respond to a larger variety of other agents that have differing levels of sophistication.

Further, in some embodiments, the system may implement a multi-agent approach. For example, the system may take into account data from various sources and/or images capturing from multiple angles. Further, some disclosed embodiments may provide economy of energy, as anticipation of an event which does not directly involve the host vehicle, but which may have an effect on the host vehicle can be considered, or even anticipation of an event that may lead to unpredictable circumstances involving other vehicles may be a consideration (e.g., radar may "see through" the leading vehicle and anticipation of an unavoidable, or even a high likelihood of an event that will affect the host vehicle).

Trained System with Imposed Navigational Constraints

In the context of autonomous driving, a significant concern is how to ensure that a learned policy of a trained navigational network will be safe. In some embodiments, the driving policy system may be trained using constraints, such that the actions selected by the trained system may already account for applicable safety constraints. Additionally, in some embodiments, an extra layer of safety may be provided by passing the selected actions of the trained system through one or more hard constraints implicated by a particular sensed scene in the environment of the host vehicle. Such an approach may ensure that that the actions taken by the host vehicle have been restricted to those confirmed as satisfying applicable safety constraints.

At its core, the navigational system may include a learning algorithm based on a policy function that maps an observed state to one or more desired actions. In some implementations, the learning algorithm is a deep learning algorithm. The desired actions may include at least one action expected to maximize an anticipated reward for a vehicle. While in some cases, the actual action taken by the vehicle may correspond to one of the desired actions, in other cases, the actual action taken may be determined based on the observed state, one or more desired actions, and non-learned, hard constraints (e.g., safety constraints) imposed on the learning navigational engine. These constraints may include no-drive zones surrounding various types of detected objects (e.g., target vehicles, pedestrians, stationary objects on the side of a road or in a roadway, moving objects on the side of a road or in a roadway, guard rails, etc.) In some cases, the size of the zone may vary based on a detected motion (e.g., speed and/or direction) of a detected object. Other constraints may include a maximum speed of travel when passing within an influence zone of a pedestrian, a maximum deceleration (to account for a target vehicle spacing behind the host vehicle), a mandatory stop at a sensed crosswalk or railroad crossing, etc.

Hard constraints used in conjunction with a system trained through machine learning may offer a degree of safety in autonomous driving that may surpass a degree of safety available based on the output of the trained system alone. For example, the machine learning system may be trained using a desired set of constraints as training guidelines and, therefore, the trained system may select an action in response to a sensed navigational state that accounts for and adheres to the limitations of applicable navigational constraints. Still, however, the trained system has some flexibility in selecting navigational actions and, therefore, there may exist at least some situations in which an action selected by the trained system may not strictly adhere to relevant navigational constraints. Therefore, in order to require that a selected action strictly adheres to relevant navigational constraints, the output of the trained system may be combined with, compared to, filtered with, adjusted, modified, etc. using a non-machine learning component outside the learning/trained framework that guarantees strict application of relevant navigational constraints.

The following discussion provides additional details regarding the trained system and the potential benefits (especially from a safety perspective) that may be gleaned from combining a trained system with an algorithmic component outside of the trained/learning framework. As discussed, the reinforcement learning objective by policy may be optimized through stochastic gradient ascent. The objective (e.g., the expected reward) may be defined as $\mathbb{E}_{s \sim P_s} R(\bar{s})$.

Objectives that involve expectation may be used in machine learning scenarios. Such an objective, without being bound by navigational constraints, however, may not return actions strictly bound by those constraints. For example, considering a reward function for which $R(\bar{s})=-r$ for trajectories that represent a rare "corner" event to be avoided (e.g., such as an accident), and $R(\bar{s}) \in [-1,1]$ for the rest of the trajectories, one goal for the learning system may be to learn to perform an overtake maneuver. Normally, in an accident free trajectory, $R(\bar{s})$ would reward successful, smooth, takeovers and penalize staying in a lane without completing the takeover—hence the range $[-1, 1]$. If a sequence, $\bar{s}$, represents an accident, the reward, $-r$, should provide a sufficiently high penalty to discourage such an occurrence. The question is what should be the value of r to ensure accident-free driving.

Observe that the effect of an accident on $\mathbb{E}[R(\bar{s})]$ is the additive term $-pr$ where p is the probability mass of trajectories with an accident event. If this term is negligible, i.e., $p \ll 1/r$, then the learning system may prefer a policy that performs an accident (or adopt in general a reckless driving policy) in order to fulfill the takeover maneuver successfully more often than a policy that would be more defensive at the expense of having some takeover maneuvers not complete successfully. In other words, if the probability of accidents is to be at most p, then r must be set such that $r \gg 1/p$. It may be desirable to make p extremely small (e.g., on the order of $p=10^{-9}$). Therefore, r should be large. In policy gradient, the gradient of $\mathbb{E}[R(\bar{s})]$ may be estimated. The following lemma shows that the variance of the random variable $R(\bar{s})$ grows with $pr^2$, which is larger than r for $r \gg 1/p$. Therefore, estimating the objective may be difficult, and estimating its gradient may be even more difficult.

Lemma: Let $\pi_0$ be a policy and let p and r be scalars such that with probability p, $R(\bar{s})=-r$ is obtained, and with probability $1-p$ we have $R(\bar{s}) \in [-1,1]$ is obtained. Then, $$\mathrm{Var}[R(s)] \geq pr^2 - (pr+(1-p))^2 = (p-p^2)r^2 - 2p(1-p)r - (1-p)^2 \approx pr^2$$

where the last approximation holds for the case $r \geq 1/p$.

This discussion shows that an objection of the form $\mathbb{E}[R(\bar{s})]$ may not ensure functional safety without causing a variance problem. The baseline subtraction method for variance reduction may not offer a sufficient remedy to the problem because the problem would shift from a high variance of $R(\bar{s})$ to an equally high variance of the baseline constants whose estimation would equally suffer numeric instabilities. Moreover, if the probability of an accident is p, then on average at least 1/p sequences should be sampled before obtaining an accident event. This implies a lower bound of 1/p samples of sequences for a learning algorithm that aims at minimizing $\mathbb{E}[R(\bar{s})]$. The solution to this problem may be found in the architectural design described herein, rather than through numerical conditioning techniques. The approach here is based on the notion that hard constraints should be injected outside of the learning framework. In other words, the policy function may be decomposed into a learnable part and a nonlearnable part. Formally, the policy function may be structured as $\pi_\theta = \pi^{(T)} \circ \pi_\theta^{(D)}$, where $\pi_\theta^{(D)}$ maps the (agnostic) state space into a set of Desires (e.g., desired navigational goals, etc.), while $\pi^{(T)}$ maps the Desires into a trajectory (which may determine how the car should move in a short range). The function $\pi_\theta^{(D)}$ is responsible for the comfort of driving and for making strategic decisions such as which other cars should be over-taken or given way and what is the desired position of the host vehicle within its lane, etc. The mapping from sensed navigational state to Desires is a policy $\pi_\theta^{(D)}$ that may be learned from experience by maximizing an expected reward. The desires produced by $\pi_\theta^{(D)}$ may be translated into a cost function over driving trajectories. The function $\pi^{(T)}$, not a learned function, may be implemented by finding a trajectory that minimizes the cost subject to hard constraints on functional safety. This decomposition may ensure functional safety while at the same time providing for comfortable driving.

Figure 11D:
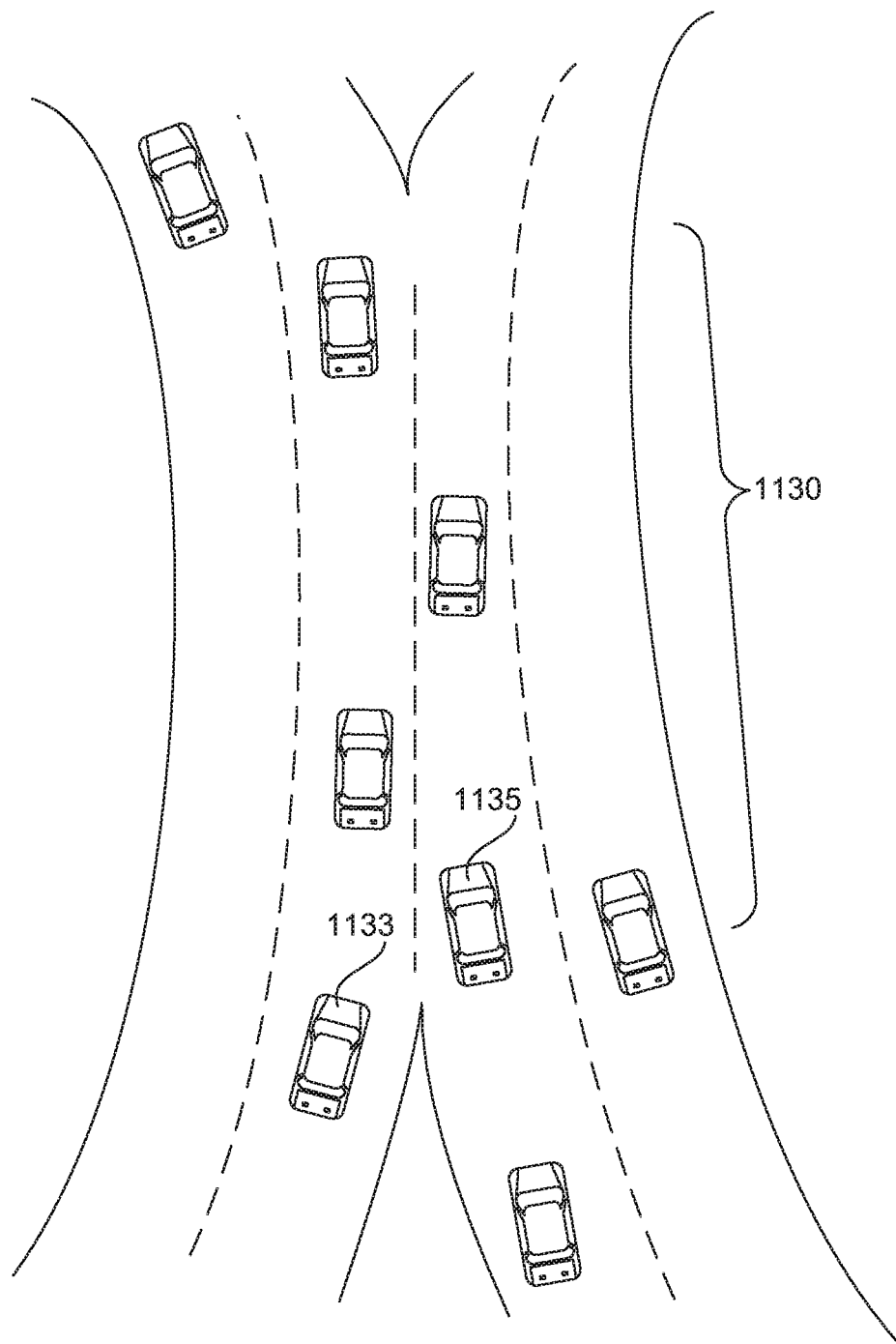
FIG. 11D provide a diagrammatic depiction of a double merge scenario consistent with the disclosed embodiments.

A double merge navigational situation, as depicted in FIG. 11D, provides an example further illustrating these concepts. In a double merge, vehicles approach the merge area 1130 from both left and right sides. And, from each side, a vehicle, such as vehicle 1133 or vehicle 1135, can decide whether to merge into lanes on the other side of merge area 1130. Successfully executing a double merge in busy traffic may require significant negotiation skills and experience and may be difficult to execute in a heuristic or brute force approach by enumerating all possible trajectories that could be taken by all agents in the scene. In this double merge example, a set of Desires, D, appropriate for the double merge maneuver may be defined. D may be the Cartesian product of the following sets: $D=[0, v_{max}] \times L \times \{g, t, o\}^n$, where $[0, v_{max}]$ is the desired target speed of the host vehicle, $L=\{1, 1.5, 2, 2.5, 3, 3.5, 4\}$ is the desired lateral position in lane units where whole numbers designate a lane center and fractional numbers designate lane boundaries, and (g, t, o) are classification labels assigned to each of the n other vehicles. The other vehicles may be assigned "g" if the host vehicle is to give way to the other vehicle, "t" if the host vehicle is to take way relative to the other vehicle, or "o" if the host vehicle is to maintain an offset distance relative to the other vehicle.

Below is a description of how a set of Desires, $(v, l, c_1, \ldots, c_n) \in D$, may be translated into a cost function over driving trajectories. A driving trajectory may be represented by $(x_1, y_1), \ldots, (x_k, y_k)$, where $(x_i, y_i)$ is the (lateral, longitudinal) location of the host vehicle (in ego-centric units) at time T·i. In some experiments, T=0.1 sec and k=10. Of course, other values may be selected as well. The cost assigned to a trajectory may include a weighted sum of individual costs assigned to the desired speed, lateral position, and the label assigned to each of the other n vehicles.

Given a desired speed $v \in [0, v_{max}]$, the cost of a trajectory associated with speed $$\sum_{i=2}^{k} \left( v - \frac{\|(x_i, y_i) - (x_{i-1}, y_{i-1})\|}{\tau} \right)^2.$$

Given desired lateral position, $l \in L$, the cost associated with desired lateral position is $\sum_{i=1}^{k} \text{dist}(x_i, y_i, l)$ where $\text{dist}(x_i, y_i, l)$ is the distance from the point (x, y) to the lane position l. Regarding the cost due to other vehicles, for any other vehicle $(x_1', y_1'), \ldots, (x_k', y_k')$ may represent the other vehicle in egocentric units of the host vehicle, and i may be the earliest point for which there exists j such that the distance between $(x_i, y_i)$ and $(x_j', y_j')$ is small. If there is no such point, then i can be set as i=∞. If another car is classified as "give-way", it may be desirable that Ti>Tj+0.5, meaning that the host vehicle will arrive to the trajectory intersection point at least 0.5 seconds after the other vehicle will arrive at the same point. A possible formula for translating the above constraint into a cost is [T(j−i)+0.5]+.

Likewise, if another car is classified as "take-way", it may be desirable that Tj>Ti+0.5, which may be translated to the cost [T(i−j)+0.5]+. If another car is classified as "offset", it may be desirable that i=∞, meaning that the trajectory of the host vehicle and the trajectory of the offset car do not intersect. This condition can be translated to a cost by penalizing with respect to the distance between trajectories.

Assigning a weight to each of these costs may provide a single objective function for the trajectory planner, $\pi^{(T)}$. A cost that encourages smooth driving may be added to the objective. And, to ensure functional safety of the trajectory, hard constraints can be added to the objective. For example, $(x_i, y_i)$ may be prohibited from being off the roadway, and $(x_i, y_i)$ may be forbidden from being close to $(x_j', y_j')$ for any trajectory point $(x_j', y_j')$ of any other vehicle |i−j| is small.

To summarize, the policy, $\pi_\theta$, can be decomposed into a mapping from the agnostic state to a set of Desires and a mapping from the Desires to an actual trajectory. The latter mapping is not based on learning and may be implemented by solving an optimization problem whose cost depends on the Desires and whose hard constraints may guarantee functional safety of the policy.

The following discussion describes mapping from the agnostic state to the set of Desires. As described above, to be compliant with functional safety, a system reliant upon reinforcement learning alone may suffer a high and unwieldy variance on the reward $R(\bar{s})$. This result may be avoided by decomposing the problem into a mapping from (agnostic) state space to a set of Desires using policy gradient iterations followed by a mapping to an actual trajectory which does not involve a system trained based on machine learning.

For various reasons, the decision making may be further decomposed into semantically meaningful components. For example, the size of D might be large and even continuous. In the double-merge scenario described above with respect to FIG. 11D, $D=[0, v_{max}] \times L \times \{g, t, o\}^n$. Additionally, the gradient estimator may involve the term $\Sigma_{t=1}^{T} \Box \theta^\pi \theta(a_t|s_t)$. In such an expression, the variance may grow with the time horizon T. In some cases, the value of T may be roughly 250 which may be high enough to create significant variance. Supposing a sampling rate is in the range of 10 Hz and the merge area 1130 is 100 meters, preparation for the merge may begin approximately 300 meters before the merge area. If the host vehicle travels at 16 meters per second (about 60 km per hour), then the value of T for an episode may be roughly 250.

Figure 11E:
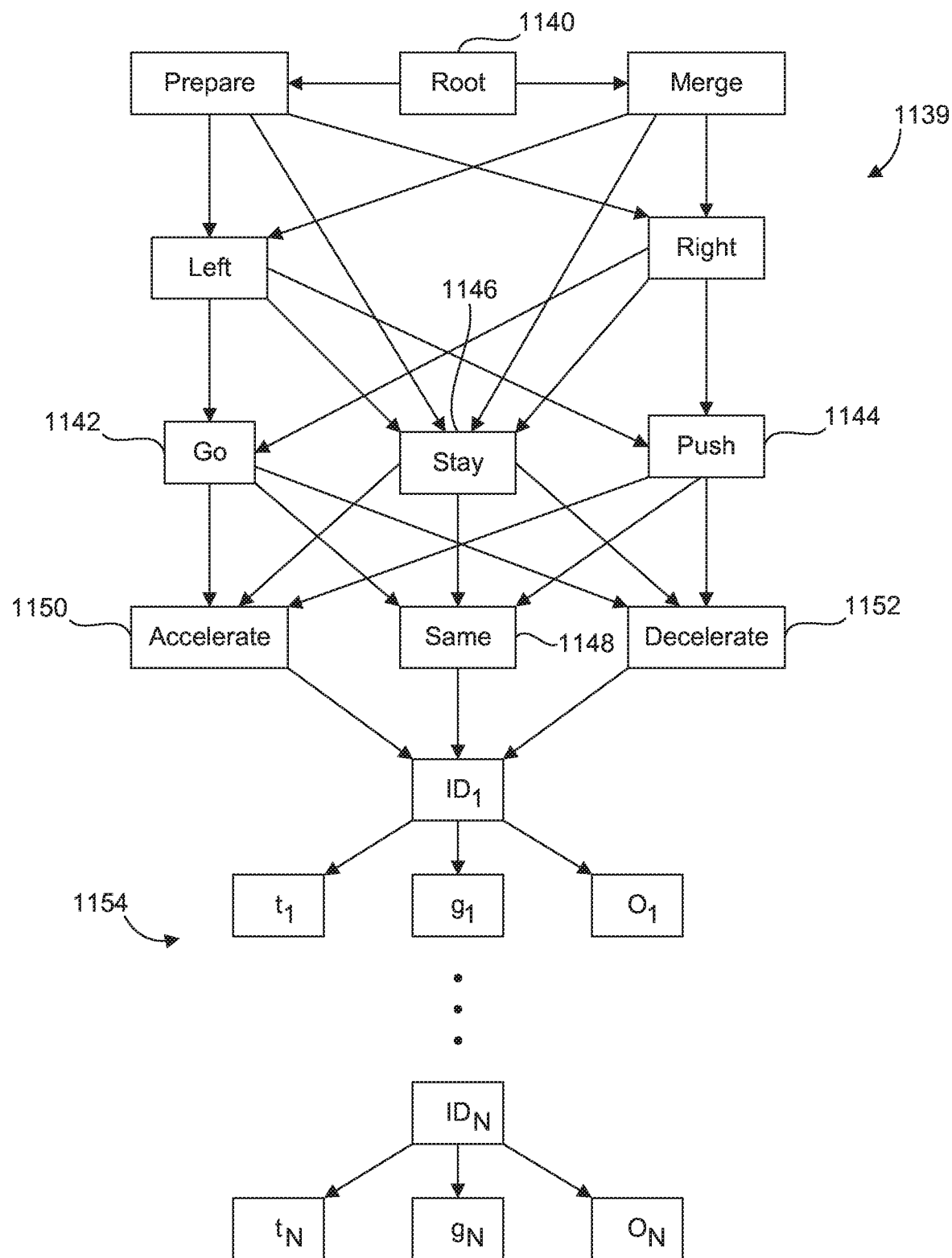
FIG. 11E provides an options graph potentially useful in a double merge scenario consistent with the disclosed embodiments.

Returning to the concept of an options graph, an options graph that may be representative of the double merge scenario depicted in FIG. 11D is shown in FIG. 11E. As previously discussed, an options graph may represent a hierarchical set of decisions organized as a Directed Acyclic Graph (DAG). There may be a special node in the graph called the "root" node 1140, which may be the only node that has no incoming edges (e.g., decision lines). The decision process may traverse the graph, starting from the root node, until it reaches a "leaf" node, namely, a node that has no outgoing edges. Each internal node may implement a policy function that chooses a child from among its available children. There may be a predefined mapping from the set of traversals over the options graph to the set of desires, D. In other words, a traversal on the options graph may be automatically translated into a desire in D. Given a node, v, in the graph, a parameter vector $\theta_v$ may specify the policy of choosing a child of v. If θ is the concatenation of all the $\theta_v$, then $\pi_\theta^{(D)}$ may be defined by traversing from the root of the graph to a leaf, while at each node v using the policy defined by $\theta_v$ to choose a child node.

In the double merge options graph 1139 of FIG. 11E, root node 1140 may first decide if the host vehicle is within the merging area (e.g., area 1130 of FIG. 11D) or if the host vehicle instead is approaching the merging area and needs to prepare for a possible merge. In both cases, the host vehicle may need to decide whether to change lanes (e.g., to the left or to the right side) or whether to stay in the current lane. If the host vehicle has decided to change lanes, the host vehicle may need to decide whether conditions are suitable to go on and perform the lane change maneuver (e.g., at "go" node 1142). If it is not possible to change lanes, the host vehicle may attempt to "push" toward the desired lane (e.g., at node 1144 as part of a negotiation with vehicles in the desired lane) by aiming at being on the lane mark. Alternatively, the host vehicle may opt to "stay" in the same lane (e.g., at node 1146). Such a process may determine the lateral position for the host vehicle in a natural way. For example, This may enable determination of the desired lateral position in a natural way. For example, if the host vehicle changes lanes from lane 2 to lane 3, the "go" node may set the desired lateral position to 3, the "stay" node may set the desired lateral position to 2, and the "push" node may set the desired lateral position to 2.5. Next, the host vehicle may decide whether to maintain the "same" speed (node 1148), "accelerate" (node 1150), or "decelerate" (node 1152). Next, the host vehicle may enter a "chain like" structure 1154 that goes over the other vehicles and sets their semantic meaning to a value in the set $\{g, t, o\}$. This process may set the desires relative to the other vehicles. The parameters of all nodes in this chain may be shared (similar to Recurrent Neural Networks).

A potential benefit of the options is the interpretability of the results. Another potential benefit is that the decomposable structure of the set D can be relied upon and, therefore, the policy at each node may be chosen from among a small number of possibilities. Additionally, the structure may allow for a reduction in the variance of the policy gradient estimator.

As discussed above, the length of an episode in the double merge scenario may be roughly T=250 steps. Such a value (or any other suitable value depending on a particular navigational scenario) may provide enough time to see the consequences of the host vehicle actions (e.g., if the host vehicle decided to change lanes as a preparation for the merge, the host vehicle will see the benefit only after a successful completion of the merge). On the other hand, due to the dynamic of driving, the host vehicle must make decisions at a fast enough frequency (e.g., 10 Hz in the case described above).

The options graph may enable a decrease in the effective value of T in at least two ways. First, given higher level decisions, a reward can be defined for lower level decisions while taking into account shorter episodes. For example, when the host vehicle has already chosen a "lane change" and the "go" node, a policy can be learned for assigning semantic meaning to vehicles by looking at episodes of 2-3 seconds (meaning that T becomes 20-30 instead of 250). Second, for high level decisions (such as whether to change lanes or to stay in the same lane), the host vehicle may not need to make decisions every 0.1 seconds. Instead, the host vehicle may be able to either make decisions at a lower frequency (e.g., every second), or implement an "option termination" function, and then the gradient may be calculated only after every termination of the option. In both cases, the effective value of T may be an order of magnitude smaller than its original value. All in all, the estimator at every node may depend on a value of T which is an order of magnitude smaller than the original 250 steps, which may immediately transfer to a smaller variance.

As discussed above, hard constraints may promote safer driving, and there may be several different types of constraints. For example, static hard constraints may be defined directly from the sensing state. These may include speed bumps, speed limits, road curvature, junctions, etc., within the environment of the host vehicle that may implicate one or more constraints on vehicle speed, heading, acceleration, breaking (deceleration), etc. Static hard constraints may also include semantic free space where the host vehicle is prohibited from going outside of the free space and from navigating too close to physical barriers, for example. Static hard constraints may also limit (e.g., prohibit) maneuvers that do not comply with various aspects of a kinematic motion of the vehicle, for example, a static hard constraint can be used to prohibit maneuvers that might lead to the host vehicle overturning, sliding, or otherwise losing control.

Hard constraints may also be associated with vehicles. For example, a constraint may be employed requiring that a vehicle maintain a longitudinal distance to other vehicles of at least one meter and a lateral distance from other vehicles of at least 0.5 meters. Constraints may also be applied such that the host vehicle will avoid maintaining a collision course with one or more other vehicles. For example, a time $\tau$ may be a measure of time based on a particular scene. The predicted trajectories of the host vehicle and one or more other vehicles may be considered from a current time to time $\tau$. Where the two trajectories intersect, $(t_i^a, t_i^l)$ may represent the time of arrival and the leaving time of vehicle i to the intersection point That is, each car will arrive at point when a first part of the car passes the intersection point, and a certain amount of time will be required before the last part of the car passes through the intersection point. This amount of time separates the arrival time from the leaving time. Assuming that $t_1^a < t_2^a$ (i.e., that the arrival time of vehicle 1 is less than the arrival time of vehicle 2), then we will want to ensure that vehicle 1 has left the intersection point prior to vehicle 2 arriving. Otherwise, a collision would result. Thus, a hard constraint may be implemented such that $t_1^a > t_2^a$. Moreover, to ensure that vehicle 1 and vehicle 2 do not miss one another by a minimal amount, an added margin of safety may be obtained by including a buffer time into the constraint (e.g., 0.5 seconds or another suitable value). A hard constraint relating to predicted intersection trajectories of two vehicles may be expressed as $t_1^l > t_2^a + 0.5$.

The amount of time $\tau$ over which the trajectories of the host vehicle and one or more other vehicles are tracked may vary. Injunction scenarios, however, where speeds may be lower, $\tau$ may be longer, and $\tau$ may be defined such that a host vehicle will enter and leave the junction in less than $\tau$ seconds.

Applying hard constraints to vehicle trajectories, of course, requires that the trajectories of those vehicles be predicted. For the host vehicle, trajectory prediction may be relatively straightforward, as the host vehicle generally already understands and, indeed, is planning an intended trajectory at any given time. Relative to other vehicles, predicting their trajectories can be less straightforward. For other vehicles, the baseline calculation for determining predicted trajectories may rely on the current speed and heading of the other vehicles, as determined, for example, based on analysis of an image stream captured by one or more cameras and/or other sensors (radar, lidar, acoustic, etc.) aboard the host vehicle.

There can be some exceptions, however, that can simplify the problem or at least provide added confidence in a trajectory predicted for another vehicle. For example, with respect to structured roads in which there is an indication of lanes and where give-way rules may exist, the trajectories of other vehicles can be based, at least in part, upon the position of the other vehicles relative to the lanes and based upon applicable give-way rules. Thus, in some situations, when there are observed lane structures, it may be assumed that next-lane vehicles will respect lane boundaries. That is, the host vehicle may assume that a next-lane vehicle will stay in its lane unless there is observed evidence (e.g., a signal light, strong lateral movement, movement across a lane boundary) indicating that the next-lane vehicle will cut into the lane of the host vehicle.

Other situations may also provide clues regarding the expected trajectories of other vehicles. For example, at stop signs, traffic lights, roundabouts, etc., where the host vehicle may have the right of way, it may be assumed that other vehicles will respect that right of way. Thus, unless there is observed evidence of a rule break, other vehicles may be assumed to proceed along a trajectory that respects the rights of way possessed by the host vehicle.

Hard constraints may also be applied with respect to pedestrians in an environment of the host vehicle. For example, a buffer distance may be established with respect to pedestrians such that the host vehicle is prohibited from navigating any closer than the prescribed buffer distance relative to any observed pedestrian. The pedestrian buffer distance may be any suitable distance. In some embodiments, the buffer distance may be at least one meter relative to an observed pedestrian.

Similar to the situation with vehicles, hard constraints may also be applied with respect to relative motion between pedestrians and the host vehicle. For example, the trajectory of a pedestrian (based on a heading direction and speed) may be monitored relative to the projected trajectory of the host vehicle. Given a particular pedestrian trajectory, with every point p on the trajectory, t(p) may represent the time required for the pedestrian to reach point p. To maintain the required buffer distance of at least 1 meter from the pedestrian, either t(p) must be larger than the time the host vehicle will reach point p (with sufficient difference in time such that the host vehicle passes in front of the pedestrian by a distance of at least one meter) or that t(p) must be less than the time the host vehicle will reach point p (e.g., if the host vehicle brakes to give way to the pedestrian). Still, in the latter example, the hard constraint may require that the host vehicle arrive at point p at a sufficient time later than the pedestrian such that the host vehicle can pass behind the pedestrian and maintain the required buffer distance of at least one meter. Of course, there may be exceptions to the pedestrian hard constraint. For example, where the host vehicle has the right of way or where speeds are very slow, and there is no observed evidence that the pedestrian will decline to give way to the host vehicle or will otherwise navigate toward the host vehicle, the pedestrian hard constraint may be relaxed (e.g., to a smaller buffer of at least 0.75 meters or 0.50 meters).

In some examples, constraints may be relaxed where it is determined that not all can be met. For example, in situations where a road is too narrow to leave desired spacing (e.g., 0.5 meters) from both curbs or from a curb and a parked vehicle, one or more the constraints may be relaxed if there are mitigating circumstances. For example, if there are no pedestrians (or other objects) on the sidewalk one can proceed slowly at 0.1 meters from a curb. In some embodiments, constraints may be relaxed if doing so will improve the user experience. For example, in order to avoid a pothole, constraints may be relaxed to allow a vehicle to navigate closers to the edges of the lane, a curb, or a pedestrian more than might ordinarily be permitted. Furthermore, when determining which constrains to relax, in some embodiments, the one or more constraints chosen to relax are those deemed to have the least available negative impact to safety. For example, a constraint relating to how close the vehicle may travel to the curb or to a concrete barrier may be relaxed before relaxing one dealing with proximity to other vehicles. In some embodiments, pedestrian constraints may be the last to be relaxed, or may never be relaxed in some situations.

Figure 12:
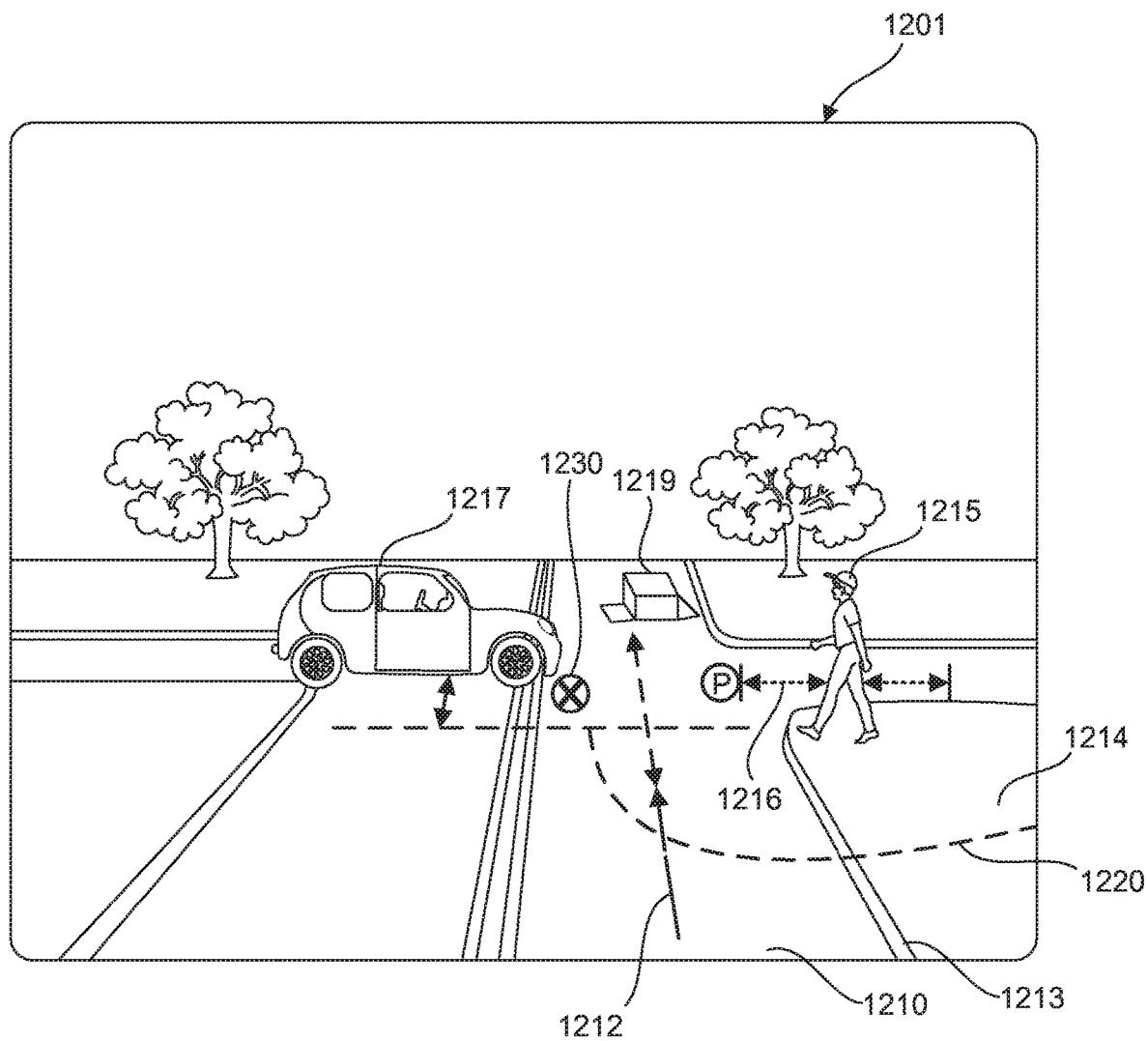
FIG. 12 provides a diagram of a representative image captured of an environment of a host vehicle, along with potential navigational constraints consistent with the disclosed embodiments.

FIG. 12 shows an example of a scene that may be captured and analyzed during navigation of a host vehicle. For example, a host vehicle may include a navigation system (e.g., system 100), as described above, that may receive from a camera (e.g., at least one of image capture device 122, image capture device 124, and image capture device 126) associated with the host vehicle a plurality of images representative of an environment of the host vehicle. The scene shown in FIG. 12 is an example of one of the images that may be captured at time t from an environment of a host vehicle traveling in lane 1210 along a predicted trajectory 1212. The navigation system may include at least one processing device (e.g., including any of the EyeQ processors or other devices described above) that are specifically programmed to receive the plurality of images and analyze the images to determine an action in response to the scene. Specifically, the at least one processing device may implement sensing module 801, driving policy module 803, and control module 805, as shown in FIG. 8. Sensing module 801 may be responsible for collecting and outputting the image information collected from the cameras and providing that information, in the form of an identified navigational state, to driving policy module 803, which may constitute a trained navigational system that has been trained through machine learning techniques, such as supervised learning, reinforcement learning, etc. Based on the navigational state information provided to driving policy module 803 by sensing module 801, driving policy module 803 (e.g., by implementing the options graph approach described above) may generate a desired navigational action for execution by the host vehicle in response to the identified navigational state.

In some embodiments, the at least one processing device may translate the desired navigation action directly into navigational commands using, for example, control module 805. In other embodiments, however, hard constraints may be applied such that the desired navigational action provided by the driving policy module 803 is tested against various predetermined navigational constraints that may be implicated by the scene and the desired navigational action. For example, where driving policy module 803 outputs a desired navigational action that would cause the host vehicle to follow trajectory 1212, this navigational action may be tested relative to one or more hard constraints associated with various aspects of the environment of the host vehicle. For example, a captured image 1201 may reveal a curb 1213, a pedestrian 1215, a target vehicle 1217, and a stationary object (e.g., an overturned box) present in the scene. Each of these may be associated with one or more hard constraints. For example, curb 1213 may be associated with a static constraint that prohibits the host vehicle from navigating into the curb or past the curb and onto a sidewalk 1214. Curb 1213 may also be associated with a road barrier envelope that defines a distance (e.g., a buffer zone) extending away from (e.g., by 0.1 meters, 0.25 meters, 0.5 meters, 1 meter, etc.) and along the curb, which defines a no-navigate zone for the host vehicle. Of course, static constraints may be associated with other types of roadside boundaries as well (e.g., guard rails, concrete pillars, traffic cones, pylons, or any other type of roadside barrier).

It should be noted that distances and ranging may be determined by any suitable method. For example, in some embodiments, distance information may be provided by onboard radar and/or lidar systems. Alternatively or additionally, distance information may be derived from analysis of one or more images captured from the environment of the host vehicle. For example, numbers of pixels of a recognized object represented in an image may be determined and compared to known field of view and focal length geometries of the image capture devices to determine scale and distances. Velocities and accelerations may be determined, for example, by observing changes in scale between objects from image to image over known time intervals. This analysis may indicate the direction of movement toward or away from the host vehicle along with how fast the object is pulling away from or coming toward the host vehicle. Crossing velocity may be determined through analysis of the change in an object's X coordinate position from one image to another over known time periods.

Pedestrian 1215 may be associated with a pedestrian envelope that defines a buffer zone 1216. In some cases, an imposed hard constraint may prohibit the host vehicle from navigating within a distance of 1 meter from pedestrian 1215 (in any direction relative to the pedestrian). Pedestrian 1215 may also define the location of a pedestrian influence zone 1220. Such an influence zone may be associated with a constraint that limits the speed of the host vehicle within the influence zone. The influence zone may extend 5 meters, 10 meters, 20 meters, etc., from pedestrian 1215. Each graduation of the influence zone may be associated with a different speed limit. For example, within a zone of 1 meter to five meters from pedestrian 1215, host vehicle may be limited to a first speed (e.g., 10 mph, 20 mph, etc.) that may be less than a speed limit in a pedestrian influence zone extending from 5 meters to 10 meters. Any graduation for the various stages of the influence zone may be used. In some embodiments, the first stage may be narrower than from 1 meter to five meters and may extend only from one meter to two meters. In other embodiments, the first stage of the influence zone may extend from 1 meter (the boundary of the no-navigate zone around a pedestrian) to a distance of at least 10 meters. A second stage, in turn, may extend from 10 meters to at least about 20 meters. The second stage may be associated with a maximum rate of travel for the host vehicle that is greater than the maximum rate of travel associated with the first stage of the pedestrian influence zone.

One or more stationary object constraints may also be implicated by the detected scene in the environment of the host vehicle. For example, in image 1201, the at least one processing device may detect a stationary object, such as box 1219 present in the roadway. Detected stationary objects may include various objects, such as at least one of a tree, a pole, a road sign, or an object in a roadway. One or more predefined navigational constraints may be associated with the detected stationary object. For example, such constraints may include a stationary object envelope, wherein the stationary object envelope defines a buffer zone about the object within which navigation of the host vehicle may be prohibited. At least a portion of the buffer zone may extend a predetermined distance from an edge of the detected stationary object. For example, in the scene represented by image 1201, a buffer zone of at least 0.1 meters, 0.25 meters, 0.5 meters or more may be associated with box 1219 such that the host vehicle will pass to the right or to the left of the box by at least some distance (e.g., the buffer zone distance) in order to avoid a collision with the detected stationary object.

The predefined hard constraints may also include one or more target vehicle constraints. For example, a target vehicle 1217 may be detected in image 1201. To ensure that the host vehicle does not collide with target vehicle 1217, one or more hard constraints may be employed. In some cases, a target vehicle envelope may be associated with a single buffer zone distance. For example, the buffer zone may be defined by a 1 meter distance surrounding the target vehicle in all directions. The buffer zone may define a region extending from the target vehicle by at least one meter into which the host vehicle is prohibited from navigating.

The envelope surrounding target vehicle 1217 need not be defined by a fixed buffer distance, however. In some cases, the predefined hard constraints associate with target vehicles (or any other movable objects detected in the environment of the host vehicle) may depend on the orientation of the host vehicle relative to the detected target vehicle. For example, in some cases, a longitudinal buffer zone distance (e.g., one extending from the target vehicle toward the front or rear of the host vehicle—such as in the case that the host vehicle is driving toward the target vehicle) may be at least one meter. A lateral buffer zone distance (e.g., one extending from the target vehicle toward either side of the host vehicle—such as when the host vehicle is traveling in a same or opposite direction as the target vehicle such that a side of the host vehicle will pass adjacent to a side of the target vehicle) may be at least 0.5 meters.

As described above, other constraints may also be implicated by detection of a target vehicle or a pedestrian in the environment of the host vehicle. For example, the predicted trajectories of the host vehicle and target vehicle 1217 may be considered and where the two trajectories intersect (e.g., at intersection point 1230), a hard constraint may require $t_1^{\,l} > t_2^{\,a}$ or $t_1^{\,l} > t_2^{\,a} + 0.5$ where the host vehicle is vehicle 1, and target vehicle 1217 is vehicle 2. Similarly, the trajectory of pedestrian 1215 (based on a heading direction and speed) may be monitored relative to the projected trajectory of the host vehicle. Given a particular pedestrian trajectory, with every point p on the trajectory, t(p) will represent the time required for the pedestrian to reach point p (i.e., point 1231 in FIG. 12). To maintain the required buffer distance of at least 1 meter from the pedestrian, either t(p) must be larger than the time the host vehicle will reach point p (with sufficient difference in time such that the host vehicle passes in front of the pedestrian by a distance of at least one meter) or that t(p) must be less than the time the host vehicle will reach point p (e.g., if the host vehicle brakes to give way to the pedestrian). Still, in the latter example, the hard constraint will require that the host vehicle arrive at point p at a sufficient time later than the pedestrian such that the host vehicle can pass behind the pedestrian and maintain the required buffer distance of at least one meter.

Other hard constraints may also be employed. For example, a maximum deceleration rate of the host vehicle may be employed in at least some cases. Such a maximum deceleration rate may be determined based on a detected distance to a target vehicle following the host vehicle (e.g., using images collected from a rearward facing camera). The hard constraints may include a mandatory stop at a sensed crosswalk or a railroad crossing or other applicable constraints.

Where analysis of a scene in an environment of the host vehicle indicates that one or more predefined navigational constraints may be implicated, those constraints may be imposed relative to one or more planned navigational actions for the host vehicle. For example, where analysis of a scene results in driving policy module 803 returning a desired navigational action, that desired navigational action may be tested against one or more implicated constraints. If the desired navigational action is determined to violate any aspect of the implicated constraints (e.g., if the desired navigational action would carry the host vehicle within a distance of 0.7 meters of pedestrian 1215 where a predefined hard constraint requires that the host vehicle remain at least 1.0 meters from pedestrian 1215), then at least one modification to the desired navigational action may be made based on the one or more predefined navigational constraints. Adjusting the desired navigational action in this way may provide an actual navigational action for the host vehicle in compliance with the constraints implicated by a particular scene detected in the environment of the host vehicle.

After determination of the actual navigational action for the host vehicle, that navigational action may be implemented by causing at least one adjustment of a navigational actuator of the host vehicle in response to the determined actual navigational action for the host vehicle. Such navigational actuator may include at least one of a steering mechanism, a brake, or an accelerator of the host vehicle.

Prioritized Constraints

As described above, various hard constraints may be employed with a navigational system to ensure safe operation of a host vehicle. The constraints may include a minimum safe driving distance with respect to a pedestrian, a target vehicle, a road barrier, or a detected object, a maximum speed of travel when passing within an influence zone of a detected pedestrian, or a maximum deceleration rate for the host vehicle, among others. These constraints may be imposed with a trained system trained based on machine learning (supervised, reinforcement, or a combination), but they also may be useful with non-trained systems (e.g., those employing algorithms to directly address anticipated situations arising in scenes from a host vehicle environment).

In either case, there may be a hierarchy of constraints. In other words, some navigational constraints may have priority over other constraints. Thus, if a situation arose in which a navigational action was not available that would result in all implicated constraints being satisfied, the navigation system may determine the available navigational action that achieves the highest priority constraints first. For example, the system may cause the vehicle to avoid a pedestrian first even if navigation to avoid the pedestrian would result in a collision with another vehicle or an object detected in a road. In another example, the system may cause the vehicle to ride up on a curb to avoid a pedestrian.

Figure 13:
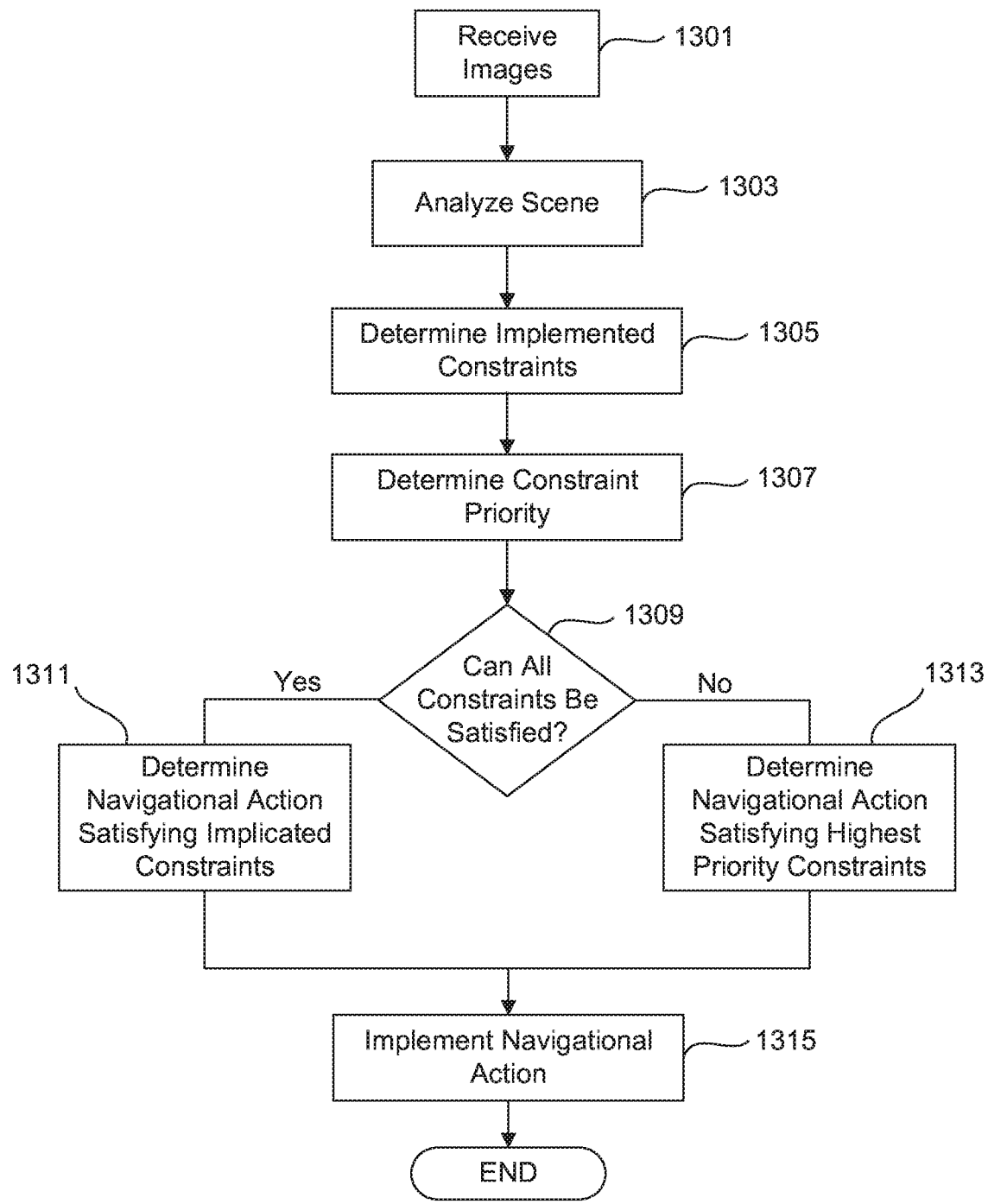
FIG. 13 provides an algorithmic flow chart for navigating a vehicle consistent with the disclosed embodiments.

FIG. 13 provides a flowchart illustrating an algorithm for implementing a hierarchy of implicated constraints determined based on analysis of a scene in an environment of a host vehicle. For example, at step 1301, at least one processing device associated with the navigational system (e.g., an EyeQ processor, etc.) may receive, from a camera mounted on the host vehicle, a plurality of images representative of an environment of the host vehicle. Through analysis of an image or images representative of the scene of the host vehicle environment at step 1303, a navigational state associated with the host vehicle may be identified. For example, a navigational state may indicate that the host vehicle is traveling along a two-lane road 1210, as in FIG. 12, that a target vehicle 1217 is moving through an intersection ahead of the host vehicle, that a pedestrian 1215 is waiting to cross the road on which the host vehicle travels, that an object 1219 is present ahead in the host vehicle lane, among various other attributes of the scene.

At step 1305, one or more navigational constraints implicated by the navigational state of the host vehicle may be determined. For example, the at least one processing device, after analyzing a scene in the environment of the host vehicle represented by one or more captured images may determine one or more navigational constraints implicated by objects, vehicles, pedestrians, etc., recognized through image analysis of the captured images. In some embodiments, the at least one processing device may determine at least a first predefined navigational constraint and a second predefined navigational constraint implicated by the navigational state, and the first predefined navigational constraint may differ from the second predefined navigational constraint. For example, the first navigational constraint may relate to one or more target vehicles detected in the environment of the host vehicle, and the second navigational constraint may relate to a pedestrian detected in the environment of the host vehicle.

At step 1307, the at least one processing device may determine a priority associated with constraints identified in step 1305. In the example described, the second predefined navigational constraint, relating to pedestrians, may have a priority higher than the first predefined navigational constraint, which relates to target vehicles. While priorities associated with navigational constraints may be determined or assigned based on various factors, in some embodiments, the priority of a navigational constraint may be related to its relative importance from a safety perspective. For example, while it may be important that all implemented navigational constraints be followed or satisfied in as many situations as possible, some constraints may be associated with greater safety risks than others and, therefore, may be assigned higher priorities. For example, a navigational constraint requiring that the host vehicle maintain at least a 1 meter spacing from a pedestrian may have a higher priority than a constraint requiring that the host vehicle maintain at least a 1 meter spacing from a target vehicle. This may be because a collision with a pedestrian may have more severe consequences than a collision with another vehicle. Similarly, maintaining a space between the host vehicle and a target vehicle may have a higher priority than a constraint requiring the host vehicle to avoid a box in the road, to drive less than a certain speed over a speed bump, or to expose the host vehicle occupants to no more than a maximum acceleration level.

While driving policy module 803 is designed to maximize safety by satisfying navigational constraints implicated by a particular scene or navigational state, in some situations it may be physically impossible to satisfy every implicated constraint. In such situations, the priority of each implicated constraint may be used to determine which of the implicated constraints should be satisfied first, as shown at step 1309. Continuing with the example above, in a situation where it is not possible satisfy both the pedestrian gap constraint and the target vehicle gap constraint, but rather only one of the constraints can be satisfied, then the higher priority of the pedestrian gap constraint may result in that constraint being satisfied before attempting to maintain a gap to the target vehicle. Thus, in normal situations, the at least one processing device may determine, based on the identified navigational state of the host vehicle, a first navigational action for the host vehicle satisfying both the first predefined navigational constraint and the second predefined navigational constraint where both the first predefined navigational constraint and the second predefined navigational constraint can be satisfied, as shown at step 1311. In other situations, however, where not all the implicated constraints can be satisfied, the at least one processing device may determine, based on the identified navigational state, a second navigational action for the host vehicle satisfying the second predefined navigational constraint (i.e., the higher priority constraint), but not satisfying the first predefined navigational constraint (having a priority lower than the second navigational constraint), where the first predefined navigational constraint and the second predefined navigational constraint cannot both be satisfied, as shown at step 1313.

Next, at step 1315, to implement the determined navigational actions for the host vehicle the at least one processing device can cause at least one adjustment of a navigational actuator of the host vehicle in response to the determined first navigational action or the determined second navigational action for the host vehicle. As in previous example, the navigational actuator may include at least one of a steering mechanism, a brake, or an accelerator.

Constraint Relaxation

As discussed above, navigational constraints may be imposed for safety purposes. The constraints may include a minimum safe driving distance with respect to a pedestrian, a target vehicle, a road barrier, or a detected object, a maximum speed of travel when passing within an influence zone of a detected pedestrian, or a maximum deceleration rate for the host vehicle, among others. These constraints may be imposed in a learning or non-learning navigational system. In certain situations, these constraints may be relaxed. For example, where the host vehicle slows or stops near a pedestrian, then progresses slowly to convey an intention to pass by the pedestrian, a response of the pedestrian can be detected from acquired images. If the response of the pedestrian is to stay still or to stop moving (and/or if eye contact with the pedestrian is sensed), it may be understood that the pedestrian recognizes an intent of the navigational system to pass by the pedestrian. In such situations, the system may relax one or more predefined constraints and implement a less stringent constraint (e.g., allow the vehicle to navigate within 0.5 meters of a pedestrian rather than within a more stringent 1 meter boundary).

Figure 14:
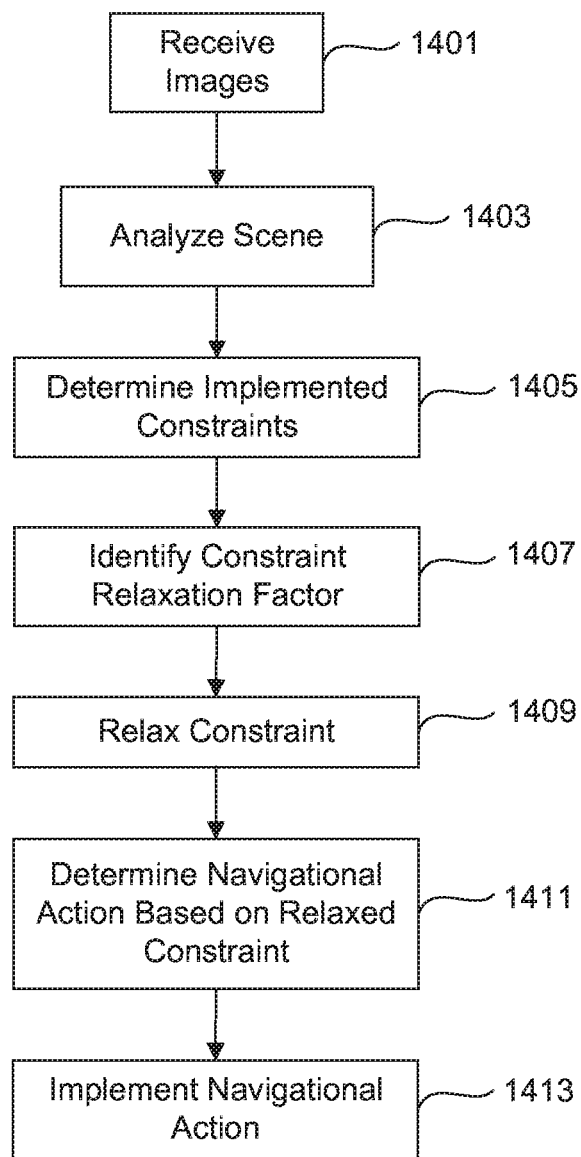
FIG. 14 provides an algorithmic flow chart for navigating a vehicle consistent with the disclosed embodiments.

FIG. 14 provides a flowchart for implementing control of the host vehicle based on relaxation of one or more navigational constraints. At step 1401, the at least one processing device may receive, from a camera associated with the host vehicle, a plurality of images representative of an environment of the host vehicle. Analysis of the images at step 1403 may enable identification of a navigational state associated with the host vehicle. At step 1405, the at least one processor may determine navigational constraints associated with the navigational state of the host vehicle. The navigational constraints may include a first predefined navigational constraint implicated by at least one aspect of the navigational state. At step 1407, analysis of the plurality of images may reveal the presence of at least one navigational constraint relaxation factor.

A navigational constraint relaxation factor may include any suitable indicator that one or more navigational constraints may be suspended, altered, or otherwise relaxed in at least one aspect. In some embodiments, the at least one navigational constraint relaxation factor may include a determination (based on image analysis) that the eyes of a pedestrian are looking in a direction of the host vehicle. In such cases, it may more safely be assumed that the pedestrian is aware of the host vehicle. As a result, a confidence level may be higher that the pedestrian will not engage in unexpected actions that cause the pedestrian to move into a path of the host vehicle. Other constraint relaxation factors may also be used. For example, the at least one navigational constraint relaxation factor may include: a pedestrian determined to be not moving (e.g., one presumed to be less likely of entering a path of the host vehicle); or a pedestrian whose motion is determined to be slowing. The navigational constraint relaxation factor may also include more complicated actions, such as a pedestrian determined to be not moving after the host vehicle has come to a stop and then resumed movement. In such a situation, the pedestrian may be assumed to understand that the host vehicle has a right of way, and the pedestrian coming to a stop may suggest an intent of the pedestrian to give way to the host vehicle. Other situations that may cause one or more constraints to be relaxed include the type of curb stone (e.g., a low curb stone or one with a gradual slope might allow a relaxed distance constraint), lack of pedestrians or other objects on sidewalk, a vehicle with its engine not running may have a relaxed distance, or a situation in which a pedestrian is facing away and/or is moving away from the area towards which the host vehicle is heading.

Where the presence of a navigational constraint relaxation factor is identified (e.g., at step 1407), a second navigational constraint may be determined or developed in response to detection of the constraint relaxation factor. This second navigational constraint may be different from the first navigational constraint and may include at least one characteristic relaxed with respect to the first navigational constraint. The second navigational constraint may include a newly generated constraint based on the first constraint, where the newly generated constraint includes at least one modification that relaxes the first constraint in at least one respect. Alternatively, the second constraint may constitute a predetermined constraint that is less stringent than the first navigational constraint in at least one respect. In some embodiments, such second constraints may be reserved for usage only for situations where a constraint relaxation factor is identified in an environment of the host vehicle. Whether the second constraint is newly generated or selected from a set of fully or partially available predetermined constraints, application of a second navigational constraint in place of a more stringent first navigational constraint (that may be applied in the absence of detection of relevant navigational constraint relaxation factors) may be referred to as constraint relaxation and may be accomplished in step 1409.

Where at least one constraint relaxation factor is detected at step 1407, and at least one constraint has been relaxed in step 1409, a navigational action for the host vehicle may be determined at step 1411. The navigational action for the host vehicle may be based on the identified navigational state and may satisfy the second navigational constraint. The navigational action may be implemented at step 1413 by causing at least one adjustment of a navigational actuator of the host vehicle in response to the determined navigational action.

As discussed above, the usage of navigational constraints and relaxed navigational constraints may be employed with navigational systems that are trained (e.g., through machine learning) or untrained (e.g., systems programmed to respond with predetermined actions in response to specific navigational states). Where trained navigational systems are used, the availability of relaxed navigational constraints for certain navigational situations may represent a mode switching from a trained system response to an untrained system response. For example, a trained navigational network may determine an original navigational action for the host vehicle, based on the first navigational constraint. The action taken by the vehicle, however, may be one that is different from the navigational action satisfying the first navigational constraint. Rather, the action taken may satisfy the more relaxed second navigational constraint and may be an action developed by a non-trained system (e.g., as a response to detection of a particular condition in the environment of the host vehicle, such as the presence of a navigational constraint relaxation factor).

There are many examples of navigational constraints that may be relaxed in response to detection in the environment of the host vehicle of a constraint relaxation factor. For example, where a predefined navigational constraint includes a buffer zone associated with a detected pedestrian, and at least a portion of the buffer zone extends a distance from the detected pedestrian, a relaxed navigational constraint (either newly developed, called up from memory from a predetermined set, or generated as a relaxed version of a preexisting constraint) may include a different or modified buffer zone. For example, the different or modified buffer zone may have a distance relative to the pedestrian that is less than the original or unmodified buffer zone relative to the detected pedestrian. As a result, in view of the relaxed constraint, the host vehicle may be permitted to navigate closer to a detected pedestrian, where an appropriate constraint relaxation factor is detected in the environment of the host vehicle.

A relaxed characteristic of a navigational constraint may include a reduced width in a buffer zone associated with at least one pedestrian, as noted above. The relaxed characteristic, however, may also include a reduced width in a buffer zone associated with a target vehicle, a detected object, a roadside barrier, or any other object detected in the environment of the host vehicle.

The at least one relaxed characteristic may also include other types of modifications in navigational constraint characteristics. For example, the relaxed characteristic may include an increase in speed associated with at least one predefined navigational constraint. The relaxed characteristic may also include an increase in a maximum allowable deceleration/acceleration associated with at least one predefined navigational constraint.

While constraints may be relaxed in certain situations, as described above, in other situations, navigational constraints may be augmented. For example, in some situations, a navigational system may determine that conditions warrant augmentation of a normal set of navigational constraints. Such augmentation may include adding new constraints to a predefined set of constraints or adjusting one or more aspects of a predefined constraint. The addition or adjustment may result in more conservative navigation relative the predefined set of constraints applicable under normal driving conditions. Conditions that may warrant constraint augmentation may include sensor failure, adverse environmental conditions (rain, snow, fog, or other conditions associated with reduced visibility or reduced vehicle traction), etc.

Figure 15:
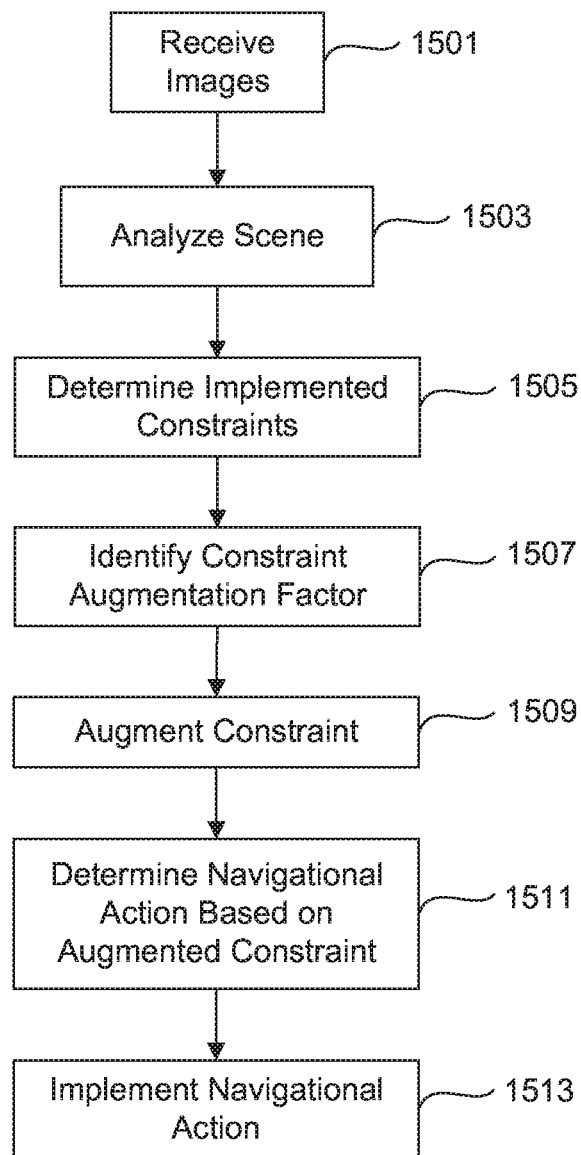
FIG. 15 provides an algorithmic flow chart for navigating a vehicle consistent with the disclosed embodiments.

FIG. 15 provides a flowchart for implementing control of the host vehicle based on augmentation of one or more navigational constraints. At step 1501, the at least one processing device may receive, from a camera associated with the host vehicle, a plurality of images representative of an environment of the host vehicle. Analysis of the images at step 1503 may enable identification of a navigational state associated with the host vehicle. At step 1505, the at least one processor may determine navigational constraints associated with the navigational state of the host vehicle. The navigational constraints may include a first predefined navigational constraint implicated by at least one aspect of the navigational state. At step 1507, analysis of the plurality of images may reveal the presence of at least one navigational constraint augmentation factor.

An implicated navigational constraint may include any of the navigational constraints discussed above (e.g., with respect to FIG. 12) or any other suitable navigational constraints. A navigational constraint augmentation factor may include any indicator that one or more navigational constraints may be supplemented/augmented in at least one aspect. Supplementation or augmentation of navigational constraints may be performed on a per set basis (e.g., by adding new navigational constraints to a predetermined set of constraints) or may be performed on a per constraint basis (e.g., modifying a particular constraint such that the modified constraint is more restrictive than the original, or adding a new constraint that corresponds to a predetermined constraint, wherein the new constraint is more restrictive than the corresponding constraint in at least one aspect). Additionally, or alternatively, supplementation or augmentation of navigational constraints may refer selection from among a set of predetermined constraints based on a hierarchy. For example, a set of augmented constraints may be available for selection based on whether a navigational augmentation factor is detected in the environment of or relative to the host vehicle. Under normal conditions where no augmentation factor is detected, then the implicated navigational constraints may be drawn from constraints applicable to normal conditions. On the other hand, where one or more constraint augmentation factors are detected, the implicated constraints may be drawn from augmented constraints either generated or predefined relative to the one or more augmentation factors. The augmented constraints may be more restrictive in at least one aspect than corresponding constraints applicable under normal conditions.

In some embodiments, the at least one navigational constraint augmentation factor may include a detection (e.g., based on image analysis) of the presence of ice, snow, or water on a surface of a road in the environment of the host vehicle. Such a determination may be based, for example, upon detection of: areas of reflectance higher than expected for dry roadways (e.g., indicative of ice or water on the roadway); white regions on the road indicating the presence of snow; shadows on the roadway consistent with the presence of longitudinal trenches (e.g., tire tracks in snow) on the roadway; water droplets or ice/snow particles on a windshield of the host vehicle; or any other suitable indicator of the presence of water or ice/snow on a surface of a road.

The at least one navigational constraint augmentation factor may also include detection of particulates on an outer surface of a windshield of the host vehicle. Such particulates may impair image quality of one or more image capture devices associated with the host vehicle. While described with respect to a windshield of the host vehicle, which is relevant for cameras mounted behind the windshield of the host vehicle, detection of particulates on other surfaces (e.g., a lens or lens cover of a camera, headlight lens, rear windshield, a tail light lens, or any other surface of the host vehicle visible to an image capture device (or detected by a sensor) associated with the host vehicle may also indicate the presence of a navigational constraint augmentation factor.

The navigational constraint augmentation factor may also be detected as an attribute of one or more image acquisition devices. For example, a detected decrease in image quality of one or more images captured by an image capture device (e.g., a camera) associated with the host vehicle may also constitute a navigational constraint augmentation factor. A decline in image quality may be associated with a hardware failure or partial hardware failure associated with the image capture device or an assembly associated with the image capture device. Such a decline in image quality may also be caused by environmental conditions. For example, the presence of smoke, fog, rain, snow, etc., in the air surrounding the host vehicle may also contribute to reduced image quality relative to the road, pedestrians, target vehicles, etc., that may be present in an environment of the host vehicle.

The navigational constraint augmentation factor may also relate to other aspects of the host vehicle. For example, in some situations, the navigational constraint augmentation factor may include a detected failure or partial failure of a system or sensor associate with the host vehicle. Such an augmentation factor may include, for example, detection of failure or partial failure of a speed sensor, GPS receiver, accelerometer, camera, radar, lidar, brakes, tires, or any other system associated with the host vehicle that may impact the ability of the host vehicle to navigate relative to navigational constraints associated with a navigational state of the host vehicle.

Where the presence of a navigational constraint augmentation factor is identified (e.g., at step 1507), a second navigational constraint may be determined or developed in response to detection of the constraint augmentation factor. This second navigational constraint may be different from the first navigational constraint and may include at least one characteristic augmented with respect to the first navigational constraint. The second navigational constraint may be more restrictive than the first navigational constraint, because detection of a constraint augmentation factor in the environment of the host vehicle or associated with the host vehicle may suggest that the host vehicle may have at least one navigational capability reduced with respect to normal operating conditions. Such reduced capabilities may include lowered road traction (e.g., ice, snow, or water on a roadway, reduced tire pressure; etc.); impaired vision (e.g., rain, snow, dust, smoke, fog etc. that reduces captured image quality); impaired detection capability (e.g., sensor failure or partial failure, reduced sensor performance, etc.), or any other reduction in capability of the host vehicle to navigate in response to a detected navigational state.

Where at least one constraint augmentation factor is detected at step 1507, and at least one constraint has been augmented in step 1509, a navigational action for the host vehicle may be determined at step 1511. The navigational action for the host vehicle may be based on the identified navigational state and may satisfy the second navigational (i.e., augmented) constraint. The navigational action may be implemented at step 1513 by causing at least one adjustment of a navigational actuator of the host vehicle in response to the determined navigational action.

As discussed, the usage of navigational constraints and augmented navigational constraints may be employed with navigational systems that are trained (e.g., through machine learning) or untrained (e.g., systems programmed to respond with predetermined actions in response to specific navigational states). Where trained navigational systems are used, the availability of augmented navigational constraints for certain navigational situations may represent a mode switching from a trained system response to an untrained system response. For example, a trained navigational network may determine an original navigational action for the host vehicle, based on the first navigational constraint. The action taken by the vehicle, however, may be one that is different from the navigational action satisfying the first navigational constraint. Rather, the action taken may satisfy the augmented second navigational constraint and may be an action developed by a non-trained system (e.g., as a response to detection of a particular condition in the environment of the host vehicle, such as the presence of a navigational constraint augmented factor).

There are many examples of navigational constraints that may be generated, supplemented, or augmented in response to detection in the environment of the host vehicle of a constraint augmentation factor. For example, where a predefined navigational constraint includes a buffer zone associated with a detected pedestrian, object, vehicle, etc., and at least a portion of the buffer zone extends a distance from the detected pedestrian/object/vehicle, an augmented navigational constraint (either newly developed, called up from memory from a predetermined set, or generated as an augmented version of a preexisting constraint) may include a different or modified buffer zone. For example, the different or modified buffer zone may have a distance relative to the pedestrian/object/vehicle that is greater than the original or unmodified buffer zone relative to the detected pedestrian/object/vehicle. As a result, in view of the augmented constraint, the host vehicle may be forced to navigate further from the detected pedestrian/object/vehicle, where an appropriate constraint augmentation factor is detected in the environment of the host vehicle or relative to the host vehicle.

The at least one augmented characteristic may also include other types of modifications in navigational constraint characteristics. For example, the augmented characteristic may include a decrease in speed associated with at least one predefined navigational constraint. The augmented characteristic may also include a decrease in a maximum allowable deceleration/acceleration associated with at least one predefined navigational constraint.

Navigation Based on Long Range Planning

In some embodiments, the disclosed navigational system can respond not only to a detected navigational state in an environment of the host vehicle, but may also determine one or more navigational actions based on long range planning. For example, the system may consider the potential impact on future navigational states of one or more navigational actions available as options for navigating with respect to a detected navigational state. Considering the effects of available actions on future states may enable the navigational system to determine navigational actions based not just upon a currently detected navigational state, but also based upon long range planning. Navigation using long range planning techniques may be especially applicable where one or more reward functions are employed by the navigation system as a technique for selecting navigational actions from among available options. Potential rewards may be analyzed with respect to the available navigational actions that may be taken in response to a detected, current navigational state of the host vehicle. Further, however, the potential rewards may also be analyzed relative to actions that may be taken in response to future navigational states projected to result from the available actions to a current navigational state. As a result, the disclosed navigational system may, in some cases, select a navigational action in response to a detected navigational state even where the selected navigational action may not yield the highest reward from among the available actions that may be taken in response to the current navigational state. This may be especially true where the system determines that the selected action may result in a future navigational state giving rise to one or more potential navigational actions offering higher rewards than the selected action or, in some cases, any of the actions available relative to a current navigational state. The principle may be expressed more simply as taking a less favorable action now in order to produce higher reward options in the future. Thus, the disclosed navigational system capable of long range planning may choose a suboptimal short term action where long term prediction indicates that a short term loss in reward may result in long term reward gains.

In general, autonomous driving applications may involve a series of planning problems, where the navigational system may decide on immediate actions in order to optimize a longer term objective. For example, when a vehicle is confronted with a merge situation at a roundabout, the navigational system may decide on an immediate acceleration or braking command in order to initiate navigation into the roundabout. While the immediate action to the detected navigational state at the roundabout may involve an acceleration or braking command responsive to the detected state, the long term objective is a successful merge, and the long term effect of the selected command is the success/failure of the merge. The planning problem may be addressed by decomposing the problem into two phases. First, supervised learning may be applied for predicting the near future based on the present (assuming the predictor will be differentiable with respect to the representation of the present). Second, a full trajectory of the agent may be modeled using a recurrent neural network, where unexplained factors are modeled as (additive) input nodes. This may allow solutions to the long-term planning problem to be determined using supervised learning techniques and direct optimization over the recurrent neural network. Such an approach may also enable the learning of robust policies by incorporating adversarial elements to the environment.

Two of the most fundamental elements of autonomous driving systems are sensing and planning. Sensing deals with finding a compact representation of the present state of the environment, while planning deals with deciding on what actions to take so as to optimize future objectives. Supervised machine learning techniques are useful for solving sensing problems. Machine learning algorithmic frameworks may also be used for the planning part, especially reinforcement learning (RL) frameworks, such as those described above.

RL may be performed in a sequence of consecutive rounds. At round I, the planner (a.k.a. the agent or driving policy module 803) may observe a state, $s_t \in S$, which represents the agent as well as the environment. It then should decide on an action at E A. After performing the action, the agent receives an immediate reward, $r_t \in \mathbb{R}$, and is moved to a new state, $s_{t+1}$. As an example, the host vehicle may include an adaptive cruise control (ACC) system, in which the vehicle should autonomously implement acceleration/braking so as to keep an adequate distance to a preceding vehicle while maintaining smooth driving. The state can be modeled as a pair, $s_t = (x_t, v_t) \in \mathbb{R}^2$, where $x_t$ is the distance to the preceding vehicle and $v_t$ is the velocity of the host vehicle relative to the velocity of the preceding vehicle. The action $a_t \in \mathbb{R}$ will be the acceleration command (where the host vehicle slows down if $a_t < 0$). The reward can be a function that depends on $|a_t|$ (reflecting the smoothness of driving) and on $s_t$ (reflecting that the host vehicle maintains a safe distance from the preceding vehicle). The goal of the planner is to maximize the cumulative reward (maybe up to a time horizon or a discounted sum of future rewards). To do so, the planner may rely on a policy, $\pi: S \to A$, which maps a state into an action.

Supervised Learning (SL) can be viewed as a special case of RL, in which $s_t$ is sampled from some distribution over S, and the reward function may have the form $r_t = -l(a_t, y_t)$, where l is a loss function, and the learner observes the value of $y_t$ which is the (possibly noisy) value of the optimal action to take when viewing the state $s_t$. There may be several differences between a general RL model and a specific case of SL, and these differences can make the general RL problem more challenging.

In some SL situations, the actions (or predictions) taken by the learner may have no effect on the environment. In other words, $s_{t+1}$ and $a_t$ are independent. This can have two important implications. First, in SL, a sample $(s_1, y_1), \ldots, (S_m, y_m)$ can be collected in advance, and only then can the search begin for a policy (or predictor) that will have good accuracy relative to the sample. In contrast, in RL, the state $s_{t+1}$ usually depends on the action taken (and also on the previous state), which in turn depends on the policy used to generate the action. This ties the data generation process to the policy learning process. Second, because actions do not affect the environment in SL, the contribution of the choice of $a_t$ to the performance of c is local. Specifically, $a_t$ only affects the value of the immediate reward. In contrast, in RL, actions that are taken at round t might have a long-term effect on the reward values in future rounds.

In SL, the knowledge of the "correct" answer, $y_t$, together with the shape of the reward, $r_t = -l(a_t, y_t)$ may provide full knowledge of the reward for all possible choices of $a_t$, which may enable calculation of the derivative of the reward with respect to $a_t$. In contrast, in RL, a "one-shot" value of the reward may be all that can be observed for a specific choice of action taken. This may be referred to as a "bandit" feedback. This is one of the most significant reasons for the need of "exploration" as a part of long term navigational planning, because in RL-based systems, if only "bandit" feedback is available, the system may not always know if the action taken was the best action to take.

Many RL algorithms rely, at least in part, on the mathematically elegant model of a Markov Decision Process (MDP). The Markovian assumption is that the distribution of $s_{t+1}$ is fully determined given $s_t$ and $a_t$. This yields a closed form expression for the cumulative reward of a given policy in terms of the stationary distribution over states of the MDP. The stationary distribution of a policy can be expressed as a solution to a linear programming problem. This yields two families of algorithms: 1) optimization with respect to the primal problem, which may be referred to as policy search, and 2) optimization with respect to a dual problem, whose variables are called the value function, $V^\pi$. The value function determines the expected cumulative reward if the MDP begins from the initial state, s, and from there actions are chosen according to $\pi$. A related quantity is the state-action value function, $Q^\pi(s, a)$, which determines the cumulative reward assuming a start from state, s, an immediately chosen action a, and from there on actions chosen according to $\pi$. The Q function may give rise to a characterization of the optimal policy (using the Bellman's equation). In particular, the Q function may show that the optimal policy is a deterministic function from S to A (in fact, it may be characterized as a "greedy" policy with respect to the optimal Q function).

One potential advantage of the MDP model is that it allows coupling of the future into the present using the Q function. For example, given that a host vehicle is now in state, s, the value of $Q^\pi(s, a)$ may indicate the effect of performing action a on the future. Therefore, the Q function may provide a local measure of the quality of an action a, thus making the RL problem more similar to a SL scenario.

Many RL algorithms approximate the V function or the Q function in one way or another. Value iteration algorithms, e.g., the Q learning algorithm, may rely on the fact that the V and Q functions of the optimal policy may be fixed points of some operators derived from Bellman's equation. Actor-critic policy iteration algorithms aim to learn a policy in an iterative way, where at iteration t, the "critic" estimates $Q^{\pi_t}$ and based on this estimate, the "actor" improves the policy.

Despite the mathematical elegancy of MDPs and the convenience of switching to the Q function representation, this approach may have several limitations. For example, an approximate notion of a Markovian behaving state may be all that can be found in some cases. Furthermore, the transition of states may depend not only on the agent's action, but also on actions of other players in the environment. For example, in the ACC example mentioned above, while the dynamic of the autonomous vehicle may be Markovian, the next state may depend on the behavior of the driver of the other car, which is not necessarily Markovian. One possible solution to this problem is to use partially observed MDPs, in which it is assumed that there is a Markovian state, but an observation that is distributed according to the hidden state is what can be seen.

A more direct approach may consider game theoretical generalizations of MDPs (e.g., the Stochastic Games framework). Indeed, algorithms for MDPs may be generalized to multi-agents games (e.g., minimax-Q learning or Nash-Q learning). Other approaches may include explicit modeling of the other players and vanishing regret learning algorithms. Learning in a multi-agent setting may be more complex than in a single agent setting.

A second limitation of the Q function representation may arise by departing from a tabular setting. The tabular setting is when the number of states and actions is small, and therefore, Q can be expressed as a table with |S| rows and |A| columns. However, if the natural representation of S and A includes Euclidean spaces, and the state and action spaces are discretized, the number of states/actions may be exponential in the dimension. In such cases, it may not be practical to employ a tabular setting. Instead, the Q function may be approximated by some function from a parametric hypothesis class (e.g., neural networks of a certain architecture). For example, a deep-Q-network (DQN) learning algorithm may be used. In DQN, the state space can be continuous, but the action space may remain a small discrete set. There may be approaches for dealing with continuous action spaces, but they may rely on approximating the Q function. In any case, the Q function may be complicated and sensitive to noise, and, therefore, may be challenging to learn.

A different approach may be to address the RL problem using a recurrent neural network (RNN). In some cases, RNN may be combined with the notions of multi-agents games and robustness to adversarial environments from game theory. Further, this approach may be one that does not explicitly rely on any Markovian assumption.

The following describes in more detail an approach for navigation by planning based on prediction. In this approach, it may be assumed that the state space, S, is a subset of $\mathbb{R}^d$, and the action space, A, is a subset of $\mathbb{R}^k$. This may be a natural representation in many applications. As noted above, there may be two key differences between RL and SL: (1) because past actions affect future rewards, information from the future may need to be propagated back to the past; and (2) the "bandit" nature of rewards can blur the dependence between (state, action) and reward, which can complicate the learning process.

As a first step in the approach, an observation may be made that there are interesting problems in which the bandit nature of rewards is not an issue. For example, reward value (as will be discussed in more detail below) for the ACC application may be differentiable with respect to the current state and action. In fact, even if the reward is given in a "bandit" manner, the problem of learning a differentiable function, $\hat{r}(s, a)$, such that $\hat{r}(s_t, a_t) \approx r_t$, may be a relatively straightforward SL problem (e.g., a one dimensional regression problem). Therefore, the first step of the approach may be to either define the reward as a function, $\hat{r}(s, a)$, which is differentiable with respect to s and a, or to use a regression learning algorithm in order to learn a differentiable function, $\hat{r}$, that minimizes at least some regression loss over a sample with instance vector being $(s_t, a_t) \in \mathbb{R}^d \times \mathbb{R}^k$ and target scalar being $r_t$. In some situations, in order to create a training set, elements of exploration may be used.

To address the connection between past and future, a similar idea may be used. For example, suppose a differentiable function $\hat{N}(s, a)$ can be learned such that $\hat{N}(s_t, a_t) \approx s_{t+1}$. Learning such a function may be characterized as an SL problem. A may be viewed as a predictor for the near future. Next, a policy that maps from S to A may be described using a parametric function $\pi_\theta: S \to A$. Expressing $\pi_\theta$ as a neural network, may enable expression of an episode of running the agent for T rounds using a recurrent neural network (RNN), where the next state is defined as $s_{t+1} = \hat{N}(s_t, a_t) + v_t$. Here, $v_t \in \mathbb{R}^d$ may be defined by the environment and may express unpredictable aspects of the near future. The fact that $s_{t+1}$ depends on $s_t$ and $a_t$ in a differentiable manner may enable a connection between future reward values and past actions. A parameter vector of the policy function, $\pi_\theta$, may be learned by back-propagation over the resulting RNN. Note that explicit probabilistic assumptions need not be imposed on $v_t$. In particular, there need not be a requirement for a Markovian relation. Instead, the recurrent network may be relied upon to propagate "enough" information between past and future. Intuitively, $\hat{N}(s_t, a_t)$ may describe the predictable part of the near future, while $v_t$ may express the unpredictable aspects, which may arise due to the behavior of other players in the environment. The learning system should learn a policy that will be robust to the behavior of other players. If $\|v_t\|$ is large, the connection between past actions and future reward values may be too noisy for learning a meaningful policy. Explicitly expressing the dynamic of the system in a transparent way may enable incorporation of prior knowledge more easily. For example, prior knowledge may simplify the problem of defining $\hat{N}$.

As discussed above, the learning system may benefit from robustness relative to an adversarial environment, such as the environment of a host vehicle, which may include multiple other drivers that may act in unexpected way. In a model that does not impose probabilistic assumptions on $v_t$, environments may be considered in which $v_t$ is chosen in an adversarial manner. In some cases, restrictions may be placed on $\mu_t$, otherwise the adversary can make the planning problem difficult or even impossible. One natural restriction may be to require that $\|\mu_t\|$ is bounded by a constant.

Robustness against adversarial environments may be useful in autonomous driving applications. Choosing $\mu_t$ in an adversarial way may even speed up the learning process, as it can focus the learning system toward a robust optimal policy. A simple game may be used to illustrate this concept. The state is $s_t \in \mathbb{R}$, the action is $a_t \in \mathbb{R}$, and the immediate loss function is $0.1|a_t| + [|s_t| - 2]_+$, where $[x]_+ = \max\{x, 0\}$ is the ReLU (rectified linear unit) function. The next state is $s_{t+1} = s_t + a_t + v_t$, where $v_t \in [-0.5, 0.5]$ is chosen for the environment in an adversarial manner. Here, the optimal policy may be written as a two layer network with ReLU: $a_t = -[s_t - 1.5]_+ + [-s_t - 1.5]_+$. Observe that when $|s_t| \in (1.5, 2]$, the optimal action may have a larger immediate loss than the action a=0. Therefore, the system may plan for the future and may not rely solely on the immediate loss. Observe that the derivative of the loss with respect to $a_t$ is $0.1\text{sign}(a_t)$, and the derivative with respect to $s_t$ is $1[|s_t|>2]\text{sign}(s_t)$. In a situation in which $s_t \in (1.5, 2]$, the adversarial choice of $v_t$ would be to set $v_t = 0.5$ and, therefore, there may be a non-zero loss on round t+1, whenever $a_t > 1.5 - s_t$. In such cases, the derivative of the loss may back-propagate directly to $a_t$. Thus, the adversarial choice of $v_t$ may help the navigational system obtain a non-zero back-propagation message in cases for which the choice of $a_t$ is sub-optimal. Such a relationship may aid the navigational system in selecting present actions based on an expectation that such a present action (even if that action would result in a suboptimal reward or even a loss) will provide opportunities in the future for more optimal actions that result in higher rewards.

Such an approach may be applied to virtually any navigational situation that may arise. The following describes the approach applied to one example: adaptive cruise control (ACC). In the ACC problem, the host vehicle may attempt to maintain an adequate distance to a target vehicle ahead (e.g., 1.5 seconds to the target car). Another goal may be to drive as smooth as possible while maintaining the desired gap. A model representing this situation may be defined as follows. The state space is $\mathbb{R}^3$, and the action space is $\mathbb{R}$. The first coordinate of the state is the speed of the target car, the second coordinate is the speed of the host vehicle, and the last coordinate is the distance between the host vehicle and target vehicle (e.g., location of the host vehicle minus the location of the target along the road curve). The action to be taken by the host vehicle is the acceleration, and may be denoted by $a_t$. The quantity T may denote the difference in time between consecutive rounds. While T may be set to any suitable quantity, in one example, T may be 0.1 seconds. Position, $s_t$, may be denoted as $s_t = (v_t^{target}, v_t^{host}, x_t)$, and the (unknown) acceleration of the target vehicle may be denoted as $a_t^{target}$.

The full dynamics of the system can be described by:

$v_t^{target} = [v_{t-1}^{target} + Ta_{t-1}^{target}]+$ $v_t^{host} = [v_{t-1}^{host} + Ta_{t-1}]+$ $x_t = [x_{t-1} + T(v_{t-1}^{target} - v_{t-1}^{host})]+$ This can be described as a sum of two vectors:

$$s_t = \left(\left[s_{t-1}[0] + \mathcal{T}a_{t-1}^{target}\right]_+, [s_{t-1}[1] + \mathcal{T}a_{t-1}]_+, [s_{t-1}[2] + \mathcal{T}(s_{t-1}[0] - s_{t-1}[1])]_+\right) = \underbrace{(s_{t-1}[0], [s_{t-1}[1] + \mathcal{T}a_{t-1}]_+, [s_{t-1}[2] + \mathcal{T}(s_{t-1}[0] - s_{t-1}[1])]_+)}_{\hat{N}(s_{t-1}, a_t)} + \underbrace{\left(\left[s_{t-1}[0] + \mathcal{T}a_{t-1}^{target}\right]_+ - s_{t-1}[0], 0, 0\right)}_{v_t}$$

The first vector is the predictable part, and the second vector is the unpredictable part. The reward on round t is defined as follows: $-r_t = 0.1|a_t| + [|x_t/x_t^* - 1| - 0.3]_+$ where $x_t^* = \max\{1, 1.5v_t^{host}\}$ The first term may result in a penalty for non-zero accelerations, thus encouraging smooth driving. The second term depends on the ratio between the distance to the target car, $x_t$, and the desired distance, $x_t^*$, which is defined as the maximum between a distance of 1 meter and break distance of 1.5 seconds. In some cases, this ratio may be exactly 1, but as long as this ratio is within [0.7, 1.3], the policy may forego any penalties, which may allow the host vehicle some slack in navigation—a characteristic that may be important in achieving a smooth drive.

Implementing the approach outlined above, the navigation system of the host vehicle (e.g., through operation of driving policy module 803 within processing unit 110 of the navigation system) may select an action in response to an observed state. The selected action may be based on analysis not only of rewards associated with the responsive actions available relative to a sensed navigational state, but may also be based on consideration and analysis of future states, potential actions in response to the futures states, and rewards associated with the potential actions.

Figure 16:
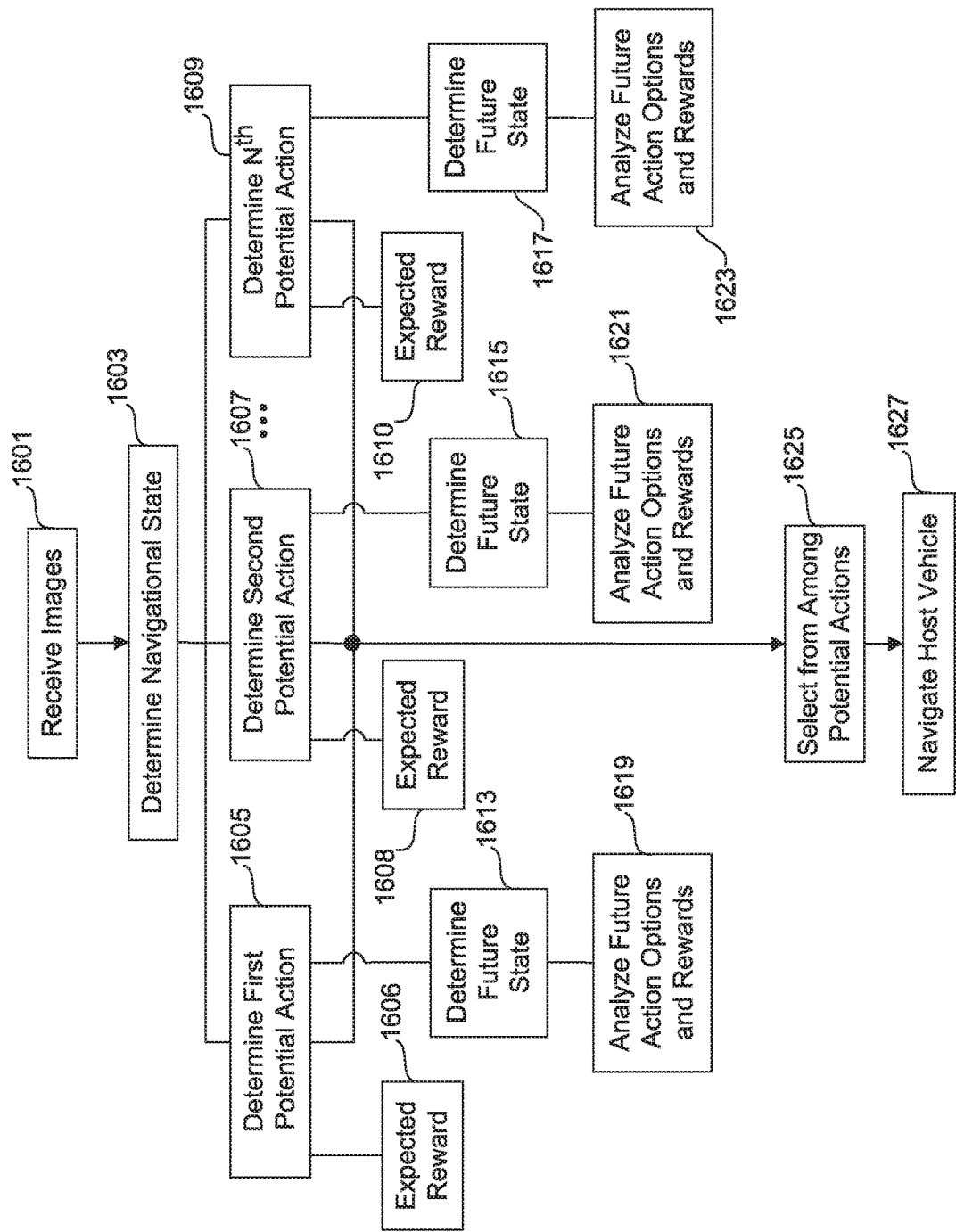
FIG. 16 provides an algorithmic flow chart for navigating a vehicle consistent with. the disclosed embodiments.

FIG. 16 illustrates an algorithmic approach to navigation based on detection and long range planning. For example, at step 1601, the at least one processing device 110 of the navigation system for the host vehicle may receive a plurality of images. These images may capture scenes representative of an environment of the host vehicle and may be supplied by any of the image capture devices (e.g., cameras, sensors, etc.) described above. Analysis of one or more of these images at step 1603 may enable the at least one processing device 110 to identify a present navigational state associated with the host vehicle (as described above).

At steps 1605, 1607, and 1609, various potential navigational actions responsive to the sensed navigational state may be determined. These potential navigational actions (e.g., a first navigational action through an $N^{th}$ available navigational action) may be determined based on the sensed state and the long range goals of the navigational system (e.g., to complete a merge, follow a lead vehicle smoothly, pass a target vehicle, avoid an object in the roadway, slow for a detected stop sign, avoid a target vehicle cutting in, or any other navigational action that may advance the navigational goals of the system).

For each of the determined potential navigational actions, the system may determine an expected reward. The expected reward may be determined according to any of the techniques described above and may include analysis of a particular potential action relative to one or more reward functions. Expected rewards 1606, 1608, and 1610 may be determined for each of the potential navigational actions (e.g., the first, second, and $N^{th}$) determined in steps 1605, 1607, and 1609, respectively.

In some cases, the navigational system of the host vehicle may select from among the available potential actions based on values associated with expected rewards 1606, 1608, and 1610 (or any other type of indicator of an expected reward). For example, in some situations, the action that yields the highest expected reward may be selected.

In other cases, especially where the navigation system engages in long range planning to determine navigational actions for the host vehicle, the system may not choose the potential action that yields the highest expected reward. Rather, the system may look to the future to analyze whether there may be opportunities for realizing higher rewards later if lower reward actions are selected in response to a current navigational state. For example, for any or all of the potential actions determined at steps 1605, 1607, and 1609, a future state may be determined. Each future state, determined at steps 1613, 1615, and 1617, may represent a future navigational state expected to result based on the current navigational state as modified by a respective potential action (e.g., the potential actions determined at steps 1605, 1607, and 1609).

For each of the future states predicted at steps 1613, 1615, and 1617, one or more future actions (as navigational options available in response to determined future state) may be determined and evaluated. At steps 1619, 1621, and 1623, for example, values or any other type of indicator of expected rewards associated with one or more of the future actions may be developed (e.g., based on one or more reward functions). The expected rewards associated with the one or more future actions may be evaluated by comparing values of reward functions associated with each future action or by comparing any other indicators associated with the expected rewards.

At step 1625, the navigational system for the host vehicle may select a navigational action for the host vehicle based on a comparison of expected rewards, not just based on the potential actions identified relative to a current navigational state (e.g., at steps 1605, 1607, and 1609), but also based on expected rewards determined as a result of potential future actions available in response to predicted future states (e.g., determined at steps 1613, 1615, and 1617). The selection at step 1625 may be based on the options and rewards analysis performed at steps 1619, 1621, and 1623.

The selection of a navigational action at step 1625 may be based on a comparison of expected rewards associated with future action options only. In such a case, the navigational system may select an action to the current state based solely on a comparison of expected rewards resulting from actions to potential future navigational states. For example, the system may select the potential action identified at step 1605, 1607, or 1609 that is associated with a highest future reward value as determined through analysis at steps 1619, 1621, and 1623.

The selection of a navigational action at step 1625 may also be based on comparison of current action options only (as noted above). In this situation, the navigational system may select the potential action identified at step 1605, 1607, or 1609 that is associated with a highest expected reward, 1606, 1608, or 1610. Such a selection may be performed with little or no consideration of future navigational states or future expected rewards to navigational actions available in response to expected future navigational states.

On the other hand, in some cases, the selection of a navigational action at step 1625 may be based on a comparison of expected rewards associated with both future action options and with current action options. This, in fact, may be one of the principles of navigation based on long range planning. For example, expected rewards to future actions may be analyzed to determine if any may warrant a selection of a lower reward action in response to the current navigational state in order to achieve a potential higher reward in response to a subsequent navigational action expected to be available in response to future navigational states. As an example, a value or other indicator of an expected reward 1606 may indicate a highest expected reward from among rewards 1606, 1608, and 1610. On the other hand, expected reward 1608 may indicate a lowest expected reward from among rewards 1606, 1608, and 1610. Rather than simply selecting the potential action determined at step 1605 (i.e., the action giving rise to the highest expected reward 1606), analysis of future states, potential future actions, and future rewards may be used in making a navigational action selection at step 1625. In one example, it may be determined that a reward identified at step 1621 (in response to at least one future action to a future state determined at step 1615 based on the second potential action determined at step 1607) may be higher than expected reward 1606. Based on this comparison, the second potential action determined at step 1607 may be selected rather than the first potential action determined at step 1605 despite expected reward 1606 being higher than expected reward 1608. In one example, the potential navigational action determined at step 1605 may include a merge in front of a detected target vehicle, while the potential navigational action determined at step 1607 may include a merge behind the target vehicle. While the expected reward 1606 of merging in front of the target vehicle may be higher than the expected reward 1608 associated with merging behind the target vehicle, it may be determined that merging behind the target vehicle may result in a future state for which there may be action options yielding even higher potential rewards than expected reward 1606, 1608, or other rewards based on available actions in response to a current, sensed navigational state.

Selection from among potential actions at step 1625 may be based on any suitable comparison of expected rewards (or any other metric or indicator of benefits associated with one potential action over another). In some cases, as described above, a second potential action may be selected over a first potential action if the second potential action is projected to provide at least one future action associated with an expected reward higher than a reward associated with the first potential action. In other cases, more complex comparisons may be employed. For example, rewards associated with action options in response to projected future states may be compared to more than one expected reward associated with a determined potential action.

In some scenarios, actions and expected rewards based on projected future states may affect selection of a potential action to a current state if at least one of the future actions is expected to yield a reward higher than any of the rewards expected as a result of the potential actions to a current state (e.g., expected rewards 1606, 1608, 1610, etc.). In some cases, the future action option that yields the highest expected reward (e.g., from among the expected rewards associated with potential actions to a sensed current state as well as from among expected rewards associated with potential future action options relative to potential future navigational states) may be used as a guide for selection of a potential action to a current navigational state. That is, after identifying a future action option yielding the highest expected reward (or a reward above a predetermined threshold, etc.), the potential action that would lead to the future state associated with the identified future action yielding the highest expected reward may be selected at step 1625.

In other cases, selection of available actions may be made based on determined differences between expected rewards. For example, a second potential action determined at step 1607 may be selected if a difference between an expected reward associated with a future action determined at step 1621 and expected reward 1606 is greater than a difference between expected reward 1608 and expected reward 1606

(assuming+sign differences). In another example, a second potential action determined at step 1607 may be selected if a difference between an expected reward associated with a future action determined at step 1621 and an expected reward associated with a future action determined at step 1619 is greater than a difference between expected reward 1608 and expected reward 1606.

Several examples have been described for selecting from among potential actions to a current navigational state. Any other suitable comparison technique or criteria, however, may be used for selecting an available action through long range planning based on action and reward analysis extending to projected future states. Additionally, while FIG. 16 represents two layers in the long range planning analysis (e.g., a first layer considering the rewards resulting from potential actions to a current state, and a second layer considering the rewards resulting from future action options in response to projected future states), analysis based on more layers may be possible. For example, rather than basing the long range planning analysis upon one or two layers, three, four or more layers of analysis could be used in selecting from among available potential actions in response to a current navigational state.

After a selection is made from among potential actions in response to a sensed navigational state, at step 1627, the at least one processor may cause at least one adjustment of a navigational actuator of the host vehicle in response to the selected potential navigational action. The navigational actuator may include any suitable device for controlling at least one aspect of the host vehicle. For example, the navigational actuator may include at least one of a steering mechanism, a brake, or an accelerator.

Navigation Based on Inferred Aggression of Others

Target vehicles may be monitored through analysis of an acquired image stream to determine indicators of driving aggression. Aggression is described herein as a qualitative or quantitative parameter, but other characteristics may be used: perceived level of attention (potential impairment of driver, distracted-cell phone, asleep, etc.). In some cases, a target vehicle may be deemed to have a defensive posture, and in some cases, the target vehicle may be determined to have a more aggressive posture. Navigational actions may be selected or developed based on indicators of aggression. For example, in some cases, the relative velocity, relative acceleration, increases in relative acceleration, following distance, etc., relative to a host vehicle may be tracked to determine if the target vehicle is aggressive or defensive. If the target vehicle is determined to have a level of aggression exceeding a threshold, for example, the host vehicle may be inclined to give way to the target vehicle. A level of aggression of the target vehicle may also be discerned based on a determined behavior of the target vehicle relative to one or more obstacles in a path of or in a vicinity of the target vehicle (e.g., a leading vehicle, obstacle in the road, traffic light, etc.).

As an introduction to this concept, an example experiment will be described with respect to a merger of the host vehicle into a roundabout, in which a navigational goal is to pass through and out of the roundabout. The situation may begin with the host vehicle approaches an entrance of the roundabout and may end with the host vehicle reaches an exit of the roundabout (e.g., the second exit). Success may be measured based on whether the host vehicle maintains a safe distance from all other vehicles at all times, whether the host vehicle finishes the route as quickly as possible, and whether the host vehicle adheres to a smooth acceleration policy. In this illustration, $N_T$ target vehicles may be placed at random on the roundabout. To model a blend of adversarial and typical behavior, with probability p, a target vehicle may be modeled by an "aggressive" driving policy, such that the aggressive target vehicle accelerates when the host vehicle attempts to merge in front of the target vehicle. With probability 1-p, the target vehicle may be modeled by a "defensive" driving policy, such that the target vehicle decelerates and lets the host vehicle merge in. In this experiment, p=0.5, and the navigation system of the host vehicle may be provided with no information about the type of the other drivers. The types of other drivers may be chosen at random at the beginning of the episode.

The navigational state may be represented as the velocity and location of the host vehicle (the agent), and the locations, velocities, and accelerations of the target vehicles. Maintaining target acceleration observations may be important in order to differentiate between aggressive and defensive drivers based on the current state. All target vehicles may move on a one-dimensional curve that outlines the roundabout path. The host vehicle may move on its own one-dimensional curve, which intersects the target vehicles' curve at the merging point, and this point is the origin of both curves. To model reasonable driving, the absolute value of all vehicles' accelerations may be upper bounded by a constant. Velocities may also be passed through a ReLU because driving backward is not allowed. Note that by not allowing driving backwards, long-term planning may become a necessity, as the agent cannot regret on its past actions.

Figure 17A:
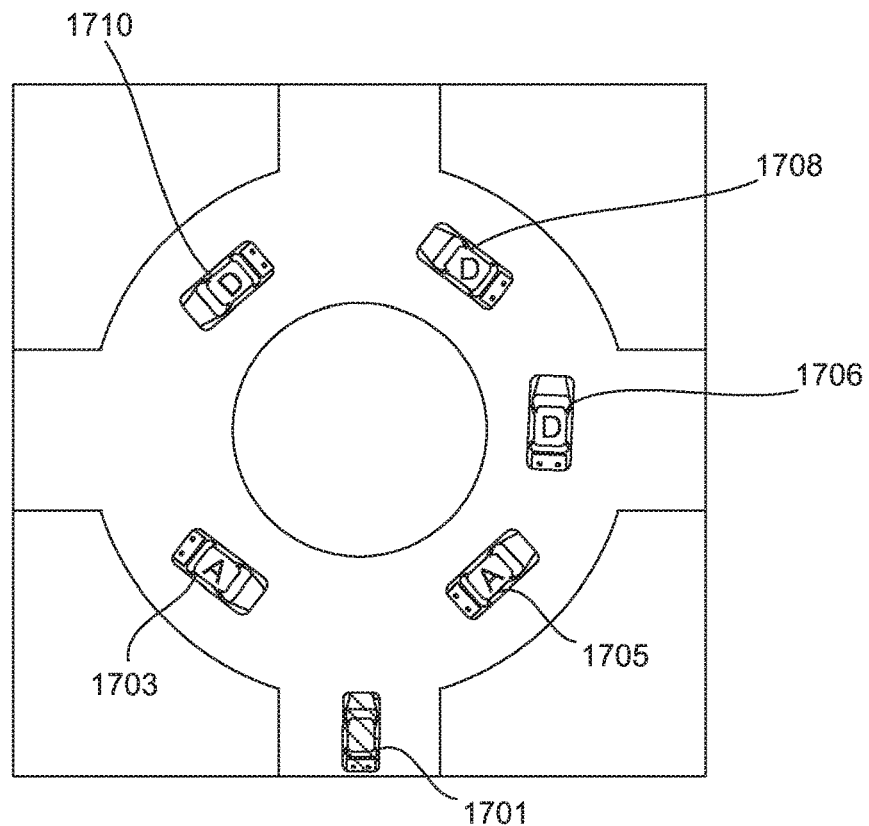
FIGS. 17A and 17B provide a diagrammatic illustration of a host vehicle navigating into a roundabout consistent with the disclosed embodiments.
Figure 17B:
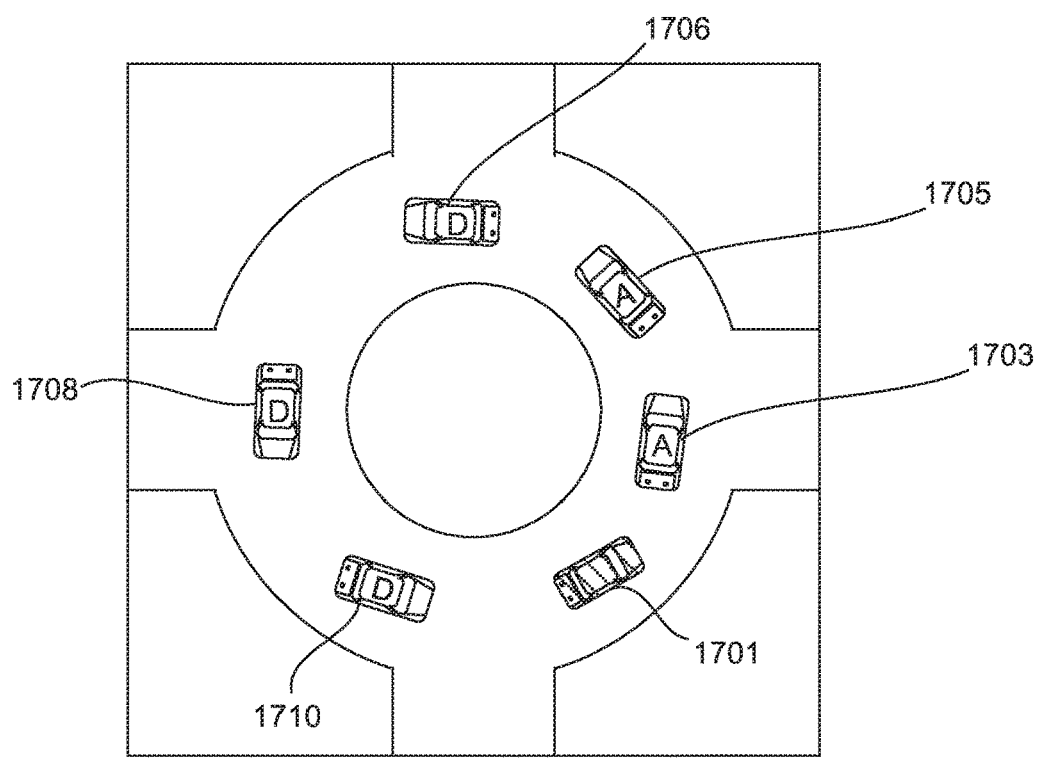

As described above, the next state, $s_{t+1}$, may be decomposed into a sum of a predictable part, $\hat{N}(s_t, a_t)$, and a non-predictable part, $v_t$. The expression, $\hat{N}(s_t, a_t)$, may represent the dynamics of vehicle locations and velocities (which may be well-defined in a differentiable manner), while $v_t$ may represent the target vehicles' acceleration. It may be verified that $\hat{N}(s_t, a_t)$ can be expressed as a combination of ReLU functions over an affine transformation, hence it is differentiable with respect to $s_t$ and $a_t$. The vector $v_t$ may be defined by a simulator in a non-differentiable manner, and may implement aggressive behavior for some targets and defensive behavior for other targets. Two frames from such a simulator are shown in FIGS. 17A and 17B. In this example experiment, a host vehicle 1701 learned to slowdown as it approached the entrance of the roundabout. It also learned to give way to aggressive vehicles (e.g., vehicles 1703 and 1705), and to safely continue when merging in front of defensive vehicles (e.g., vehicles 1706, 1708, and 1710). In the example represented by FIGS. 17A and 17B, the navigation system of host vehicle 1701 is not provided with the type of target vehicles. Rather, whether a particular vehicle is determined to be aggressive or defensive is determined through inference based on observed position and acceleration, for example, of the target vehicles. In FIG. 17A, based on position, velocity, and/or relative acceleration, host vehicle 1701 may determine that vehicle 1703 has an aggressive tendency and, therefore, host vehicle 1701 may stop and wait for target vehicle 1703 to pass rather than attempting to merge in front of target vehicle 1703. In FIG. 17B, however, target vehicle 1701 recognized that the target vehicle 1710 traveling behind vehicle 1703 exhibited defensive tendencies (again, based on observed position, velocity, and/or relative acceleration of vehicle 1710) and, therefore, completed a successful merge in front of target vehicle 1710 and behind target vehicle 1703.

Figure 18:
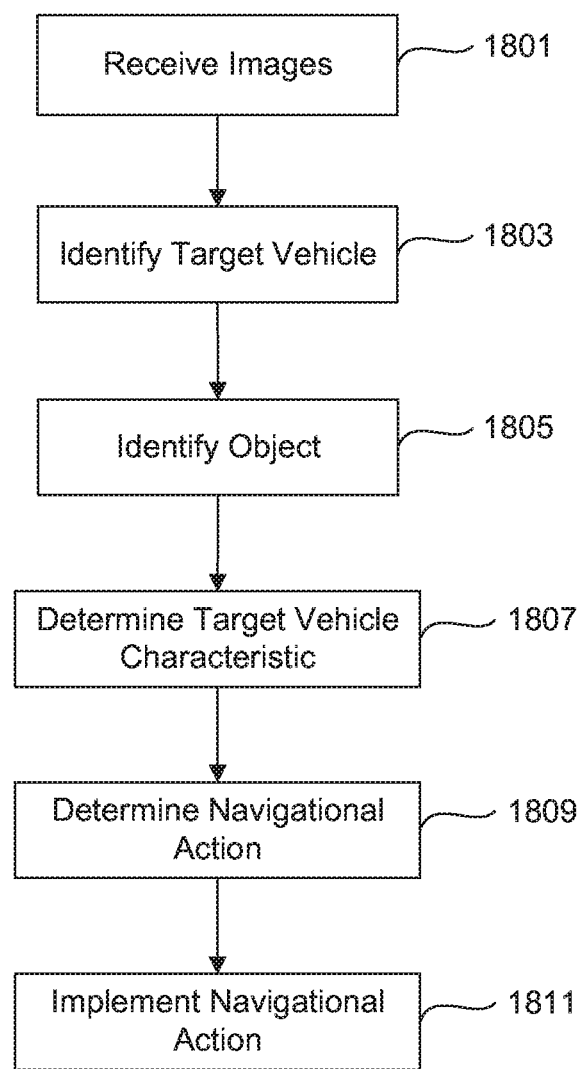
FIG. 18 provides an algorithmic flow chart for navigating a vehicle consistent with the disclosed embodiments.

FIG. 18 provides a flowchart representing an example algorithm for navigating a host vehicle based on predicted aggression of other vehicles. In the example of FIG. 18, a level of aggression associated with at least one target vehicle may be inferred based on observed behavior of the target vehicle relative to an object in the environment of the target vehicle. For example, at step 1801, at least one processing device (e.g., processing device 110) of the host vehicle navigation system may receive, from a camera associated with the host vehicle, a plurality of images representative of an environment of the host vehicle. At step 1803, analysis of one or more of the received images may enable the at least one processor to identify a target vehicle (e.g., vehicle 1703) in the environment of the host vehicle 1701. At step 1805, analysis of one or more of the received images may enable the at least one processing device to identify in the environment of the host vehicle at least one obstacle to the target vehicle. The object may include debris in a roadway, a stoplight/traffic light, a pedestrian, another vehicle (e.g., a vehicle traveling ahead of the target vehicle, a parked vehicle, etc.), a box in the roadway, a road barrier, a curb, or any other type of object that may be encountered in an environment of the host vehicle. At step 1807, analysis of one or more of the received images may enable the at least one processing device to determine at least one navigational characteristic of the target vehicle relative to the at least one identified obstacle to the target vehicle.

Various navigational characteristics may be used to infer a level of aggression of a detected target vehicle in order to develop an appropriate navigational response to the target vehicle. For example, such navigational characteristics may include a relative acceleration between the target vehicle and the at least one identified obstacle, a distance of the target vehicle from the obstacle (e.g., a following distance of the target vehicle behind another vehicle), and/or a relative velocity between the target vehicle and the obstacle, etc.

In some embodiments, the navigational characteristics of the target vehicles may be determined based on outputs from sensors associated with the host vehicle (e.g., radar, speed sensors, GPS, etc.). In some cases, however, the navigational characteristics of the target vehicles may be determined partially or fully based on analysis of images of an environment of the host vehicle. For example, image analysis techniques described above and in, for example, U.S. Pat. No. 9,168,868, which is incorporated herein by reference, may be used to recognize target vehicles within an environment of the host vehicle. And, monitoring a location of a target vehicle in the captured images over time and/or monitoring locations in the captured images of one or more features associated with the target vehicle (e.g., tail lights, head lights, bumper, wheels, etc.) may enable a determination of relative distances, velocities, and/or accelerations between the target vehicles and the host vehicle or between the target vehicles and one or more other objects in an environment of the host vehicle.

An aggression level of an identified target vehicle may be inferred from any suitable observed navigational characteristic of the target vehicle or any combination of observed navigational characteristics. For example, a determination of aggressiveness may be made based on any observed characteristic and one or more predetermined threshold levels or any other suitable qualitative or quantitative analysis. In some embodiments, a target vehicle may be deemed as aggressive if the target vehicle is observed to be following the host vehicle or another vehicle at a distance less than a predetermined aggressive distance threshold. On the other hand, a target vehicle observed to be following the host vehicle or another vehicle at a distance greater than a predetermined defensive distance threshold may be deemed defensive. The predetermined aggressive distance threshold need not be the same as the predetermined defensive distance threshold. Additionally, either or both of the predetermined aggressive distance threshold and the predetermined defensive distance threshold may include a range of values, rather than a bright line value. Further, neither of the predetermined aggressive distance threshold nor the predetermined defensive distance threshold must be fixed. Rather these values, or ranges of values, may shift over time, and different thresholds/ranges of threshold values may be applied based on observed characteristics of a target vehicle. For example, the thresholds applied may depend on one or more other characteristics of the target vehicle. Higher observed relative velocities and/or accelerations may warrant application of larger threshold values/ranges. Conversely, lower relative velocities and/or accelerations, including zero relative velocities and/or accelerations, may warrant application of smaller distance threshold values/ranges in making the aggressive/defensive inference.

The aggressive/defensive inference may also be based on relative velocity and/or relative acceleration thresholds. A target vehicle may be deemed aggressive if its observed relative velocity and/or its relative acceleration with respect to another vehicle exceeds a predetermined level or range. A target vehicle may be deemed defensive if its observed relative velocity and/or its relative acceleration with respect to another vehicle falls below a predetermined level or range.

While the aggressive/defensive determination may be made based on any observed navigational characteristic alone, the determination may also depend on any combination of observed characteristics. For example, as noted above, in some cases, a target vehicle may be deemed aggressive based solely on an observation that it is following another vehicle at a distance below a certain threshold or range. In other cases, however, the target vehicle may be deemed aggressive if it both follows another vehicle at less than a predetermined amount (which may be the same as or different than the threshold applied where the determination is based on distance alone) and has a relative velocity and/or a relative acceleration of greater than a predetermined amount or range. Similarly, a target vehicle may be deemed defensive based solely on an observation that it is following another vehicle at a distance greater than a certain threshold or range. In other cases, however, the target vehicle may be deemed defensive if it both follows another vehicle at greater than a predetermined amount (which may be the same as or different than the threshold applied where the determination is based on distance alone) and has a relative velocity and/or a relative acceleration of less than a predetermined amount or range. System 100 may make an aggressive/defensive if, for example, a vehicle exceeds 0.5 G acceleration or deceleration (e.g., jerk 5 m/s3), a vehicle has a lateral acceleration of 0.5 G in a lane change or on a curve, a vehicle causes another vehicle to do any of the above, a vehicle changes lanes and causes another vehicle to give way by more than 0.3 G deceleration or jerk of 3 m/s3, and/or a vehicle changes two lanes without stopping.

It should be understood that references to a quantity exceeding a range may indicate that the quantity either exceeds all values associated with the range or falls within the range. Similarly, references to a quantity falling below a range may indicate that the quantity either falls below all values associated with the range or falls within the range. Additionally, while the examples described for making an aggressive/defensive inference are described with respect to distance, relative acceleration, and relative velocity, any other suitable quantities may be used. For example, a time to collision may calculation may be used or any indirect indicator of distance, acceleration, and/or velocity of the target vehicle. It should also be noted that while the examples above focus on target vehicles relative to other vehicles, the aggressive/defensive inference may be made by observing the navigational characteristics of a target vehicle relative to any other type of obstacle (e.g., a pedestrian, road barrier, traffic light, debris, etc.).

Returning to the example shown in FIGS. 17A and 17B, as host vehicle 1701 approaches the roundabout, the navigation system, including its at least one processing device, may receive a stream of images from a camera associated with the host vehicle. Based on analysis of one or more of the received images, any of target vehicles 1703, 1705, 1706, 1708, and 1710 may be identified. Further, the navigation system may analyze the navigational characteristics of one or more of the identified target vehicles. The navigation system may recognize that the gap between target vehicles 1703 and 1705 represents the first opportunity for a potential merge into the roundabout. The navigation system may analyze target vehicle 1703 to determine indicators of aggression associated with target vehicle 1703. If target vehicle 1703 is deemed aggressive, then the host vehicle navigation system may choose to give way to vehicle 1703 rather than merging in front of vehicle 1703. On the other hand, if target vehicle 1703 is deemed defensive, then the host vehicle navigation system may attempt to complete a merge action ahead of vehicle 1703.

As host vehicle 1701 approaches the roundabout, the at least one processing device of the navigation system may analyze the captured images to determine navigational characteristics associated with target vehicle 1703. For example, based on the images, it may be determined that vehicle 1703 is following vehicle 1705 at a distance that provides a sufficient gap for the host vehicle 1701 to safely enter. Indeed, it may be determined that vehicle 1703 is following vehicle 1705 by a distance that exceeds an aggressive distance threshold, and therefore, based on this information, the host vehicle navigation system may be inclined to identify target vehicle 1703 as defensive. In some situations, however, more than one navigational characteristic of a target vehicle may be analyzed in making the aggressive/defensive determination, as discussed above. Furthering the analysis, the host vehicle navigation system may determine that, while target vehicle 1703 is following at a non-aggressive distance behind target vehicle 1705, vehicle 1703 has a relative velocity and/or a relative acceleration with respect to vehicle 1705 that exceeds one or more thresholds associated with aggressive behavior. Indeed, host vehicle 1701 may determine that target vehicle 1703 is accelerating relative to vehicle 1705 and closing the gap that exists between vehicles 1703 and 1705. Based on further analysis of the relative velocity, acceleration, and distance (and even a rate that the gap between vehicles 1703 and 1705 is closing), host vehicle 1701 may determine that target vehicle 1703 is behaving aggressively. Thus, while there may be a sufficient gap into which host vehicle may safely navigate, host vehicle 1701 may expect that a merge in front of target vehicle 1703 would result in an aggressively navigating vehicle directly behind the host vehicle. Further, target vehicle 1703 may be expected, based on the observed behavior through image analysis or other sensor output, that target vehicle 1703 would continue accelerating toward host vehicle 1701 or continuing toward host vehicle 1701 at a non-zero relative velocity if host vehicle 1701 was to merge in front of vehicle 1703. Such a situation may be undesirable from a safety perspective and may also result in discomfort to passengers of the host vehicle. For such reasons, host vehicle 1701 may choose to give way to vehicle 1703, as shown in FIG. 17B, and merge into the roundabout behind vehicle 1703 and in front of vehicle 1710, deemed defensive based on analysis of one or more of its navigational characteristics.

Returning to FIG. 18, at step 1809, the at least one processing device of the navigation system of the host vehicle may determine, based on the identified at least one navigational characteristic of the target vehicle relative to the identified obstacle, a navigational action for the host vehicle (e.g., merge in front of vehicle 1710 and behind vehicle 1703). To implement the navigational action (at step 1811), the at least one processing device may cause at least one adjustment of a navigational actuator of the host vehicle in response to the determined navigational action. For example, a brake may be applied in order to give way to vehicle 1703 in FIG. 17A, and an accelerator may be applied along with steering of the wheels of the host vehicle in order to cause the host vehicle to enter the roundabout behind vehicle 1703, as shown if FIG. 17B.

As described in the examples above, navigation of the host vehicle may be based on the navigational characteristics of a target vehicle relative to another vehicle or object. Additionally, navigation of the host vehicle may be based on navigational characteristics of the target vehicle alone without a particular reference to another vehicle or object. For example, at step 1807 of FIG. 18, analysis of a plurality of images captured from an environment of a host vehicle may enable determination of at least one navigational characteristic of an identified target vehicle indicative of a level of aggression associated with the target vehicle. The navigational characteristic may include a velocity, acceleration, etc. that need not be referenced with respect to another object or target vehicle in order to make an aggressive/defensive determination. For example, observed accelerations and/or velocities associated with a target vehicle that exceed a predetermined threshold or fall within or exceed a range of values may indicate aggressive behavior. Conversely, observed accelerations and/or velocities associated with a target vehicle that fall below a predetermined threshold or fall within or exceed a range of values may indicate defensive behavior.

Of course, in some instances the observed navigational characteristic (e.g., a location, distance, acceleration, etc.) may be referenced relative to the host vehicle in order to make the aggressive/defensive determination. For example, an observed navigational characteristic of the target vehicle indicative of a level of aggression associated with the target vehicle may include an increase in relative acceleration between the target vehicle and the host vehicle, a following distance of the target vehicle behind the host vehicle, a relative velocity between the target vehicle and the host vehicle, etc.

Navigation Based on Accident Liability Constraint

As described in the sections above, planned navigational actions may be tested against predetermined constraints to ensure compliance with certain rules. In some embodiments, this concept may be extended to considerations of potential accident liability. As discussed below, a primary goal of autonomous navigation is safety. As absolute safety may be impossible (e.g., at least because a particular host vehicle under autonomous control cannot control the other vehicles in its surroundings—it can only control its own actions), the use of potential accident liability as a consideration in autonomous navigation and, indeed, as a constraint to planned actions may help ensure that a particular autonomous vehicle does not take any actions that are deemed unsafe—e.g., those for which potential accident liability may attach to the host vehicle. If the host vehicle takes only actions that are safe and that are determined not to result in an accident of the host vehicle's own fault or responsibility, then desired levels of accident avoidance (e.g., fewer than $10^{-9}$ per hour of driving) may be achieved.

Figure 19:
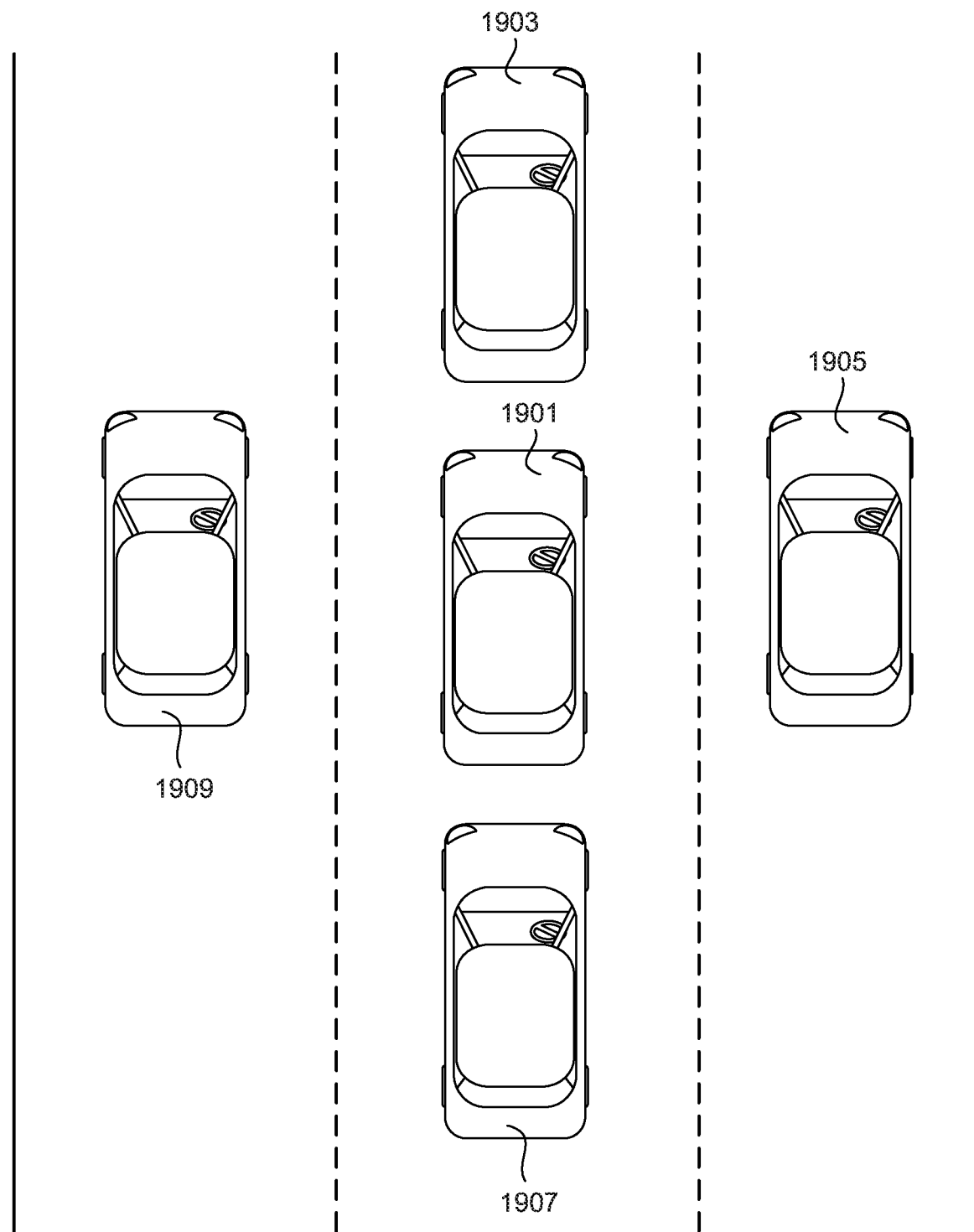
FIG. 19 illustrates an example of a host vehicle driving on a multi-lane highway consistent with the disclosed embodiments.

The challenges posed by most current approaches to autonomous driving include a lack of safety guarantees (or at least an inability to provide desired levels of safety), and also a lack of scalability. Consider the issue of guaranteeing multi-agent safe driving. As society will unlikely tolerate road accident fatalities caused by machines, an acceptable level of safety is paramount to the acceptance of autonomous vehicles. While a goal may be to provide zero accidents, this may be impossible since multiple agents are typically involved in an accident and one may envision situations where an accident occurs solely due to the blame of other agents. For example, as shown in FIG. 19, host vehicle 1901 drives on a multi-lane highway, and while host vehicle 1901 can control its own actions relative to the target vehicles 1903, 1905, 1907, and 1909, it cannot control the actions of the target vehicles surrounding it. As a result, host vehicle 1901 may be unable to avoid an accident with at least one of the target vehicles should vehicle 1905, for example, suddenly cut in to the host vehicle's lane on a collision course with the host vehicle. To address this difficulty, a typical response of autonomous vehicle practitioners is to resort to a statistical data-driven approach where safety validation becomes tighter as data over more mileage is collected.

To appreciate the problematic nature of a data-driven approach to safety, however, consider first that the probability of a fatality caused by an accident per one hour of (human) driving is known to be $10^{-6}$. It is reasonable to assume that for society to accept machines to replace humans in the task of driving, the fatality rate should be reduced by three orders of magnitude, namely to a probability of $10^{-9}$ per hour. This estimate is similar to the assumed fatality rate of air bags and from aviation standards. For example, $10^{-9}$ is the probability that a wing will spontaneously detach from an aircraft in mid-air. Attempts to guarantee safety using a data-driven statistical approach that provides additional confidence with accumulating miles driven, however, is not practical. The amount of data required to guarantee a probability of $10^{-9}$ fatality per hour of driving is proportional to its inverse (i.e., $10^9$ hours of data) which is roughly on the order of thirty billion miles. Moreover, a multi-agent system interacts with its environment and likely cannot be validated offline (unless a realistic simulator emulating real human driving with all its richness and complexities such as reckless driving is available—but the problem of validating the simulator would be even more difficult than creating a safe autonomous vehicle agent). And any change to the software of planning and control will require a new data collection of the same magnitude, which is clearly unwieldy and impractical. Further, developing a system through data invariably suffers from lack of interpretability and explainability of the actions being taken—if an autonomous vehicle (AV) has an accident resulting in a fatality, we need to know the reason. Consequently, a model-based approach to safety is required, but the existing "functional safety" and ASIL requirements in the automotive industry are not designed to cope with multi-agent environments.

A second primary challenge in developing a safe driving model for autonomous vehicles is the need for scalability. The premise underlying AV goes beyond "building a better world" and instead is based on the premise that mobility without a driver can be sustained at a lower cost than with a driver. This premise is invariably coupled with the notion of scalability—in the sense of supporting mass production of AVs (in the millions) and more importantly of supporting a negligible incremental cost to enable driving in a new city. Therefore, the cost of computing and sensing does matter, if AV is to be mass manufactured, the cost of validation and the ability to drive "everywhere" rather than in a select few cities is also a necessary requirement to sustain a business.

The issue with most current approaches lies in a "brute force" state of mind along three axes: (i) the required "computing density," (ii) the way high-definition maps are defined and created, and (iii) the required specification from sensors. A brute-force approach goes against scalability and shifts the weight towards a future in which unlimited on-board computing is ubiquitous, where the cost of building and maintaining HD-maps becomes negligible and scalable, and exotic super advanced sensors would be developed, productized to automotive grade, and at a negligible cost. A future for which any of the above comes to fruition is indeed plausible but having all of the above hold is likely a low-probability event. Thus, there is a need to provide a formal model that pieces together safety and scalability into an AV program that society can accept and is scalable in the sense of supporting millions of cars driving anywhere in the developed countries.

The disclosed embodiments represent a solution that may provide the target levels of safety (or may even surpass safety targets) and may also be scalable to systems including millions of autonomous vehicles (or more). On the safety front, a model called "Responsibility-Sensitive Safety" (RSS) is introduced that formalizes the notion of "accident blame," is interpretable and explainable, and incorporates a sense of "responsibility" into the actions of a robotic agent. The definition of RSS is agnostic to the manner in which it is implemented—which is a key feature to facilitate a goal of creating a convincing global safety model. RSS is motivated by the observation (as in FIG. 19) that agents play a non-symmetrical role in an accident where typically only one of the agents is responsible for the accident and therefore is to be responsible for it. The RSS model also includes a formal treatment of "cautious driving" under limited sensing conditions where not all agents are always visible (due to occlusions, for example). One primary goal of the RSS model is to guarantee that an agent will never make an accident of its "blame" or for which it is responsible. A model may be useful only if it comes with an efficient policy (e.g., a function that maps the "sensing state" to an action) that complies with RSS. For example, an action that appears innocent at the current moment might lead to a catastrophic event in the far future ("butterfly effect"). RSS may be useful for constructing a set of local constraints on the short-term future that may guarantee (or at least virtually guarantee) that no accidents will happen in the future as a result of the host vehicle's actions.

Another contribution evolves around the introduction of a "semantic" language that consists of units, measurements, and action space, and specification as to how they are incorporated into planning, sensing and actuation of the AV. To get a sense of semantics, in this context, consider how a human taking driving lessons is instructed to think about a "driving policy." These instructions are not geometric—they do not take the form "drive 13.7 meters at the current speed and then accelerate at a rate of 0.8 m/s$^2$". Instead, the instructions are of a semantic nature—"follow the car in front of you" or "overtake that car on your left." The typical language of human driving policy is about longitudinal and lateral goals rather than through geometric units of acceleration vectors. A formal semantic language may be useful on multiple fronts connected to the computational complexity of planning that do not scale up exponentially with time and number of agents, to the manner in which safety and comfort interact, to the way the computation of sensing is defined and the specification of sensor modalities and how they interact in a fusion methodology. A fusion methodology (based on the semantic language) may ensure that the RSS model achieves the required $10^{-9}$ probability of fatality, per one hour of driving, all while performing only offline validation over a dataset of the order of $10^5$ hours of driving data.

For example, in a reinforcement learning setting, a Q function (e.g., a function evaluating the long term quality of performing an action a∈A when the agent is at state s∈S; given such a Q-function, a natural choice of an action may be to pick the one with highest quality, $\pi(s)=\mathrm{argmax}_a Q(s, a)$) may be defined over a semantic space in which the number of trajectories to be inspected at any given time is bounded by $10^4$ regardless of the time horizon used for planning. The signal to noise ratio in this space may be high, allowing for effective machine learning approaches to succeed in modeling the Q function. In the case of computation of sensing, semantics may allow for distinguishing between mistakes that affect safety versus those mistakes that affect the comfort of driving. We define a PAC model (Probably Approximate Correct (PAC)), borrowing Valiants PAC-learning terminology) for sensing which is tied to the Q-function and show how measurement mistakes are incorporated into planning in a manner that complies with RSS yet allows for optimization of the comfort of driving. The language of semantics may be important for the success of certain aspects of this model as other standard measures of error, such as error with respect to a global coordinate system, may not comply with the PAC sensing model. In addition, the semantic language may be an important enabler for defining HD-maps that can be constructed using low-bandwidth sensing data and thus be constructed through crowd-sourcing and support scalability.

To summarize, the disclosed embodiments may include a formal model that covers important ingredients of an AV: sense, plan, and act. The model may help ensure that from a planning perspective there will be no accident of the AV's own responsibility. And also through a PAC-sensing model, even with sensing errors, the described fusion methodology may require only offline data collection of a very reasonable magnitude to comply with the described safety model. Furthermore, the model may tie together safety and scalability through the language of semantics, thereby providing a complete methodology for a safe and scalable AV. Finally, it is worth noting that developing an accepted safety model that would be adopted by the industry and regulatory bodies may be a necessary condition for the success of AV.

The RSS model may generally follow a classic sense-plan-act robotic control methodology. The sensing system may be responsible for understanding a present state of the environment of a host vehicle. The planning part, which may be referred to as a "driving policy" and which may be implemented by a set of hard-coded instructions, through a trained system (e.g., a neural network), or a combination, may be responsible for determining what is the best next move in view of available options for accomplishing a driving goal (e.g., how to move from the left lane to a right lane in order to exit a highway). The acting portion is responsible for implementing the plan (e.g., the system of actuators and one or more controllers for steering, accelerating, and/or braking, etc. a vehicle in order to implement a selected navigational action). The described embodiments below focus primarily on the sensing and planning parts.

Accidents may stem from sensing errors or planning errors. Planning is a multi-agent endeavor, as there are other road users (humans and machines) that react to actions of an AV. The described RSS model is designed to address safety for the planning part, among others. This may be referred to as multi-agent safety. In a statistical approach, estimation of the probability of planning errors may be done "online." Namely, after every update of the software, billions of miles must be driven with the new version to provide an acceptable level of estimation of the frequency of planning errors. This is clearly infeasible. As an alternative, the RSS model may provide a 100% guarantee (or virtually 100% guarantee) that the planning module will not make mistakes of the AV's blame (the notion of "blame" is formally defined). The RSS model may also provide an efficient means for its validation not reliant upon online testing.

Errors in a sensing system may be easier to validate, because sensing can be independent of the vehicle actions, and therefore we can validate the probability of a severe sensing error using "offline" data. But, even collecting offline data of more than $10^9$ hours of driving is challenging. As part of the description of a disclosed sensing system, a fusion approach is described that can be validated using a significantly smaller amount of data.

The described RSS system may also be scalable to millions of cars. For example, the described semantic driving policy and applied safety constraints may be consistent with sensing and mapping requirements that can scale to millions of cars even in today's technology.

A foundational building block of such a system is a thorough safety definition, that is, a minimal standard to which AV systems may need to abide. In the following technical lemma, a statistical approach to validation of an AV system is shown to be infeasible, even for validating a simple claim such as "the system makes N accidents per hour". This implies that a model-based safety definition is the only feasible tool for validating an AV system.

Lemma 1 Let X be a probability space, and A be an event for which $\Pr(A)=p_1<0.1$. Assume we sample $$m = \frac{1}{p_1} i.i.d.$$

samples from X, and let $Z=\Sigma_{i=1}^m 1_{[x \in A]}$. Then $\Pr(Z=0) \geq e^{-2}$.

Proof We use the inequality $1-x \geq e^{-2x}$ (proven for completeness in Appendix A.1), to get $\Pr(Z=0)=(1-p_1)^m \geq e^{-2 p_1 m} = e^{-2}$.

Corollary 1 Assume an AV system $AV_1$ makes an accident with small yet insufficient probability $p_1$. Any deterministic validation procedure which is given $1/p_1$ samples, will, with constant probability, not distinguish between $AV_1$ and a different AV system $AV_0$ which never makes accidents.

To gain perspective over the typical values for such probabilities, assume we desire an accident probability of $10^{-9}$ per hour, and a certain AV system provides only $10^{-8}$ probability. Even if the system obtains $10^8$ hours of driving, there is constant probability that the validation process will not be able to indicate that the system is dangerous.

Finally, note that this difficulty is for invalidating a single, specific, dangerous AV system. A full solution cannot be a viewed as a single system, as new versions, bug fixes, and updates will be necessary. Each change, even of a single line of code, generates a new system from a validator's perspective. Thus, a solution which is validated statistically, must do so online, over new samples after every small fix or change, to account for the shift in the distribution of states observed and arrived-at by the new system. Repeatedly and systematically obtaining such a huge number of samples (and even then, with constant probability, failing to validate the system), is infeasible.

Further, any statistical claim must be formalized to be measured. Claiming a statistical property over the number of accidents a system makes is significantly weaker than claiming "it drives in a safe manner." In order to say that, one must formally define what is safety.

Absolute Safety is Impossible

An action a taken by a car c may be deemed absolutely safe if no accident can follow the action at some future time. It can be seen that it is impossible to achieve absolute safety, by observing simple driving scenarios, for example, as depicted in FIG. 19. From the perspective of vehicle 1901, no action can ensure that none of the surrounding cars will crash into it. Solving this problem by forbidding the autonomous car from being in such situations is also impossible. As every highway with more than two lanes will lead to it at some point, forbidding this scenario amounts to a requirement to remain in the garage. The implications might seem, at first glance, disappointing. Nothing is absolutely safe. However, such a requirement for absolute safety, as defined above, may be too harsh, as evident by the fact that human drivers do not adhere to a requirement for absolute safety. Instead, humans behave according to a safety notion that depends on responsibility.

Responsibility-Sensitive Safety (RSS)

An important aspect missing from the absolute safety concept is the non-symmetry of most accidents-it is usually one of the drivers who is responsible for a crash, and is to be blamed. In the example of FIG. 19, the central car 1901 is not to be blamed if the left car 1909, for example, suddenly drives into it. To formalize the fact that considering its lack of responsibility, a behavior of AV 1901 staying in its own lane can be considered safe. To do so, a formal concept of "accident blame" or accident responsibility, which can serve as the premise for a safe driving approach, is described.

As an example, consider the simple case of two cars $c_f$, $c_r$, driving at the same speed, one behind the other, along a straight road. Assume $c_f$, the car at the front, suddenly brakes because of an obstacle appearing on the road, and manages to avoid it. Unfortunately, $c_r$ did not keep enough of a distance from $c_f$, is not able to respond in time, and crashes into $c_f$'s rear side. It is clear that the blame is on $c_r$: it is the responsibility of the rear car to keep safe distance from the front car, and to be ready for unexpected, yet reasonable, braking.

Next, consider a much broader family of scenarios: driving in a multi-lane road, where cars can freely change lanes, cut into other cars' paths, drive at different speeds, and so on. To simplify the following discussion, assume a straight road on a planar surface, where the lateral, longitudinal axes are the x, y axes, respectively. This can be achieved, under mild conditions, by defining a homomorphism between the actual curved road and a straight road. Additionally, consider a discrete time space. Definitions may aid in distinction between two intuitively different sets of cases: simple ones, where no significant lateral maneuver is performed, and more complex ones, involving lateral movement.

Definition 1 (Car Corridor) The corridor of a car c is the range $[c_{x,left}, c_{x,right}] \times [\pm \infty]$, where $c_{x,left}, c_{x,right}$ are the positions of the leftmost, rightmost corners of c.

Definition 2 (Cut-in) A car $c_1$ (e.g., car 2003 in FIGS. 20A and 20B) cuts-in to car $c_0$'s (e.g., car 2001 in FIGS. 20A and 20B) corridor at time t if it did not intersect $c_0$'s corridor at time t−1, and does intersect it at time t.

A further distinction may be made between front/back parts of the corridor. The term "the direction of a cut-in" may describe movement in the direction of the relevant corridor boundary. These definitions may define cases with lateral movement. For the simple case where there is no such occurrence, such as the simple case of a car following another, the safe longitudinal distance is defined:

Definition 3 (Safe longitudinal distance) A longitudinal distance 2101 (FIG. 21) between a car $c_r$ (car 2103) and another car $c_f$ (car 2105) that is in $c_r$'s frontal corridor is safe w.r.t. a response time p if for any braking command a, $|a| < a_{max,brake}$, performed by $c_f$, if $c_r$ will apply its maximal brake from time p until a full stop then it won't collide with $c_f$.

Lemma 2 below calculates d as a function of the velocities of $c_r$, $c_f$, the response time p, and the maximal acceleration $a_{max,brake}$. Both p and $a_{max,brake}$ are constants, which should be determined to some reasonable values by regulation. In further examples, either one of response time p and the maximal acceleration $a_{max,brake}$ may be set for a specific vehicle or vehicle type, or may be adapted/adjusted according to measurements or otherwise input parameters regarding the vehicle condition, the road condition, the user's (e.g., a driver or a passenger) preferences, etc.

Lemma 2 Let $c_r$ be a vehicle which is behind $c_f$ on the longitudinal axis. Let $a_{max,brake}$, $a_{max,accel}$ be the maximal braking and acceleration commands, and let p be $c_r$'s response time. Let $v_r$, $v_f$ be the longitudinal velocities of the cars, and let $l_f$, $l_r$ be their lengths. Define $n_{p,max} = v_r + p \cdot a_{max,accel}$, and define $$T_r = p + \frac{v_{p,max}}{a_{max,brake}} \text{ and } T_f = \frac{v_f}{a_{max,brake}}.$$

Let $L = (l_r + l_f)/2$. Then, the minimal safe longitudinal distance for $c_r$ is:

$$d_{min} = \begin{cases} L & \text{if } T_r \leq T_f \\ L + T_f[(v_{p,max} - v_f) + \rho a_{max,brake}] - \frac{\rho^2 a_{max,brake}}{2} + \\ \frac{(T_r - T_f)(v_{p,max} - (T_f - \rho)a_{max,brake})}{2} & \text{otherwise} \end{cases}$$

Proof Let $d_t$ be the distance at time t. To prevent an accident, we must have that $d_t > L$ for every t. To construct $d_{min}$ we need to find the tightest needed lower bound on $d_0$. Clearly, $d_0$ must be at least L. As long as the two cars didn't stop after $T \geq p$ seconds, the velocity of the preceding car will be $v_f - T a_{max,brake}$ while $c_r$'s velocity will be upper bounded by $v_{p,max} - (T-p) a_{max,accel}$. So, the distance between the cars after T seconds will be lower bounded by:

$$d_T :=$$

$$d_0 + \frac{T}{2}(2v_f - Ta_{max,brake}) - \left[\rho v_{\rho,max} + \frac{T-\rho}{2}(2v_{\rho,max} - (T-\rho)a_{max,brake})\right] =$$

$$d_0 + T[(v_f - v_{\rho,max}) - \rho a_{max,brake}] + \frac{\rho^2 a_{max,brake}}{2}$$

Note that $T_r$ is the time on which $c_r$ arrives to a full stop (a velocity of 0) and $T_f$ is the time on which the other vehicle arrives to a full stop. Note that $a_{max,brake}(T_r-T_f)=v_{p,max}-v_f+\rho a_{max,brake}$, so if $T_r \leq T_f$ it suffices to require that $d_0>L$. If $T_r>T_f$ then $$d_{T_r} = d_0 + T_f[(v_f - v_{\rho,max}) - \rho a_{max,brake}] +$$

$$\frac{\rho^2 a_{max,brake}}{2} - \frac{(T_r - T_f)(v_{\rho,max} - (T_f - \rho)a_{max,brake})}{2}.$$

Requiring $d_{T_r}>L$ and rearranging terms concludes the proof.

Finally, a comparison operator is defined which allows comparisons with some notion of "margin": when comparing lengths, velocities and so on, it is necessary to accept very similar quantities as "equal".

Definition 4 (µ-comparison) The µ-comparison of two numbers a, b is $a>_\mu b$ if $a>b+\mu$, $a<_\mu b$ if $a<b-\mu$ and $a-_\mu b$ If $|a-b| \leq \mu$.

The comparisons (argmin, argmax, etc.) below are p-comparisons for some suitable µs. Assume an accident occurred between cars $c_1$, $c_2$. To consider who is to blame for the accident, the relevant moment which needs to be examined is defined. This is some point in time which preceded the accident, and intuitively, was the "point of no return"; after it, nothing could be done to prevent the accident.

Definition 5 (Blame Time) The Blame Time of an accident is the earliest time preceding the accident in which:
  there was an intersection between one of the cars and the other's corridor, and
  the longitudinal distance was not safe.

Clearly there is such a time, since at the moment of accident, both conditions hold. Blame Times may be split into two separate categories:
  Ones in which a cut-in also occurs, namely, they are the first moment of intersection of one car and the other's corridor, and it's in a non-safe distance.
  Ones in which a cut-in does not occur, namely, there was intersection with the corridor already, in a safe longitudinal distance, and the distance had changed to unsafe at the Blame Time.

Definition 6 (µ-Losing by Lateral Velocity) Assume a cut-in occurs between cars $c_1$, $c_2$. We say that $c_1$ µ-Loses by Lateral Velocity in case its lateral velocity w.r.t. the direction of the cut-in is higher by µ than that of $c_2$.

It should be noted that the direction of the velocity is important: For example, velocities of −1, 1 (both cars crashing into each other) is a tie, however if the velocities are 1, 1+µ/2, the one with positive direction towards the other car is to be blamed. Intuitively, this definition will allow us to blame a car which drives laterally very fast into another.

Definition 7 (($\mu_1$, $\mu_2$)-Winning by Lateral Position) Assume a cut-in occurs between cars $c_1$, $c_2$. We say that $c_1$ ($\mu_1$, $\mu_2$)-Wins by Lateral Position in case its lateral position w.r.t. the cut-in lane's center (the center closest to the cut-in relevant corridor) is smaller than $\mu_1$ (in absolute value), and smaller by $\mu_2$ than that of $c_2$.

Intuitively, we will not blame a car if it's very close to the lane center ($\mu_1$), and much closer than the other car (by $\mu_2$).

Definition 8 (Blame) The Blame or responsibility for an accident between cars $c_1$, $c_2$, is a function of the state at the Blame Time, and is defined as follows:
  If the Blame Time is not a cut-in time, the blame is on the rear car.
  If the Blame Time is also a cut-in time, the blame is on both cars, unless for one of the cars, w.l.o.g. $c_1$, the two following conditions hold, for some predefined µs:
  It doesn't lose by Lateral Velocity,
  It wins by Lateral Position.

In that case, $c_1$ is spared. In other words, if an unsafe cut-in occurs, both cars are to blame, unless one of the cars is not (significantly) laterally faster, and is (significantly) closer to the lane center. By this, the desired behavior is captured: if following a car, keep a safe distance, and if cutting into a corridor of a car which simply drives in its own lane, do it only at a safe distance. An automated controller-based system for following the safety guidelines described above should not lead to overly defensive driving, as discussed further below.

Dealing with Limited Sensing

Figure 22:
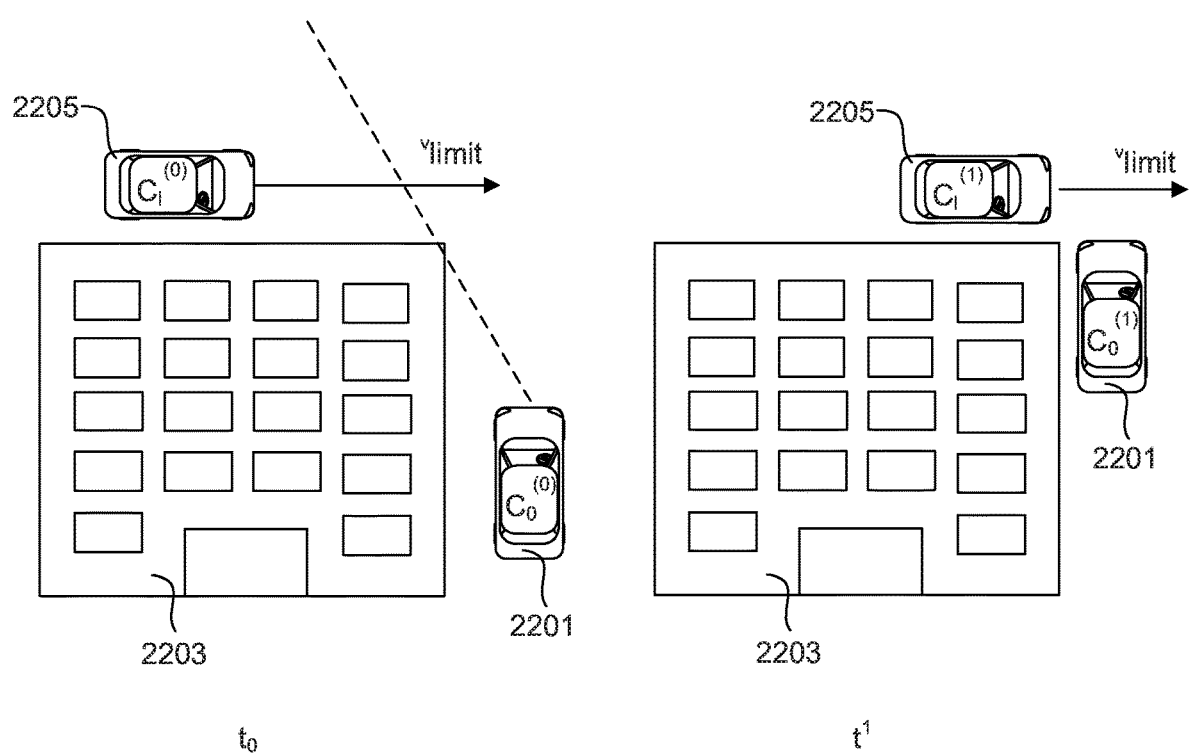
FIG. 22 illustrates an example of a vehicle exiting a parking lot and merging into a possibly busy road consistent with the disclosed embodiments.
Figure 23:
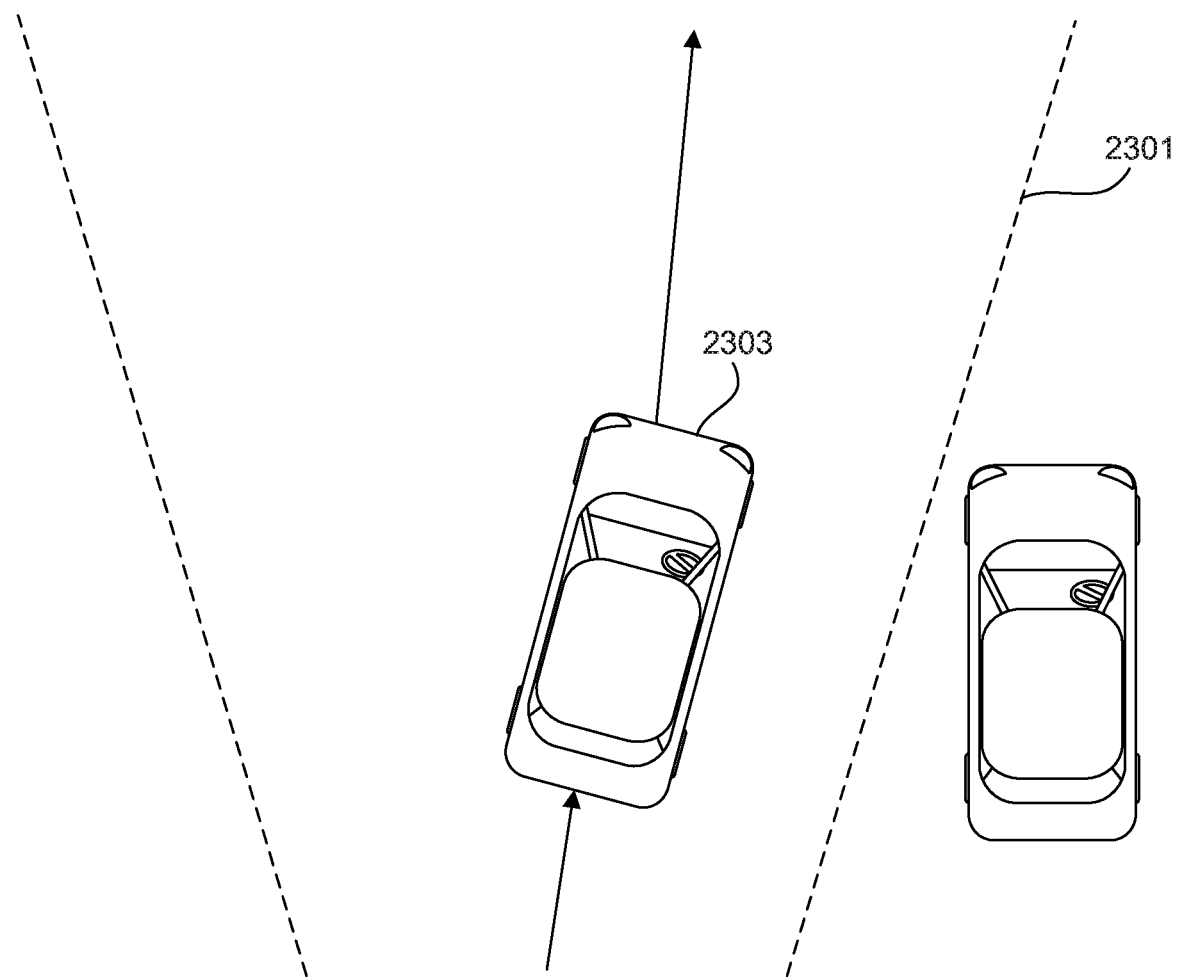
FIG. 23 illustrates a vehicle traveling on a road consistent with the disclosed embodiments.

After considering the highway example, a second example next addresses a problem of limited sensing. A very common human response, when blamed for an accident, falls into the "but I couldn't see him" category. It is, many times, true. Human sensing capabilities are limited, sometimes because of an unaware decision to focus on a different part of the road, sometimes because of carelessness, and sometimes because of physical limitations—it is impossible to see a pedestrian hidden behind a parked car. Of those human limitations, advanced automatic sensing systems may only be subject to the latter: 360° view of the road, along with the fact that computers are never careless, puts them above human sensing capabilities. Returning to the "but I couldn't see him" example, a fitting answer is "well, you should've been more careful." To formalize what is being careful with respect to limited sensing, consider the scenario, depicted in FIG. 22. Car 2201 ($c_0$) is trying to exit a parking lot, merging into a (possibly) busy road, but cannot see whether there are cars in the street because its view is obscured by building 2203. Assume that this is an urban, narrow street, with a speed limit of 30 km/h. A human driver's behavior is to slowly merge onto the road, obtaining more and more field of view, until sensing limitations are eliminated. A significant moment in time should be defined—the first time the occluded object is exposed to us; after its exposure, one deal with it just like any other object that one can sense.

Definition 9 (Exposure Time) The Exposure Time of an object is the first time in which we see it.

Definition 10 (Blame due to Unreasonable Speed) Assume that at the exposure time or after it, car $c_1$ (car 2205) was driving at speed $v>v_{limit}$, and $c_0$ wasn't doing so. Then, the blame is only on $c_1$. We say that $c_1$ is blamed due to unreasonable speed.

This extension allows $c_0$ to exit the parking lot safely. Using our previous responsibility-sensitive safety definitions, along with a dynamic $v_{limit}$ definition (which uses the road conditions and speed limit, plus reasonable margins), the only necessity is to check whether in the worst case, as illustrated in the figure, the cut-in is in a safe longitudinal distance, while assuming that $c_1$ will not exceed $v_{limit}$. Intuitively, this encourages co to drive slower and further from the occluder, thus slowly increasing its field of view and later allowing for safe merging into the street.

Having extended the accident responsibility definition to this basic case of limited sensing, a family of extensions may address similar cases. Simple assumptions as to what can be occluded (a potentially fast car cannot be occluded between two closely parked cars, but a pedestrian can), and what is the worst case maneuver it can perform (a pedestrian's $v_{limit}$ is much smaller than that of a car), imply restrictions on driving—one must be prepared for the worst, and have the ability to respond if suddenly, the exposure time comes. A more elaborate example, in an urban scenario, can be taken from the scenario of a pedestrian which is possibly occluded by a parked car Accident blame for accidents with a pedestrian may be defined:

Definition 11 (Accident-with-Pedestrian Blame) The Accident-with-Pedestrian Blame is always on the car, unless one of the following three holds:

the car hits the pedestrian with the car's side, and the lateral velocity of the car is smaller than µ, w.r.t. the direction of the hit.

the pedestrian's velocity at the exposure time or later was larger than $v_{limit}$.

the car is at complete stop.

Informally, the car is not to blame only if a pedestrian runs into its side, while the car does not ride faster than µ into the pedestrian, or if the car is at stop, or if the pedestrian was running super-humanly fast, in some direction, not necessarily the hitting direction.

While the described system may not ensure absolute safety, it may lead to a scenario where very few (if any) accidents occur among autonomous vehicles. For example, where all cars (and other road users) are able to successfully verify that they will not be blamed for an accident as a result of an action taken, accidents may be eliminated. By definition, for every accident there is at least one responsible car. Thus, if no car takes an action for which it may be responsible for a resulting accident (according to the RSS model described above), there should never be any accidents, leading to the type of absolute safety or near absolute safety sought by unwieldy and impractical statistical methods.

Not all roads are of a simple structure. Some, like junctions and roundabouts, contain more complex situations, along with various right of way rules. Not all occluded objects are should be noted that the constraints on the policy we have described above depend on just one future time step, hence it can be verified in a computationally efficient manner.

To generalize those ideas of sufficient local properties for RSS, we firstly define a Default Emergency Policy (DEP), and use it as a building block for defining a local property of action-taking which we call "cautious". It is then shown that taking only cautious commands is sufficient for RSS.

Definition 12 (Default Emergency Policy) The Default Emergency Policy (DEP) is to apply maximum braking power, and maximum heading change towards 0 heading w.r.t. the lane. The maximum braking power and heading change are derived from physical parameters of the car (and maybe also from weather and road conditions). Definition 13 (Safe state) A state s is safe if performing DEP starting from it will not lead to an accident of our blame. As in the simple case of a car following another, we define a command to be cautious if it leads to a safe state. Definition 14 (Cautious command) Suppose we are currently at state so. A command a is cautious if the next state, $s_t$, will be safe with respect to a set A of possible commands that other vehicles might perform now. The above definition depends on the worst-case commands, in the set A, other vehicles might perform. We will construct the set A based on reasonable upper bounds on maximum braking/acceleration and lateral movements.

The following theorem proves, by induction again, that if we only issue cautious commands then there will be no accidents of our blame. Theorem 1 Assume that in time 0, c is in a safe state, and for every time step, c only issues cautious commands, where if no cautious command exists at some time step, c applies DEP. Then, c will never make accidents of its blame. Proof By induction. The base of the induction follows from the definition of a safe state and step from the definition of a cautious command.

One benefit of this approach is that there may be no need to check infinite future, as we can quickly return to a safe state, and continue safely from there. Moreover, given the fact we will plan again at t+1, and hence be able to perform DEP then if necessary, we should only check the command we are giving at time t, and not a possible longer plan we might have in mind—we can change that plan at t+1. Now, incorporating a learning component in a system, when it is verified at run time by this transparent model, is made possible. Finally, this local verification implies full future RSS, which is our desired goal. An implementation obstacle is that the cautiousness definition involves all trajectories another agent can perform until $t_{brake}$, which, even for moderate $t_{brake}$, is a huge space. To tackle this, we next turn to develop an efficiently computable way to verify cautiousness, and hence RSS, in a scalable manner.

Efficient Cautiousness Verification

A first observation is that a state is not safe if and only if there exists a specific vehicle, c̃, which can perform commands from the set A which lead to an accident of our blame while we execute the DEP. Therefore, in a scene with a single target car, denoted c̃, and in the general case, the procedure may be executed sequentially, for each of the other vehicles in the scene.

When considering a single target car, an action a is not cautious if and only if there is a sequence of commands for c̃, denoted $ã_1, \ldots, ã_{t_{brake}}$, all in the set A, that results in an accident of c's blame. As already proven, if at time 0, it holds that c̃ is in the frontal corridor of c, there is a simple way to check the cautiousness of a—we just need to verify that even if c̃ will apply maximal brake for one time step (and we'll perform a), the resulting longitudinal distance will remain safe. The lemma below gives a sufficient condition for cautiousness in the more involved cases, where lateral maneuvers are to be considered too.

Lemma 4 Assume that at time T=0, c̃ is not in the frontal corridor of c. Then, if at every $T \in (0, t_{brake}]$, there is no non-safe cut in of c's blame, then a is cautious.

Proof Suppose that a is not cautious, namely, there exists $ã_1, \ldots, ã_{t_{brake}}$ that leads to an accident of c's blame. Before the accident there must be a cut-in time, T. Assume first that T>0. If this cut-in was at a safe longitudinal distance, then there cannot be an accident of our blame due to the fact that DEP is executed by deceleration of $-a_{max}$ and based on the definition of safe longitudinal distance (and we assume here that the response time p is larger than the time resolution of steps). If the cut-in was non-safe, by the assumption of the lemma it was not of c's blame, hence the accident is also not of c's blame.

Finally, if T<0, by the assumption of the lemma, at the moment of cutting, c̃ was at the back corridor of c. By induction, c performed only safe cut-ins in the past, and hence either the cut-in was safe or it was c's blame. In both cases, the current accident is not of c's blame.

In light of Lemma 4, the problem of checking whether there can be a non-safe cut in of c's blame remains. An efficient algorithm is presented below for checking the possibility of a non-safe cut-in at time t. To validate the entire trajectory we discretize the time interval [0, $t_{brake}$] and apply the algorithm on all time intervals (with a slightly larger value of p in the definition of safe distance to ensure that the discretization doesn't hurt). Let $\tilde{c}_{diag}$ be the length of a diagonal of a minimal rectangle bounding $\tilde{c}$. For each time t∈[0, $t_{brake}$], define $c_{length}(t)$ to be the longitudinal "span" of c in time t, and let $$L(t) = \frac{\tilde{c}_{diag} + c_{length[t]}}{2}.$$

Define $c_{width}[t]$ in similar fashion and $$W(t) = \frac{\tilde{c}_{diag} + c_{width[t]}}{2}.$$

by $\tilde{c}$ at time t. By the fact $[\tilde{y}_{min}, \tilde{y}_{max}] \cap [y[t]-L, y[t]+L] = 0$, we obtain that any longitudinally non-safe distance which is attainable, is $\geq L$. Assume $\tilde{y}_{min} > y[t]+L$, and assume by contradiction that a non-safe longitudinal position and velocity, denoted $\tilde{y}_{bad}[t]$, $\tilde{v}_{ybad}[t]$, are attainable using acceleration commands bounded by $a_{y,min}$, $a_{y,max}$. By definition of $\tilde{y}_{min}$, we have $\tilde{y}_{bad}[t] > \tilde{y}_{min}$, and hence the distance between the cars is larger, namely $\tilde{y}_{bad}[t]-(y[t]+L) > \tilde{y}_{min}-(y[t]+L)$. Since $(\tilde{y}_{min}, \tilde{v}_y[0]+a_{y,min}t)$ is longitudinally safe w.r.t. $(y[t], v_y[t])$, by definition of longitudinal non-safety, it follows that the attained velocity $\tilde{v}_{ybad}[t]$ must be smaller than $\tilde{v}_y[0]+a_{y,min}t$. However, it is clear that in order to achieve lesser speed, $\tilde{c}$ must use average acceleration which is lesser than $a_{y,min}$ throughout the time window [0, t], thus contradicting the fact that the longitudinal non-safety was attained using commands bounded by $a_{y,min}$, $a_{y,max}$. By considering a symmetrical argument for the case $\tilde{y}_{max} < y[t]-L$, the proof is completed.

Next, the lateral feasibility.

Lemma 6 Under the notation of Algorithm 1, if the check lateral feasibility procedure is concluded by returning "non-feasible", then there cannot be a non-safe cut-in of the ego vehicle's blame at time t.

Algorithm 1: Check the possibility of a non-safe cut-in at time t input:
$\tilde{y}[0]$, $\tilde{v}_y[0]$, $\tilde{x}[0]$, $\tilde{v}_x[0]$ are longitudinal/lateral position/velocity of $\tilde{c}$ at time 0
$y[t]$, $v_y[t]$, $x[t]$, $v_x[t]$ are longitudinal/lateral position/velocity of c at time t
$a_{y,min}$, $a_{y,max}$ are longitudinal acceleration boundaries
$a_{x,max}$ is a lateral acceleration absolute value boudary
$L = L(t)$, $W = W(t)$
check longitudinal feasibility:
  let $\tilde{y}_{min} = \tilde{y}[0] + \tilde{v}_y[0]t + \frac{1}{2}a_{y,min}t^2$
  let $\tilde{y}_{max} = \tilde{y}[0] + \tilde{v}_y[0]t + \frac{1}{2}a_{y,max}t^2$
  if $[\tilde{y}_{min}, \tilde{y}_{max}] \cap [y[t] - L, y[t] + L] \neq \emptyset$
    continue to check lateral feasibility
  else if $\tilde{y}_{min} > y[t] + L$ and $(\tilde{y}_{min}, \tilde{v}_y[0] + a_{y,min}t)$ is not longitudinally safe w.r.t. $(y[t], v_y[t])$
    continue to check lateral feasibility
  else if $\tilde{y}_{max} < y[t] - L$ and $(\tilde{y}_{max}, \tilde{v}_y[0] + a_{y,max}t)$ is not longitudinally safe w.r.t. $(y[t], v_y[t])$
    continue to check lateral feasibility
  return "non-feasible"
check lateral feasibility:
  w.l.o.g. assume $x[t] = 0$ and $\tilde{x}[0] \leq 0$, and $[\tilde{v}_x[0] \geq 0$.
  if position $x[t]$ is not considered $(\mu_1, \mu_2)$-Winning by Lateral Position w.r.t. a position $x[t] - W$
    w.l.o.g. assume $v_x[t] = -\mu$, as in Definition 6.
  else
    w.l.o.g. assume $v_x[t] = -2\mu$, as in Definition 6.
  let $t_{top} = 0.5(t - \tilde{v}_x[0]/a_{x,max})$
  if $t_{top} < 0$
    return "non-feasible"
  let $x_{max} = \tilde{x}[0] + 2(\tilde{v}[0]t_{top} + 0.5a_{x,max}t_{top}^2) + \tilde{v}_x[0]^2/(2a_{x,max})$
  if $x_{max} < -W$
    return "non-feasible"
  return "feasible"

The following theorem proves the correctness of the above algorithm.

Theorem 2 If Algorithm 1 returns "non-feasible" then there cannot be a non-safe cut-in of the ego vehicle's blame at time t. To prove the theorem, we rely on the following key lemmas, which prove the correctness of the two building blocks of Algorithm 1. Start with the longitudinal feasibility:

Lemma 5 Under the notation of Algorithm 1, if the check longitudinal feasibility procedure is concluded by returning "non-feasible", then, there cannot be a non-safe cut-in of the ego vehicle's blame at time t.

Proof Ignoring the lateral aspect of a cut-in maneuver, we examine the mere possibility that the longitudinal distance between c and $\tilde{c}$ will be unsafe. It is clear that the positions $(\tilde{y}_{min}, \tilde{y}_{max})$ are bounding the position which can be attained Proof First, it is clear that there is no loss of generality by the assumptions $x[t]=0$, $\tilde{x}[0] \leq 0$ and the ones regarding $v_x[t]$, by a simple change of coordinates and consideration of relative velocity. Moreover, by similar arguments it is simple to extend to the case when $\tilde{v}_x[0] \leq 0$.

Note that the positions of the cars involved in the cut-in, which in our case, are $(x[t], x[t]-W)$, imply some $(\mu 1, \mu 2)$-Winning by Lateral Position property, affecting the blame. By our assumptions over $v_x[t]$, we obtain that the maximal lateral velocity $\tilde{c}$ may use at time t, under assumption that c will be blamed, is 0: either in order to $\mu$-"tie" lateral velocity (in the case c does not $(\mu 1, \mu 2)$-Win by Lateral Position, this can be enough in order to put the blame on it), or to $\mu$-Win lateral velocity (in the case c does $(\mu 1, \mu 2)$-Win by Lateral Position, this is necessary in order to put the blame on it). It is left to check whether exists a maneuver starting at $\tilde{v}_x[0]$, ending at $\tilde{v}_x[t]=0$, using lateral accelerations bounded by $a_{x,max}$, with final position $\tilde{x}[t] \geq x[t]-W$ In words, a cut-in which ends at the desired lateral velocity, 0.

Recall the definition $t_{top}=0.5(t-\tilde{v}_x[0]/a_{x,max})$ from the algorithm. Assume $t_{top}<0$. This implies that the time needed by $\tilde{c}$ in order to reach lateral velocity 0 when using maximal lateral acceleration, namely, $\tilde{v}_x[0]/a_{x,max}$, is lesser than t. This implies that there is no manoeuvre which it can perform in order to reach the desired velocity in time, and hence no problematic maneuver exists. Therefore, if the procedure returned "non-feasible" due to $t_{top}<0$, indeed, there is no feasibility of a non-safe cut-in of c's blame.

Consider the case $t_{top}>0$. Then, the procedure returned "non-feasible" due to $x_{max}<-W$. Consider a family of lateral velocity profiles for $\tilde{c}$ in the time range [0, t], denoted $U=\{u_0: a > \tilde{v}_x[0]/t\}$ and parameterized by a. We define, for each a, in similar fashion to the one used in the algorithm, $t_{top}(a):=0.5(t-\tilde{v}_x[0]/a)$. Note that $t_{top}(a)>0$ for all $a>\tilde{v}_x[0]/t$. We now define the velocity profile $u_a$ for all times $t'0$ [0, t] as follows:

$$u_a(t') = \begin{cases} \tilde{v}_x[0] + a \cdot t' & t' < t_{top}(a) \\ \tilde{v}_x[0] + a \cdot (2t_{top}(a) - t') & t' \geq t_{top}(a) \end{cases}$$

First, it can be seen that $u_a$ satisfies the constraints $u_a(0)=\tilde{v}_x[0]$, $u_a(t)=\tilde{v}_x[t]$. Second, the distance travelled while using $u_a$ can be calculated, as this amounts to integration of a piecewise linear function. Define the arrived-at position as $\tilde{x}_{u_a}$, and note that $x_{max}$ defined in the algorithm is precisely $$x_{u_{a_{x,max}}}.$$

Third, it can be seen that the travelled distance is monotonically increasing with a, and is unbounded. Hence, for any desired final position $$x > \tilde{x}_{u_{\tilde{v}_x[0]/t}},$$

there exists a value of a for which $x=\tilde{x}_{u_a}$. In particular, for $x=x[t]-W$, such a value exists, and we denote it by $a_{out}$.

Observe that since $x_{max}$, defined in the algorithm, is $<x[t]-W$, we have that $a_{cut}>a_{x,max}$. This in not sufficient in order to show no valid maneuver can lead to position $\geq x[t]-W$; this is implied only for members of the family U. We now prove that even outside of U, all velocity profiles which attain a final position of $x[t]-W$ must use an acceleration value of at least $a_{cut}$ on the way, making them invalid, and hence completing the proof.

Assume some velocity profile u satisfies the boundary constraints $u(0)=\tilde{v}_x[0]$, $u(t)=\tilde{v}_x[t]$. Moreover, assume it attains some final position $\tilde{x}_u > x[t]-W$. We thus obtain:

$$\int_0^t u(\tau)d\tau \geq \int_0^t u_{a_{cut}}(\tau)d\tau.$$

Assume $u \geq u_{a_{cut}}$ for all $\tau$. In particular, $u(t_{top}(a_{cut})) \geq u_{a_{cut}}(t_{top}(a_{cut}))$. From the mean value theorem, there exists $\zeta 0[0, t_{top}(a_{cut})]$ s.t.

$$u'(\zeta) = \frac{u(t_{top}(a_{cut})) - u(0)}{t_{top}(a_{cut})} =$$

$$\frac{u(t_{top}(a_{cut})) - u_{a_{cut}}(0)}{t_{top}(a_{cut})} \geq \frac{u_{a_{cut}}(t_{top}(a_{cut})) - u_{a_{cut}}(0)}{t_{top}(a_{cut})} = a_{cut} > a_{x,max},$$

implying infeasibility of u, as it uses acceleration (that is, u', the derivative of the velocity) which exceeds $a_{x,max}$.

Now, assume $u \geq u_{a_{cut}}$ does not hold for all $\tau$. Then, due to the fact $\int_0^t u(\tau)d\tau \geq \int_0^t u_{a_{cut}}(\tau)d\tau$, there must be a point where $u > u_{a_{cut}}$. If such point $\tau_{large}$ exists in $[0, t_{top}(a_{cut})]$, then we can easily use the mean value theorem in the same manner as above, to obtain $\zeta 0$ $[0, \tau_{large}]$ where too large an acceleration is used. If such point only exists in $[t_{top}(a_{cut}), t]$, similar argument will give us a point $\zeta 0$ $[\tau_{large}, t]$ in which an acceleration value lesser than $-a_{x,max}$, was used, concluding the proof. Equipped with the above lemmas, Theorem 2's proof is immediate.

Safety Verification—Occlusions

In similar fashion to dealing with observed objects, we can define the extension for cautiousness w.r.t. occluded objects, with a similar theorem to Theorem 1, proving that cautiousness implies there are never accidents of our blame.

Definition 15 (Cautiousness w.r.t. Occluded Objects) A command given at time t is Cautious w.r.t. Occluded Objects if in the case that the exposure time of the object is t+1, and we command a Default Emergency Policy (DFP) at time t+1, there will not be an accident of our blame.

Lemma 7 If we only give cautious, w.r.t. occluded objects and non occluded objects, commands, there will never be an accident of our blame.

Proof Assume that an accident of our blame occurred at time t, with the exposure time being t'≤t. By cautiousness assumption, the command given at t'−1 allowed us to command a DEP at t' without being blamed for an accident. As there was an accident of our blame, we apparently did not command a DEP at time t'. But from t' on, we were safe w.r.t. non occluded objects, hence the command we gave was safe, and there was no accident of our blame.

Here too, we provide efficient ways to checking cautiousness with respect to a worst-case assumption over occluded objects, allowing for feasible, scalable, RSS.

Driving Policy

A driving policy is a mapping from a sensing state (a description of the world around us) into a driving command (e.g., the command is lateral and longitudinal accelerations for the coming second, which determines where and at what speed should the car be in one second from now). The driving command is passed to a controller, which aims at actually moving the car to the desired position/speed.

In the previous sections a formal safety model and proposed constraints on the commands issued by the driving policy that guarantee safety were described. The constraints on safety are designed for extreme cases. Typically, we do not want to even need these constraints, and would like to construct a driving policy that leads to a comfortable ride. The focus of this section is on how to build an efficient driving policy, in particular, one that requires computational resources that can scale to millions of cars. For now, this discussion does not address the issue of how to obtain the sensing state and assume an utopic sensing state, that faithfully represents the world around us without any limitations. Later sections discuss the effect of inaccuracies in the sensing state on the driving policy.

The problem of defining a driving policy is cast in the language of Reinforcement Learning (RL), as discussed in the sections above. At each iteration of RL, an agent observes a state describing the world, denoted $s_t$, and should pick an action, denoted $a_t$, based on a policy function, $\pi$, that maps states into actions. As a result of its action and other factors out of its control (such as the actions of other agents), the state of the world is changed to $s_t+1$. We denote a (state, action) sequence by $\bar{s}=((s_1,a_1), (s_2,a_2), \ldots, (s_{len(\bar{s})},a_{len(\bar{s})}))$. Every policy induces a probability function over (state, action) sequences. This probability function may be affected by the actions taken by the agent, but also depends on the environment (and in particular, on how other agents behave). We denote by $P_\pi$ the probability over (state, action) sequences induced by $\pi$. The quality of a policy is defined to be $\mathbb{E}_{s \sim p\pi}[p(\bar{s})]$, where $p(\bar{s})$ is a reward function that measures how good the sequence $\bar{s}$ is. In most case, $p(\bar{s})$ takes the form $p(\bar{s})=\Sigma_{t=1}^{len(\bar{s})}p(s_t, a_t)$, where $p(s, a)$ is an instantaneous reward function that measures the immediate quality of being at state s and performing action a. For simplicity, we stick to this simpler case.

To cast the driving policy problem in the above RL language, let $s_t$ be some representation of the road, and the positions, velocities, and accelerations, of the ego vehicle as well as other road users. Let $a_t$ be a lateral and longitudinal acceleration command. The next state, $s_{t+1}$, depends on $a_t$ as well as on how the other agents will behave. The instantaneous reward, $p(s_t, a_t)$, may depend on the relative position/velocities/acceleration to other cars, the difference between our speed and the desired speed, whether we follow the desired route, whether our acceleration is comfortable etc.

One challenge in deciding what action should the policy take at time t stems from the fact that one needs to estimate the long term effect of this action on the reward. For example, in the context of driving policy, an action that is taken at time t may seem a good action for the present (that is, the reward value $p(s_t, a_t)$ is good), but might lead to an accident after 5 seconds (that is, the reward value in 5 seconds would be catastrophic). We therefore need to estimate the long term quality of performing an action a when the agent is at state s. This is often called the Q-function, namely, Q(s, a) should reflect the long term quality of performing action a at time s. Given such a Q-function, the natural choice of an action is to pick the one with highest quality, $\pi(s)=\text{argmax}_a Q(s, a)$.

The immediate questions are how to define Q and how to evaluate Q efficiently. Let us first make the (completely non-realistic) simplifying assumption that $s_t+1$ is some deterministic function of $(s_t, a_t)$, namely, $s_t+1=f(s_t, a_t)$. One familiar with Markov Decision Processes (MDPs), will notice that this assumption is even stronger than the Markovian assumption of MDPs (i.e., that $s_t+1$ is conditionally independent of the past given $(s_t, a_t)$). As noted in [5], even the Markovian assumption is not adequate for multi-agent scenarios, such as driving, and we will therefore later relax the assumption.

Under this simplifying assumption, given $s_t$, for every sequence of decisions for T steps, (at, ..., $a_{t+T}$), we can calculate exactly the future states $(s_t+1, \ldots, s_{t+T}+1)$ as well as the reward values for times t, ..., T Summarizing all these reward values into a single number, e.g. by taking their sum $\Sigma_{\tau=t}^{T} p(s_\tau, a_\tau)$, we can define Q(s, a) as follows:

$$Q(s,a) = \max_{(a_t,\ldots,a_t+T)} \Sigma_{\tau=t}^{T} \rho(s_\tau, a_\tau) \text{ s.t. } s_t = s,$$

$$a_t = a, \forall \tau, s_{\tau+1} = f(s_\tau, a_\tau)$$

That is, Q(s, a) is the best future we can hope for, if we are currently at state s and immediately perform action a.

Let us discuss how Q may be calculated. The first idea is to discretize the set of possible actions, A, into a finite set $\hat{A}$, and simply traverse all action sequences in the discretized set. Then, the runtime is dominated by the number of discrete action sequences, $|\hat{A}|^T$. If $\hat{A}$ represents 10 lateral accelerations and 10 longitudinal accelerations, we obtain $100^T$ possibilities, which becomes infeasible even for small values of T. While there are heuristics for speeding up the search (e.g. coarse-to-fine search), this brute-force approach requires tremendous computational power.

The parameter T is often called the "time horizon of planning", and it controls a natural tradeoff between computation time and quality of evaluation—the larger T is, the better our evaluation of the current action (since we explicitly examine its effect deeper into the future), but on the other hand, a larger T increases the computation time exponentially. To understand why we may need a large value of T, consider a scenario in which we are 200 meters before a highway exit and we should take it. When the time horizon is long enough, the cumulative reward will indicate if at some time $\tau$ between t and t+T we have arrived to the exit lane. On the other hand, for a short time horizon, even if we perform the right immediate action we will not know if it will lead us eventually to the exit lane.

A different approach attempts to perform offline calculations in order to construct an approximation of Q, denoted $\hat{Q}$, and then during the online run of the policy, use $\hat{Q}$ as an approximation to Q, without explicitly rolling out the future. One way to construct such an approximation is to discretize both the action domain and the state domain. Denote by $\hat{A}$, $\hat{S}$ these discretized sets. An offline calculation may evaluate the value of Q(s, a) for every (s, a) 0 $\hat{S}$ H $\hat{A}$. Then, for every a 0 $\hat{A}$ we define $\hat{Q}(s_t, a)$ to be Q(s, a) for $s=\text{argmin}_0\hat{s}\|s-s_t\|$. Furthermore, based on the pioneering work of Bellman [2, 3], we can calculate Q(s, a) for every (s, a) 0$\hat{S}$ H $\hat{A}$, based on dynamic programming procedures (such as the Value Iteration algorithm), and under our assumptions, the total runtime is order of T|$\hat{A}$| |$\hat{S}$|. The main problem with this approach is that in any reasonable approximation, $\hat{S}$ is extremely large (due to the curse of dimensionality). Indeed, the sensing state should represent 6 parameters for every other relevant vehicle in the sense—the longitudinal and lateral position, velocity, and acceleration. Even if we discretize each dimension to only 10 values (a very crude discretization), since we have 6 dimensions, to describe a single car we need $10^6$ states, and to describe k cars we need $10^{6k}$ states. This leads to unrealistic memory requirements for storing the values of Q for every (s, a) in $\hat{S}$ H $\hat{A}$.

One approach for dealing with this curse of dimensionality is to restrict Q to come from a restricted class of functions (often called a hypothesis class), such as linear functions over manually determined features or deep neural networks. For example, consider a deep neural network that approximates Q in the context of playing Atari games. This leads to a resource-efficient solution, provided that the class of functions that approximate Q can be evaluated efficiently. However, there are several disadvantages of this approach. First, it is not known if the chosen class of functions contains a good approximation to the desired Q function. Second, even if such function exists, it is not known if existing algorithms will manage to learn it efficiently. So far, there are not many success stories for learning a Q function for complicated multi-agent problems, such as the ones we are facing in driving. There are several theoretical reasons why this task is difficult. As mentioned regarding the Markovian assumption, underlying existing methods are problematic.

But, a more severe problem is a very small signal-to-noise ratio due to the time resolution of decision making, as explained below.

Consider a simple scenario in which a vehicle needs to change lane in order to take a highway exit in 200 meters and the road is currently empty. The best decision is to start making the lane change. Decisions may be made every 0.1 second, so at the current time t, the best value of $Q(s_t, a)$ should be for the action a corresponding to a small lateral acceleration to the right. Consider the action a' that corresponds to zero lateral acceleration. Since there is a very little difference between starting the change lane now, or in 0.1 seconds, the values of $Q(s_t, a)$ and $Q(s_t, a')$ are almost the same. In other words, there is very little advantage for picking a over a'. On the other hand, since we are using a function approximation for Q, and since there is noise in measuring the state $s_t$, it is likely that our approximation to the Q value is noisy. This yields a very small signal-to-noise ratio, which leads to an extremely slow learning, especially for stochastic learning algorithms which are heavily used for the neural networks approximation class. However, as noted in, this problem is not a property of any particular function approximation class, but rather, it is inherent in the definition of the Q function.

In summary, available approaches can be roughly divided into two camps. The first one is the brute-force approach which includes searching over many sequences of actions or discretizing the sensing state domain and maintaining a huge table in memory. This approach can lead to a very accurate approximation of Q but requires unlimited resources, either in terms of computation time or in terms of memory. The second one is a resource efficient approach in which we either search for short sequences of actions or we apply a function approximation to Q. In both cases, we pay by having a less accurate approximation of Q that might lead to poor decisions.

The approach described herein includes constructing a Q function that is both resource-efficient and accurate is to depart from geometrical actions and to adapt a semantic action space, as described in the next subsection.

Semantic Approach

As a basis for the disclosed semantic approach, consider a teenager that just got his driving license. His father sits next to him and gives him "driving policy" instructions. These instructions are not geometric—they do not take the form "drive 13.7 meters at the current speed and then accelerate at a rate of 0.8 m/s$^2$". Instead, the instructions are of semantic nature —"follow the car in front of you" or "quickly overtake that car on your left." We formalize a semantic language for such instructions, and use them as a semantic action space. We then define the Q function over the semantic action space. We show that a semantic action can have a very long time horizon, which allows us to estimate Q(s, a) without planning for many future semantic actions. Yes, the total number of semantic actions is still small. This allows us to obtain an accurate estimation of the Q function while still being resource efficient. Furthermore, as we show later, we combine learning techniques for further improving the quality function, while not suffering from a small signal-to-noise ratio due to a significant difference between different semantic actions.

Now define a semantic action space. The main idea is to define lateral and longitudinal goals, as well as the aggressiveness level of achieving them. Lateral goals are desired positions in lane coordinate system (e.g., "my goal is to be in the center of lane number 2"). Longitudinal goals are of three types. The first is relative position and speed with respect to other vehicles (e.g., "my goal is to be behind car number 3, at its same speed, and at a distance of 2 seconds from it"). The second is a speed target (e.g., "drive at the allowed speed for this road times 110%"). The third is a speed constraint at a certain position (e.g., when approaching a junction, "speed of 0 at the stop line", or when passing a sharp curve, "speed of at most 60 kmh at a certain position on the curve"). For the third option, we can instead apply a "speed profile" (few discrete points on the route and the desired speed at each of them). A reasonable number of lateral goals is bounded by 16=4×4 (4 positions in at most 4 relevant lanes). A reasonable number of longitudinal goals of the first type is bounded by 8×2×3=48 (8 relevant cars, whether to be in front or behind them, and 3 relevant distances). A reasonable number of absolute speed targets are 10, and a reasonable upper bound on the number of speed constraints is 2. To implement a given lateral or longitudinal goal, we need to apply acceleration and then deceleration (or the other way around). The aggressiveness of achieving the goal is a maximal (in absolute value) acceleration/deceleration to achieve the goal. With the goal and aggressiveness defined, we have a closed form formula to implement the goal, using kinematic calculations. The only remaining part is to determine the combination between the lateral and longitudinal goals (e.g., "start with the lateral goal, and exactly at the middle of it, start to apply also the longitudinal goal"). A set of 5 mixing times and 3 aggressiveness levels seems more than enough. All in all, we have obtained a semantic action space whose size is $\approx 10^4$.

It is worth mentioning that the variable time required for fulfilling these semantic actions is not the same as the frequency of the decision making process. To be reactive to the dynamic world, we should make decisions at a high frequency—in our implementation, every 100 ms. In contrast, each such decision is based on constructing a trajectory that fulfills some semantic action, which will have a much longer time horizon (say, 10 seconds). We use the longer time horizon since it helps us to better evaluate the short term prefix of the trajectory. The next subsection discusses the evaluation of semantic actions, but before that, we argue that semantic actions induce a sufficient search space.

As discussed above, a semantic action space induces a subset of all possible geometrical curves, whose size is exponentially smaller (in T) than enumerating all possible geometrical curves. The first immediate question is whether the set of short term prefixes of this smaller search space contains all geometric commands that we will ever want to use. This is indeed sufficient in the following sense. If the road is free of other agents, then there is no reason to make changes except setting a lateral goal and/or absolute acceleration commands and/or speed constraints on certain positions. If the road contains other agents, we may want to negotiate the right of way with the other agents. In this case, it suffices to set longitudinal goals relatively to the other agents. The exact implementation of these goals in the long run may vary, but the short term prefixes will not change by much. Hence, we obtain a very good cover of the relevant short term geometrical commands.

Constructing an Evaluation Function for Semantic Actions

We have defined a semantic set of actions, denoted by $A^s$. Given that we are currently in state, s, we need away to choose the best $a^s$ 0 $A^s$. To tackle this problem, we follow a similar approach to the options mechanism of [6]. The basic idea is to think of $a^s$ as a meta-action (or an option). For each choice of a meta-action, we construct a geometrical trajectory $(s_1, a_1), \ldots, (s_T, a_T)$ that represents an implementation of the meta-action, $a^s$. To do so we of course need to know how other agents will react to our actions, but for now we are still relying on (the non-realistic) assumption that $s_{t+1}=f(s_t, a_t)$ for some known deterministic function f. We can now use $$\frac{1}{T}\sum_{t=1}^{T} \rho(s_t, a_t)$$

as a good approximation of the quality of performing the semantic action $a^s$ when we are at state $s^1$.

This approach can yield a powerful driving policy. However, in some situations a more sophisticated quality function may be needed. For example, suppose that we are following a slow truck before an exit lane, where we need to take the exit lane. One semantic option is to keep driving slowly behind the truck. Another one is to overtake the truck, hoping that later we can get back to the exit lane and make the exit on time. The quality measure described previously does not consider what will happen after we will overtake the truck, and hence we will not choose the second semantic action even if there is enough time to make the overtake and return to the exit lane. Machine learning can help us to construct a better evaluation of semantic actions that will take into account more than the immediate semantic actions. As previously discussed, learning a Q function over immediate geometric actions is problematic due to the low signal-to-noise ratio (the lack of advantage). This is not problematic when considering semantic actions, both because there is a large difference between performing the different semantic actions and because the semantic time horizon (how many semantic actions we take into account) is very small (probably less than three in most cases).

Another potential advantage of applying machine learning is for the sake of generalization: we may set an adequate evaluation function for every road, by a manual inspection of the properties of the road, which may involve some trial and error. But, can we automatically generalize to any road? Here, a machine learning approach, as discussed above, can be trained on a large variety of road types so as to generalize to unseen roads as well. The semantic action space according to the disclosed embodiments may allow for potential benefits: semantic actions contain information on a long time horizon, hence we can obtain a very accurate evaluation of their quality while being resource efficient.

The Dynamics of the Other Agents

So far, we have relied on the assumption that $s_{t+1}$ is a deterministic function of $s_t$ and $a_t$. As emphasized previously, this assumption is not completely realistic as our actions affect the behavior of other road users. While we do take into account some reactions of other agents to our actions (for example, we assume that if we will perform a safe cut-in than the car behind us will adjust its speed so as not to hit us from behind), it is not realistic to assume that we model all of the dynamics of other agents. The solution to this problem is to re-apply the decision making at a high frequency, and by doing this, constantly adapt our policy to the parts of the environment that are beyond our modeling. In a sense, one can think of this as a Markovization of the world at every step.

Sensing

This section describes the sensing state, which is a description of the relevant information of the scene, and forms the input to the driving policy module. By and large, the sensing state contains static and dynamic objects. The static objects are lanes, physical road delimiters, constraints on speed, constraints on the right of way, and information on occluders (e.g., a fence that occludes relevant part of a merging road). Dynamic objects are vehicles (e.g., bounding box, speed, acceleration), pedestrians (bounding box, speed, acceleration), traffic lights, dynamic road delimiters (e.g., cones at a construction area), temporary traffic signs and police activity, and other obstacles on the road (e.g., an animal, a mattress that fell from a truck, etc.).

In any reasonable sensor setting, we cannot expect to obtain the exact sensing state, s. Instead, we view raw sensor and mapping data, which we denote by x 0 X, and there is a sensing system that takes x and produces an approximate sensing state.

Definition 16 (Sensing system) Let S denotes the domain of sensing state and let X be the domain of raw sensor and mapping data. A sensing system is a function $\hat{s}$: X→S.

It is important to understand when we should accept $\hat{s}(x)$ as a reasonable approximation to s. The ultimate way to answer this question is by examining the implications of this approximation on the performance of our driving policy in general, and on the safety in particular. Following our safety-comfort distinction, here again we distinguish between sensing mistakes that lead to non-safe behavior and sensing mistakes that affect the comfort aspects of the ride. Before addressing the details, the type of errors a sensing system might make include:

False negative: the sensing system misses an object
False positive: the sensing system indicates a "ghost" object
Inaccurate measurements: the sensing system correctly detects an object but incorrectly estimates its position or speed
Inaccurate semantic: the sensing system correctly detects an object but misinterpret its semantic meaning, for example, the color of a traffic light
Comfort Recall that for a semantic action a, we have used Q(s, a) to denote our evaluation of a given that the current sensing state is s. Our policy picks the action $\pi(s)=\text{argmax}_a$ Q(s, a). If we inject $\hat{s}(x)$ instead of s then the selected semantic action would be $\pi(\hat{s}(x))=\text{argmax}_a$ Q(s(x), a). If $\pi(\hat{s}(x))=\pi(s)$ then $\hat{s}(x)$ should be accepted as a good approximation to s. But, it is also not bad at all to pick $\pi(\hat{s}(x))$ as long as the quality of $\pi(\hat{s}(x))$ w.r.t. the true state, s, is almost optimal, namely, Q(s, $\pi(\hat{s}(x)))\geq$Q(s, $\pi(s))-\epsilon$, for some parameter $\epsilon$. We say that $\hat{s}$ is $\epsilon$-accurate w.r.t. Q in such case. Naturally, we cannot expect the sensing system to be $\epsilon$-accurate all the time. We therefore also allow the sensing system to fail with some small probability $\delta$. In such a case we say that $\hat{s}$ is Probably (w.p. of at least 1-$\delta$), Approximately (up to $\epsilon$), Correct, or PAC for short (borrowing Valiant's PAC learning terminology).

We may use several ($\epsilon$, $\delta$) pairs for evaluating different aspects of the system. For example, we can choose three thresholds, $\epsilon_1 < \epsilon_2 < \epsilon_3$ to represent mild, medium, and gross mistakes, and for each one of them set a different value of $\delta$. This leads to the following definition.

Definition 17 (PAC sensing system) Let $((\epsilon_1, \delta_1), \ldots, (\epsilon_k, \delta_k))$ be a set of (accuracy, confidence) pairs, let S be the sensing state domain, let X be the raw sensor and mapping data domain, aid let D be a distribution over X×S. Let A be an action space, Q: S×A→|be a quality function, and $\pi$: S→A be such that $\pi(s)\epsilon\text{argmax}_a$ Q(s, a). A sensing system, $\hat{s}$: X→S. is Probably-Approximately-Correct (PAC) with respect to the above parameters if for every i$\in\{1, \ldots, k\}$ we have that $P(x,x)\sim D[Q(s, \pi(\hat{s}(x)))\geq Q(s, \pi(s))-\epsilon_i]\geq 1-\delta_i$.

Here, the definition depends on a distribution D over X×S. It is important to emphasize that we construct this distribution by recording data of many human drivers but not by following the particular policy of our autonomous vehicle. While the latter seems more adequate, it necessitates online validation, which makes the development of the sensing system impractical. Since the effect of any reasonable policy on D is minor, by applying simple data augmentation techniques we can construct an adequate distribution and then perform offline validation after every major update of the sensing system. The definition provides a sufficient, but not necessary, condition for comfort ride using ŝ. It is not necessary because it ignores the important fact that short term wrong decisions have little effect on the comfort of the ride. For example, suppose that there is a vehicle 100 meters ahead, and it is slower than the host vehicle. The best decision would be to start accelerating slightly now. If the sensing system misses this vehicle, but will detect it in the next time (after 100 mili-seconds), then the difference between the two rides will not be noticeable. To simplify the presentation, we have neglected this issue and required a stronger condition. The adaptation to a multi-frame PAC definition is conceptually straightforward, but is more technical.

We next derive design principles that follow from the above PAC definition. Recall that we have described several types of sensing mistakes. For mistakes of types false negative, false positive, and inaccurate semantic, either the mistakes will be on non-relevant objects (e.g., a traffic light for left turn when we are proceeding straight), or they will be captured by the δ part of the definition. We therefore focus on the "inaccurate measurements" type of errors, which happens frequently.

Somewhat surprisingly, we will show that the popular approach of measuring the accuracy of a sensing system via ego-accuracy (that is, by measuring the accuracy of position of every object with respect to the host vehicle) is not sufficient for ensuring PAC sensing system. We will then propose a different approach that ensures PAC sensing system, and will show how to obtain it efficiently. We start with some additional definitions.

For every object o in the scene, let p(o), p̂(o) be the positions of o in the coordinate system of the host vehicle according to s, ŝ(x), respectively. Note that the distance between o and the host vehicle is ∥p∥. The additive error of p̂ is ∥p(o)−p̂(o)∥. The relative error of p̂(o), w.r.t. the distance between o and the host vehicle, is the additive error divided by ∥p(o)∥, namely $$\frac{\|\hat{p}(o) - p(o)\|}{\|p(o)\|}.$$

It is not realistic to require that the additive error is small for far away objects. Indeed, consider o to be a vehicle at a distance of 150 meters from the host vehicle, and let ϵ be of moderate size, say ϵ=0.1. For additive accuracy, it means that we should know the position of the vehicle up to 10 cm of accuracy. This is not realistic for reasonably priced sensors. On the other hand, for relative accuracy we need to estimate the position up to 10%, which amounts to 15 m of accuracy. This is feasible to achieve (as described below).

A sensing system, ŝ, positions a set of objects, O, in an ϵ-ego-accurate way, if for every o∈O, the (relative) error between p(o) and p̂(o) is at most ϵ. The following example demonstrates that an ϵ-ego-accurate sensing state does not guarantee PAC sensing system with respect to every reasonable Q. Indeed, consider a scenario in which the host vehicle drives at a speed of 30 m/s, and there is a stopped vehicle 150 meters in front of it. If this vehicle is in the ego lane, and there is no option to change lanes in time, we must start decelerating now at a rate of at least 3 m/s² (otherwise, we will either not stop in time or we will need to decelerate strongly later). On the other hand, if the vehicle is on the side of the road, we don't need to apply a strong deceleration. Suppose that p(o) is one of these cases while p̂(o) is the other case, and there is a 5 meters difference between these two positions. Then, the relative error of p̂(o) is $$\frac{\|\hat{p}(o) - p(o)\|}{\|p(o)\|} = \frac{5}{150} = \frac{1}{30} \le 0.034.$$

That is, the sensing system may be ϵ-ego-accurate for a rather small value of ϵ (less than 3.5% error), and yet, for any reasonable Q function, the values of Q are completely different since we are confusing between a situation in which we need to brake strongly and a situation in which we do not need to brake strongly.

The above example shows that ϵ-ego-accuracy does not guarantee that our sensing system is PAC. Whether there is another property that is sufficient for PAC sensing system depends on Q. We will describe a family of Q functions for which there is a simple property of the positioning that guarantees PAC sensing system. The problem of ϵ-ego-accuracy is that it might lead to semantic mistakes—in the aforementioned example, even though ŝ was ϵ-ego-accurate with ϵ<3.5%, it mis-assigned the vehicle to the correct lane. To solve this problem, we rely on semantic units for lateral position.

Definition 18 (semantic units) A lane center is a simple natural curve, namely, it is a differentiable, injective, mapping l: [a, b]→l³, where for every a≤t₁<t₂≤b we have that the length Length(t₁, t₂):=∫$_{r=t_1}^{t_2}$|l'(τ)|dτ equals to t₂−t₁. The width of the lane is a function w: [a, b]→l. The projection of a point x∈l³ onto the curve is the point on the curve closest to x, namely, the point l(t$_x$) for t$_x$=argminϵ$_{[a,b]}$∥l(t)−x∥. The semantic longitudinal position of x w.r.t. the lane is t$_x$ and the semantic lateral position of x w.r.t. the lane is l(t$_x$)/w(t$_x$). Semantic speed and acceleration are defined as first and second derivatives of the above.

Similarly to geometrical units, for semantic longitudinal distance we use relative error: if S induces a semantic longitudinal distance of p̂(o) for some object, while the true distance is p(o), then the relative error is $$\frac{|\hat{p}(o) - p(o)|}{\max\{p(o), 1\}}$$

(where the maximum in the denominator deals with cases in which the object has almost the same longitudinal distance (e.g., a car next to us on another lane). Since semantic lateral distances are small we can use additive error for them. This leads to the following definition:

Definition 19 (error in semantic units) Let l be a lane and suppose that the semantic longitudinal distance of the host vehicle w.r.t. the lane is 0. Let x∈ℝ³ be a point and let p$_{lat}$(x), p$_{lon}$(x) be the semantic lateral and longitudinal distances to the point w.r.t. the lane. Let p̂$_{lat}$(x), p̂$_{lon}$(x) be approximated measurements. The distance between p̂ and p w.r.t. x is defined as $$d(\hat{p}, p; x) = \max\left\{|\hat{p}_{lat}(x) - p_{lat}(x)|, \frac{|\hat{p}_{lon}(x) - p_{lon}(x)|}{\max\{p_{lon}(x), 1\}}\right\}$$

The distance of the lateral and longitudinal velocities is defined analogously. Equipped with the above definition, we are ready to define the property of Q and the corresponding sufficient condition for PAC sensing system.

Definition 20 (Semantically-Lipschitz Q) A Q function is L-semantically-Lipschitz if for every a, s, ŝ, |Q(s, a)−Q(ŝ(x), a)|≤L $\max_o$ d(p̂, p; o), where p̂, p are the measurements induced by s, ŝ on an object o.

As an immediate corollary we obtain:

Lemma 8 If Q is L-semantically-Lipschitz and a sensing system i produces semantic measurements such that with probability of at least 1−δ we have d(p̂, p; o)≤0L, then ŝ is a PAC sensing system with parameters 0, δ.

Safety

This section discusses the potential for sensing errors that can lead to unwanted behaviors. As mentioned before, the policy is provably safe, in the sense that it won't lead to accidents of the host AV's blame. Such accidents might still occur due to hardware failure (e.g., a breakdown of all the sensors or exploding tire on the highway), software failure (a significant bug in some of the modules), or a sensing mistake. Our ultimate goal is that the probability of such events will be extremely small—a probability of $10^{-9}$ for such an accident per hour. To appreciate this number, the average number of hours driver in the U.S. spends on the road is (as of 2016) less than 300 hours. So, in expectation, one would need to live 3.3 million years to be in an accident resulting from one of these types of events.

We first define what is a safety-related sensing error. Recall that at every step, our policy picks the value of a that maximizes Q(s, a), namely, $\pi(s) = \text{argmax}_a Q(s, a)$. We ensure safety by letting Q(s, a)=−∞ for every action a that is not cautious (see Definition 14). Therefore, the first type of safety-critic sensing mistake is if our sensing system leads to picking a non-safe action. Formally, letting $\pi(\hat{s}(x)) = \text{argmax}_a Q(\hat{s}(x), a)$ be the decision according to ŝ, we say that ŝ leads to a safety-critic miss if Q(s, π(ŝ(x)))=−∞. The second type of safety-critic sensing mistake is if all the actions are non-safe according to ŝ(x), and we must apply the standard emergency policy (e.g., braking hard), while according to s there is a safe action, namely, $\max_a Q(s, a) > -\infty$. This is dangerous when our speed is high and there is a car behind us. We call such mistake a safety-critic ghost.

Usually, a safety-critic miss is caused by a false negative while a safety-critic ghost is caused by a false positive. Such mistakes can also be caused from significantly incorrect measurements, but in most cases, our comfort objective ensures we are far away from the boundary of the safety definitions, and therefore reasonable measurements errors are unlikely to lead to a safety-critic mistake. How can we ensure that the probability of safety-critic mistakes will be very small, say, smaller than $10^{-9}$ per hour? As followed from Lemma 1, without making further assumptions we need to check our system on more than $10^9$ hours of driving. This is unrealistic (or at least extremely challenging)—it amounts to recording the driving of 3.3 million cars over a year. Furthermore, building a system that achieves such a high accuracy is a great challenge. A solution for both the system design and validation challenges is to rely on several sub-systems, each of which is engineered independently and depends on a different technology, and the systems are fused together in a way that ensures boosting of their individual accuracy.

Suppose we build three sub-systems, denoted, $s_1$, $s_2$, $s_3$ (the extension to more than 3 is straightforward). Each sub-system receives a and should output safe/non-safe. Actions for which the majority of the sub-systems (2 in our case) accept as safe are considered safe. If there is no action that is considered safe by at least 2 sub-systems, then the default emergency policy is applied. The performance of this fusion scheme is analyzed as follows based on the following definition:

Definition 21 (One side c-approximate independent) Two Bernoulli random variables $r_1$, $r_2$ are called one side c-approximate independent if $\mathbb{P}[r_1 \wedge r_2] \leq c\, \mathbb{P}[r_1]\, \mathbb{P}[r_2]$.

For i 0 {1,2,3}, denote by $e_i^m$, $e_i^g$ the Bernoulli random variables that indicate if sub-system i performs a safety-critic miss/ghost respectively. Similarly, $e^m$, $e^g$ indicate a safety-critic miss/ghost of the fusion system. We rely on the assumption that for any pair i≠j, the random variables $e_i^m$, $e_j^m$ are one sided c-approximate independent, and the same holds for $e_i^g$, $e_j^g$. Before explaining why this assumption is reasonable, let us first analyze its implication. We can bound the probability of $e^m$ by:

$$\mathbb{P}[e^m] = \mathbb{P}[e_1^m \wedge e_2^m \wedge e_3^m] + \sum_{j=1}^{3}\mathbb{P}[\neg e_j^m \wedge \wedge_{i \neq j} e_i^m] \leq$$

$$3\mathbb{P}[e_1^m \wedge e_2^m \wedge e_3^m] + \sum_{j=1}^{3}\mathbb{P}[\neg e_j^m \wedge \wedge_{i \neq j} e_i^m] = \sum_{j=1}^{3}\mathbb{P}[\wedge_{i \neq j} e_i^m] \leq c \sum_{j=1}^{3}\prod_{i \neq j}\mathbb{P}[e_i^m].$$

Therefore, if all sub-systems have $\mathbb{P}[e_i^m] \leq p$ then $\mathbb{P}[e^m] \leq 3cp^2$. The exact same derivation holds for the safety-critic ghost mistakes. By applying a union bound we therefore conclude:

Corollary 2 Assume that for any pair i≠j, the random variables $e_i^m, e_j^m$ are one sided c-approximate independent, and the same holds for $e_i^g$, $e_j^g$. Assume also that for every i, $\mathbb{P}[e_i^m] \leq p$ and $\mathbb{P}[e_i^g] \leq p$. Then, $\mathbb{P}[e^m \vee e^g] \leq 6cp^2$.

This corollary allows us to use significantly smaller data sets in order to validate the sensing system. For example, if we would like to achieve a safety-critic mistake probability of $10^{-9}$, instead of taking order of $10^9$ examples, it suffices to take order of $10^5$ examples and test each system separately.

There may be pairs of sensors that yield non-correlated errors. For example, radar works well in bad weather conditions but might fail due to non-relevant metallic objects, as opposed to camera that is affected by bad weather but is not likely to be affected by metallic objects. Seemingly, camera and lidar have common sources of error—e.g., both are affected by foggy weather, heavy rain, or snow. However, the type of errors for camera and lidar would be different —a camera might miss objects due to bad weather and lidar might detect a ghost due to reflections from particles in the air. Since we have distinguished between the two types of errors, the approximate independency is still likely to hold.

Our definition of safety-important ghost requires that all actions are non-safe by at least two sensors. Even in difficult conditions (e.g., heavy fog), this is unlikely to happen. The reason is that in such situations, systems that are affected by the difficult conditions (e.g., the lidar), will dictate a very defensive driving, as they can declare high velocity and lateral maneuver to be non-safe actions. As a result, the host AV will drive slowly, and then even if an emergency stop is required, it is not dangerous due to the low speed of driving. Therefore, our definition yields an adaptation of the driving style to the conditions of the road.

Building a Scalable Sensing System

The requirements from a sensing system, both in terms of comfort and safety, have been described. Next, an approach for building a sensing system that meets these requirements while being scalable is described. There are three main components of the sensing system. The first is long range, 360 degrees coverage, of the scene based on cameras. The three main advantages of cameras are: (1) high resolution, (2) texture, (3) price. The low price enables a scalable system. The texture enables to understand the semantics of the scene, including lane marks, traffic light, intentions of pedestrians, and more. The high resolution enables a long range of detection. Furthermore, detecting lane marks and objects in the same domain enables excellent semantic lateral accuracy. The two main disadvantages of cameras are: (1) the information is 2D and estimating longitudinal distance is difficult, (2) sensitivity to lighting conditions (low sun, bad weather). We overcome these difficulties using the next two components of our system.

The second component of our system is a semantic high-definition mapping technology, called Road Experience Management (REM) (which involves navigation based on target trajectories predetermined and stored for road segments along with an ability to determine precise locations along the target trajectories based on the location (e.g., in images) of recognized landmarks identified in the environment of the host vehicle). A common geometrical approach to map creation is to record a cloud of 3D points (obtained by a lidar) in the map creation process, and then, localization on the map is obtained by matching the existing lidar points to the ones in the map. There are several disadvantages of this approach. First, it requires a large memory per kilometer of mapping data, as we need to save many points. This necessitates an expensive communication infrastructure. Second, not all cars may be equipped with lidar sensors, and therefore, the map is updated very infrequently. This is problematic as changes in the road can occur (construction zones, hazards), and the "time-to-reflect-reality" of lidar-based mapping solutions is large. In contrast, REM follows a semantic-based approach. The idea is to leverage the large number of vehicles that are equipped with cameras and with software that detects semantically meaningful objects in the scene (lane marks, curbs, poles, traffic lights, etc.). Nowadays, many new cars are equipped with ADAS systems which can be leveraged for crowd-sourced map creation. Since the processing is done on the vehicle side, only a small amount of semantic data should be communicated to the cloud. This allows a very frequent update of the map in a scalable way. In addition, the autonomous vehicles can receive the small sized mapping data over existing communication platforms (the cellular network). Finally, highly accurate localization on the map can be obtained based on cameras, without the need for expensive lidars.

REM may be used for several purposes. First, it gives us a foresight on the static structure of the road (we can plan for a highway exit way in advance). Second, it gives us another source of accurate information of all of the static information, which together with the camera detections yields a robust view of the static part of the world. Third, it solves the problem of lifting the 2D information from the image plane into the 3D world as follows. The map describes all of the lanes as curves in the 3D world. Localization of the ego vehicle on the map enables to trivially lift every object on the road from the image plane to its 3D position. This yields a positioning system that adheres to the accuracy in semantic units. A third component of the system may be complementary radar and lidar systems. These systems may serve two purposes. First, they can offer extremely high levels of accuracy for augmenting safety. Second, they can give direct measurements on speed and distances, which further improves the comfort of the ride.

The following sections include technical lemmas and several practical considerations of the RSS system.

Lemma 9 For all x 0 [0, 0.1], it hold that $1-x>e^{-2x}$. Proof Let $f(x)=1-x-e^{-2x}$. Our goal is to show it is $\geq 0$ for x 0 [0, 0.1]. Note that $f(0)=0$, and it is therefore sufficient to have that $f(x)\geq 0$ in the aforementioned range. Explicitly, $f'(x)=-1+2e^{-2x}$. Clearly, $f'(0)=1$, and it is monotonically decreasing, hence it is sufficient to verify that $f'(0.1)>0$, which is easy to do numerically, $f'(0.1)\approx 0.637$.

Efficient Cautiousness Verification—Occluded Objects

As with non-occluded objects, we can check whether giving the current command, and after it, the DEP, is RSS. For this, we unroll our future until $t_{brake}$, when assuming the exposure time is 1 and we then command DEP, which suffices for cautiousness by definition. For all t'0 [0, $t_{brake}$], we check whether a blameful accident can occur—when assuming worst case over the occluded object. We use some of our worst case maneuvers and safe distance rules. We take an occluder based approach to find interest points—namely, for each occluding object, we calculate the worst case. This is a crucial efficiency-driven approach—a pedestrian, for example, can be hidden in many positions behind a car, and can perform many maneuvers, but there's a single worst case position and maneuver it can perform.

Next, consider the more elaborate case, that of the occluded pedestrian. Consider an occluded area behind a parked car. The closest points in an occluded area and the front/side of our car c may be found, for example, by their geometrical properties (triangles, rectangles) Formally, we can consider the occluded area as a union of a small number of convex regions of simple shape, and treat each of them separately. Furthermore, it can be seen that a pedestrian can run into the front of the car (under the $v_{limit}$ constraint) from the occluded area IFF he can do it using the shortest path possible. Using the fact that the maximal distance which can be travelled by the pedestrian is $v_{limit} \cdot t'$, we obtain a simple check for a frontal hit possibility. As for a side hit, we note that in case the path is shorter than vlimit·t', we are responsible IFF our lateral velocity is greater than μ, in the direction of the hit. Disclosed is an algorithm for cautiousness verification with respect to occluded pedestrians, which is described here in free pseudo code. The crucial part, that of checking existence of possibility of blameful accident with a pedestrian occluded by a vehicle, is done in the simple manner described above.

---

Algorithm 2: Check cautiousness w.r.t. an occluded pedestrian for t' ∈ [0, $t_{brake}$]
    Rolls self future until t'
    if Exists possibility of blameful accident with a
    pedestrian occluded by a vehicle
        return "non-cautious"
return On the Problem of Validating a Simulator As previously discussed, multi-agent safety may be difficult to validate statistically as it should be done in an "online" manner. One may argue that by building a simulator of the driving environment, we can validate the driving policy in the "lab." However, validating that the simulator faithfully represents reality is as hard as validating the policy itself. To see why this is true, suppose that the simulator has been validated in the sense that applying a driving policy π in the simulator leads to a probability of an accident of p̂, and the probability of an accident of π in the real world is p, with |p−p̂|<0. (We need that 0 will be smaller than $10^{-9}$.) Next replace the driving policy to be π'. Suppose that with probability of $10^{-8}$, π' performs a weird action that confuses human drivers and leads to an accident. It is possible (and even rather likely) that this weird action is not modeled in the simulator, without contradicting its superb capabilities in estimating the performance of the original policy π. This proves that even if a simulator has been shown to reflect reality for a driving policy π, it is not guaranteed to reflect reality for another driving policy.

The Lane-Based Coordinate System

One simplifying assumption that can be made in the RSS definition is that the road is comprised by adjacent, straight lanes, of constant width. The distinction between lateral and longitudinal axes, along with an ordering of longitudinal position, may play a significant role in RSS. Moreover, the definition of those directions is clearly based on the lane shape. A transformation from (global) positions on the plane, to a lane-based coordinate system reduces the problem to the original, "straight lane of constant width," case.

Assume that the lane's center is a smooth directed curve r on the plane, where all of its pieces, denoted $r^{(1)}, \ldots, r^{(k)}$, are either linear, or an arc. Note that smoothness of the curve implies that no pair of consecutive pieces can be linear. Formally, the curve maps a "longitudinal" parameter, Y 0 $[Y_{min}, Y_{max}] \subset I$, into the plane, namely, the curve is a function of the form $r:[Y_{min}, Y_{max}] \to I^2$. We define a continuous lane-width function $w:[Y_{min}, Y_{max}] \to I_+$, mapping the traffic lights to dictate the flow of traffic), may be fully handled by the concepts of route priority and two-way roads. Unstructured roads (for example parking areas), where there is no clear route definition may also be handled with RSS. RSS is still valid for this case, where the only needed modification is a way to define virtual routes and to assign each car to (possibly several) routes.

Route Priority

The concept of route priority is now introduced to deal with scenarios in which there are multiple different road geometries in one scene that overlap in a certain area. Examples, as shown in FIGS. 24A-D, include roundabouts, junctions, and merge into highways. A way to transform general lane geometry into a lane-based one, with coherent meaning for longitudinal and lateral axes, has been described. Now scenarios in which multiple routes of different road geometry exists are addressed. It follows that when two vehicles approach the overlap area, both perform a cut-in to the frontal corridor of the other one. This phenomenon cannot happen when two routes have the same geometry (as is the case of two adjacent highway lanes). Roughly speaking, the principle of route priority states that if routes $r_1, r_2$ overlap, and $r_1$ has priority over $r_2$, then a vehicle coming from $r_1$ that enters into the frontal corridor of a vehicle that comes from $r_2$ is not considered to perform a cut-in.

Figure 24D:
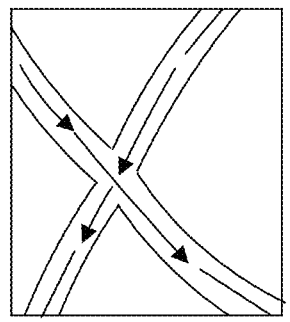
FIGS. 24A-24D illustrate four example scenarios consistent with the disclosed embodiments.
Figure 24C:
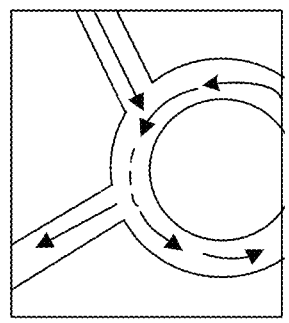
Figure 24B:
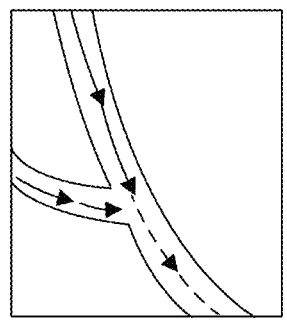
Figure 24A:
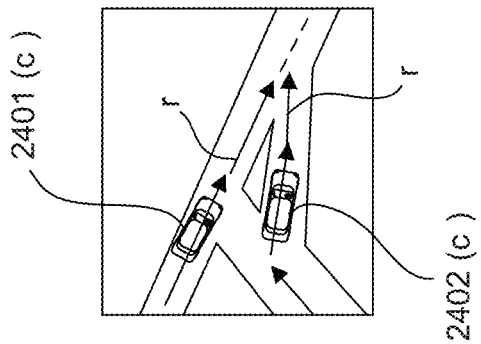

To explain the concept formally, recall that the blame of an accident depends on geometrical properties which are derived from the lane's coordinate system, and on worst case assumptions which rely on it too. Let $r_1, \ldots, r_k$ be the routes defining the road's structure. As a simple example, consider the merge scenario, as depicted in FIG. 24A. Assume two cars, 2401 ($c_1$) and 2402 ($c_2$) are driving on routes $r_1, r_2$ respectively, and $r_1$ is the prioritized route. For example, suppose that $r_1$ is a highway lane and $r_2$ is a merging lane. Having defined the route-based coordinate systems for each route, a first observation is that we can consider any maneuver in any route's coordinate system. For example, if we use $r_2$'s coordinate system, driving straight on $r_1$ seems like a merge into $r_2$'s left side. One approach to definition of RSS could be that each of the cars can perform a maneuver IFF ∀i 0 {1, 2}, if it is safe with respect to $r_i$. However, this implies that $c_1$, driving on the prioritized route, should be very conservative w.r.t. $r_2$, the merging route, as $c_2$ can drive exactly on the route, and hence can win by lateral position. This is unnatural, as cars on the highway have the right-of-way in this case. To overcome this problem, we define certain areas in which route priority is defined, and only some of the routes are considered as relevant for safety.

Figure 25:
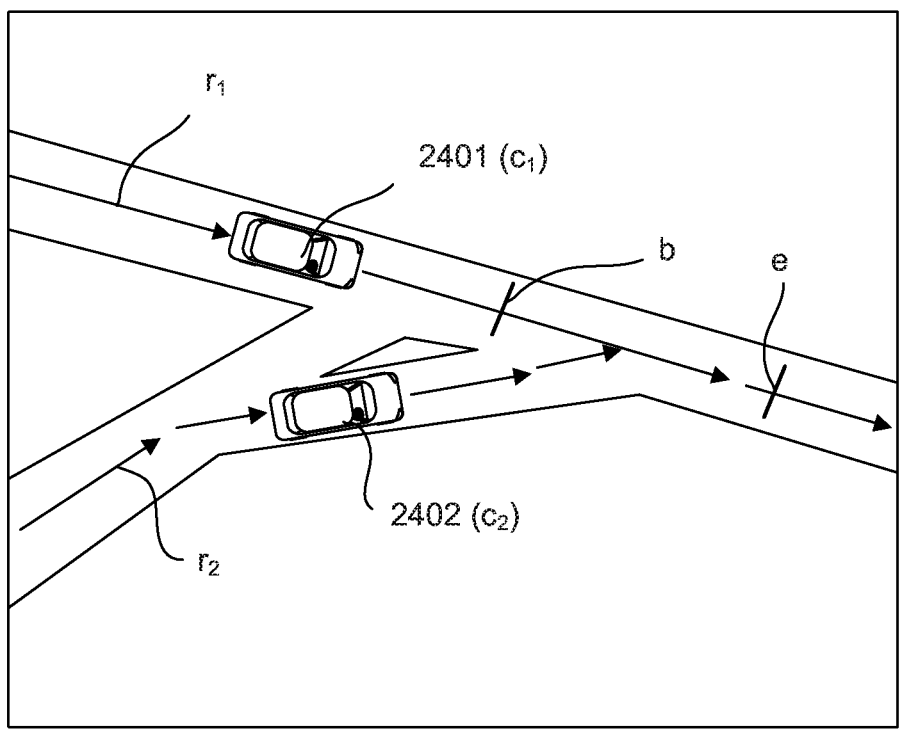
FIG. 25 illustrates an example scenario consistent with the disclosed embodiments.

Definition 22 (Accident Responsibility with Route Priority) Suppose $r_1, r_2$ are two routes with different geometry that overlap. We use $r_1 >_{[b,e]} r_2$ to symbolize that $r_1$ has priority over $r_2$ in the longitudinal interval [b, e] (FIG. 25) of $r_1$ coordinate system. Suppose there is an accident between cars $c_1, c_2$, driving on routes $r_1, r_2$. For i 0 {1,2}, let $b_i \subset \{1,2\}$ indicate the cars to blame for the accident if we consider the coordinate system of $r_1$. The blame for the accident is as follows:

If $r_1 >_{[b, e]} r_2$ and on the blame time w.r.t. $r_1$, one of the cars was in the interval [b,e] of the $r_1$-system's longitudinal axis, then the blame is according to $b_1$.

Otherwise, the blame is according to $b_1 \cup b2$.

Figure 26:
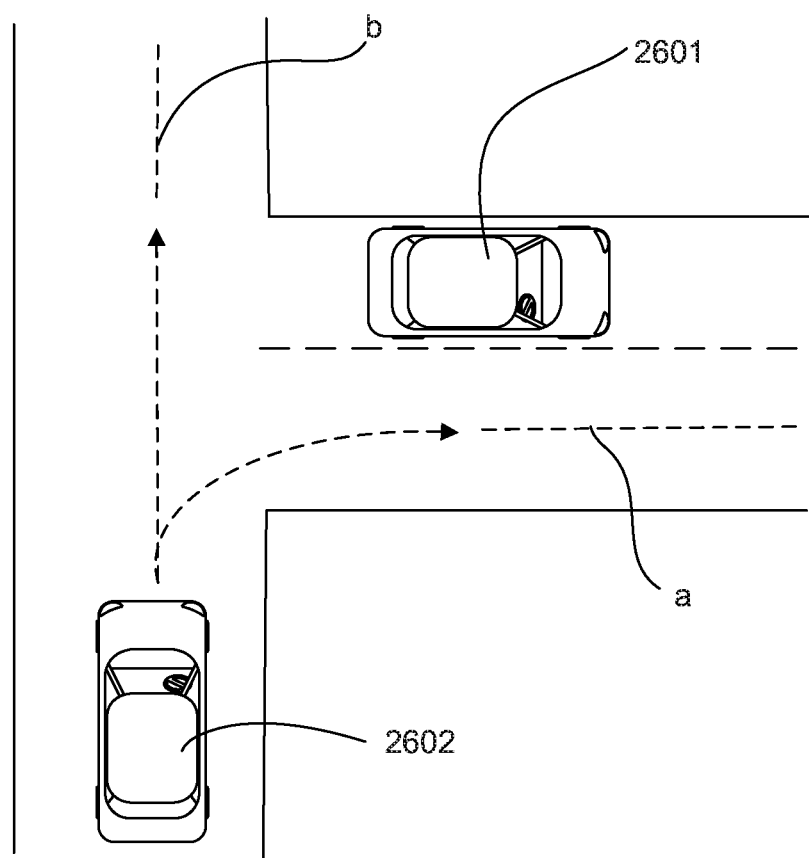
FIG. 26 illustrates an example scenario consistent with the disclosed embodiments.

To illustrate the definition, consider again the merge into highway example. The lines denoted "b" and "e" in FIG. 25 indicate the values of b, e for which $r_1 >_{[b,e]} r_2$. Thus, we allow cars to drive naturally on the highway, while implying merging cars must be safe with respect to those cars. In particular, observe that in the case a car 2401 $c_1$ drives at the center of the prioritized lane, with no lateral velocity, it will not be blamed for an accident with a car 2402 $c_2$ driving on a non-prioritized lane, unless 2402 $c_2$ has cut-in into 2401 $c_1$'s corridor at a safe distance. Note, that the end result is very similar to the regular RSS—this is exactly the same as a case where a car, on a straight road, tries to perform a lane change. Note that there may be cases where the route used by another agent is unknown. For example, in FIG. 26, car 2601 may not be able to determine whether a car 2602 will take path "a" or path "b". In such cases, RSS may be obtained by iteratively checking all possibilities.

Two-Way Traffic

To deal with two-way traffic, the modification to the blame definition comes through sharpening the parts which rely on rear/front relationships, as those are of a slightly different meaning in such cases. Consider two cars $c_1, c_2$ driving on some straight two lane road, in opposite longitudinal directions, namely, $v_{1,long} \cdot v_{2,long} < 0$. The direction of driving with respect to a lane may be negative in reasonable urban scenarios, such as a car deviating to the opposite lane to overtake a parked truck, or a car reversing into a parking spot. It is therefore required to extend the definition of the safe longitudinal distance which we have introduced for cases where negative longitudinal velocity was assumed to be un-realistic. Recall that a distance between $c_r, c_f$ was safe if a maximal brake by $c_f$ would allow enough of response time for $c_r$ to brake before crashing into $c_f$. In our case, we again consider the "worst-case" by the opposite car, in a slightly different manner: of course we do not assume that the "worst case" is that it speeds up towards us, but that it indeed will brake to avoid a crash—but only using some reasonable braking power. In order to capture the difference in responsibility between the cars, when one of them clearly drives at the opposite direction, we start by defining a "correct" driving direction.

In the RSS definition for parallel lanes, the relevant lane has been defined as the one whose center is closest to the cut-in position. We can now reduce ourselves to consideration of this lane (or, in the case of symmetry, deal with the two lanes separately, as in Definition 22). In the definition below, the term "heading" denotes the arc tangent (in radians) of the lateral velocity divided by the longitudinal velocity.

Definition 23 (($\mu_1$, $\mu_2$, $\mu_3$)-Winning by Correct Driving Direction) Assume $c_1$, $c_2$ are driving in opposite directions, namely $v_{1,long} \cdot v_{2,long} < 0$. Let $x_i, h_i$ be their lateral positions and headings w.r.t. the lane. We say that $c_1$ ($\mu_1$, $\mu_2$, $\mu_3$)-Wins by Correct Driving Direction if all of the following conditions hold:
$|h_1| < \mu_1$,
$|h_2 - \pi| < \mu_2$,
$|x_1| < \mu_3$.
The indicator of this event is denoted by $W_{CDD}(i)$.

In words, $c_1$ wins if it drives close to the lane canter, in the correct direction, while $c_2$ takes the opposite direction. At most one car can win, and it can be that none of the cars does so. Intuitively, assume there is a crash in the discussed situation. It is reasonable to put more responsibility over a car $c_1$, that loses by Correct Driving Direction. This is done by re-defining $a_{max,brake}$ for the case that a car wins by correct driving direction.

Definition 24 (Reasonable Braking Power) Let $a_{max,brake,wedd} > 0$ be a constant, smaller than $a_{max,brake}$. Assume $c_1$, $c_2$ are driving in opposite directions. The Reasonable Braking Power of each car $c_i$, denoted $RBP_i$, is $a_{max,brake,wedd}$ if $c_i$ ($\mu_1$, $\mu_2$, $\mu_3$)-Wins by Correct Driving Direction and $a_{max,brake}$ otherwise.

The exact values of $a_{max,brake,wedd}$, $a_{max,brake}$, for the cases of winning/not-winning by correct driving direction, are constants which should be defined, and can depend on the type of road and the lanes driven by each car. For example, in a narrow urban street, it may be the case that winning by a correct driving direction does not imply a much lesser brake value: in dense traffic, we do expect a car to brake at similar forces, either when someone clearly deviated into its lane or not. However, consider an example of a rural two way road, where high speeds are allowed. When deviating to the opposite lane, cars which drive at the correct direction cannot be expected to apply a very strong braking power to avoid hitting the host vehicle—the host vehicle will have more responsibility than them. Different constants can be defined for the case when two cars are at the same lane, with one of them reversing into a parking spot.

The safety distance between cars which are driving in opposite directions, and immediately derive its exact value, is next defined.

Definition 25 (Safe Longitudinal Distance—Two-Way Traffic) A longitudinal distance between a car $c_1$ and another car $c_2$ which are driving in opposite directions and are both in the frontal corridors of each other, is safe w.r.t. a response time p if for any acceleration command a, $|a| < a_{max,accel}$, performed by $c_1$, $c_2$ until time p, if $c_1$ and $c_2$ will apply their Reasonable Braking Power from time p until a full stop then they won't collide.

Lemma 10 Let $c_1$, $c_2$ as in Definition 25. Let $RBP_i$, $a_{max,accel}$ be the reasonable braking (for each i) and acceleration commands, and let p be the cars' response time. Let $v_1$, $v_2$ be the longitudinal velocities of the cars, and let $l_1$, $l_2$ be their lengths. Define $v_{i,p,max} = |v_i| + p \cdot a_{max,accel}$. Let $L = (l_r + l_f)/2$. Then, the minimal safe longitudinal distance is:

$$d_{min} = L + \sum_{i=1}^{2}\left(\frac{|v_i| + v_{i,p,max}}{2}p + \frac{v_{i,p,max}^2}{2RBP_i}\right)$$

It can be seen that the term in the sum is the maximal distance travelled by each car until it reaches full stop, when performing the maneuver from Definition 25. Therefore, in order for the full stop to be at a distance greater than L, the initial distance must be larger than this sum and an additional term of L.

The same blame time definition of RSS, with the non-safe longitudinal distance as defined in Definition 25, is used to define the blame/accident responsibility for a two-way traffic scenario.

Definition 26 (Blame in Two-Way Traffic) The Blame in Two-Way Traffic of an accident between cars $c_1$, $c_2$ driving in opposite directions, is a function of the state at the Blame Time, and is defined as follows:
 If the Blame Time is also a cut-in time, the blame is defined as in the regular RSS definition.
 Otherwise, for every i, the blame is on $c_i$ if at some I that happens after the blame time, $c_i$ was not braking at a power of at least $RBP_i$.

For example, assume a safe cut-in occurred before the blame time. For example, $c_1$ has deviated to the opposite lane, performed a cut-in into $c_2$'s corridor, at a safe distance. Note that $c_2$ wins by correct driving direction, and hence this distance can be very large—we do not expect $c_2$ to perform strong braking power, but only the Reasonable Braking Power. Then, both cars have responsibility not to crash into each other. However, if the cut-in was not in a safe-distance, we use the regular definition, noting that $c_2$ will not be blamed if it drove in the center of its lane, without lateral movement. The blame will be solely on $c_1$. This allows a car to drive naturally at the center of its lane, without worrying about traffic which may unsafely deviate into its corridor. On the other hand, safe deviation to the opposite lane, a common maneuver required in dense urban traffic, is allowed. Considering the example of a car which initiates a reverse parking maneuver, it should start reversing while making sure the distance to cars behind it is safe.

Traffic Lights

Figure 27:
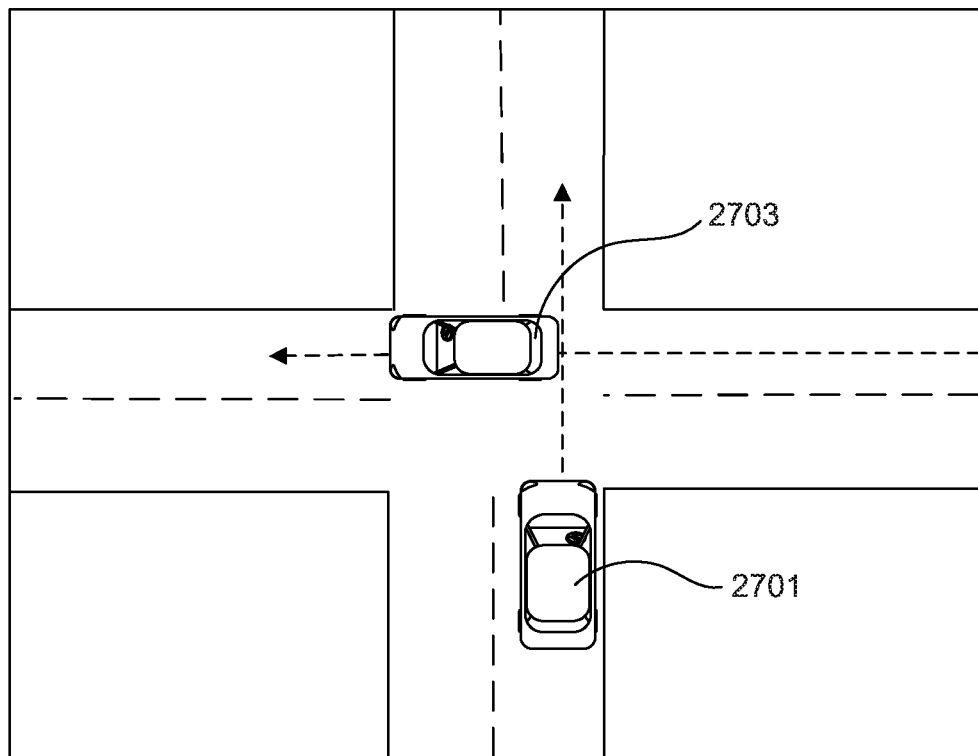
FIG. 27 illustrates an example scenario consistent with the disclosed embodiments.

In scenarios that include intersections with traffic lights, one might think that the simple rule for traffic lights scenarios is "if one car's route has the green light and the other car's route has a red light, then the blame is on the one whose route has the red light". However, this is not the correct rule, especially in all cases. Consider for example the scenario depicted in FIG. 27. Even if the car 2701 is on a route having a green light, we do not expect it to ignore car 2703 that is already in the intersection. The correct rule is that the route that has a green light has priority over routes that have a red light. Therefore, we obtain clear reduction from traffic lights to the route priority concept we have described previously.

Unstructured Road

Turning to roads where no clear route geometry can be defined, consider first a scenario where there is no lane structure at all (e.g. a parking lot). A way to ensure that there will be no accidents can be to require that every car will drive in a straight line, while if a change of heading occurs, it must be done when there are no close cars in my surrounding. The rationale behind this is that a car can predict what other cars will do, and behave accordingly. If other cars deviate from this prediction (by changing heading), it is done with a long enough distance and therefore there may be enough time to correct the prediction. When there is lane structure, it may enable smarter predictions on what other cars will do. If there is no lane structure at all, a car will continue according to its current heading. Technically speaking, this is equivalent to assigning every car to a virtual straight route according to its heading. Next, consider the scenario in a large unstructured roundabout (e.g., around the Arc de Triomphe in Paris). Here, a sensible prediction is to assume that a car will continue according to the geometry of the roundabout, while keeping its offset. Technically, this is equivalent to assigning every car to a virtual arc route according to its current offset from the center of the roundabout.

The above described driving policy system (e.g., the RL system) may be implemented together with one or more of the described accident liability rules to provide a navigational system that takes into account potential accident liability when deciding on a particular navigational instruction to implement. Such rules may be applied during the planning phase; e.g., within a set of programmed instructions or within a trained model such that a proposed navigational action is developed by the system already in compliance with the rules. For example, a driving policy module may account for or be trained with, for example, one or more navigational rules upon which RSS is based. Additionally or alternatively, the RSS safety constraint may be applied as a filter layer through which all proposed navigational actions proposed by the planning phase are tested against the relevant accident liability rules to ensure that the proposed navigational actions are in compliance. If a particular action is in compliance with the RSS safety constraint, it may be implemented. Otherwise, if the proposed navigational action is not in compliance with the RSS safety constraint (e.g., if the proposed action could result in accident liability to the host vehicle based on one or more of the above-described rules), then the action is not taken.

In practice, a particular implementation may include a navigation system for a host vehicle. The host vehicle may be equipped with an image capture device (e.g., one or more cameras such as any of those described above) that, during operation, captures images representative of an environment of the host vehicle. Using the image information, a driving policy may take in a plurality of inputs and output a planned navigational action for accomplishing a navigational goal of the host vehicle. The driving policy may include a set of programmed instructions, a trained network, etc., that may receive various inputs (e.g., images from one or more cameras showing the surroundings of the host vehicle, including target vehicles, roads, objects, pedestrians, etc.; output from LIDAR or RADAR systems; outputs from speed sensors, suspension sensors, etc.; information representing one or more goals of the host vehicle—e.g., a navigational plan for delivering a passenger to a particular location, etc.). Based on the input, the processor may identify a target vehicle in the environment of the host vehicle, e.g., by analyzing camera images, LIDAR output, RADAR output, etc. In some embodiments, the processor may identify a target vehicle in the environment of the host vehicle by analyzing one or more inputs, such as one or more camera images, LIDAR output, and/or RADAR output. Further, in some embodiments, the processor may identify a target vehicle in the environment of the host vehicle based on an agreement of a majority or combination of sensor inputs (e.g., by analyzing one or more camera images, LIDAR output, and/or RADAR output, and receiving a detection result identifying the target vehicle based on a majority agreement or combination of the inputs).

Based on the information available to the driving policy module, an output may be provided in the form of one or more planned navigational actions for accomplishing a navigational goal of the host vehicle. In some embodiments, the RSS safety constraint may be applied as a filter of the planned navigational actions. That is, the planned navigational action, once developed, can be tested against at least one accident liability rule (e.g., any of the accident liability rules discussed above) for determining potential accident liability for the host vehicle relative to the identified target vehicle. And, as noted, if the test of the planned navigational action against the at least one accident liability rule indicates that potential accident liability may exist for the host vehicle if the planned navigational action is taken, then the processor may cause the host vehicle not to implement the planned navigational action. On the other hand, if the test of the planned navigational action against the at least one accident liability rule indicates that no accident liability would result for the host vehicle if the planned navigational action is taken, then the processor may cause the host vehicle to implement the planned navigational action.

In some embodiments, the system may test a plurality of potential navigational actions against the at least one accident liability rule. Based on the results of the test, the system may filter the potential navigational actions to a subset of the plurality of potential navigational actions. For example, in some embodiments, the subset may include only the potential navigational actions for which the test against the at least one accident liability rule indicates that no accident liability would result for the host vehicle if the potential navigational actions were taken. The system may then score and/or prioritize the potential navigational actions without accident liability and select one of the navigational actions to implement based on, for example, an optimized score, or a highest priority. The score and/or priority may be based, for example, one or more factors, such as the potential navigational action viewed as being the most safe, most efficient, the most comfortable to passengers, etc.

In some instances, the determination of whether to implement a particular planned navigational action may also depend on whether a default emergency procedure would be available in a next state following the planned action. If a DEP is available, the RSS filter may approve the planned action. On the other hand, if a DEP would not be available, the next state may be deemed an unsafe one, and the planned navigational action may be rejected. In some embodiments, the planned navigational action may include at least one default emergency procedure.

One benefit of the described system is that to ensure safe actions by the vehicle, only the host vehicle's actions relative to a particular target vehicle need be considered. Thus, where more than one target vehicle is present, the planned action for the host vehicle may be tested for an accident liability rule sequentially with respect to the target vehicles in an influence zone in the vicinity of the host vehicle (e.g., within 25 meters, 50 meters, 100 meters, 200 meters, etc.). In practice, the at least one processor may be further programmed to: identify, based on analysis of the at least one image representative of an environment of the host vehicle (or based on LIDAR or RADAR information, etc.), a plurality of other target vehicles in the environment of the host vehicle and repeat the test of the planned navigational action against at least one accident liability rule for determining potential accident liability for the host vehicle relative to each of the plurality of other target vehicles. If the repeated tests of the planned navigational action against the at least one accident liability rule indicate that potential accident liability may exist for the host vehicle if the planned navigational action is taken, then the processor may cause the host vehicle not to implement the planned navigational action. If the repeated tests of the planned navigational action against the at least one accident liability rule indicate that no accident liability would result for the host vehicle if the planned navigational action is taken, then the processor may cause the host vehicle to implement the planned navigational action.

As noted, any of the rules described above can be used as the basis for the RSS safety test. In some embodiments, the at least one accident liability rule includes a following rule defining a distance behind the identified target vehicle within which the host vehicle may not proceed without a potential for accident liability. In other cases, the at least one accident liability rule includes a leading rule defining a distance forward of the identified target vehicle within which the host vehicle may not proceed without a potential for accident liability.

While the system described above can apply the RSS safety test to a single planned navigational action to test compliance with the rule that the host vehicle should not take any action for which it would be liable for a resulting accident, the test may be applied to more than one planned navigational action. For example, in some embodiments, the at least one processor, based on application of at least one driving policy may determine two or more planned navigational actions for accomplishing a navigational goal of the host vehicle. In these situations, the processor may test each of the two or more planned navigational actions against at least one accident liability rule for determining potential accident liability. And, for each of the two or more planned navigational actions, if the test indicates that potential accident liability may exist for the host vehicle if a particular one of the two or more planned navigational actions is taken, the processor may cause the host vehicle not to implement the particular one of the planned navigational actions. On the other hand, for each of the two or more planned navigational actions, if the test indicates that no accident liability would result for the host vehicle if a particular one of the two or more planned navigational actions is taken, then the processor may identify the particular one of the two or more planned navigational actions as a viable candidate for implementation. Next, the processor may select a navigational action to be taken from among the viable candidates for implementation based on at least one cost function and cause the host vehicle to implement the selected navigational action.

Because an implementation of RSS relates to a determination of relative potential liability for accidents between the host vehicle and one or more target vehicles, along with testing planned navigational actions for safety compliance, the system may track accident liability potential for encountered vehicles. For example, not only may the system be able to avoid taking an action for which a resulting accident would result in liability to the host vehicle, but the host vehicle systems may also be able to track one or more target vehicles and identify and track which accident liability rules have been broken by those target vehicles. In some embodiments, an accident liability tracking system for a host vehicle may include at least one processing device programmed to receive, from an image capture device, at least one image representative of an environment of the host vehicle and analyze the at least one image to identify a target vehicle in the environment of the host vehicle. Based on analysis of the at least one image, the processor may include programming to determine one or more characteristics of a navigational state of the identified target vehicle. The navigational state may include various operational characteristics of the target vehicle, such as vehicle speed, proximity to a center of a lane, lateral velocity, direction of travel, distance from the host vehicle, heading, or any other parameter that may be used to determine potential accident liability based on any of the rules described above. The processor may compare the determined one or more characteristics of the navigational state of the identified target vehicle to at least one accident liability rule (e.g., any of the rules described above, such as winning by lateral velocity, directional priority, winning by proximity to lane center, following or leading distance and cut-in, etc.). Based on comparison of the state to one or more rules, the processor may store at least one value indicative of potential accident liability on the part of the identified target vehicle. And in the case of an accident, the processor may provide an output of the stored at least one value (e.g., via any suitable data interface, either wired or wireless). Such an output may be provided, for example, after an accident between the host vehicle and at least one target vehicle, and the output may be used for or may otherwise provide an indication of liability for the accident.

The at least one value indicative of potential accident liability may be stored at any suitable time and under any suitable conditions. In some embodiments, the at least one processing device may assign and store a collision liability value for the identified target vehicle if it is determined that the host vehicle cannot avoid a collision with the identified target vehicle.

The accident liability tracking capability is not limited to a single target vehicle, but rather can be used to track potential accident liability for a plurality of encountered target vehicles. For example, the at least one processing device may be programmed to detect a plurality of target vehicles in the environment of the host vehicle, determine navigational state characteristics for each of the plurality of target vehicles, and determine and store values indicative of potential accident liability on the part of respective ones of the plurality of target vehicles based on comparisons of the respective navigational state characteristics for each of the target vehicles to the at least one accident liability rule. As noted, the accident liability rules used as the basis for liability tracking may include any of the rules described above or any other suitable rule. For example, the at least one accident liability rule may include a lateral velocity rule, a lateral position rule, a driving direction priority rule, a traffic light-based rule, a traffic sign-based rule, a route priority rule, etc. The accident liability tracking function may also be coupled with safe navigation based on RSS considerations (e.g., whether any action of the host vehicle would result in potential liability for a resulting accident).

In addition to navigating based on accident liability considerations according to RSS, navigation can also be considered in terms of vehicle navigational states and a determination of whether a particular, future navigational state is deemed safe (e.g., whether a DEP exists such that accidents may be avoided or any resulting accident will not be deemed the fault of the host vehicle, as described in detail above). The host vehicle can be controlled to navigate from safe state to safe state. For example, in any particular state, the driving policy may be used to generate one or more planned navigational actions, and those actions may be tested by determining if the predicted future states corresponding to each planned action would offer a DEP. If so, the planned navigational action or actions providing the DEP may be deemed safe and may qualify for implementation.

In some embodiments, a navigation system for a host vehicle may include at least one processing device programmed to: receive, from an image capture device, at least one image representative of an environment of the host vehicle, determine, based on at least one driving policy, a planned navigational action for accomplishing a navigational goal of the host vehicle; analyze the at least one image to identify a target vehicle in the environment of the host vehicle; test the planned navigational action against at least one accident liability rule for determining potential accident liability for the host vehicle relative to the identified target vehicle; if the test of the planned navigational action against the at least one accident liability rule indicates that potential accident liability may exists for the host vehicle if the planned navigational action is taken, then cause the host vehicle not to implement the planned navigational action; and if the test of the planned navigational action against the at least one accident liability rule indicates that no accident liability would result for the host vehicle if the planned navigational action is taken, then cause the host vehicle to implement the planned navigational action.

In some embodiments, a navigation system for a host vehicle, may include at least one processing device programmed to: receive, from an image capture device, at least one image representative of an environment of the host vehicle; determine, based on at least one driving policy, a plurality of potential navigational actions for the host vehicle; analyze the at least one image to identify a target vehicle in the environment of the host vehicle; test the plurality of potential navigational actions against at least one accident liability rule for determining potential accident liability for the host vehicle relative to the identified target vehicle; select one of the potential navigational actions for which the test indicates that no accident liability would result for the host vehicle if the selected potential navigational action is taken; and cause the host vehicle to implement the selected potential navigational action. In some instances, the selected potential navigational action may be selected from a subset of the plurality of potential navigational actions for which the test indicates that no accident liability would result for the host vehicle if any of the subset of the plurality of potential navigational action were taken. Further, in some instances, the selected potential navigational action may be selected according to a scoring parameter.

In some embodiments, a system for navigating a host vehicle may include at least one processing device programmed to receive, from an image capture device, at least one image representative of an environment of the host vehicle and determine, based on at least one driving policy, a planned navigational action for accomplishing a navigational goal of the host vehicle. The processor may also analyze the at least one image to identify a target vehicle in the environment of the host vehicle; determine a next-state distance between the host vehicle and the target vehicle that would result if the planned navigational action was taken; determine a current maximum braking capability of the host vehicle and a current speed of the host vehicle; determine a current speed of the target vehicle and assume a maximum braking capability of the target vehicle based on at least one recognized characteristic of the target vehicle; and implement the planned navigational action if, given the maximum braking capability of the host vehicle and current speed of the host vehicle, the host vehicle can be stopped within a stopping distance that is less than the determined next-state distance summed together with a target vehicle travel distance determined based on the current speed of the target vehicle and the assumed maximum braking capability of the target vehicle. The stopping distance may further include a distance over which the host vehicle travels during a reaction time without braking.

The recognized characteristic of the target vehicle upon which the maximum braking capability of the target vehicle is determined may include any suitable characteristic. In some embodiments, the characteristic may include a vehicle type (e.g., motorcycle, car, bus, truck, each of which may be associated with different braking profiles), vehicle size, a predicted or known vehicle weight, a vehicle model (e.g., that may be used to look up a known braking capability), etc.

In some cases, the safe state determination may be made relative to more than one target vehicle. For example, in some cases a safe state determination (based on distance and braking capabilities) may be based on two or more identified target vehicles leading a host vehicle. Such a determination may be useful especially where information regarding what is ahead of the foremost target vehicle is not available. In such cases, it may be assumed for purposes of determining a safe state, safe distance, and/or available DEP that the foremost detectable vehicle will experience an imminent collision with an immovable or nearly immovable obstacle, such that the target vehicle following may reach a stop more quickly than its own braking profile allows (e.g., the second target vehicle may collide with a first, foremost vehicle and therefore reach a stop more quickly than expected max braking conditions). In such cases, it may be important to base the safe state, safe following distance, DEP determination upon the location of the foremost identified target vehicle relative to the host vehicle.

In some embodiments, such a safe state to safe state navigation system may include at least one processing device programmed to receive, from an image capture device, at least one image representative of an environment of the host vehicle. Here, as with other embodiments, the image information captured by an image capture device (e.g., a camera) may be supplemented with information obtained from one or more other sensors, such as a LIDAR or RADAR system. In some embodiments, the image information used to navigate may even originate from a LIDAR or RADAR system, rather than from an optical camera. The at least one processor may determine, based on at least one driving policy, a planned navigational action for accomplishing a navigational goal of the host vehicle. The processor may analyze the at least one image (e.g., obtained from any of a camera, a RADAR, a LIDAR, or any other device from which an image of the environment of the host vehicle may be obtained, whether optically based, distance map-based, etc.) to identify a first target vehicle ahead of the host vehicle and a second target vehicle ahead of the first target vehicle. The processor may then determine a next-state distance between the host vehicle and the second target vehicle that would result if the planned navigational action was taken. Next, the processor may determine a current maximum braking capability of the host vehicle and a current speed of the host vehicle. The processor may implement the planned navigational action if, given the maximum braking capability of the host vehicle and the current speed of the host vehicle, the host vehicle can be stopped within a stopping distance that is less than the determined next-state distance between the host vehicle and the second target vehicle.

That is, if the host vehicle processor determines that there is enough distance to stop in a next-state distance between the leading visible target vehicle and the host vehicle, without collision or without collision for which responsibility would attach to the host vehicle and assuming the leading visible target vehicle will suddenly at any moment come to a complete stop, then the processor of the host vehicle may take the planned navigational action. On the other hand, if there would be insufficient room to stop the host vehicle without collision, then the planned navigational action may not be taken.

Additionally, while the next-state distance may be used as a benchmark in some embodiments, in other cases, a different distance value may be used to determine whether to take the planned navigational action. In some cases, as in the one described above, the actual distance in which the host vehicle may need to be stopped to avoid a collision may be less than the predicted next-state distance. For example, where the leading, visible target vehicle is followed by one or more other vehicles (e.g., the first target vehicle in the example above), the actual predicted required stopping distance would be the predicted next-state distance less the length of the target vehicle(s) following the leading visible target vehicle. If the leading visible target vehicle comes to an immediate stop, it may be assumed that the following target vehicles would collide with the leading visible target vehicle and, therefore, they too would need to be avoided by the host vehicle to avoid a collision. Thus, the host vehicle processor can evaluate the next-state distance less the summed lengths of any intervening target vehicles between the host vehicle and the leading, visible/detected target vehicle to determine whether there would be sufficient space to bring the host vehicle to a halt under max braking conditions without a collision.

In other embodiments, the benchmark distance for evaluating a collision between the host vehicle and one or more leading target vehicles may be greater than the predicted next-state distance. For example, in some cases, the leading visible/detected target vehicle may come to a quick, but not immediate stop, such that the leading visible/detected target vehicle travels a short distance after the assumed collision. For example, if that vehicle hits a parked car, the colliding vehicle may still travel some distance before coming to a complete stop. The distance traveled after the assumed collision may be less than an assumed or determined minimum stopping distance for the relevant target vehicle. Thus, in some cases, the processor of the host vehicle may lengthen the next-state distance in its evaluation of whether to take the planned navigational action. For example, in this determination, the next-state distance may be increased by 5%, 10%, 20%, etc. or may be supplemented with a predetermined fixed distance (10 m, 20 m, 50 m, etc.) to account for a reasonable distance that the leading/visible target vehicle may travel after an assumed imminent collision.

In addition to lengthening the next-state distance in the evaluation by an assumed distance value, the next-state distance may be modified by both accounting for a distance traveled after collision by the leading visible/detected target vehicle and the lengths of any target vehicles following the leading visible/detected target vehicle (which may be assumed to pile up with the leading visible/detected vehicle after its sudden stop).

In addition to basing the determination on whether to take the planned navigational action on the next-state distance between the host vehicle and the leading visible/detected target vehicle (as modified by considering the post-collision movement of the leading visible/detected target vehicle and/or the lengths of vehicles following the leading visible/detected target vehicle), the host vehicle may continue to account for the braking capability of one or more leading vehicles in its determination. For example, the host vehicle processor may continue to determine a next-state distance between the host vehicle and the first target vehicle (e.g., a target vehicle following the leading visible/detected target vehicle) that would result if the planned navigational action was taken; determine a current speed of the first target vehicle and assume a maximum braking capability of the first target vehicle based on at least one recognized characteristic of the first target vehicle; and not implement the planned navigational action if, given the maximum braking capability of the host vehicle and the current speed of the host vehicle, the host vehicle cannot be stopped within a stopping distance that is less than the determined next-state distance between the host vehicle and the first target vehicle summed together with a first target vehicle travel distance determined based on the current speed of the first target vehicle and the assumed maximum braking capability of the first target vehicle. Here, as in the examples described above, the recognized characteristic of the first target vehicle may include a vehicle type, a vehicle size, a vehicle model, etc.

In some cases (e.g., through actions of other vehicles), the host vehicle may determine that a collision is imminent and unavoidable. In such cases, the processor of the host vehicle may be configured to select a navigational action (if available) for which the resulting collision would result in no liability to the host vehicle. Additionally or alternatively, the processor of the host vehicle may be configured to select a navigational action that would offer less potential damage to the host vehicle or less potential damage to a target object than the current trajectory or relative to one or more other navigational options. Further, in some cases, the host vehicle processor may select a navigational action based on considerations of the type of object or objects for which a collision is expected. For example, when faced with a collision with a parked car for a first navigational action or with an immovable object for a second navigational action, the action offering the lower potential damage to the host vehicle (e.g., the action resulting in a collision with the parked car) may be selected. When faced with a collision with a car moving in a similar direction as the host vehicle for a first navigational action or with a parked car for a second navigational action, the action offering the lower potential damage to the host vehicle (e.g., the action resulting in a collision with the moving car) may be selected. When faced with a collision with a pedestrian as a result of a first navigational action or with any other object for a second navigational action, the action offering any alternative to colliding with a pedestrian may be selected.

In practice, the system for navigating a host vehicle may include at least one processing device programmed to receive, from an image capture device, at least one image representative of an environment of the host vehicle (e.g., a visible image, LIDAR image, RADAR image, etc.); receive from at least one sensor an indicator of a current navigational state of the host vehicle; and determine, based on analysis of the at least one image and based on the indicator of the current navigational state of the host vehicle, that a collision between the host vehicle and one or more objects is unavoidable. The processor may evaluate available alternatives. For example, the processor may determine, based on at least one driving policy, a first planned navigational action for the host vehicle involving an expected collision with a first object and a second planned navigational action for the host vehicle involving an expected collision with a second object. The first and second planned navigational actions may be tested against at least one accident liability rule for determining potential accident liability. If the test of the first planned navigational action against the at least one accident liability rule indicates that potential accident liability may exist for the host vehicle if the first planned navigational action is taken, then the processor may cause the host vehicle not to implement the first planned navigational action. If the test of the second planned navigational action against the at least one accident liability rule indicates that no accident liability would result for the host vehicle if the second planned navigational action is taken, then the processor may cause the host vehicle to implement the second planned navigational action. The objects may include other vehicles or non-vehicle objects (e.g., road debris, trees, poles, signs, pedestrians, etc.).

The following figures and discussion provide examples of various scenarios that may occur when navigating and implementing the disclosed systems and methods. In these examples, a host vehicle may avoid taking an action that would result in blame attributable to the host vehicle for a resulting accident if the action is taken.

Figure 28A:
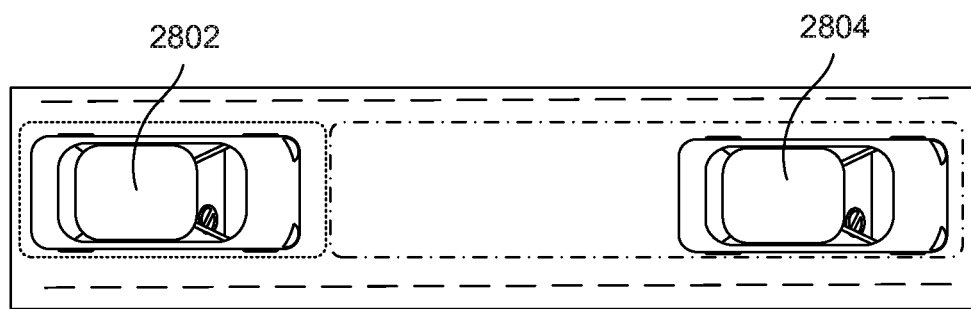
FIGS. 28A and 28B illustrate an example of a scenario in which a vehicle is following another vehicle consistent with the disclosed embodiments.
Figure 28B:
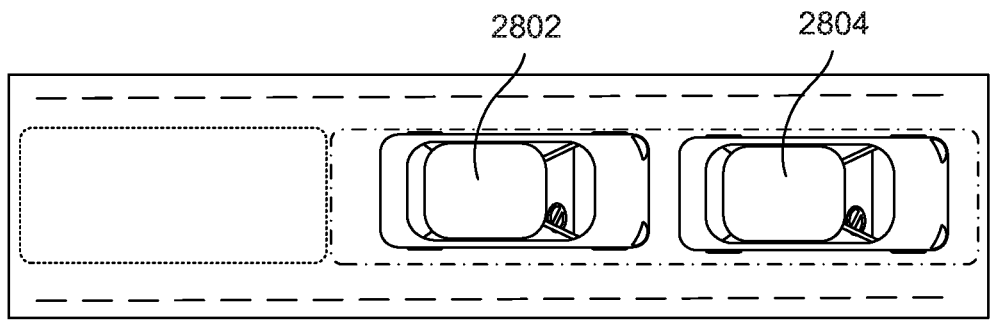

FIGS. 28A and 28B illustrate example following scenarios and rules. As shown in FIG. 28A, the region surrounding vehicle 2804 (e.g., a target vehicle) represents a minimum safe distance corridor for vehicle 2802 (e.g., a host vehicle), which is traveling in the lane a distance behind vehicle 2804. According to one rule consistent with disclosed embodiments, to avoid an accident in which blame is attributable to vehicle 2802, vehicle 2802 must maintain a minimum safe distance by remaining in the region surrounding vehicle 2802. In contrast, as shown in FIG. 28B, if vehicle 2804 brakes, then vehicle 2802 will be at fault if there is an accident.

Figure 29A:
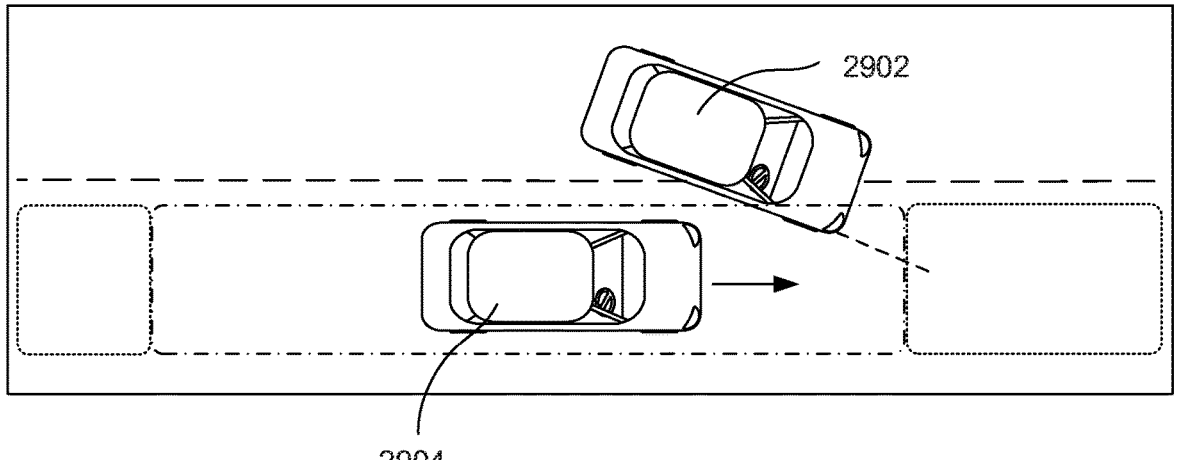
FIGS. 29A and 29B illustrate example blame in cut-in scenarios consistent with the disclosed embodiments.
Figure 29B:
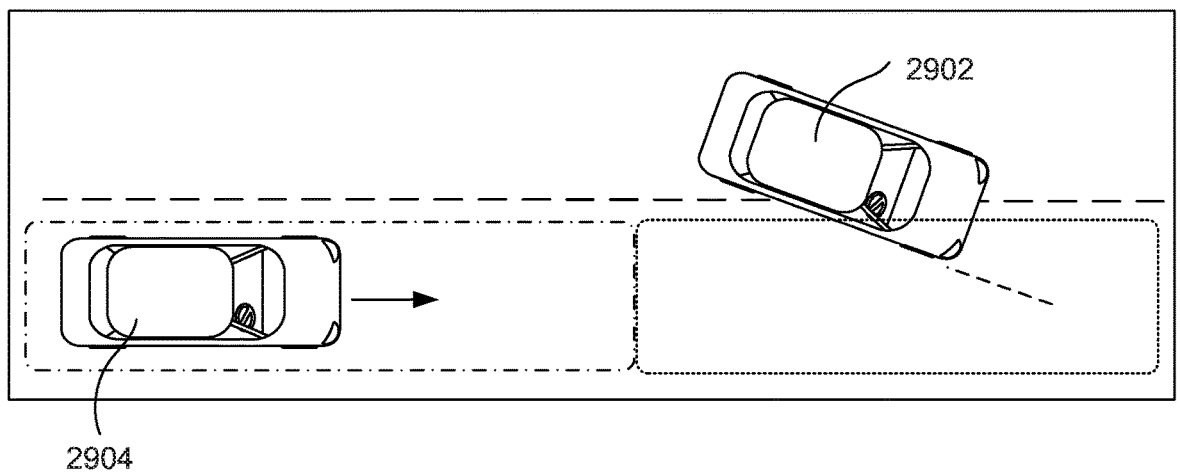

FIGS. 29A and 29B illustrate example blame in cut-in scenarios. In these scenarios, safe corridors around vehicle 2902 determine the fault in cut-in maneuvers. As shown in FIG. 29A, vehicle 2902 is cutting in front of vehicle 2904, violating the safe distance (depicted by the region surrounding vehicle 2904) and therefore is at fault. As show in FIG. 29B, vehicle 2902 is cutting in front of vehicle 2904, but maintains a safe distance in front of vehicle 2904.

Figure 30A:
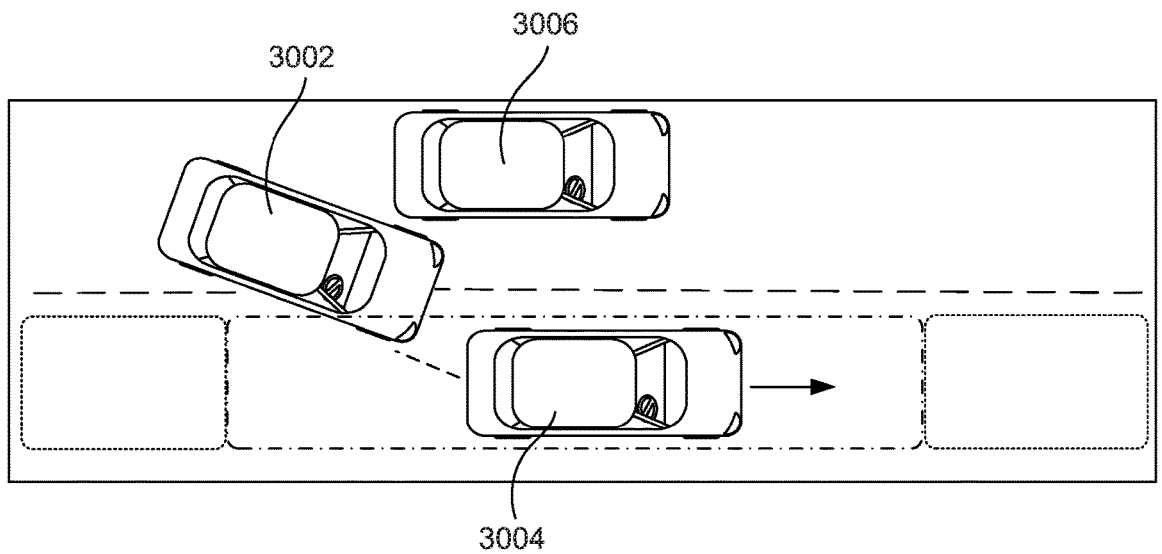
FIGS. 30A and 30B illustrate example blame in cut-in scenarios consistent with the disclosed embodiments.
Figure 30B:
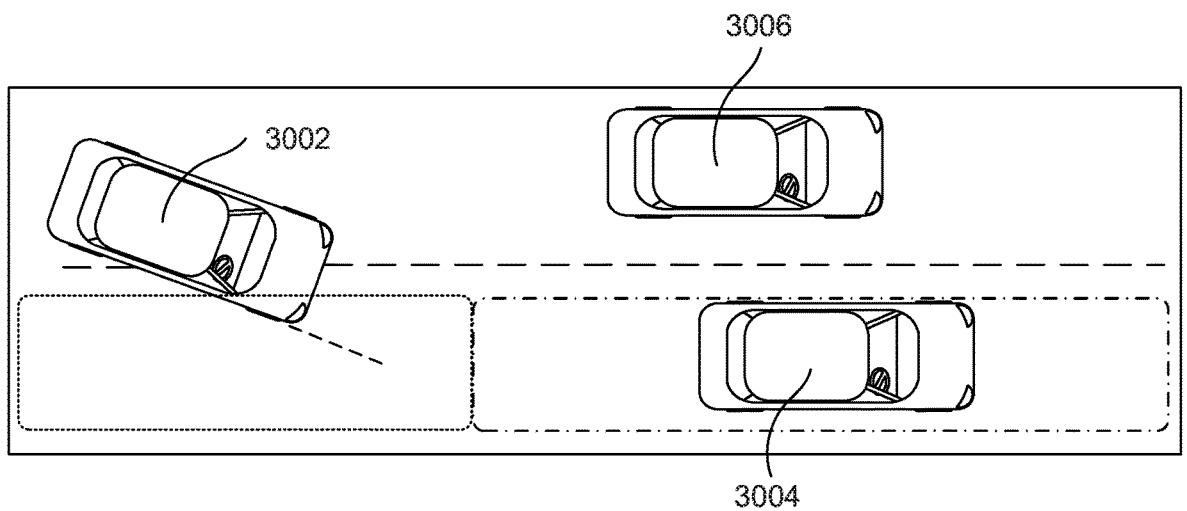

FIGS. 30A and 30B illustrate example blame in cut-in scenarios. In these scenarios, safe corridors around vehicle 3004 determine whether vehicle 3002 is at fault. In FIG. 30A, vehicle 3002 is traveling behind vehicle 3006 and changes into the lane in which target vehicle 3004 is traveling. In this scenario, vehicle 3002 violates a safe distance and therefore is at fault if there is an accident. In FIG. 30B, vehicle 3002 cuts in behind vehicle 3004 and maintains a safe distance.

Figure 31A:
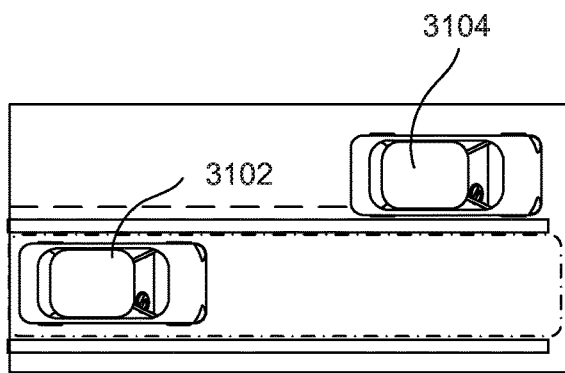
FIGS. 31A-31D illustrate example blame in drifting scenarios consistent with the disclosed embodiments.
Figure 31B:
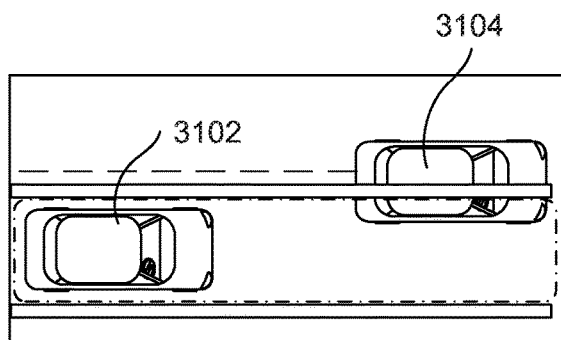
Figure 31C:
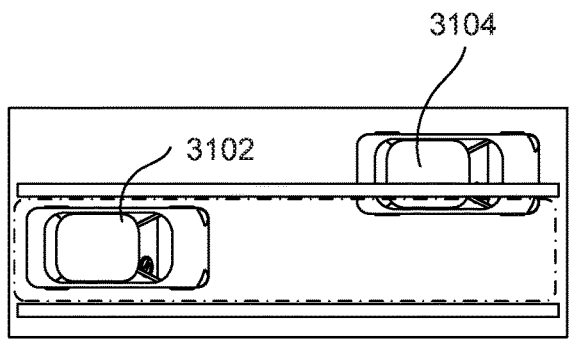
Figure 31D:
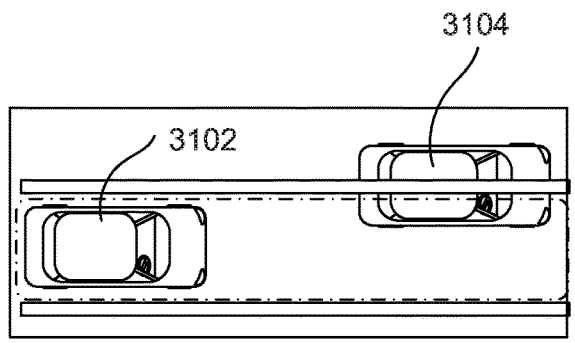

FIGS. 31A-31D illustrate example blame in drifting scenarios. In FIG. 31A, the scenario starts with a slight lateral maneuver by vehicle 3104, cutting-in to the wide corridor of vehicle 3102. In FIG. 31B, vehicle 3104 continues cutting into the normal corridor of the vehicle 3102, violating a safe distance region. Vehicle 3104 is to blame if there is an accident. In FIG. 31C, vehicle 3104 maintains its initial position, while vehicle 3102 moves laterally "forcing" a violation of a normal safe distance corridor. Vehicle 3102 is to blame if there is an accident. In FIG. 31B, vehicle 3102 and 3104 move laterally towards each other. The blame is shared by both vehicles if there is an accident.

Figure 32A:
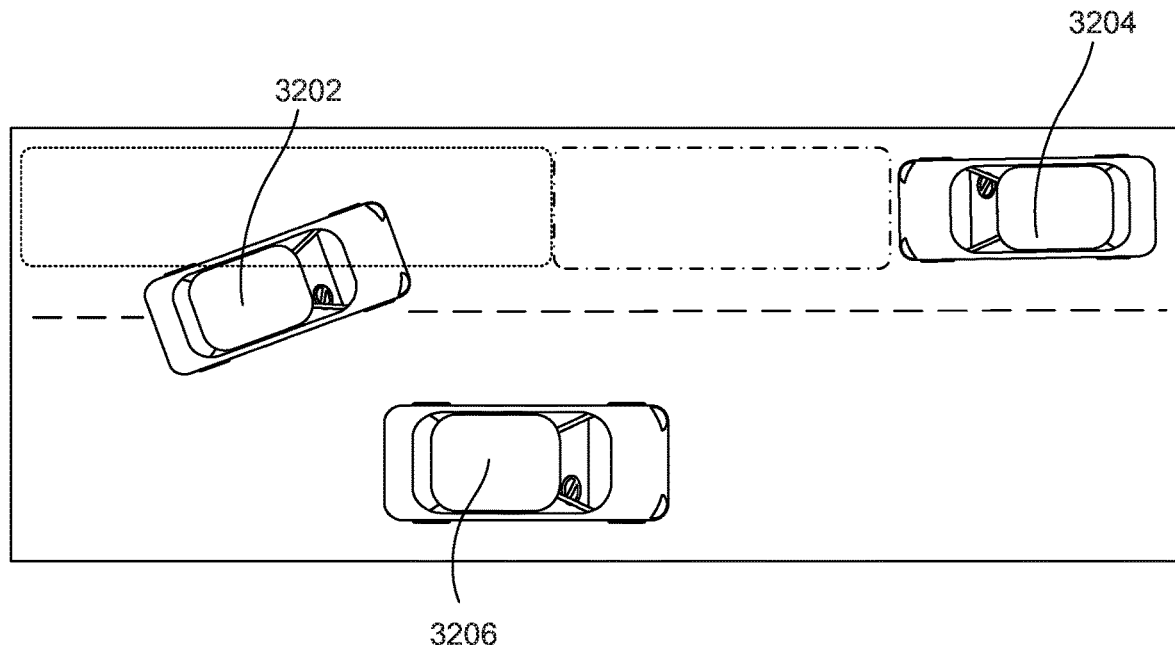
FIGS. 32A and 32B illustrate example blame in two-way traffic scenarios consistent with the disclosed embodiments.
Figure 32B:
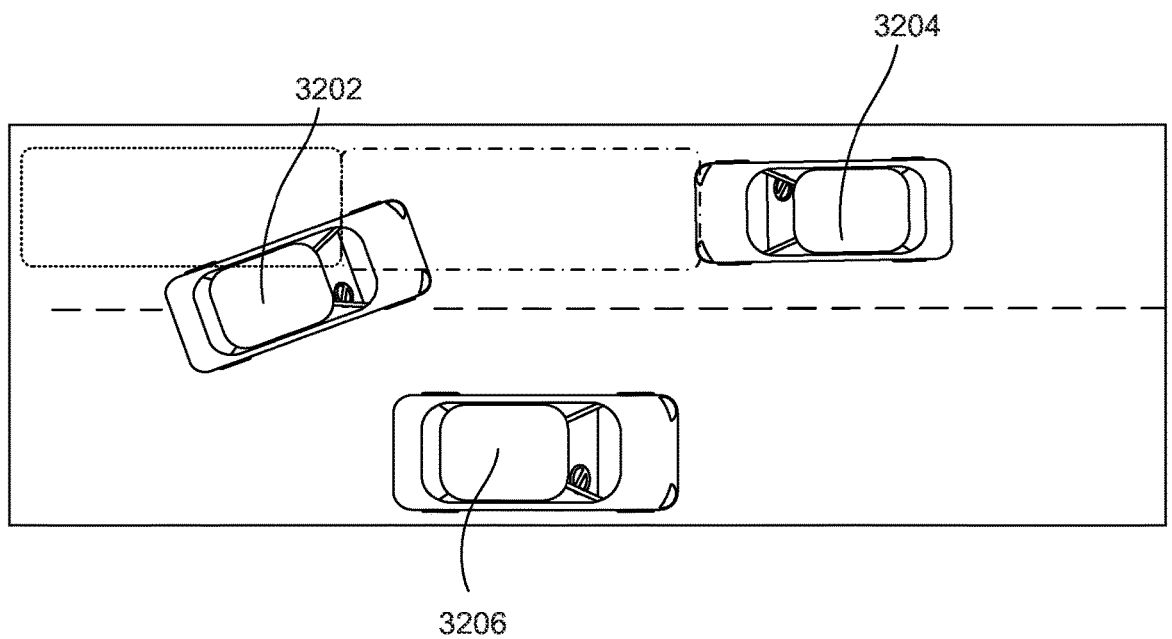

FIGS. 32A and 32B illustrate example blame in two-way traffic scenarios. In FIG. 32A, vehicle 3202 overtakes vehicle 3206, and vehicle 3202 has performed a cut-in maneuver maintaining a safe distance from vehicle 3204. If there is an accident, vehicle 3204 is to blame for not braking with reasonable force. In FIG. 32B, vehicle 3202 cuts-in without keeping safe longitudinal distance from vehicle 3204. In case of an accident, vehicle 3202 is to blame.

Figure 33A:
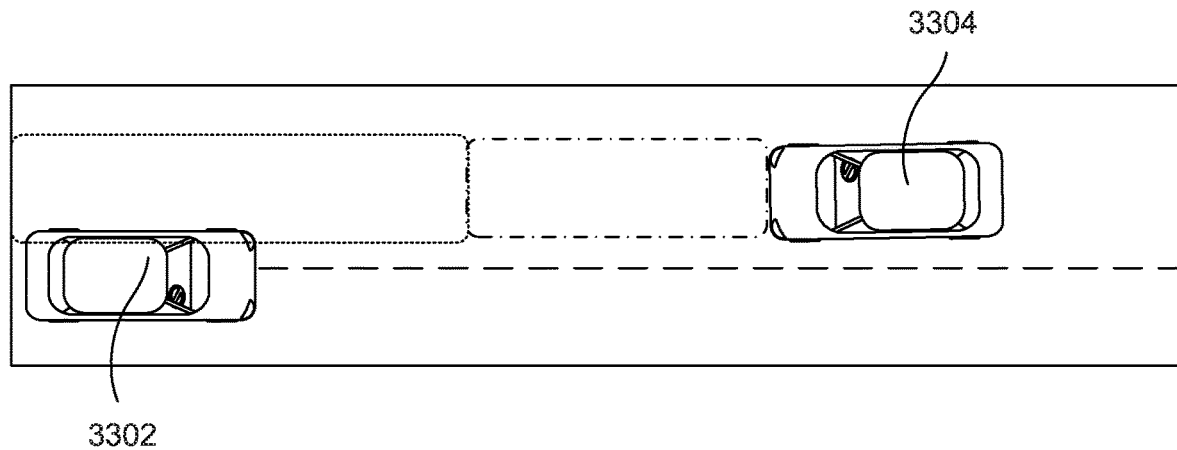
FIGS. 33A and 33B illustrate example blame in two-way traffic scenarios consistent with the disclosed embodiments.
Figure 33B:
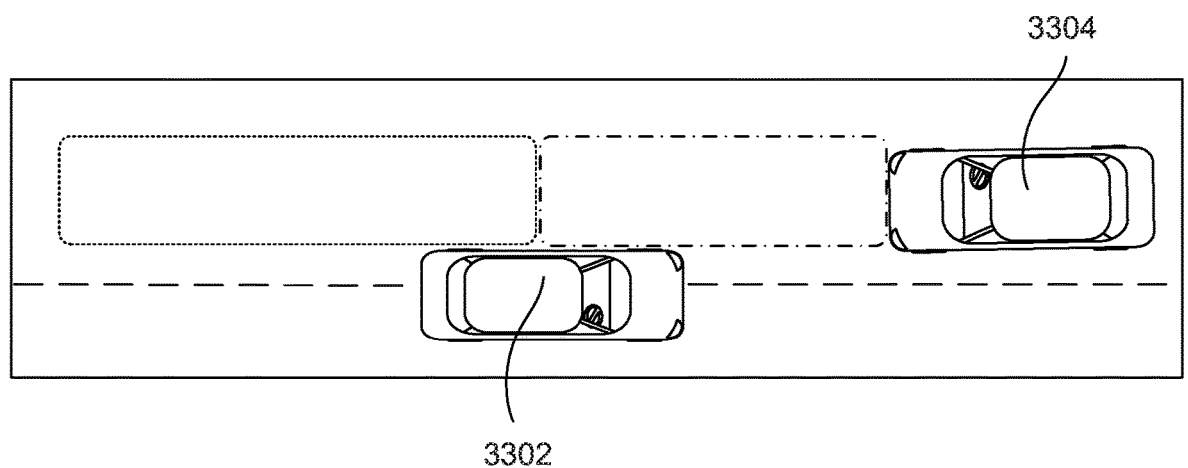

FIGS. 33A and 33B illustrate example blame in two-way traffic scenarios. In FIG. 33A, vehicle 3302 drifts into the path of oncoming vehicle 3204, maintaining a safe distance. In case of an accident, vehicle 3204 is to blame for not braking with reasonable force. In FIG. 33B, vehicle 3202 drifts into the path of the oncoming vehicle 3204, violating a safe longitudinal distance. In case of an accident, vehicle 3202 is to blame.

Figure 34A:
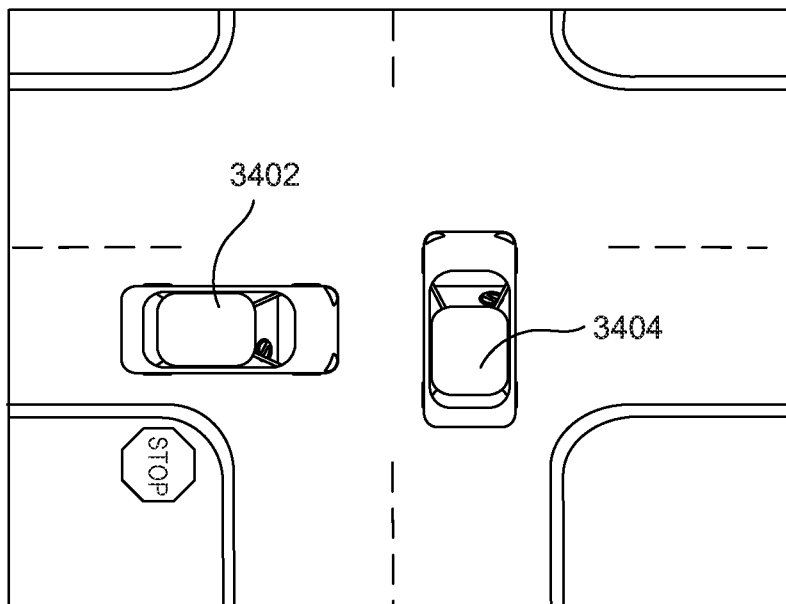
FIGS. 34A and 34B illustrate example blame in route priority scenarios consistent with the disclosed embodiments.
Figure 34B:
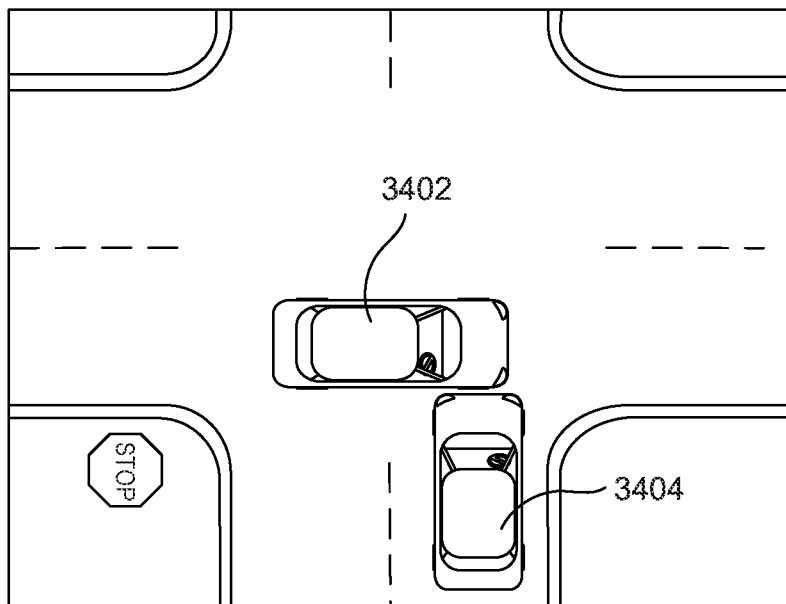

FIGS. 34A and 34B illustrate example blame in route priority scenarios. In FIG. 34A, vehicle 3402 runs a stop sign. Blame is attributed to vehicle 3402 for not respecting the priority assigned to vehicle 3404 by the traffic light. In FIG. 34B, although vehicle 3402 did not have priority, it was already in the intersection when vehicle 3404's light turned green. If vehicle 3404 hits 3402, vehicle 3404 would be to blame.

Figure 35A:
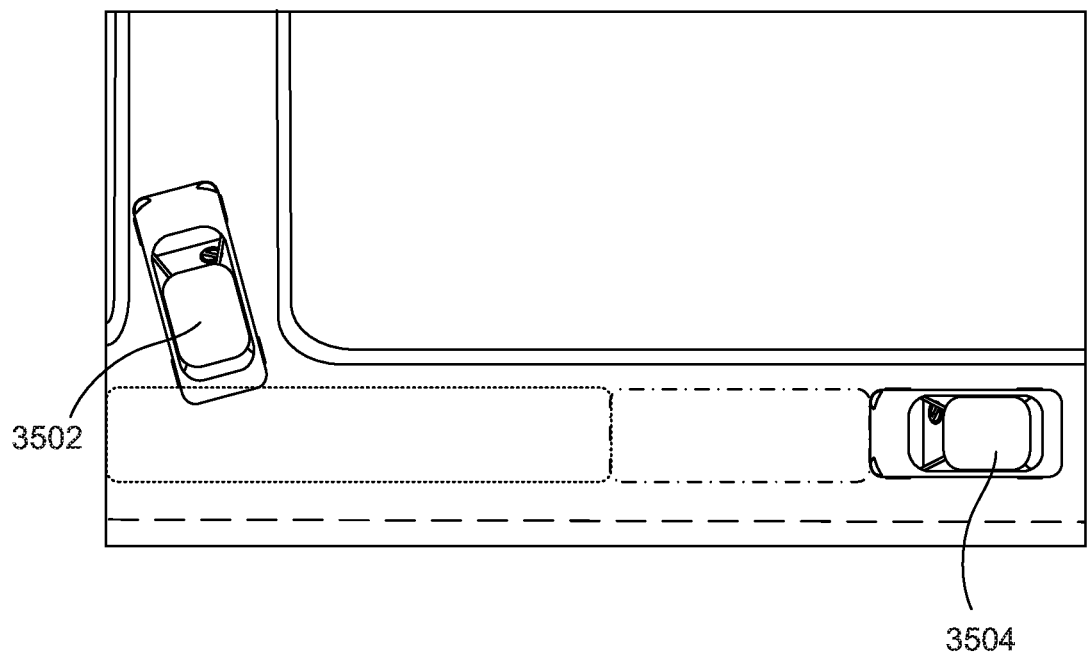
FIGS. 35A and 35B illustrate example blame in route priority scenarios consistent with the disclosed embodiments.
Figure 35B:
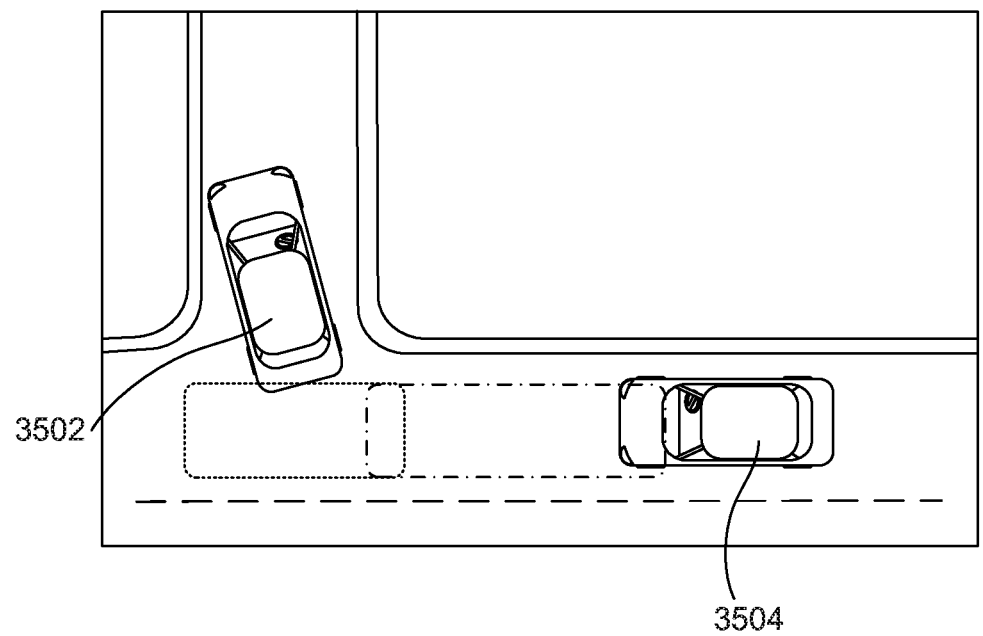

FIGS. 35A and 35B illustrate example blame in route priority scenarios. In FIG. 35A, vehicle 3502 backing-up into the path of an oncoming vehicle 3504. Vehicle 3502 performs a cut-in maneuver maintaining a safe distance. In case of an accident, vehicle 3504 is to blame for not braking with reasonable force. In FIG. 35B, vehicle 3502 car cuts-in without keeping a safe longitudinal distance. In case of an accident, vehicle 3502 is to blame.

Figure 36A:
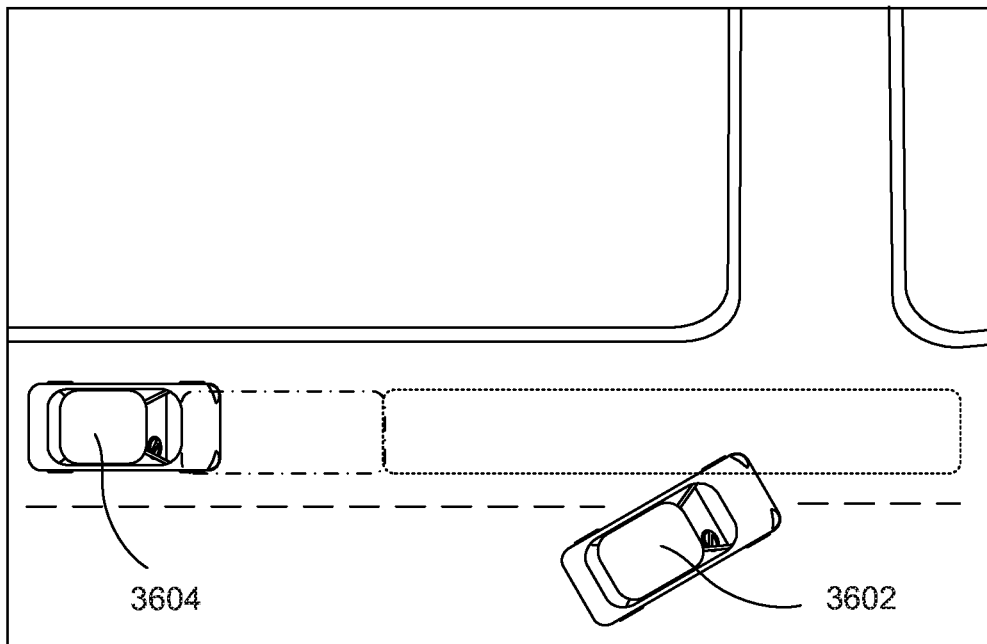
FIGS. 36A and 36B illustrate example blame in route priority scenarios consistent with the disclosed embodiments.
Figure 36B:
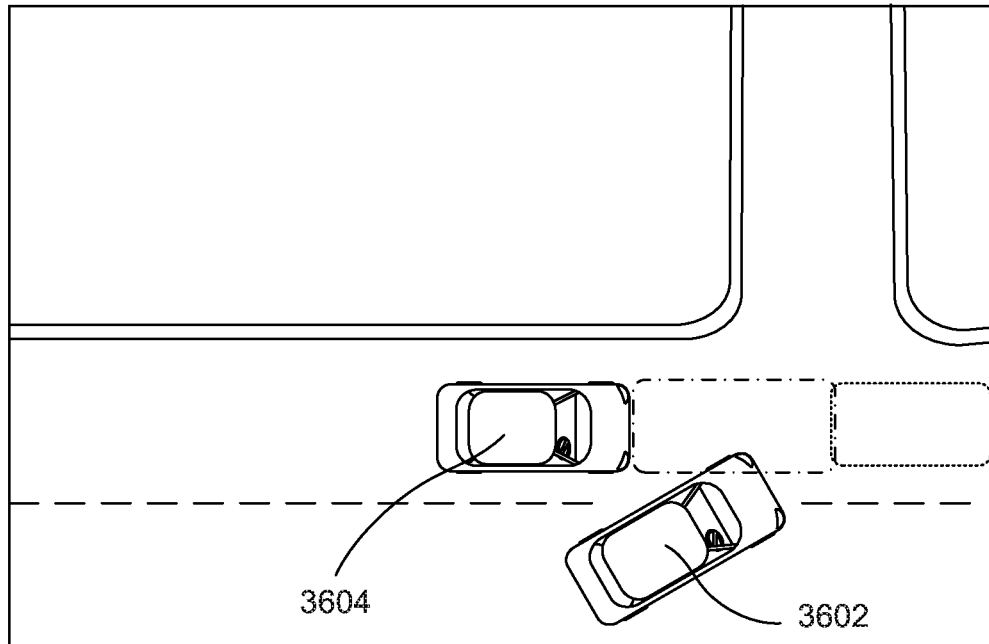

FIGS. 36A and 36B illustrate example blame in route priority scenarios. In FIG. 36A, vehicle 3602 and vehicle 3604 are driving in the same direction, while vehicle 3602 turns left across the path of vehicle 3604. Vehicle 3602 performs cut-in maneuver maintaining safe distance. In case of an accident, vehicle 3604 is to blame for not braking with reasonable force. In FIG. 36B, vehicle 3602 cuts-in without keeping safe longitudinal distance. In case of an accident, vehicle 3602 is to blame.

Figure 37A:
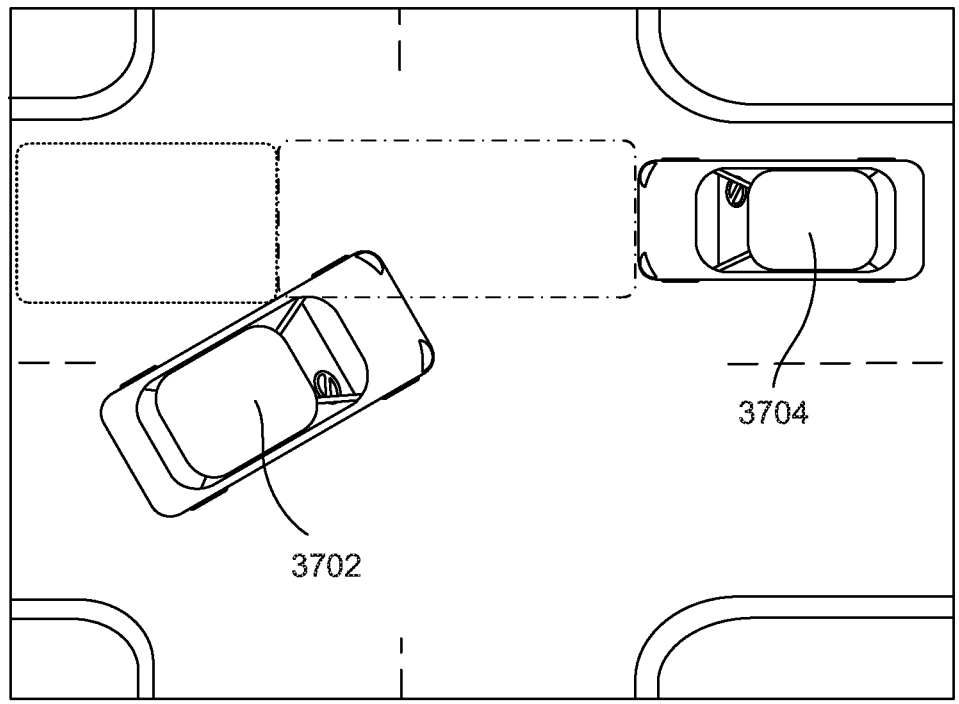
FIGS. 37A and 37B illustrate example blame in route priority scenarios consistent with the disclosed embodiments.
Figure 37B:
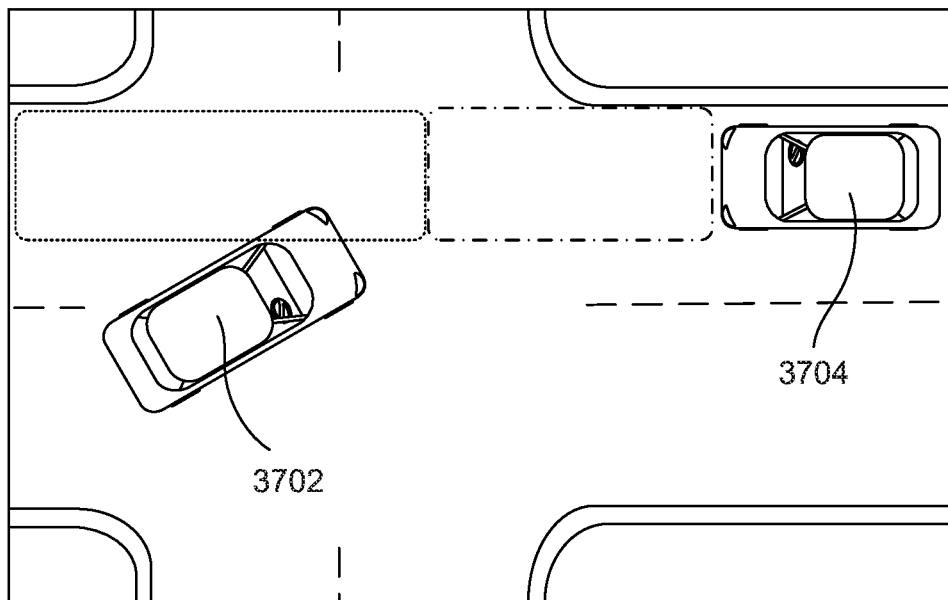

FIGS. 37A and 37B illustrate example blame in route priority scenarios. In FIG. 37A, vehicle 3702 wants to turn left, but must give way to the oncoming vehicle 3704. Vehicle 3702 turns left, violating safe distance with respect to vehicle 3704. Blame is on vehicle 3702. In FIG. 37B, vehicle 3702 turns left, maintaining a safe distance with respect to vehicle 3704. In case of an accident, vehicle 3704 is to blame for not braking with reasonable force.

Figure 38A:
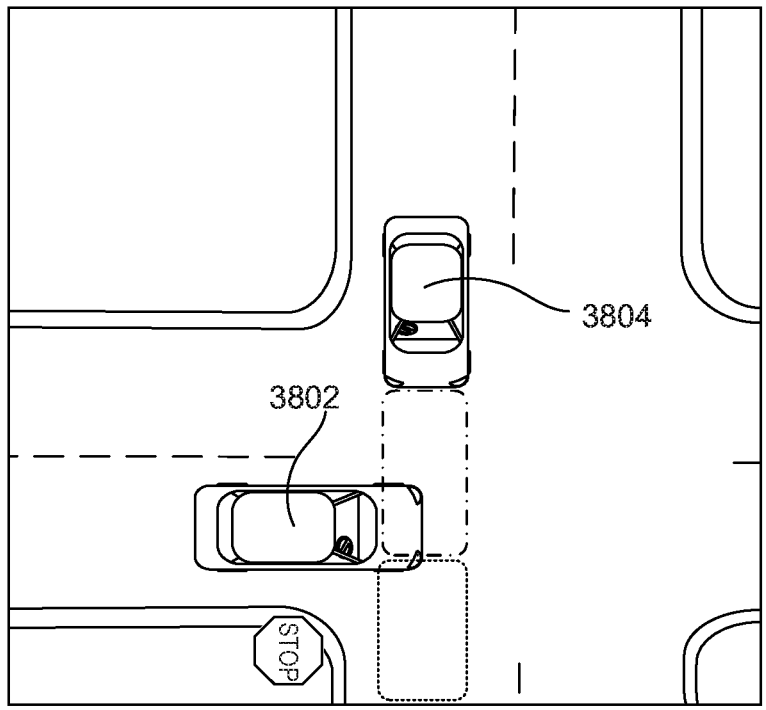
FIGS. 38A and 38B illustrate example blame in route priority scenarios consistent with the disclosed embodiments.
Figure 38B:
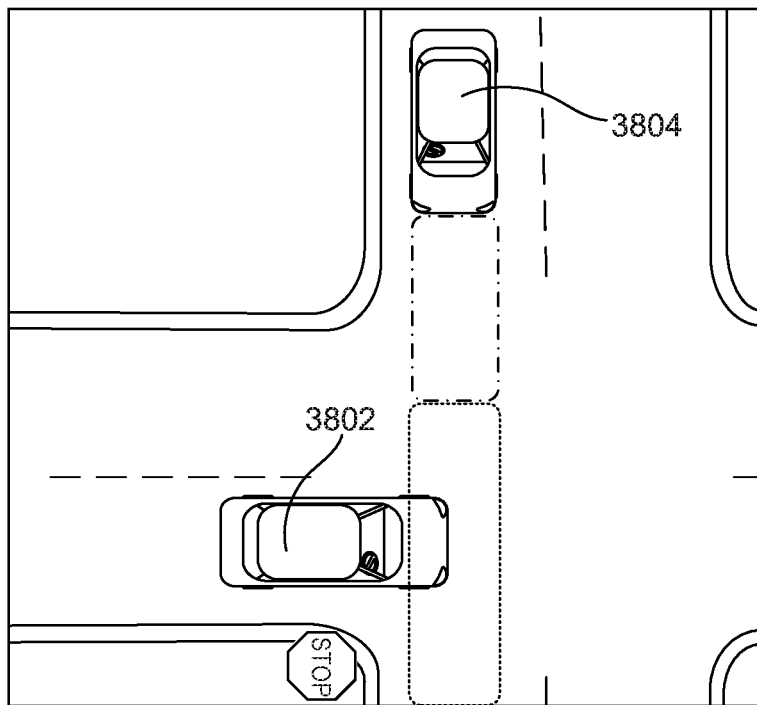

FIGS. 38A and 38B illustrate example blame in route priority scenarios. In FIG. 38A, vehicle 3802 and vehicle 3804 are driving straight, and vehicle 3802 has a stop sign. Vehicle 3802 enters the intersection, violating a safe distance with respect to vehicle 3804. Blame is on vehicle 3802. In FIG. 38B, vehicle 3802 enters the intersection while maintaining a safe distance with respect to vehicle 3804. In case of an accident, vehicle 3804 is to blame for not braking with reasonable force.

Figure 39A:
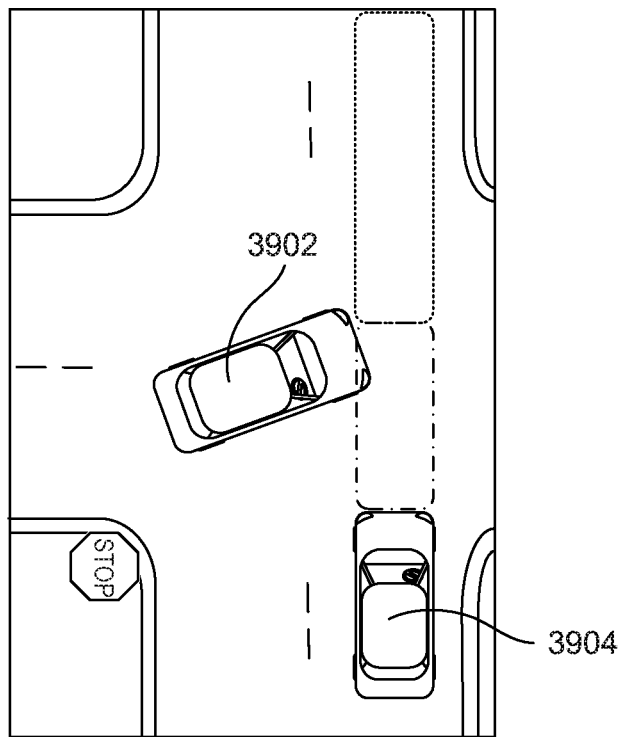
FIGS. 39A and 39B illustrate example blame in route priority scenarios consistent with the disclosed embodiments.
Figure 39B:
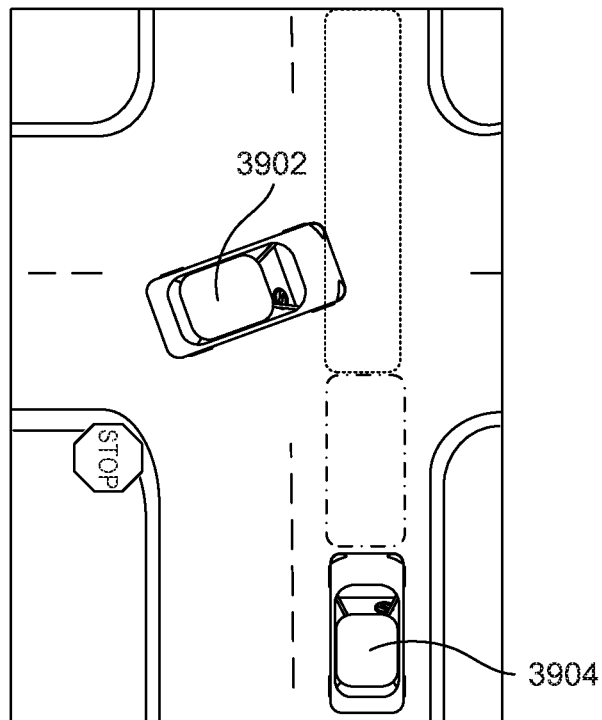

FIGS. 39A and 39B illustrate example blame in route priority scenarios. In FIG. 39A, vehicle 3902 wants to turn left, but must give way to vehicle 3904 coming from its right. Vehicle 3902 enters the intersection, violating the right-of-way and a safe distance with respect to vehicle 3904. Blame is on vehicle 3902. In FIG. 39B, vehicle 3902 enters the intersection while maintaining the right-of-way and a safe distance with respect to vehicle 3904. In case of an accident, vehicle 3904 is to blame for not braking with reasonable force.

Figure 40A:
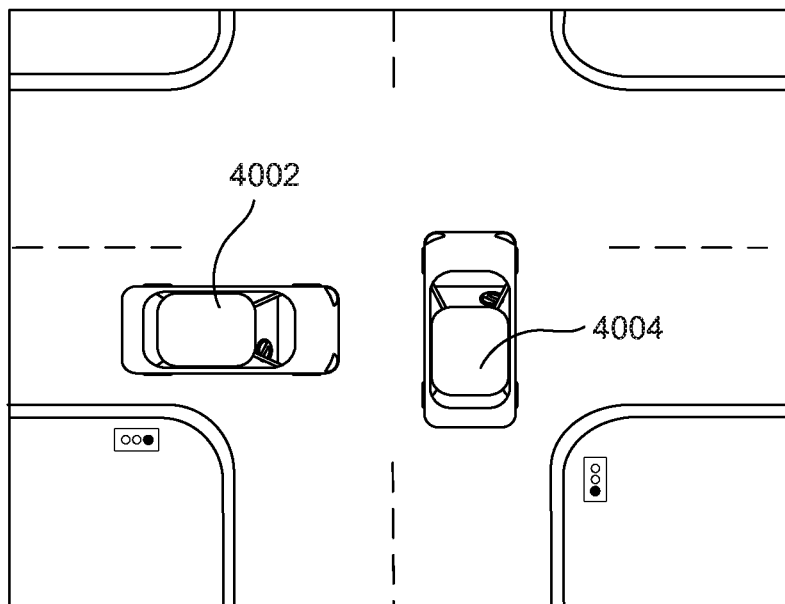
FIGS. 40A and 40B illustrate example blame in traffic light scenarios consistent with the disclosed embodiments.
Figure 40B:
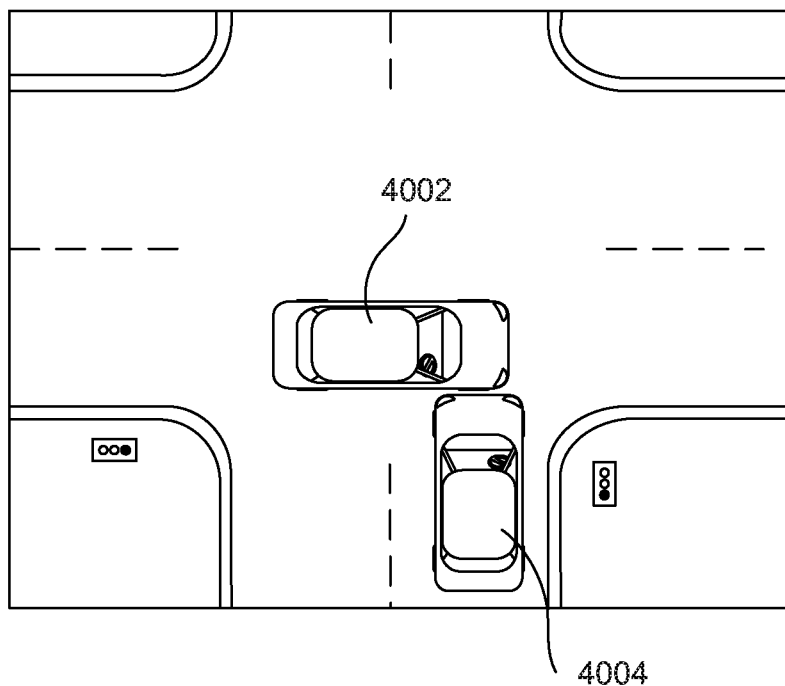

FIGS. 40A and 40B illustrate example blame in traffic light scenarios. In FIG. 40A, vehicle 4002 is running a red light. Blame is attributed to vehicle 4002 for not respecting the priority assigned to vehicle 4004 by the traffic light. In FIG. 40B, although vehicle 4002 did not have priority, it was already in the intersection when the light for vehicle 4004 turned green. If vehicle 4004 hits vehicle 4002, vehicle 4004 would be to blame.

Figure 41A:
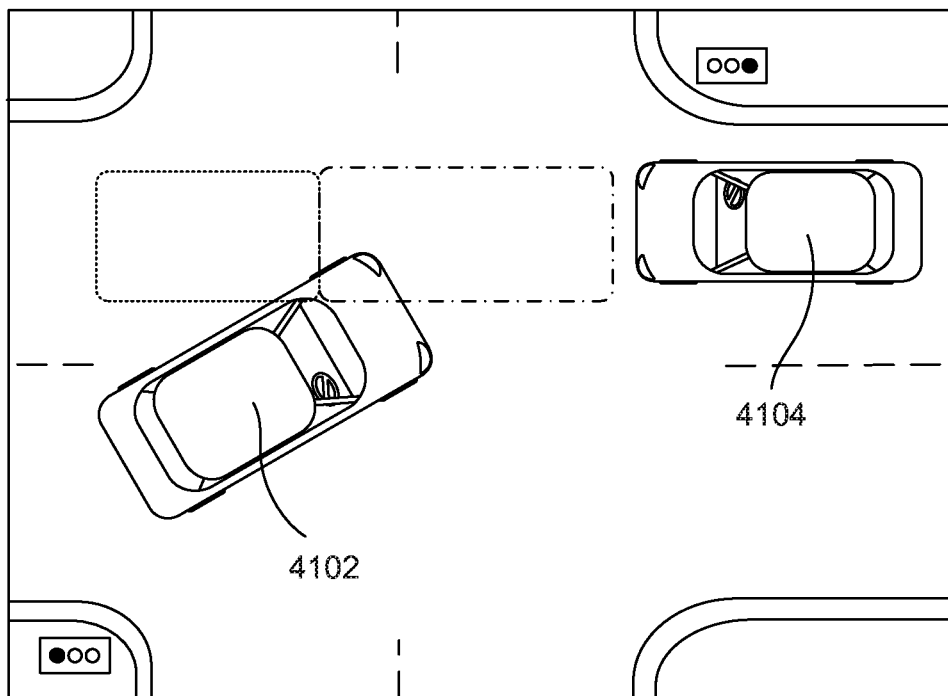
FIGS. 41A and 41B illustrate example blame in traffic light scenarios consistent with the disclosed embodiments.
Figure 41B:
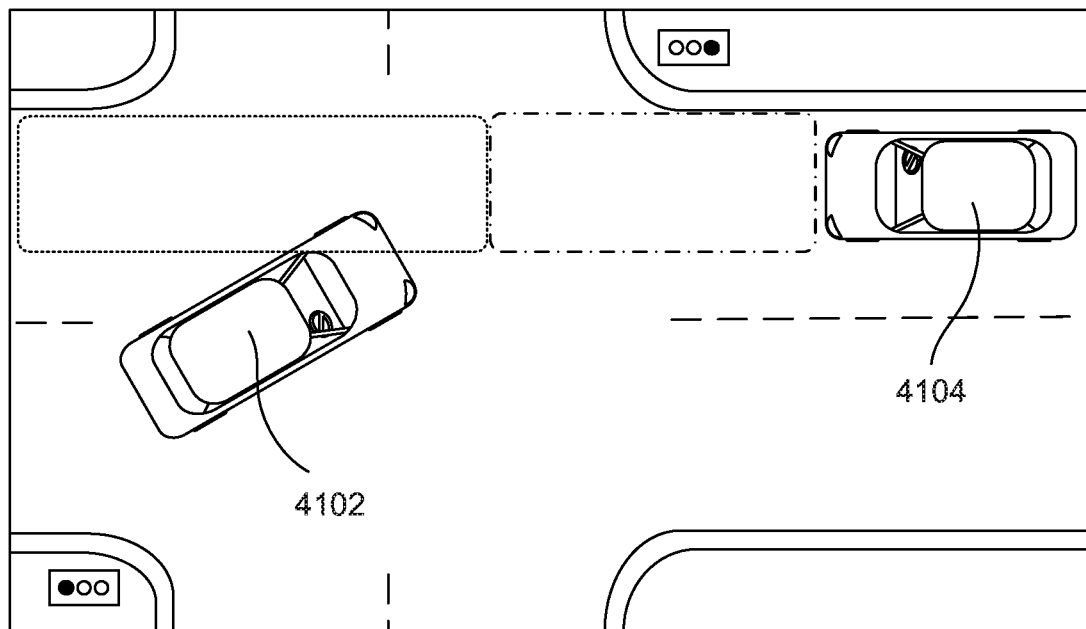

FIGS. 41A and 41B illustrate example blame in traffic light scenarios. Vehicle 4102 is turning left across the path of the oncoming vehicle 4104. Vehicle 4104 has priority. In FIG. 41, vehicle 4102 turns left, violating a safe distance with respect to vehicle 4104. Blame is attributed to vehicle 4102. In FIG. 41B, vehicle 4102 turns left, maintaining a safe distance with respect to vehicle 4104. In case of an accident, vehicle 4104 is to blame for not braking with reasonable force.

Figure 42A:
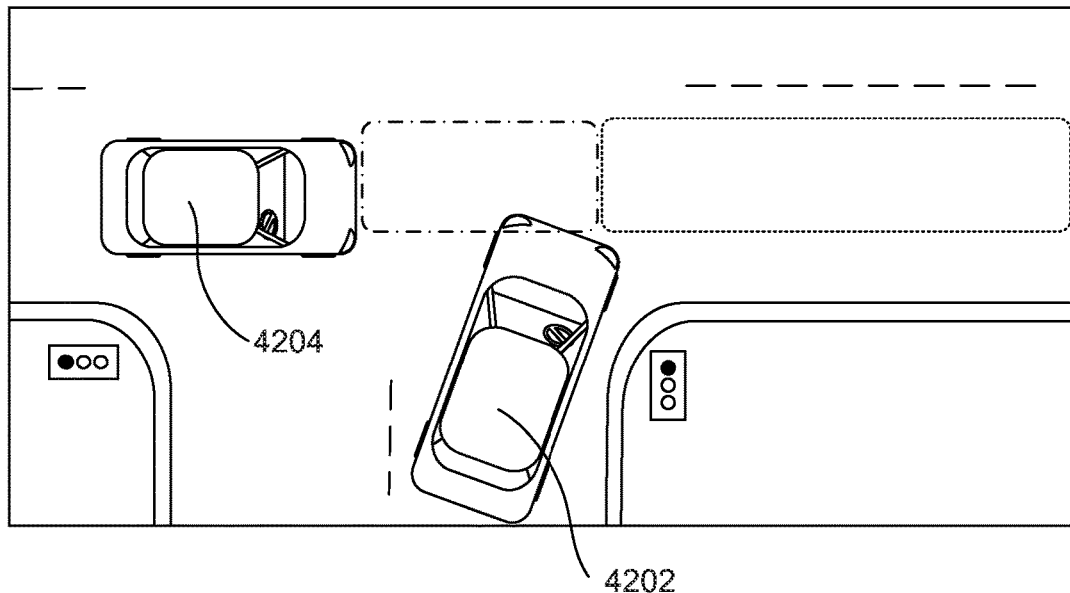
FIGS. 42A and 42B illustrate example blame in traffic light scenarios consistent with the disclosed embodiments.
Figure 42B:
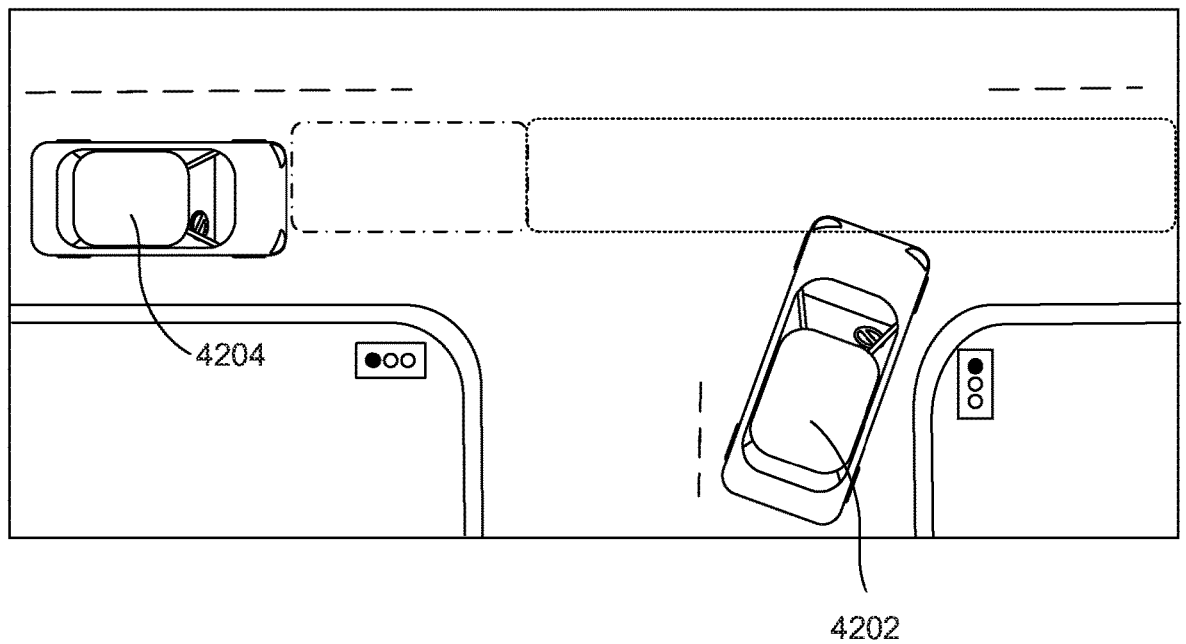

FIGS. 42A and 42B illustrate example blame in traffic light scenarios. In FIG. 42A, vehicle 4202 is turning right, cutting into the path of vehicle 4204, which is driving straight. Right-on-red is assumed to be a legal maneuver, but vehicle 4204 has right of way, as vehicle 4202 violates a safe distance with respect to vehicle 4204. Blame is attributed to vehicle 4202. In FIG. 42B, vehicle 4202 turns right, maintaining a safe distance with respect to vehicle 4204. In case of an accident, vehicle 4204 is to blame for not braking with reasonable force.

Figure 43A:
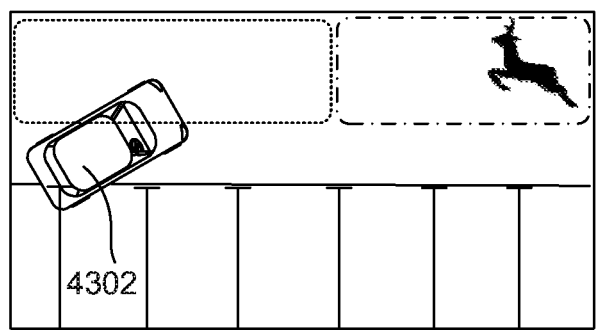
FIGS. 43A-43C illustrate example vulnerable road users (VRUs) scenarios consistent with the disclosed embodiments.
Figure 43B:
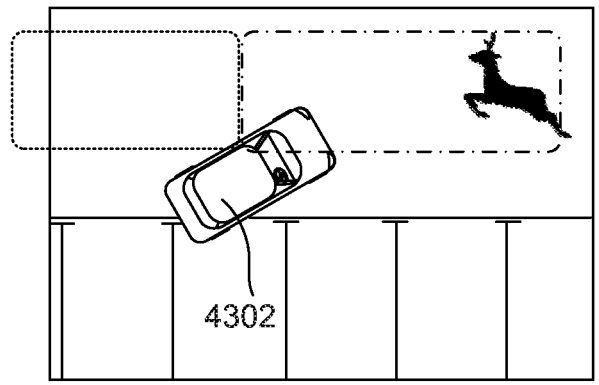
Figure 43C:
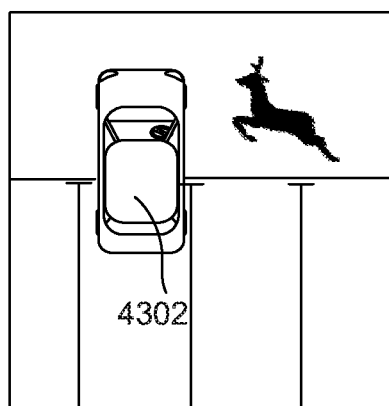

FIGS. 43A-43C illustrate example vulnerable road users (VRUs) scenarios. Accidents with animals or VRUs where the vehicle performs a maneuver are treated as a variation of a cut-in, where the default blame is on the car, with some exceptions. In FIG. 43A, vehicle 4302 cuts into the path of an animal (or VRU) while maintaining safe distance and ensuring an accident can be avoided. In FIG. 43B, vehicle 4302 cuts into the path of an animal (or VRU) violating safe distance. Blame is attributed to vehicle 4302. In FIG. 43C, vehicle 4302 notices the animal and stops, giving the animal sufficient time to stop. If the animal hits the car, the animal is to blame.

Figure 44A:
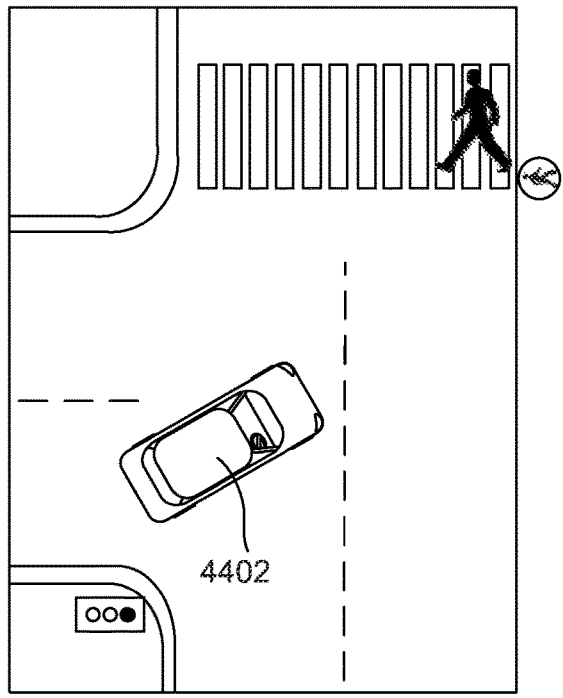
FIGS. 44A-44C illustrate example vulnerable road users (VRUs) scenarios consistent with the disclosed embodiments.
Figure 44B:
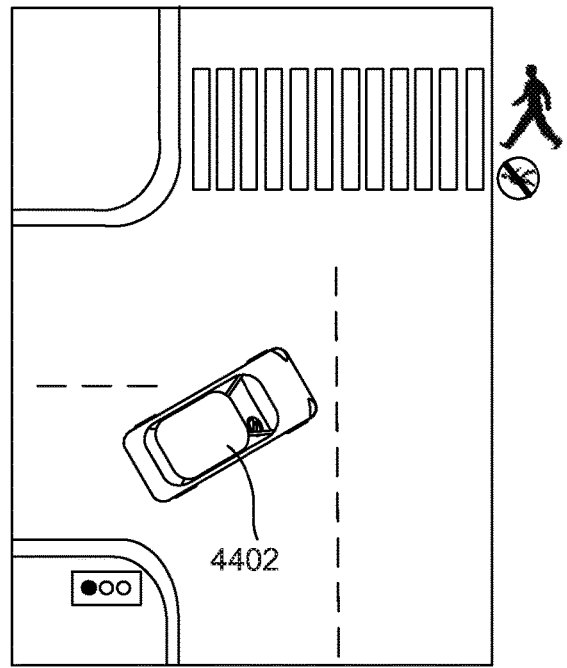
Figure 44C:
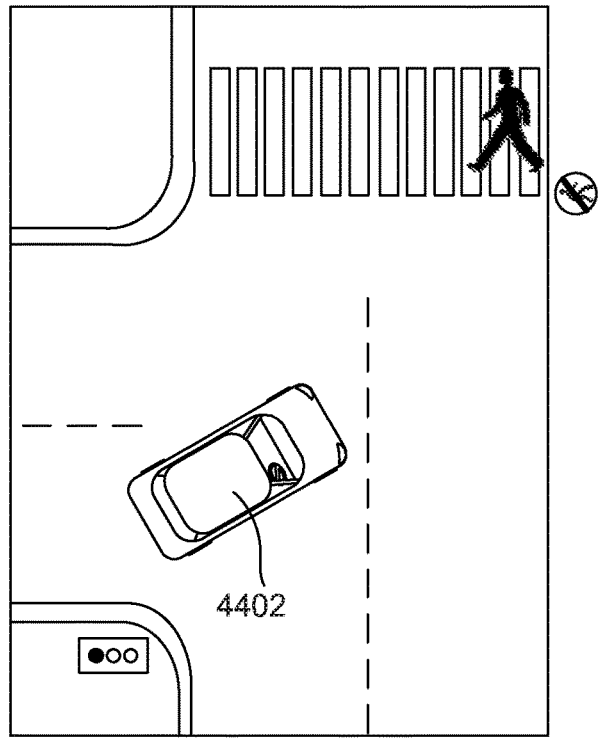

FIGS. 44A-44C illustrate example vulnerable road users (VRUs) scenarios. In FIG. 44A, vehicle 4402 is turning left at a signalized intersection and encounters a pedestrian in the crosswalk. Vehicle 4402 has a red light and the VRU has a green. Vehicle 4402 is at fault. In FIG. 44B, vehicle 4402 has a green light, and the VRU has a red light. If the VRU enters the crosswalk, the VRU is at fault. In FIG. 44C, vehicle 4402 has a green light, and the VRU has a red light. If the VRU was already in the crosswalk, vehicle 4402 is it fault.

Figure 45A:
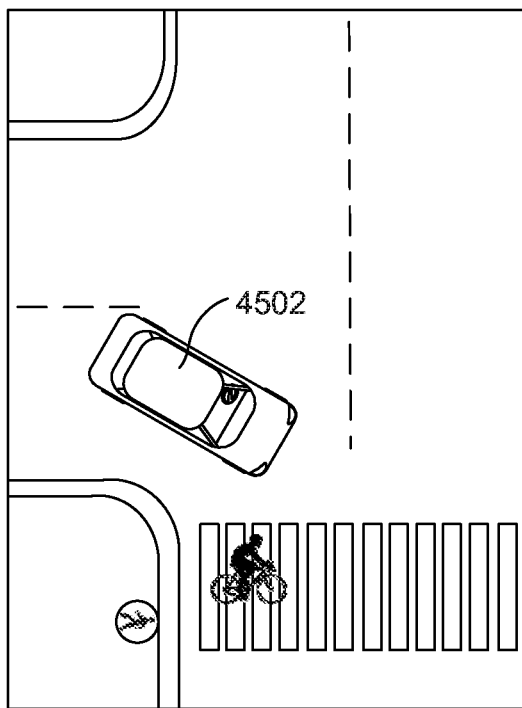
FIGS. 45A-45C illustrate example vulnerable road users (VRUs) scenarios consistent with the disclosed embodiments.
Figure 45B:
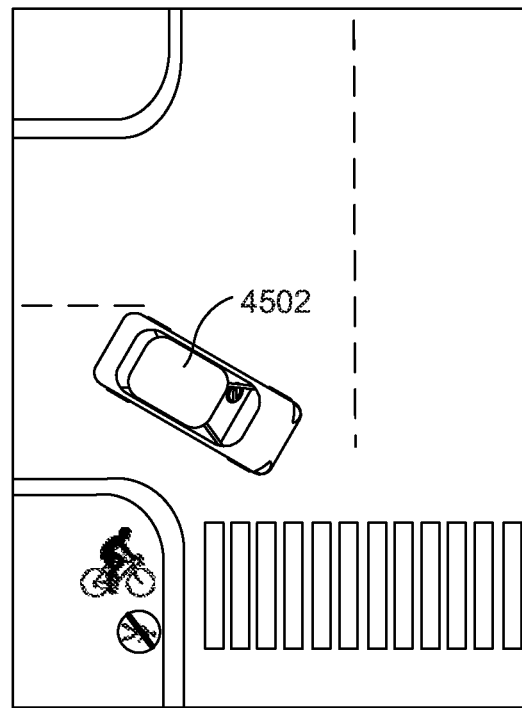
Figure 45C:
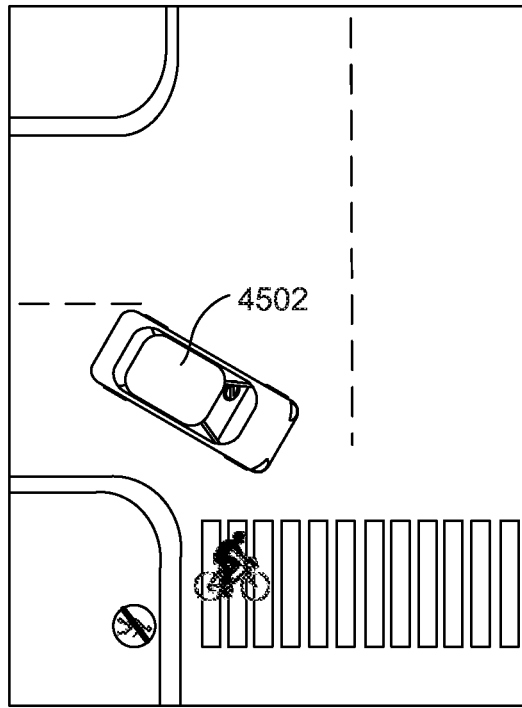

FIGS. 45A-45C illustrate example vulnerable road users (VRUs) scenarios. In FIG. 45A, vehicle 4502 is turning right and encounters a cyclist. The cyclist has a green light. Vehicle 4502 is at fault. In FIG. 45B, the cyclist has a red light. If the cyclist enters the intersection, the cyclist is at fault. In FIG. 45C, the cyclist has a red light, but was already in the intersection. Vehicle 4502 is at fault.

Figure 46A:
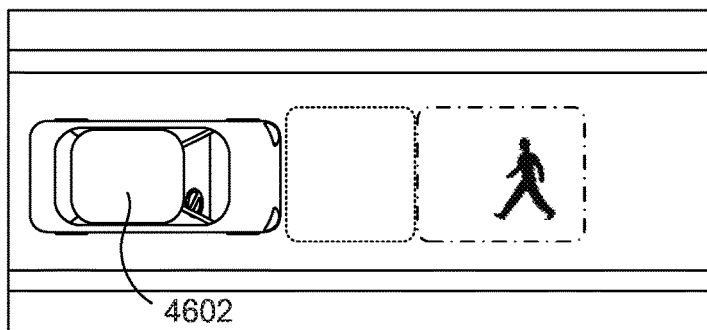
FIGS. 46A-46D illustrate example vulnerable road users (VRUs) scenarios consistent with the disclosed embodiments.
Figure 46B:
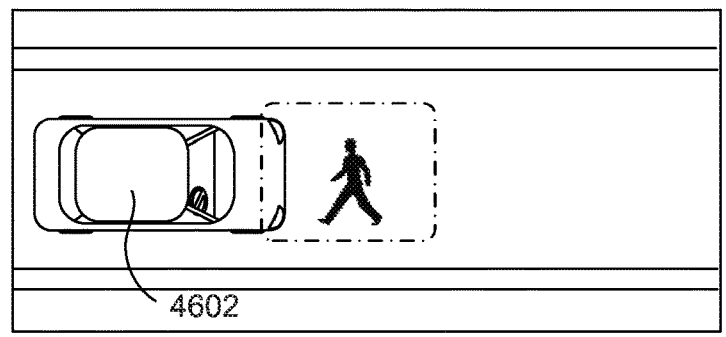
Figure 46C:
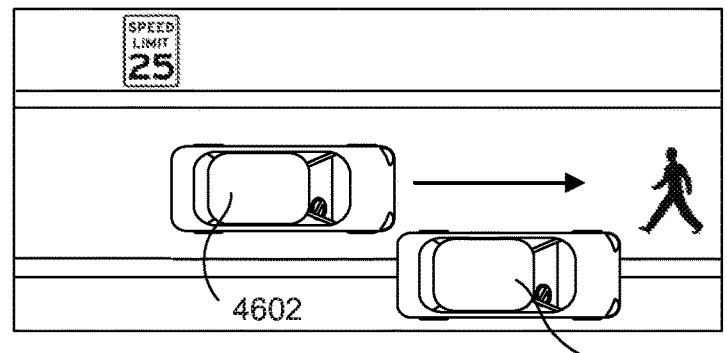
Figure 46D:
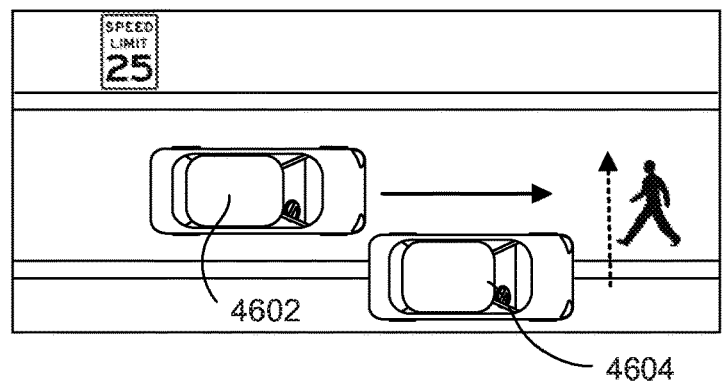

FIGS. 46A-46D illustrate example vulnerable road users (VRUs) scenarios. Accidents with VRUs where a vehicle does not perform a maneuver are blamed on the car by default, with some exceptions. In FIG. 46A, vehicle 4602 must always make sure to maintain safe distance and ensuring an accident can be avoided with a VRU. In FIG. 46B, if vehicle 4602 does not maintain safe distance, vehicle 4602 is to blame. In FIG. 46C, if vehicle 4602 does not maintain sufficiently low speed as to avoid colliding with a VRU that is potentially occluded by vehicle 5604, or drives above the legal limit, vehicle 4602 is to blame. In FIG. 46D, another scenario with a potential occlusion of a VRU by vehicle 4604, if vehicle 4602 maintains sufficiently low speed, but the VRUs speed is above a reasonable threshold, the VRU is to blame.

As disclosed herein, RSS defines a framework for multi-agent scenarios. Accidents with static objects, road departures, loss of control or vehicle failure are blamed on the host. RSS defines cautious maneuvers, which will not allow accidents with other objects, unless other objects maneuvers dangerously into the path of the host (in which case they are to blame). In the case of a sure-collision where blame is on the target, the host will apply its brakes. The system may consider evasive steering only if the maneuver is "cautious" (perceived not to cause another accident).

Non-collision incidents include accidents initiated by vehicle fires, potholes, falling objects, etc. In these cases, the blame may default to the host, except for scenarios which the host can avoid, such as potholes and falling objects, which may be classified as a "static object" scenario, assuming they become visible at safe distance or that a cautious evasive maneuver exists. In multi-agent scenarios where the host vehicle was stationary, the host is not to blame. In this case the target essentially performed a non-safe cut-in. For example, if a cyclist rides into a stationary car, the host is not to blame.

RSS also includes guidelines for assigning blame where the road is not structured clearly, such as parking lots or wide roundabouts without lane marks. In these unstructured road scenarios, blame is assigned by examining deviations of each vehicle from its path to determine if they allowed sufficient distance to allow other objects in the area to adjust.

Additional Details Relating to Responsibility-Sensitive Safety (RSS)

As discussed above, RSS provides a set of mathematical formulae that can be used to guarantee that a vehicle implementing RSS will not be involved in an accident caused by it. As a result, in some implementations, RSS may set an envelope of extremes (e.g., a minimum safe longitudinal distance) that would guarantee that the vehicle implementing RSS will not be involved in an accident for which it is to blame. In some embodiments, a system can implement a modified RSS, which may involve a predetermined operational envelope that that may be larger than the RSS protocol described above. Such a modified RSS can, at least in some circumstances, provide a heightened level of safety and reduce the probability that fault may be attributable to a vehicle employing RSS. Such a modified RSS system will be described in more detail below, for example, relating to the described comfort RSS system.

As discussed above, RSS may assume that a host vehicle will brake at its maximum braking capability to avoid a collision with a target vehicle, a VRU, or another object. RSS may determine a safe longitudinal distance between a host vehicle, effectively a buffer zone, having a size, as described above, based on host and target vehicle velocities, host and target vehicle maximum braking capabilities, and the maximum acceleration capability of the host vehicle over a host vehicle reaction time. If a host vehicle comes within a distance less than the safe distance (e.g., the RSS distance), then the host vehicle may not be able to stop (at least in some cases) without contacting a target vehicle, even if braking at its maximum braking capacity, as shown in the examples of FIGS. 28A-46D. Applying maximum braking, especially when such application is sudden, may be regarded as an extreme response that should be reserved for cases when it is not avoidable. Under certain circumstances, maximum braking can be uncomfortable to passengers, can implicate trailing vehicles, can excessively wear down vehicle hardware (tires, brake pads etc.), etc. Thus, to avoid maximum braking scenarios and potential contact with target vehicles, a driving policy based on the RSS safe distance may be adopted at least under certain circumstances or in some implementations, to maintain a safe longitudinal distance relative to target vehicles.

As noted above, an RSS distance may include a component dependent upon the maximum possible acceleration capability that the host vehicle may experience during a period between a sensed event and a host vehicle's reaction to a sensed event (i.e., a reaction time associated with the host vehicle). For example, RSS may account for a delay between the period in which a target vehicle, VRU, or other object is sensed by a host vehicle and the time the host vehicle scenarios, blame is assigned by examining deviations of each vehicle from its path to determine if they allowed sufficient distance to allow other objects in the area to adjust.

Additional Details Relating to Responsibility-Sensitive Safety (RSS)

As discussed above, RSS provides a set of mathematical formulae that can be used to guarantee that a vehicle implementing RSS will not be involved in an accident caused by it. As a result, in some implementations, RSS may set an envelope of extremes (e.g., a minimum safe longitudinal distance) that would guarantee that the vehicle implementing RSS will not be involved in an accident for which it is to blame. In some embodiments, a system can implement a modified RSS, which may involve a predetermined operational envelope that that may be larger than the RSS protocol described above. Such a modified RSS can, at least in some circumstances, provide a heightened level of safety and reduce the probability that fault may be attributable to a vehicle employing RSS. Such a modified RSS system will be described in more detail below, for example, relating to the described comfort RSS system.

As discussed above, RSS may assume that a host vehicle will brake at its maximum braking capability to avoid a collision with a target vehicle, a VRU, or another object. RSS may determine a safe longitudinal distance between a host vehicle, effectively a buffer zone, having a size, as described above, based on host and target vehicle velocities, host and target vehicle maximum braking capabilities, and the maximum acceleration capability of the host vehicle over a host vehicle reaction time. If a host vehicle comes within a distance less than the safe distance (e.g., the RSS distance), then the host vehicle may not be able to stop (at least in some cases) without contacting a target vehicle, even if braking at its maximum braking capacity, as shown in the examples of FIGS. 28A-46D. Applying maximum braking, especially when such application is sudden, may be regarded as an extreme response that should be reserved for cases when it is not avoidable. Under certain circumstances, maximum braking can be uncomfortable to passengers, can implicate trailing vehicles, can excessively wear down vehicle hardware (tires, brake pads etc.), etc. Thus, to avoid maximum braking scenarios and potential contact with target vehicles, a driving policy based on the RSS safe distance may be adopted at least under certain circumstances or in some implementations, to maintain a safe longitudinal distance relative to target vehicles.

As noted above, an RSS distance may include a component dependent upon the maximum possible acceleration capability that the host vehicle may experience during a period between a sensed event and a host vehicle's reaction to a sensed event (i.e., a reaction time associated with the host vehicle). For example, RSS may account for a delay between the period in which a target vehicle, VRU, or other object is sensed by a host vehicle and the time the host vehicle begins applying the brake or making another navigational maneuver. For example, there may be several milliseconds (or more or less) between the time a host vehicle detects that a target vehicle is braking and the time the host vehicle begins braking or another avoidance maneuver. Further details relating to RSS and the RSS safe distance are described above.

Definition 27 (RSS safe distance) A longitudinal distance between a car $c_r$ and another car $c_f$ that is in $c_r$'s frontal corridor is safe w.r.t. a response time p if for any braking of at most $a_{max,brake}$, performed by $c_f$, if $c_r$ will accelerate by at most $a_{max,accel}$ during the response time p, and from there on will brake by its maximal brake $a_{max,brake}$ from time p until a full stop then it won't collide with $c_f$.

Lemma 11 below calculates an example of an RSS safe distance according to this embodiment for a host vehicle following a target vehicle. The RSS safe distance may include an assumption of the maximum braking capacity and determined current speed of a target vehicle.

Lemma 11 Let $c_r$ be a host vehicle which is behind a target vehicle $c_f$ on the longitudinal axis. Let $a_{max,brake}$ be the maximal braking capacity and let $a_{max,accel}$ be the maximum acceleration of a vehicle. Let v be a current velocity of a vehicle. Let p be the response time of host vehicle $c_r$. Then, the RSS safe distance for host vehicle $c_r$ is:

$$RSS_{Distance} = \max\left(\frac{v_1 + (v_1 + \rho a_{max,accel})}{2}\rho + \frac{(v_1 + \rho a_{max,accel})^2 - v_2^2}{2a_{max,brake}}, 0\right)$$

Proof. The RSS safe distance may include a calculation of the minimum distance that it would take the vehicles to stop if braking at maximum braking capacity $a_{max,brake}$. This minimum distance may be calculated in any manner described above in relation to RSS and the formula used in Lemma 11 is exemplary only. For example, the minimum distance needed to come to a stop may be calculated using Lemma 2. Lemma 11 provides an example of the modifications need to account for the acceleration that may occur during response period p. Let $v_1$ be the current velocity of a host vehicle $c_r$ and $v_2$ be the current velocity of a target vehicle $c_f$. Then for host vehicle $c_r$ the $RSS_{Distance}$ includes a calculation of the velocity of host vehicle $c_r$ after accelerating at a maximum acceleration capacity $a_{max,accel}$ for the response period p and multiplies that velocity by the response period p to determine a maximum distance traveled during the response period p. The maximum distance traveled during response period p is:

$$d_{max,p} = (v_1 + (v_1 + \rho a_{max,accel}))p$$

The velocity of the host vehicle used in the safe distance determination may correspond to a maximum possible velocity of the host vehicle after accelerating for its response period, p. For example, let $v_1$ be a current velocity of the host vehicle, let p be the response period, and let $a_{max,accel}$ be the maximum acceleration of the host vehicle, then the maximum possible velocity $v_{max,p}$ of the host vehicle after the response period p is:

$$v_{max,p} = v_1 + \rho a_{max,accel}$$

In some embodiments, an RSS safe distance may also include a component to ensure that even if both the host and the target vehicles stop with maximum braking capabilities from their current speed (and after a maximum acceleration of the host vehicle over its reaction time). Such a component may include a minimum distance of approach component. The minimum distance of approach may correspond with a minimum distance component in an RSS safe distance calculation such that even if the host vehicle and the target vehicle apply maximum braking while stopping (and after the host vehicle reaction time at maximum acceleration) the host vehicle will stop at least the minimum distance from a sensed target vehicle, VRU, or other object. For example, if a host vehicle is traveling behind a target vehicle and the target vehicle begins braking at its maximum braking capacity, the host vehicle equipped with RSS may respond by braking at its maximum braking capacity. If RSS safe distance includes a minimum distance of approach component, then the host vehicle may come to a stop at least the minimum distance from the target vehicle. The minimum distance may be predetermined (e.g., a minimum distance of 0.5 m, 1 m, 2 m, etc.) or may be determined based on any set of factors consistent with this disclosure (e.g., a velocity associated with host vehicle and/or target vehicle, a sensed weather condition, a user's preferences, etc.). The following expression for the RSS safe distance includes a minimum distance $d_{min}$:

$$RSS_{Distance} = \max\left(\frac{v_1 + (v_1 + \rho a_{max,accel})}{2}\rho + \frac{(v_1 + \rho a_{max,accel})^2 - v_2^2}{2a_{max,brake}}, 0\right) + d_{min}$$

Figure 47A:
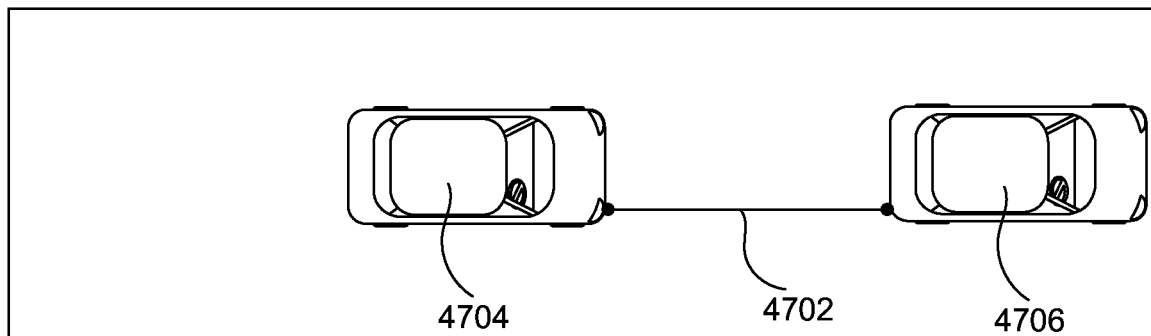
FIGS. 47A and 47B illustrate example scenarios in which a vehicle is following another vehicle consistent with the disclosed embodiments.
Figure 47B:
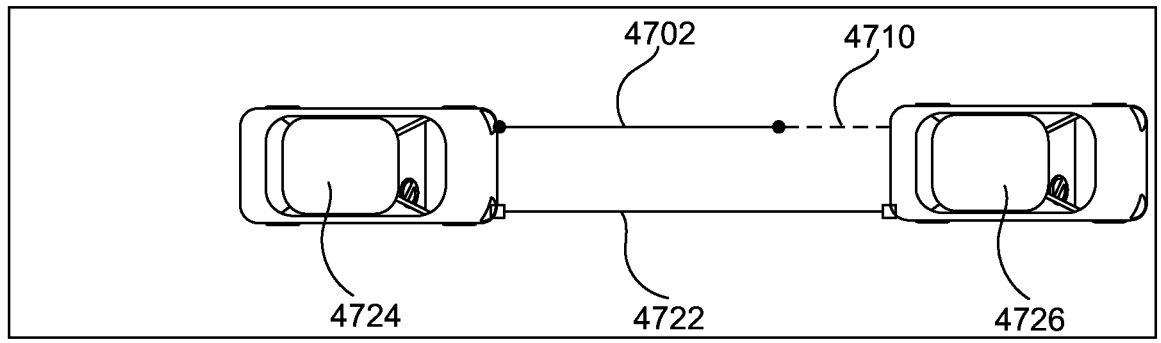

FIGS. 47A and 47B further illustrate the concept of an RSS safe distance when a host vehicle is traveling behind a target vehicle. For example, FIG. 47A shows an RSS safe distance 4702 between a host vehicle 4704 and a target vehicle 4706. Even in a worst-case scenario, where target vehicle 4706 brakes at its maximum braking capability, at RSS safe distance 4702, host vehicle 4704 will be able to stop by braking at its maximum braking capability without colliding with target vehicle 4706, even if maximum braking commences after a response time of the host vehicle during which it accelerates at its maximum acceleration capability. In most instances, target vehicle 4706 may not need to brake to a complete stop at its maximum braking capability. In such instances, host vehicle 4704 may brake at its maximum braking capability until it becomes at least RSS safe distance 4702 away from target vehicle 4706.

FIG. 47B illustrates an RSS safe distance 4722 between a host vehicle 4724 and a target vehicle 4726. In this embodiment, RSS safe distance 4722 includes RSS safe distance 4702 and a minimum approach distance 4710. As discussed above, minimum approach distance 4710 may be a minimum separation distance that will exist between host vehicle 4724 and target vehicle 4726 if they were both to brake at their maximum braking capability and to come to a stop (even after the host vehicle accelerates at its maximum acceleration capability over its reaction time).

Consistent with this disclosure, a system for navigating a host vehicle is disclosed. The system may include at least one processing device programmed to perform one or more methods, processes, functions, or operations consistent with this disclosure. In some embodiments, the system may be an ADAS system or another navigational system disclosed herein. Similarly, the processing device may be processing device 110 or another processor or processing device in or in communication with a host vehicle.

Figure 48:
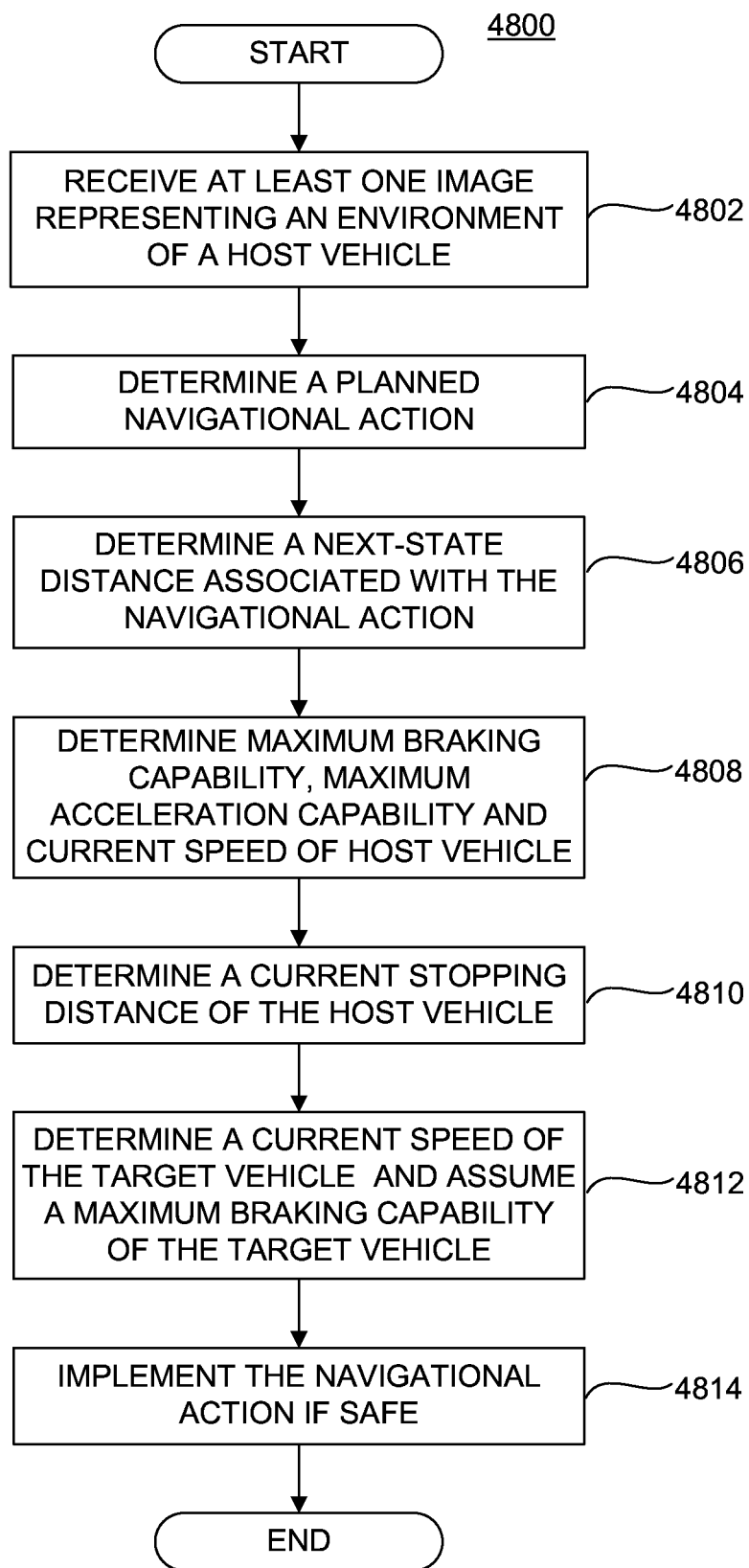
FIG. 48 is a flowchart showing an exemplary process for navigating a host vehicle consistent with the disclosed embodiments.

FIG. 48 is a flowchart depicting an exemplary process 4800 that may be performed by the at least one processing device. Process 4800 is exemplary only. One of ordinary skill in the art having the benefit of this disclosure may understand that process 4800 may include additional steps, exclude certain steps, or may be otherwise modified in a manner consistent with this disclosure.

Process 4800 may include a step 4802 for receiving at least one image representing an environment of a host vehicle. Consistent with this disclosure, the at least one processing device may be programmed to receive at least one image representative of an environment of the host vehicle. As discussed above, the at least one image may be received from an image capture device. The image capture device may be any consistent with this disclosure, including image capture device 122. In some embodiments, the at least one image may be an image obtained from any of a camera, a RADAR, a LIDAR, or any other device from which an image may be obtained, whether optical or otherwise. There may some period of delay between the time when the image is captured and time when the processing device receives the image. Further, there may a period of delay between the time when an event occurs and the imaging device captures an image of the event. For example, if a target vehicle enters a lane in front of a host vehicle, there may be a short period (e.g., a millisecond, 2 milliseconds, 5 milliseconds, etc.) between when the target vehicle maneuvers into the lane and when the imaging device captures an image of the target vehicle.

Process 4800 may include a step 4804 for determining a planned navigational action for the host vehicle. Consistent with this disclosure, the at least one processing device may be programmed to determine a planned navigation action for accomplishing a navigational goal of the host vehicle. The navigation action may be determined based on at least one driving policy. The planned navigation action and/or the at least one driving policy may be any consistent with this disclosure, including those discussed above. For example, the planned navigation action may include at least one of a lane change maneuver, a merge maneuver, a passing maneuver, a follow distance reduction maneuver, or a maintain throttle action. The processing device may be programmed to analyze the at least one image to identify a target vehicle in the environment of the host vehicle. The at least one image may be an image received from an image capture device, such as image capture device 122. The at least one image may be the one or more images received as part of step 4802 of process 4800.

Process 4800 may include a step 4806 for determining a next-state distance associated with the planned navigation action. Consistent with this disclosure, the processing device may be programmed to determine a next-state distance between the host vehicle and the target vehicle that would result if the planned navigation action was taken. The next-state distance may be calculated by any means disclosed herein, including the RSS safe distance formula above. For example, if the planned navigation action is an acceleration of the host vehicle, the next-state distance may be a distance between the host vehicle and a vehicle in front of the host vehicle. In some examples, more than one next-state distance may be determined. For example, if the planned navigation action is a merge into an adjacent lane, a first next-state distance may be determined in relation to the host vehicle and a first target vehicle that will be in front of the host vehicle after the merge and a second next-state distance may be determined in relation to a second target vehicle that will be behind the host vehicle after the merge.

Process 4800 may include a step 4808 for determining a maximum braking capability, a maximum acceleration capability, and a current speed of the host vehicle. Consistent with this disclosure, the processing device may be programmed to determine a maximum braking capability of the host vehicle, a maximum acceleration capability of the host vehicle, and/or a speed of the host vehicle. Each of the factors, (i.e., the maximum braking capability, the maximum acceleration capability, and the speed of the host vehicle) may be determined by any means consistent with this disclosure. In some embodiments, the maximum braking capability and/or the maximum acceleration capability of the host vehicle may be determined based on, for example, the current speed of the vehicle, road characteristics (e.g., a slope of the road, a material of the road, etc.), weather conditions (e.g., snowy, humid, etc.), vehicle conditions (e.g., tire pressure, brake-pad condition, current load of the vehicle, etc.), or the like. In some embodiments, one or more of the factors may be determined based on an output of one or more sensors. For example, a host vehicle may contain an accelerometer, which may provide an output to the processing device, and that output may include a current speed of the host vehicle and/or an acceleration capacity of the host vehicle. In some embodiments, the processing device may determine a current speed of the host vehicle and use the current speed to determine a current maximum braking capability and/or a current acceleration capability. For example, the maximum braking capability of vehicle traveling at a first speed (e.g., 15 km/hr) may be significantly different from the maximum braking capability of the same vehicle traveling at a second speed (e.g., 30 km/hr). In some embodiments, one or more of the maximum braking capability, the maximum acceleration capability, and/or the speed of the host vehicle may be assumed using a predetermined value. For example, the processing device may be configured to assume that the host vehicle has a maximum braking capability corresponding with a predetermined value corresponding with an average (or the worst) maximum braking capability of the type of vehicle associated with the host vehicle. In some embodiments, each factor may be determined based on external conditions of the road or temporary characteristics of the vehicle. For example, the maximum braking capability of the host vehicle may be determined based on a sensed condition of a road surface. In this example, the sensed road condition may include a roughness of the road, a slant or slope of the road, the present or absence of a substance or object on the road, whether the road is asphalt, cement, gravel, or another material, or any other condition consistent with this disclosure. As another example, the maximum braking capability of the host vehicle may be determined based on a sensed weather condition. In this example, the weather condition may include a detection of any precipitation (e.g., rain, sleet, snow, ice, etc.), a weather condition that affects visibility (e.g., fog, smog, smoke, etc.), a weather condition that may affect the handling of the vehicle (e.g., strong winds, high heat, etc.), or any other weather condition that may affect a navigational response of the host vehicle. In another example, processing device may determine a maximum braking capability based on whether the host vehicle contains, for example, one passenger or a plurality of passengers, cargo of a significant weight, a trailer, etc.

In some embodiments, the maximum braking capability and/or the maximum acceleration capability may be determined based on one or more predefined factors. For example, a government or industry entity may provide one or more regulations that dictate a maximum braking capability and/or a maximum acceleration capability that a vehicle or class of vehicles may have and the at least one processor may assume that that the host vehicle has the maximum braking capability and/or the maximum acceleration capability allowed by the regulations.

Process 4800 may include a step 4810 for determining a current stopping distance for the host vehicle. Consistent with this disclosure, the processing device may be configured to determine a current stopping distance for the host vehicle based on the current maximum braking capability of the host vehicle, the current maximum acceleration capability of the host vehicle, and/or the current speed of the host vehicle. The current stopping distance for the host vehicle may be determined by any means consistent with this disclosure. For example, processing device may use one or more of the formulas discussed in relation with RSS above.

In some embodiments, a current stopping distance may be a distance that a host vehicle needs to come to a stop, given its current speed, if the host vehicle were to accelerate at its maximum acceleration capability for period of time before braking at its maximum braking capability. For example, the current stopping distance for the host vehicle may include an acceleration distance that corresponds to a distance the host vehicle can travel over a predetermined time period at the current maximum acceleration capability of the host vehicle, starting from the determined current speed of the host vehicle. The predetermined time period may be a time period assumed by the processing device. For example, a constraint may dictate that the processing device assumes a host vehicle will accelerate for a certain time period (e.g., 0.5 milliseconds, 1 millisecond, 2 milliseconds, 3 milliseconds, 10 milliseconds, etc.). The predetermined time period may be a reaction time associated with the host vehicle. For example, the predetermined time period may be a delay between the time when a sensor (e.g., an imaging device) of the host vehicle senses a condition that requires a braking response from the host vehicle (e.g., a target vehicle coming into the path of the host vehicle) and the time when the host vehicle begins braking at its maximum braking capability. In this example, it may be assumed that, in a worst-case scenario, the host vehicle accelerates at its maximum braking capability for the entirety of the delay period. In some embodiments, the time period associated with the reaction time may be determined or approximated by the processing device. For example, the processing device may monitor the time between receiving an image and determining that a braking response is needed. As another example, the processing device may determine a mean, median, or mode reaction time associated with a plurality of navigational responses and use the mean, median, or mode reaction time when calculating a current stopping distance. For example, after tens, hundreds, or thousands of navigational responses, the processing device may determine that the average time between a sensed event and a navigational response is a particular value (e.g., any real number of milliseconds) and use that value as the reaction time associated with the host vehicle.

Consistent with this disclosure, a determined current stopping distance may include a minimum distance between the host vehicle and another object (e.g., a target vehicle or VRU) after coming to a complete stop. The determined or predetermined minimum distance may correspond with a predetermined separation distance to be maintained between the host vehicle and other vehicles. For example, the processing device may be programmed to include a determined or predetermined minimum distance in a calculation of a stopping distance. For example, a predetermined separation distance may be at least 1 m. In this example, the determined or predetermined minimum distance may be $d_{min}$ as discussed above.

Process 4800 may include a step 4812 for determining a current speed of the target vehicle and to assume a maximum braking capability of the target vehicle. Consistent with this disclosure, the at least one processing device may be programmed to determine a current speed of a target vehicle. In some embodiments, the speed of the target vehicle may be determined based on the speed of the host vehicle. For example, one or more sensors on a host vehicle may provide information related to the speed of the host vehicle and an indication of the acceleration or change in direction of a target vehicle in relation to the host vehicle. In some embodiments, the target vehicle speed may be determined based on analysis of at least one image. The at least one image may be, for example, the same image received by the processing device at step 4802 that was used to identify the target vehicle at step 4806. In some embodiments, a plurality of images may be analyzed to determine a speed of the target vehicle. For example, a first image may depict the target vehicle a first distance from the host vehicle and a second image may depict the target vehicle a second distance from the host vehicle, the processing device may use the change in distance and the time between the first and second images to determine a speed associated with the target vehicle. In some embodiments, the target vehicle speed may be determined based on analysis of an output from at least one of a LIDAR system or a RADAR system associated with the host vehicle. For example, the processing device may use the speed of the host vehicle and a distance between the host vehicle and the target vehicle (as sensed by, for example, a LIDAR system) to determine a speed of the host vehicle.

In some embodiments, to account for a worst-case scenario, the processing device may be programmed to assume that the current speed of the target vehicle is less than or more than a sensed speed of the target vehicle. For example, if the target vehicle is traveling in front of the host vehicle, the processing device may be programmed to reduce a sensed speed using a predetermined value, a percentage, a formula, or the like. For example, if the processing device determined, based on information from one or more sensors, that a target vehicle is traveling at 100 km/hr, it may adjust the sensed speed by 10% to assume that the vehicle is traveling at 90 km/hr. The speed of a target vehicle may be correlated with the braking capacity of the target vehicle so assuming a reduced speed of the target vehicle is akin to assuming the target vehicle may stop quicker than it otherwise might (e.g., a target vehicle may stop in a shorter distance if traveling at 90 km/hr than if traveling at 100 km/hr).

Consistent with this disclosure, the at least one processing device may be programmed to assume a maximum braking capability of the target vehicle based on at least one recognized characteristic of the target vehicle. The maximum braking capability may be assumed as part of step 4812 of process 4800. The processing device may be programmed to recognize the at least one characteristic from information from one or more sensors (e.g., LIDAR, RADAR, imaging devices, etc.). In some embodiments, the recognized characteristic of the target vehicle may be determined based on analysis of the at least one image. For example, the image of the target vehicle may include a text on the exterior of the target vehicle, which may be used to determine a vehicle type, vehicle model, vehicle size, or other characteristic. As another example, the image of the target vehicle may include other objects that may be used to approximate a vehicle size or other characteristic based on comparison with the other objects. As a particular example, a large vehicle may appear taller than a speed-limit sign whereas a small vehicle may appear shorter than a speed-limit sign. In some embodiments, the at least one characteristic of the target vehicle may be determined based on at least one of a LIDAR output or a RADAR output. For example, a LIDAR output may include a first distance associated with the distance to the rear bumper of the target vehicle and a second distance associated with a distance to the front bumper (or other area) of the target vehicle, the difference between which may be used to estimate the size of the target vehicle.

The at least one characteristic may be any characteristic that is known to correlate with a braking capability or that may correlate with a braking capability. In some embodiments, the recognized characteristic of the target vehicle may include a vehicle type. The vehicle type may be, for example, a general category to which the target vehicle belongs (e.g., full-size sedan, compact car, SUV, cross-over SUV, motorcycle, etc.) or a more particular category or sub-category associated with the target vehicle. The processing device may be programmed to assume that the target vehicle has a maximum braking capability corresponding with that of a known braking capability of that vehicle type or a class of vehicles. For example, if the target vehicle is determined to be a full-sized sedan, the processing device may assume that the target vehicle has a maximum braking capability matching that of a full-sized sedan having a best maximum braking capability (e.g., the full-sized sedan that can come to a stop in the shortest distance compared to other full-sized sedans). In some embodiments, the recognized characteristic of the target vehicle may include a vehicle model, brand name, or other classifier of the target vehicle (e.g., Toyota Prius®, BMW X5®, etc.). The processing device may use the vehicle type to, for example, access a database containing known braking capabilities of each vehicle type. For example, if the detected vehicle type is BMW X5®, the processing device may look up the reported braking capabilities of a BMW X5® from a database. If there are multiple maximum braking capabilities reported for a vehicle model (for example, a BMW X5® may have different braking capabilities depending on whether it has the xDrive40i or xDrive50i trim level or depending on the year of its manufacture), the processing device may be programmed to assume the target vehicle has the best maximum braking capability reported for that vehicle model. In some embodiments, the recognized characteristic of the target vehicle may include a vehicle size. The vehicle size may be a relative size, a predetermined size, or the like. The vehicle size may correspond to a physical size of the vehicle and/or an estimated weight of the vehicle. For example, the processing device may determine that the target vehicle is larger or smaller than the host vehicle. In another example, the processing device may be programmed to classify the target vehicle into one or a plurality of predetermined vehicle sizes, each of which may include a range of sizes (e.g., category 1=less than 1,000 kg; category 2=1,000-1500 kg; category 3=1,500-1,800 kg; and so forth). Some vehicles may contain an indication of its size, which may be used to determine a vehicle size of the target vehicle. For example, the target vehicle may be a GMC Sierra® and may include an indication on the exterior of the vehicle associated with its size, such as 1500, 2500, 2500HD, and so forth.

The current speed of the target vehicle and the assumed maximum braking capability of the target vehicle may be used to determine a target vehicle travel distance comprising a distance it would take for the target vehicle to come to a complete stop from its current speed by braking at its maximum braking capability. The distance may be determined by any means consistent with this disclosure.

Process 4800 may include a step 4814 for implementing the planned navigational action if the planned navigation action is safe. For the purposes of step 4814, one example of when the planned navigation action may be considered safe is when the determined current stopping distance for the host vehicle is less than the determined next-state distance summed together with a target vehicle travel distance. In some embodiments, the at least one processing device may be programmed to implement the planned navigational action if the determined current stopping distance for the host vehicle is less than the determined next-state distance summed together with a target vehicle travel distance. The target vehicle travel distance may be determined by any means consistent with this disclosure. For example, the target vehicle travel distance may be based on the current speed of the target vehicle and the assumed maximum braking capability of the target vehicle. This target vehicle travel distance may correspond with a total distance the target vehicle will travel before coming to a complete stop. The navigational action may be implemented in this circumstance because there will be no collision between the host vehicle and the target vehicle because the host vehicle's current stopping distance (including the potential distance traveled assuming maximum acceleration during the reactionary period) will allow it to come to a complete stop before hitting the target vehicle even if the target vehicle brakes at its maximum braking capability. The processing device will implement the navigational action because the host vehicle will be at least the RSS safe distance from the target vehicle after performance of the navigational action. In other words, the next-state distance is equal to or larger than the RSS safe distance Conversely, if the next-state distance is less than the RSS safe distance (e.g., the current stopping distance for the host vehicle is not less than the determined next-state distance summed with the target vehicle travel distance) then the processing device may be programmed to deny or abort the navigational action, or to implement a different navigational action.

For the purposes of step 4814, one example of when the planned navigation action may be considered safe is when the determined current stopping distance for the host vehicle is less, by at least a predetermined minimum distance, than the determined next-state distance summed together with the target vehicle travel distance, where the target vehicle travel distance is determined based on the current speed of the target vehicle and the assumed maximum braking capability of the target vehicle. In some embodiments, the at least one processing device may be configured to implement the planned navigational action if the determined current stopping distance for the host vehicle is less, by at least a predetermined minimum distance, than the determined next-state distance summed together with the target vehicle travel distance, where the target vehicle travel distance is determined based on the current speed of the target vehicle and the assumed maximum braking capability of the target vehicle. In this embodiment, the predetermined minimum distance may be $d_{min}$ and may be predetermined, or determined, by any means consistent with this disclosure and have any attribute discussed above. In some embodiments, the predetermined minimum distance may correspond to a predetermined separation distance to be maintained between the host vehicle and other vehicles. For example, a constraint of an autonomous navigation system may dictate that the autonomous vehicle never come within (less than) a specified distance of other vehicles. The predetermined separation distance may be a distance of any dimension. In some embodiments, the predetermined separation distance is at least 1 m, 2 m, 5 m, etc. In some embodiments, the predetermined distance may vary depending upon, for example, the speed at which the host vehicle is traveling, the location of the host vehicle (e.g., an urban road, a rural highway, etc.).

Consistent with this disclosure, the RSS model may be used to navigate a fully autonomous vehicle, may be used to navigate a partially autonomous vehicle (e.g., a vehicle with a human-operable mode and a selectively autonomous mode), or may be used as an underlying safety feature in a human operable vehicle (e.g., a safety system may prevent or inhibit human inputs in a human-operable vehicle that may be unsafe under the RSS model).

Comfort Responsibility-Sensitive Safety (CRSS)

RSS is effective for determining a safe distance between a host vehicle and another object (e.g., one or more target vehicles or VRUs). Some of the underlying calculations in RSS may assume a worst-case scenario and call for the host vehicle to respond at its maximum capability. For example, some embodiments of RSS may define a safe area in which there will not be a collision if both the target vehicle and the host vehicle brake at their maximum braking capacity, and the host vehicle begins braking after a reaction time during which it accelerates at its maximum capability.

While RSS may prevent or avoid accidents, some users of autonomous vehicles may find that the reactions required by RSS may not create the most comfortable or relaxing ride in certain circumstances. For example, if the worst-case scenario does arise, a vehicle operating in an RSS mode may brake at its maximum braking capability in at least some scenarios. In addition, RSS may define a safe distance between a host vehicle and another object. If a target vehicle, VRU, or other object is further from a vehicle than the safe distance, the vehicle need not make any navigational response. However, as the object comes within a distance equal to or less than the RSS safe distance, the vehicle may respond by braking at the maximum braking capability until the vehicle comes to a stop or until an RSS distance has been established between the object or the target vehicle. Such operation may subject the passengers of the host vehicle to uncomfortable acceleration rates (e.g., during periods of time when the host vehicle brakes are applied at maximum level). Accordingly, there may be a need for an autonomous vehicle safety model that allows for a more comfortable passenger experience.

To provide for a more comfortable, human-like driving experience, an autonomous vehicle may be equipped with a navigation system configured to operate using non-maximal navigational responses. For example, if an autonomous vehicle needs to slow down or stop to avoid a collision, the navigation system may allow braking at a force that is less than the maximum braking capability of the vehicle, at least during a part of the breaking period. Similarly, if a vehicle needs to turn, veer, or swerve to avoid a collision, the navigation system may allow a turn that is less than the maximum turning capability of the vehicle. The same may be true for an acceleration response, which may carried out at less than the maximum acceleration capability of the vehicle, at least during a part of the acceleration period. By limiting the amount of braking or acceleration, a braking response by a host vehicle may be less abrupt, smoother, and feel more similar to a scheduled brake rather than an emergency or late brake. For example, a scheduled brake may include a gradual decrease of the speed that does not cause a seatbelt to lockup. In another example, a scheduled brake may include a gradual increase of the breaking power, possibly until reaching the maximum breaking power of the vehicle, by which point breaking may resume with maximum breaking power.

Consistent with disclosed embodiments, a comfort responsibility-sensitive safety (CRSS) safe distance may be determined. The CRSS safe distance may be the distance between a host vehicle and another object (e.g., a target vehicle or VRU) at which the host vehicle may comfortably come to a stop without colliding with the object. Consistent with this disclosure, CRSS may assume a gradual application of the brake from an initial braking force (that is less than the maximum braking capability of the vehicle) to the maximum braking capability of the vehicle rather than an immediate application of the maximum braking capability. At least in the context of CRSS, the term minimum breaking capability is sometime used interchangeably with the term initial breaking force. The initial braking force may be a minimum braking force of the vehicle or a fraction of the maximum braking capability of the vehicle. The CRSS safe distance may be determined based on a momentary calculated velocity of the host vehicle, the momentary velocity of the target vehicle, the comfort or sub-maximal braking acceleration, and the response time.

Definition 28 (CRSS safe distance) A longitudinal distance between a car $c_r$ and another car $c_f$ that is in $c_r$'s frontal corridor is safe w.r.t. a response time p if for any braking of at most $a_{max,brake}$, performed by $c_f$, if $c_r$ will apply a jerk-bounded braking and acceleration then it won't collide with $c_f$.

In some embodiments, a comfortable navigation response may be accomplished by decreasing the speed or velocity of a host vehicle by a restrained braking profile, which may significantly reduce the jerk on a vehicle and/or passenger thereof. Lemma 12 below calculates the CRSS safe distance according to one embodiment wherein the brake of the vehicle is subject to a gradual braking profile rather than an immediate application of the maximum braking capability.

Lemma 12 Let $c_r$ be a host vehicle which is behind a target vehicle $c_f$ on the longitudinal axis. Let $a_{max,brake}$ be the maximal braking capacity. Let $v_0$ be the initial velocity of the host vehicle and $v_f$ be the original velocity of the target vehicle. Let $j_{max}$ be the slope of a linear application of the host vehicle's brake and let T be the time for reaching full brake in the host vehicle. Then, the CRSS safe distance for the host vehicle is:

$$CRSS_{Distance} = \left[\left[v_0 T + \frac{1}{2}a_0 T^2 - \frac{1}{6}j_{max}T^3\right] + \frac{\left(v_0 + a_0 T - \frac{1}{2}j_{max}T^2\right)^2}{2|a_{min,brake}|} - \frac{v_f^2}{2|a_{max,brake}|}\right]$$

Proof CRSS assumes a jerk-bounded braking capability of the host vehicle that is associated with decreasing the acceleration of the host vehicle linearly (with slope $j_{max}$), until reaching a maximum braking capability $a_{max,brake}$ and then continuing to brake with a constant deceleration (correlated with $a_{max,brake}$) until reaching coming to a stop. A vehicle braking with a jerk of $j_{max}$ that has an initial acceleration $a_0 \leq 0$ m/s, an initial velocity $v_0 \leq 0$ m/s² and an initial position $x_0 \leq 0$ m has the following dynamics:

$$a(t) = a_0 - j_{max}t$$

$$v(t) = v_0 + \int_{r=0}^{t} a(r)dr = v_0 + \left[a_0 r - \frac{1}{2}j_{max}r^2\right]_0^t = v_0 + a_0 t - \frac{1}{2}j_{max}t^2$$

$$x(t) = x_0 + \int_{r=0}^{t} v(r)dr =$$
$$x_0 + \left[v_0 r + \frac{1}{2}a_0 r^2 - \frac{1}{6}j_{max}r^3\right]_0^t = x_0 + v_0 t + \frac{1}{2}a_0 t^2 - \frac{1}{6}j_{max}t^3$$

Based on these equations, the braking distance can be defined. Let $a_{min,brake}$ be the minimum braking capability of the host vehicle and let T be the first time in which either $a(T) = -a_{min,brake}$ or $v(T)=0$, that is, $$T = \min\{T_1, T_2\} \text{ where}$$

$$T_1 = \frac{a_0 + a_{min,brake}}{j_{max}}, T_2 = \frac{a_0 + \sqrt{a_0^2 + 2j_{max}v_0}}{j_{max}}$$

The time for reaching the maximum brake capability by applying the brake linearly with $j_{max}$ is:

$$T_b = \begin{cases} T_2 & \text{if } T = T_2 \\ \dfrac{v_0 + a_0 T - \frac{1}{2}j_{max}T^2}{a_{min,brake}} & \text{otherwise} \end{cases}$$

The speed (velocity) of the host vehicle at any given time may also be determined as a function of $j_{max}$, as follows:

$$v(t) = \begin{cases} v_0 + a_0 t - \frac{1}{2}j_{max}t^2 & \text{if } t \leq T \\ v_0 + a_0 T - \frac{1}{2}j_{max}T^2 - (t-T)a_{min,brake} & \text{if } t \in (T, T_b) \\ 0 & \text{otherwise} \end{cases}$$

With the formulas for the time for reaching the maximum braking capacity and the speed of the host vehicle both during the period in which the brake is being applied according to $j_{max}$ and during the period in which the maximum brake $a_{max,brake}$ is being applied (because the brake was gradually applied using $j_{max}$ until the maximum braking capability was reached), we can determined a braking distance for the host vehicle.

$$\left[v_0 T + \frac{1}{2}a_0 T^2 - \frac{1}{6}j_{max}T^3\right] + \frac{\left(v_0 + a_0 T - \frac{1}{2}j_{max}T^2\right)^2}{2a_{min,brake}}$$

Consistent with this disclosure, the sub-maximal braking rate $j_{max}$ may be predetermined or determined by a processing device. In some embodiments, $j_{max}$ may be an ideal or statistically acceptable braking rate. For example, data relating to the braking rate at which most humans come to a stop may be used for $j_{max}$. In some embodiments, $j_{max}$ may be set according to a user preference. For example, a first passenger may provide a first $j_{max}$ that is comfortable to him or her, a second passenger may provide a second $j_{max}$ that is comfortable to him or her, and so forth. In some embodiments, a processing device may determine a $j_{max}$ based on, for example, one or more road characteristics, traffic conditions (congestion level, average distance between vehicle around the host vehicle, rate of cut-ins in front of the host vehicle, etc.), one or more vehicle characteristics, one or more weather characteristics, or the like. For example, a processing device may determine a $j_{max}$ that provides the maximum safety and comfort on a snowy road, a second $j_{max}$ that provides the maximum safety and comfort on a dry highway, and so forth. It will be appreciated, that while implementing $j_{max}$ can help increase comfort and have other positive impacts on the behavior of the host vehicle, it can also have less desirable effects, in particular, if $j_{max}$ is small, so that breaking may become "relaxed." or not as strong. For example, using a small $j_{max}$ can have a strong negative effect on efficiency, by causing the vehicle to always keep an exaggerated distance from the vehicle ahead. This may cause an annoyance to other road users and prevent the host vehicle from effectively negotiating complex scenarios such as merging and driving in congested areas. Thus, in some examples, a $j_{max}$ that balances performance or efficiency with comfort (while maintaining RSS safety) can be set, selected or determined.

Consistent with this disclosure, the sub-maximal braking rate $j_{max}$ may be a constant. For example, the sub-maximal braking rate may be a braking rate that corresponds with a deceleration of 2 m/s², 10 m/s², or any other constant deceleration. In some embodiments, the sub-maximal braking rate may be constant that is proportional to the maximum braking rate capability of a host vehicle. For example, the sub-maximal braking rate may be 20%, 33%, 50%, 70%, or any other percentage of the maximum braking capability of the host vehicle. In some embodiments, the sub-maximal braking rate may be a linear function of the current speed of the host vehicle, such that the brake is gradually applied from the minimum braking capability of the host vehicle up to, at most, the maximum braking capability of the host vehicle. For example, a sub-maximal braking rate may be determined that allows the host vehicle to come to a stop from its current speed without reaching the maximum braking capability of the vehicle. As another example, a sub-maximal braking rater may be determined that eventually reaches the maximum braking capability of the host vehicle such that the host vehicle brakes at less than maximum braking capability for a first portion of a stopping maneuver and brakes at its maximum braking capability for a second portion the stopping maneuver. In some embodiments, the sub-maximal braking rate may be a different function of the current speed of the vehicle. For example, the sub-maximal braking rate may be a braking rate that is exponentially or logarithmically applied until the vehicle comes to a stop.

Consistent with this disclosure, the CRSS safe distance may be used in any embodiment discussed above in relation to RSS. In practice, CRSS requires an autonomous vehicle to begin braking sooner than a vehicle operating in an RSS mode With CRSS, the vehicle applies the brake at most at the rate dictated by $j_{max}$ where as in RSS, the vehicle may brake at its maximum braking capability. As such, a CRSS safe distance may be longer than an RSS safe distance.

Consistent with this disclosure, a CRSS model may the RSS assumption that the host vehicle may accelerate at its maximum acceleration capability for an initial response period before braking at the rate associated with $j_{max}$ until coming to a stop. As another example, CRSS may include the RSS assumption that the host vehicle stop leaving a minimum approach distance from a target vehicle after applying the brake at a rate associated with $j_{max}$ until coming to a stop.

In some embodiments, CRSS may be modified such that a vehicle may brake at a sub-maximal braking period during a first period and may brake at its maximum braking capability during a second period. For example, a host vehicle traveling behind a target vehicle may sense that the target vehicle is coming to a stop and the host vehicle may then brake at a sub-maximal braking capability (e.g., gradually brake at $j_{max}$) for a first duration (or until a first distance is traveled) and brake at a maximum braking capability for a second duration (or until a second distance is traveled). In this example, the CRSS safe distance may be shorter than if the vehicle were programmed to only brake at the sub-maximal braking capability for the entire period. In some embodiments, CRSS may be modified such that the host vehicle may brake at a first sub-maximal braking capability for a first period and a second sub-maximal braking capability for a second time period. For example, the host vehicle may be programmed to brake at a first rate (e.g., a first jam) for a first duration or distance and to brake at a second rate (e.g., a second $j_{max}$) for a second duration or distance. In this example, the first rate may be less than the second rate. Such a mode of operation may enable a host vehicle to re-establish a CRSS distance, for example, without braking at a rate higher that a level associated with $j_{max}$.

In some embodiments, a passenger or user of a host vehicle may select one or more navigation modes that determine the sub-maximal braking rate. For example, the passenger may be able to select whether the host vehicle brakes with a braking profile associated with a constant sub-maximal braking rate, a gradually increasing sub-maximal braking rate, an exponentially increasing sub-maximal braking rate. Any other braking rate profile may be employed. For example, a selectable mode may instruct the host vehicle to constantly apply the predetermined sub-maximal braking rate until the host vehicle is stopped or until a braking condition is determined to no longer exist. As another example, a selectable mode may instruct the host vehicle to constantly apply the predetermined sub-maximal braking rate for at least a portion of a time period during which a braking condition is determined to exist followed by an application of the host vehicle brake at its maximum braking rate capability. As another example, a selectable mode may instruct the host vehicle to apply the brake beginning at the predetermined sub-maximal braking rate and to progressively increase the braking rate up to the maximum braking rate capability of the host vehicle. Any other combination of braking rates may be selected.

Consistent with this disclosure, CRSS may be used in association with an RSS moder or may be used instead of an RSS mode. In some embodiments, CRSS may be selectively used in some circumstances while RSS may be used in other circumstances. For example, CRSS may be used on a highway (e.g., where the host vehicle is traveling at a high rate of speed and braking at a maximum braking capability may be highly uncomfortable) and RSS may be used in an urban setting (e.g., where the host vehicle is traveling at a low speed and making frequent stops at traffic lights, stop signs, etc.). In some embodiments, a host vehicle may be able to automatically switch between CRSS and RSS modes. For example, the system may switch to CRSS upon sensing the host vehicle has entered a highway environment, may switch to RSS upon sensing an urban environment, and/or may switch to CRSS in certain sensed weather conditions (e.g., snow, rain, etc.).

In some embodiments, CRSS may be used to ensure that a host vehicle remains at least a CRSS safe distance from a target vehicle (or VRU or other object) at all times. For example, if a target vehicle changes lanes and is ahead of the host vehicle after the lane change by a distance less than the CRSS distance, the host vehicle may brake at a sub-maximal braking rate (e.g., a $j_{max}$ braking rate) until it is a distance from the target vehicle that is equal to or greater than the CRSS safe distance. In this example, if the target vehicle comes to a complete stop, the host vehicle may brake at the sub-maximal braking rate until coming to a complete stop or may apply a braking profile that begins at a sub-maximal rate and increases up to a maximum braking rate. Likewise, if the target vehicle brakes for a period but continues traveling in front of the host vehicle, the host vehicle may brake at the sub-maximal braking rate until the target vehicle is at least a CRSS safe distance away from the target vehicle, then the host vehicle may continue traveling at its current speed or at a new speed that allows the host vehicle to maintain the CRSS distance. As noted above, the host vehicle will not take an active navigational action relative to a target vehicle if the CRSS distance, in this mode, cannot be maintained. In some embodiments, the processing device may determine that the host vehicle is approaching the CRSS safe distance (e.g., the host vehicle is more than the CRSS safe distance from a target vehicle, but will be at the CRSS safe distance if it continues at its current acceleration or current speed) and may remove acceleration without braking to maintain a distance that is greater than the CRSS safe distance. For example, the host vehicle may release the throttle, causing the host vehicle to coast away from a target vehicle in front of the host vehicle when the host vehicle would otherwise come within the CRSS safe distance if it did not coast.

In some embodiments, RSS may be implemented as an emergency measure when CRSS is used. For example, when a target vehicle cuts in front of a host vehicle and the distance (through no fault of the host vehicle) to the target vehicle in front of the host vehicle is less than the CRSS safe distance, the host vehicle may brake according to the RSS mode (e.g., immediately breaking at its maximum braking capability). In particular, RSS breaking may be used if the cut in creates a distance that is equal to or less than the RSS safe distance (which is shorter than the CRSS safe distance). If the distance is greater than the RSS safe distance but is less than a CRSS safe distance, than in one example, the system may determine a $j_{max}$ that can be used to stop the host vehicle safely according to the current distance (which is somewhere between CRSS safe distance and RSS safe distance) and adjust CRSS accordingly so that the vehicle stops using the determined $j_{max}$ during at least a portion of the breaking period.

FIGS. 49A-49D illustrate the concept of a safe distance under the CRSS model when a host vehicle is traveling behind a target vehicle. FIG. 48A shows a CRSS safe distance 4902 between a host vehicle 4904 and a target vehicle 4906. As discussed above, CRSS safe distance 4902 is the distance needed for host vehicle 4904 to come to a stop without colliding with target vehicle 4906 if host vehicle 4904 brakes at a comfortable braking rate $j_{max}$ that is less than its maximum braking capability. For comparison purposes, RSS safe distance 4702 (as shown in FIGS. 47A-47D) is included. RSS safe distance 4702 is the distance needed for host vehicle 4904 to come to a stop if it brakes at its maximum braking capability.

Figure 49A:
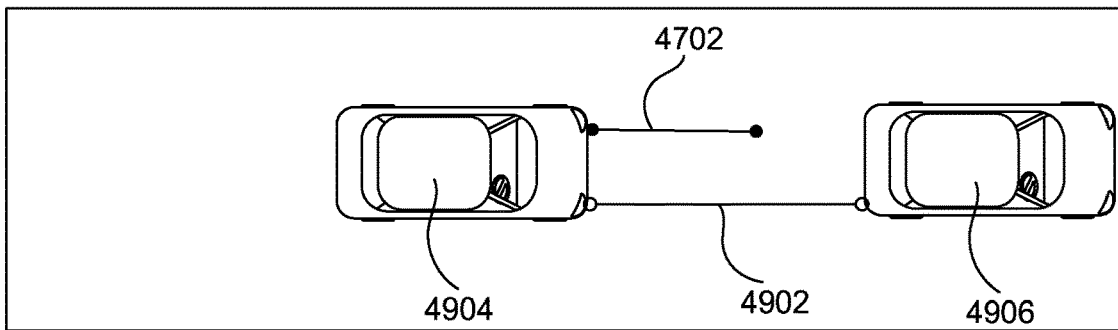
FIGS. 49A-49D illustrate example scenarios in which a vehicle is following another vehicle consistent with the disclosed embodiments.
Figure 49B:
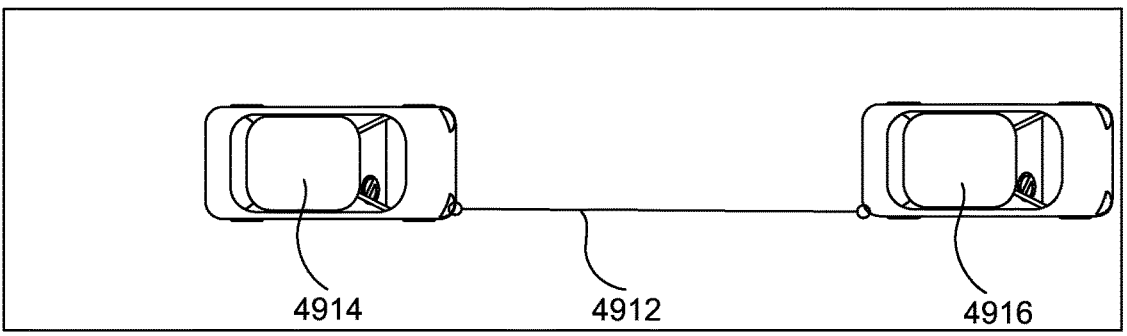

FIG. 49B shows a CRSS safe distance 4912 between a host vehicle 4914 and a target vehicle 4916. The difference between CRSS safe distance 4902 and CRSS safe distance 4912 may be that CRSS safe distance 4912 is associated with a lower braking rate than CRSS safe distance 4902. That is, the $j_{max}$ associated with host vehicle 4814 is lower than the $j_{max}$ associated with host vehicle 4904, therefore, host vehicle 4914 will require a longer distance to come to a stop.

Figure 49C:
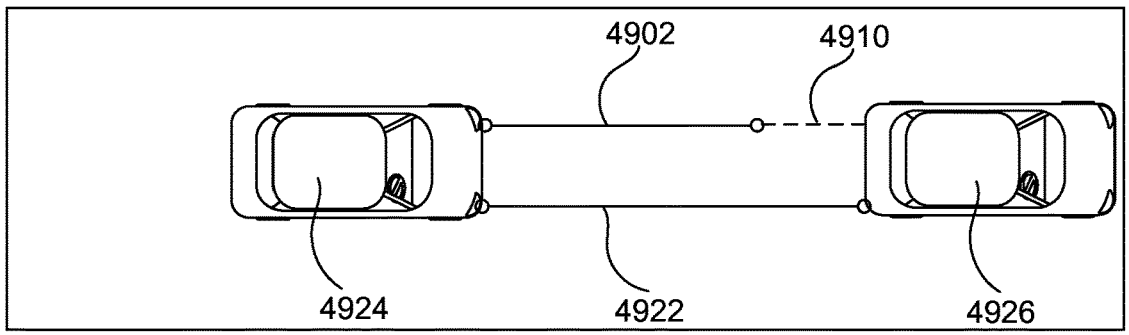

FIG. 49C illustrates CRSS safe distance 4922 between a host vehicle 4924 and a target vehicle 4926. In this example, CRSS safe distance 4922 include a minimum distance 4910, which may be a minimum separation between host vehicle 4924 and target vehicle 4926 after host vehicle comes to a stop by braking with at a rate of $j_{max}$ (as shown by CRSS safe distance 4902). As discussed above, minimum distance 4910 may be $d_{min}$.

Figure 49D:
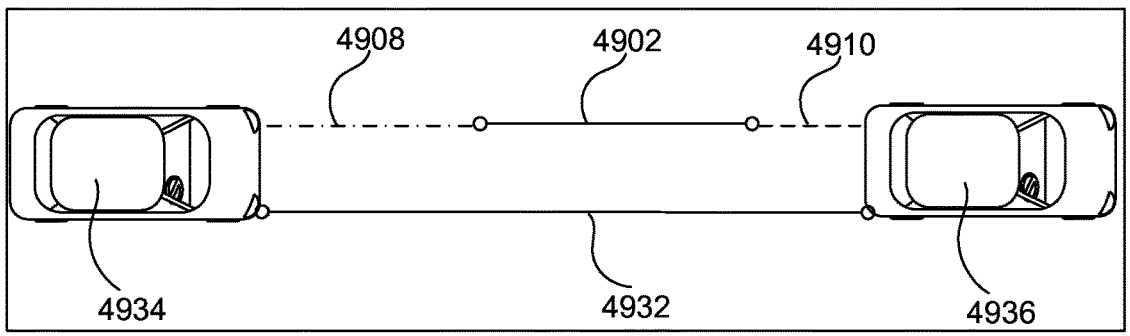

FIG. 49D illustrates CRSS safe distance 4932 between a host vehicle 4934 and a target vehicle 4936. In this example, CRSS safe distance 4932 includes both minimum distance 4910 and acceleration distance 4908. Acceleration distance 4908 may be the distance that host vehicle 4934 would travel if it accelerated at a maximum acceleration capability during an initial reaction period.

The concept of the CRSS safe distance may be extended into lateral directions. A person skilled in the art having the benefit of this disclosure would recognize that a CRSS safe distance may include a lateral distance between a host vehicle and another object (e.g., a target vehicle or VRU) within which the host vehicle may adjust the steering of the host vehicle to avoid collision with the object while avoiding an uncomfortable steering adjustment.

Consistent with this disclosure, a system for braking a host vehicle is disclosed. The system may be, for example, braking system 230 or may be included in a navigational system, for example, an ADAS system. The braking system may include at least one processing device. The processing device may be programmed to perform one or more methods, processes, operations, or functions consistent with this disclosure.

Figure 50:
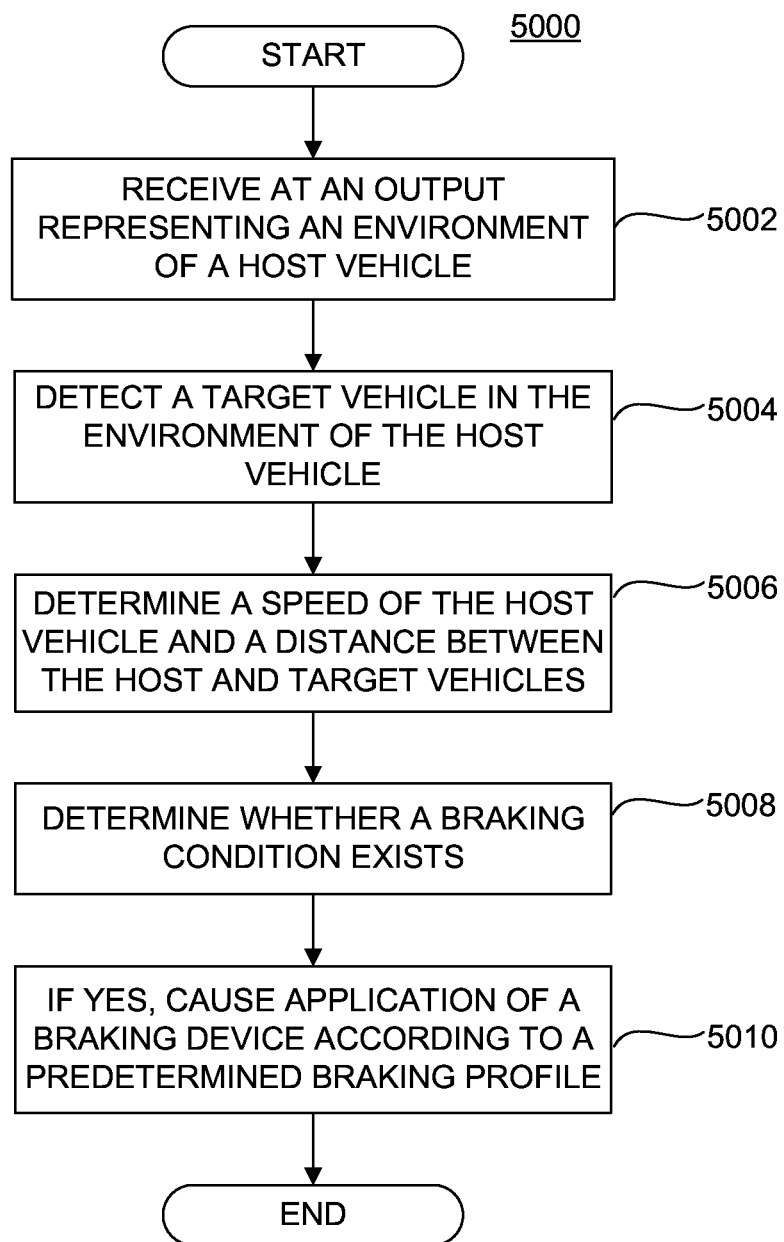
FIG. 50 is a flowchart showing an exemplary process for braking a host vehicle consistent with the disclosed embodiments.

FIG. 50 is a flowchart depicting an exemplary process 5000 that may be performed by the at least one processing device of the braking system. Process 5000 is used for explanatory purposes and is not intended to be limiting. One of ordinary skill in the art having the benefit of this disclosure may understand that process 5000 may include additional steps, may exclude certain steps, or may be otherwise modified in a manner consistent with this disclosure.

Process 5000 may include a step 5002 for receiving an output representing an environment of a host vehicle. Consistent with this disclosure, the at least one processing device may be programmed to receive an output representative of an environment of the host vehicle. The output may be received, for example, from at least one sensor included in or in communication with the braking system. The at least one sensor may be any sensor disclosed herein including, for example, an image capture device, a LIDAR system, a RADAR system, an accelerometer, or the like. In some embodiments, the processing device may be programmed to receive a plurality of outputs from one or more sensors. For example, the processing device may receive a first output from an image capture device, a second output from a LIDAR system, and so forth. As another example, the processing device may be programmed to receive a first output from an image capture device, a second output from the image capture device, and so forth. In some embodiments, the one or more sensors may be configured to capture information relating to different areas of the environment of the host vehicle. For example, a first image capture device may be configured to capture an image of the environment in front of the host vehicle, a second image capture device may be configured to capture an image of the environment behind the host vehicle, and so forth. As another example, an image capture device may be configured to capture an image of the environment in front of the host vehicle and one or more LIDAR systems may be configured to capture information relating to the environment on either side of the host vehicle.

Process 5000 may include a step 5004 for detecting a target vehicle in the environment of the host vehicle. In some embodiments, the target vehicle may be detected based on the output received at step 5002. Consistent with this disclosure, the at least one processing device of the braking system may be programmed to detect, based on the output, a target vehicle in the environment of the host vehicle. The target vehicle may be detected by any means consistent with this disclosure. For example, if the output is one or more images, the processing device may analyze the images (e.g., compare the images to images know to contain vehicles) to detect a target vehicle. As another example, one or more outputs from one or more LIDAR system or RADAR systems may be used to detect the outline and position of a target vehicle. In some embodiments, the processing device may detect a plurality of target vehicles. For example, the processing device may detect a target vehicle in front of the host vehicle, behind the host vehicle, and/or next to the target vehicle, or a combination thereof. While the examples disclose detecting target vehicles, it is understood that any other object (e.g., VRUs, road characteristics, etc.) may be detected by the same means.

Process 5000 may include a step 5006 for determining a speed of the host vehicle and a distance between the host vehicle and the target vehicle. Consistent with this disclosure, the at least one processing device of the braking system may be programmed to determine a current speed of the host vehicle and a current distance between the host vehicle and the target vehicle. The current speed and/or the current distance may be determined based on one or more outputs from one or more sensors. In some embodiments, the current speed and/or the current distance may be determined based on the outputs used to detect the target vehicle at step 5004. For example, an output from a LIDAR system may output one or more distances between various points on the target vehicle and the host vehicle, which may be used to determine a current distance between the host vehicle and the target vehicle. In some embodiments, the current speed of the host vehicle may be provided by an accelerometer and/or speedometer associated with the host vehicle.

Process 5000 may include a step 5008 for determining whether a braking condition exists. Consistent with this disclosure, the at least one processing device of the braking system may determine whether a braking condition exists. A braking condition may be any condition in which the host vehicle needs to brake to avoid unsafe circumstances, avoid a collision, or come to a stop. For example, a braking condition may be a determination that the host vehicle is less than the CRSS safe distance away from the target vehicle or other object. The determination of whether a braking condition exists may be based at least upon the current speed of the host vehicle and the current distance between the host vehicle and the target vehicle. For example, the processing device may determine a CRSS safe distance (or RSS safe distance) between the target vehicle and the host vehicle based on the current speed of the host vehicle and target vehicle, the braking capability of the host vehicle, the assumed braking capabilities of the target vehicle, and optionally, the maximum acceleration rate of the host vehicle, as discussed above. The processing device may the compare the CRSS safe distance with the current distance between the host vehicle and the target vehicle. The processing device may determine that a braking condition exists if, based on the comparison, the current distance between the host vehicle and the target vehicle is less than the CRSS safe distance. Any other unsafe condition disclosed herein to which the host vehicle would respond by braking may be a braking condition. A braking condition would also exist if the host vehicle detects that at a current speed and/or acceleration, the host vehicle will approach a target vehicle closer than the CRSS distance. In such cases, the host vehicle would take action by braking, or instituting another maneuver (lane change etc.) such that the CRSS distance is at least maintained between the host vehicle and the target vehicle.

Process 5000 may include a step 5010 for causing application of a braking device according to a predetermined braking profile if a braking condition exists. The braking condition may be any braking condition determined at step 5008. Consistent with this disclosure, the at least one processing device of the braking system may be programmed to, if a braking condition is determined to exist, cause application of a braking device associated with the host vehicle according to a predetermined braking profile. For example, if the processing device determines that the host vehicle is less than or is approaching a CRSS safe distance relative to a target vehicle, the braking system may begin braking the host vehicle at a predetermined sub-maximal braking rate. The predetermined braking profile may include a segment beginning at a sub-maximal braking rate for the host vehicle and may progressively increase up to a maximum braking rate of the host vehicle. The sub-maximal braking rate may progressively increase according to any of the embodiments disclosed herein. For example, the progressive increase may be a non-linear increase. In another example, the progressive increase may be a linear increase.

For example, the braking system may only apply the brake during the duration of the braking condition. In some embodiments, once the maximum braking rate of the host vehicle is achieved, the at least one processor may be configured to continue the application of the braking device of the host vehicle at the maximum braking rate of the host vehicle until the braking condition ceases to exist (e.g., the host vehicle stops or a CRSS distance is reestablished between the host vehicle and the target vehicle). In some cases, the braking condition may cease before the host vehicle comes to a complete stop, even when applying the braking mechanism at the maximum braking rate, and the processing device may cease the braking in response to the end of the braking condition. In some embodiments, the maximum braking rate of the host vehicle may not be achieved. For example, if the braking condition ceases to exist before the braking system reaches the maximum braking rate, the at least one processor may be programmed to cease braking and the maximum braking rate of the host vehicle may never be reached.

In some embodiments, the maximum braking capability that is used to compute breaking distances may be a certain number (or any other mathematical expression) that is used in the formulae that are used and described herein. In some embodiments, the maximum braking force may vary with respect to that which was used in the formulae and may be the actual breaking force that the vehicle is capable of producing at each and every instant, and which may be effected by, for example, dynamic factors including road surface characteristics, weather conditions, and conditions of the vehicle and its various systems and components.

Consistent with this disclosure, a system for navigating a host vehicle is disclosed. In some embodiments, the system may be an ADAS system or other navigational system disclosed herein. The navigation system may include at least one processor or processing device programmed to perform one or more methods, process, functions, or operations consistent with this disclosure. The processor or processing device may be processing device 110 or another processor or processing device in or in communication with a host vehicle (e.g., the at least one processing device of the braking system).

Figure 51:
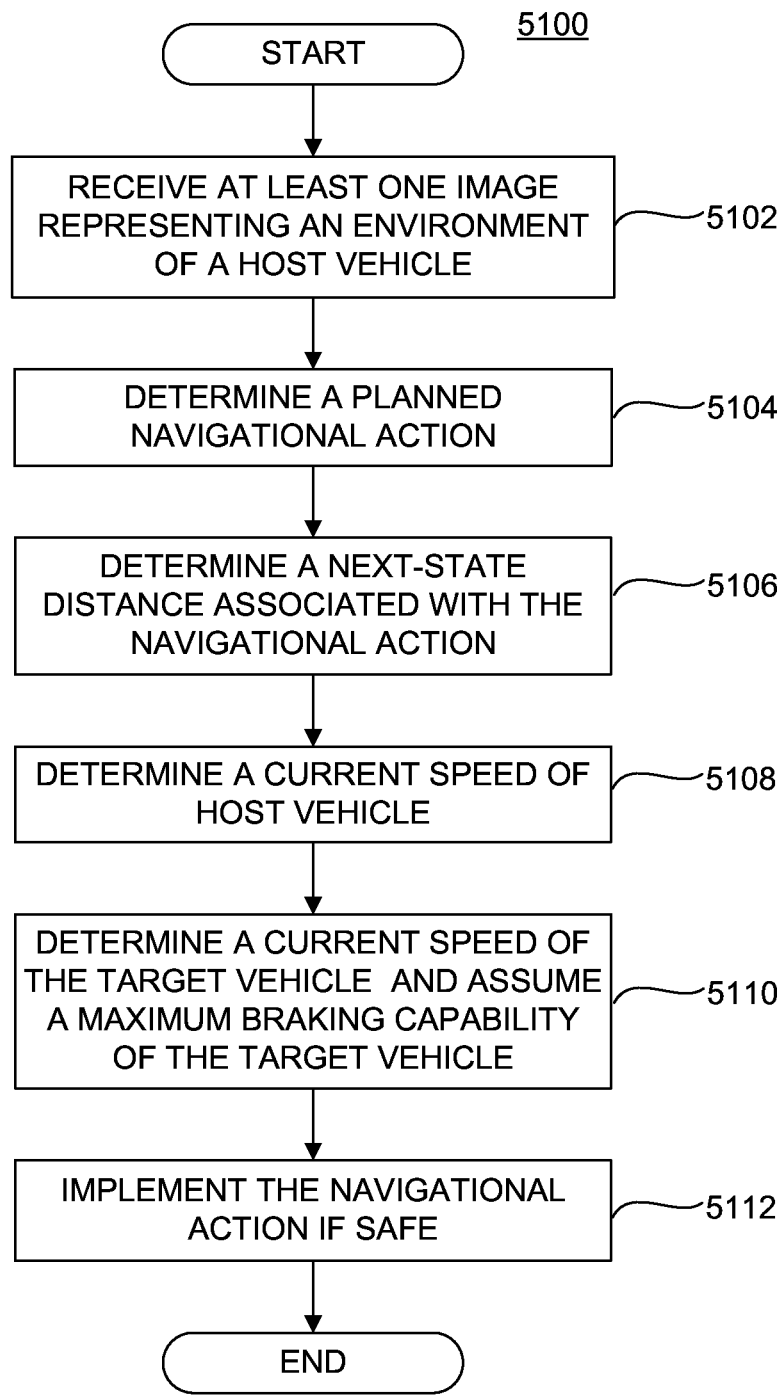
FIG. 51 is a flowchart showing an exemplary process for navigating a host vehicle consistent with the disclosed embodiments.

FIG. 51 is a flowchart depicting an exemplary process 5100 that may be performed by the at least one processing device of the navigational system. Process 5100 is for explanatory purposes and it not intended to be limiting. One of ordinary skill in the art having the benefit of this disclosure may understand that process 5100 may include additional steps, exclude certain steps, or may be otherwise modified in a manner consistent with this disclosure.

Process 5100 may include a step 5102 for receiving at least one image representing an environment of a host vehicle. Consistent with this disclosure, the at least one processing device may be programmed to receive at least one image representative of an environment of a host vehicle. The at least one image may be received from an image capture device. The image capture device may be any consistent with this disclosure, including image capture device 122. In some embodiments, the at least one image may be an image obtained from any of a camera, a RADAR, a LIDAR, or any other device from which an image may be obtained, whether optical or otherwise.

Process 5100 may include a step 5104 for determining a planned navigational action. Consistent with this disclosure, the at least one processing device may be programmed to determine a planned navigation action for accomplishing a navigational goal of the host vehicle. The navigation action may be determined based on at least one driving policy. The planned navigation action and/or the at least one driving policy may be any consistent with this disclosure, including those discussed above. For example, the planned navigation action may include at least one of a lane change maneuver, a merge maneuver, a passing maneuver, a follow distance reduction maneuver, or a maintain throttle action. The navigational action may be determined in substantially the same manner as discussed with respect to step 4804 of process 4800. The processing device may be programmed to analyze the at least one image to identify a target vehicle in the environment of the host vehicle. The at least one image may be an image received from an image capture device, such as image capture device 122. The target vehicle may be a vehicle anywhere in the current vicinity of the host vehicle or a future vicinity of the host vehicle. For example, the target vehicle may be a vehicle in front of, next to, or behind the host vehicle and/or a vehicle that will be in front of, next to, or behind the host vehicle if it performs the planned navigation action.

Process 5100 may include a step 5106 for determining a next-state distance associate with the planned navigational action. Consistent with this disclosure, the at least one processing device may be programmed to determine a next-state distance between the host vehicle and the target vehicle that would result if the planned navigation action was taken. The next-state distance may be calculated by any means disclosed herein, including the CRSS safe distance formula above. For example, if the planned navigation action is an acceleration (or a lane change, or even continuing at a current speed without application of a brake, etc.) of the host vehicle, the next-state distance may be a distance between the host vehicle and a target vehicle in front of the host vehicle. In some examples, more than one next-state distance may be determined. For example, if the planned navigation action is a merge into an adjacent lane, a first next-state distance may be determined in relation to the host vehicle and a first target vehicle that will be in front of the host vehicle after the merge and a second next-state distance may be determined in relation to a second target vehicle that will be behind the host vehicle after the merge.

Process 5100 may include a step 5108 for determining a current speed of the host vehicle. Consistent with this disclosure, the at least one processing device may be programmed to determine a current speed of the host vehicle. The current speed may be determined by any means consistent with this disclosure, including as discussed in relation to step 4808 of process 4800. In some embodiments, the current speed of the host vehicle may be determined based on an output of one or more sensors. For example, the current speed may be determined from an output of an accelerator, a LIDAR system, a RADAR system, a GPS unit, or the like. As another example, the current speed of the host vehicle may be determined by analyzing one or more images (e.g., based on a scaling rate change of a fixed object detected in two or more images).

Process 5100 may include a step 5110 for determining a current speed of the target vehicle and to assume a maximum braking capability of the target vehicle. Consistent with this disclosure, the at least one processing device may be programmed to determine a current speed of the target vehicle and assume a maximum braking rate capability of the target vehicle. The maximum braking rate capability may be assumed based on at least one characteristic of the target vehicle. The maximum braking capability of the target vehicle may be determined by any means consistent with this disclosure, including those discussed in relation to RSS (e.g., as part of step 4812 of process 4800).

In some embodiments, the current speed of the target vehicle may be determined based on the current speed of the host vehicle. For example, one or more sensors of the host vehicle may provide information related to the speed of the host vehicle and one or more sensors may provide a position of the target vehicle in relation to the host vehicle and/or a change in position, acceleration, or velocity of the target vehicle, which may be used to determine a current speed of the target vehicle. In some embodiments, the target vehicle speed may be determined based on analysis of at least one image. The at least one image may be the same image in which the target vehicle was first detected or may a different image. In some embodiments, a plurality of images may be analyzed to determine a current speed of the target vehicle. For example, an image captured at a first time may depict the target vehicle a first distance from the host vehicle and an image captured at a second time may depict the target vehicle a second distance from the host vehicle, the processing device may determine a current speed based on the change in distance between the two images. In some embodiments, the target vehicle speed may be determined based on analysis of an output from at least one of a LIDAR system or a RADAR system associated with the host vehicle. For example, the processing device may use the speed of the host vehicle and a distance between the host vehicle and the target vehicle (as sensed by, for example, a LIDAR system) to determine a speed of the host vehicle.

The at least one characteristic of the target vehicle may be determined by any means consistent with this disclosure. In some embodiments, the processing device may determine the at least one characteristic based on one or more outputs from one or more sensors associated with the host vehicle. For example, the at least one characteristic may be determined based on at least one of a LIDAR output or a RADAR output. For example, a LIDAR output may include one or more distances associated with the distance between, for example, the host vehicle and the top edge of the target vehicle and a bottom edge of the target vehicle, the difference between which may be used to determine a size of the target vehicle. In some embodiments, the at least one characteristic may be determined based on analysis of at least one image. The at least one image may be the image in which the target vehicle was first detected or a different image. For example, the image of the target vehicle may include text, logos, or other information that may be used to determine a vehicle type, model, trim level, or other characteristic. As another example, the image of the target vehicle may include other vehicles or objects that may be used for comparison with the target vehicle to determine a size of the target vehicle.

The recognized characteristic of the target vehicle may be any that may be useful for determining a maximum braking capability of the target vehicle. In some embodiments, the recognized characteristic of the target vehicle may include a vehicle type. The vehicle type may be, for example, a general category to which the target vehicle belongs (e.g., full-size sedan, compact car, SUV, cross-over SUV, motorcycle, etc.) or a more particular category or sub-category associated with the target vehicle. The processing device may be programmed to assume that the target vehicle has a maximum braking capability corresponding with that of a known braking capability of that vehicle type or a class of vehicles. For example, if the target vehicle is determined to be a motorcycle, the processing device may assume that the target vehicle has a maximum braking capability matching that of the motorcycle having the best maximum braking capability (e.g., the motorcycle that can come to a stop the quickest or in the shortest difference). In some embodiments, the recognized characteristic of the target vehicle may include a vehicle model. The vehicle model may include, for example, a brand name and/or model name of the vehicle. The vehicle model of the target vehicle may be determined by any means consistent with this disclosure including, for example, detection of text, logos, or other identifiers of a vehicle model or detection of features characteristic of a vehicle model. For example, the processing device may analyze an image of the target vehicle and recognize text associated with a vehicle model (e.g., the text "Honda Accord" may be detected on the rear of the target vehicle). As another example, the processing device may analyze an image and recognize one or more distinctive features of the target vehicle (e.g., the shape of the taillights, the presence or absence of a spoiler, the general shape of the target vehicle, etc.) and may determine a vehicle type by, for example, comparing the recognized features with one or more images of known vehicle types. The processing device may use the vehicle type to determine the braking capabilities of the target vehicle. For example, if the vehicle type is Ford Escape®, the processing device may access a database or perform an Internet search to locate the reported braking capabilities of a Ford Escape®. Some vehicle types may have multiple reported braking capabilities depending upon, for example, the features offered in the trim level of the vehicle. The processing device may be programmed to assume that the target vehicle has the best maximum braking capability of the vehicles of that type. In some embodiments, the recognized characteristics of the target vehicle may include a vehicle size. The vehicle size may be a physical dimension of the vehicle, a weight associated with the vehicle, a combination thereof, or the like. The vehicle size may be a relative size, one of a plurality of predetermined sizes, or the like. For example, the processing device may be programmed to categorize target vehicles into one of a plurality of predetermined size ranges (e.g., compact=less than 1,000 kg; small=1,000-1,500 kg; and so forth). In some embodiments, the target vehicle size may be estimated based on its comparison to the size of the host vehicle, to other vehicles on the road, to objects near the target vehicle, and so forth. For example, the processing device may analyze an image of the target vehicle and determine that it is larger than the host vehicle but smaller than a vehicle next to the target vehicle. The vehicle size may be used to assume a maximum braking capability of the target vehicle. For example, the processing device may be programmed to assume that larger, heavier vehicles take longer to come to a stop.

The maximum braking capability of the target vehicle may be determined based on additional factors. For example, the current maximum braking capability of the target vehicle may be determined based on a sensed condition of a road surface. In this example, the sensed road condition may include a roughness of the road, a slant or slope of the road, the present or absence of a substance or an object on the road, whether the road is asphalt, cement, gravel, or another material, or any other condition consistent with this disclosure. As another example, the current maximum braking capability of the target vehicle may be determined based on a sensed weather condition. In this example, the weather condition may include a detection of any precipitation (e.g., rain, sleet, snow, ice, etc.), a weather condition that affects visibility (e.g., fog, smog, smoke, etc.), a weather condition that may affect the handling of the vehicle (e.g., strong winds, high heat, etc.), or any other weather condition that may affect a navigational response of the host vehicle. In another example, processing device may determine a maximum braking capability based on whether the host vehicle contains, for example, new or old tires, 1 passenger or a plurality of passengers, a significant weight of cargo, a trailer, etc. In some embodiments, the maximum braking capability of the target vehicle may be determined based on a predefined factor, such as a regulation which provides a maximum braking capability allowed for vehicles or vehicle types.

The assumed maximum braking capability may be used to determine a target vehicle travel distance that it may take the target vehicle to come to a stop from its current speed if it were to brake at its maximum braking capability. The distance may be calculated by any means consistent with this disclosure, including those discussed in relation to RSS and/or CRSS.

Process 5100 may include a step 5112 for implementing the navigational action if the planned navigational action is safe. For the purposed of step 5112, one example of when the planned navigation action may be considered safe is when the host vehicle can be stopped using a sub-maximal braking rate within a host vehicle stopping distance that is less than the determined next-state distance summed together with a target vehicle travel stopping distance determined based on the current speed of the target vehicle and the assumed maximum braking rate capability of the target vehicle. In some embodiments, the at least one processing device may be programmed to implement the planned navigational action if, for the determined current speed of the host vehicle and at a predetermined sub-maximal braking rate, the host vehicle can be stopped within a host vehicle stopping distance that is less than the determined next-state distance summed together with a target vehicle travel distance. The predetermined sub-maximal braking rate may be less than a maximum braking rate capability of the host vehicle. The target vehicle travel distance may be a distance determined based on the current speed of the target vehicle and the assumed maximum braking rate capability of the target vehicle. As described above, the sub-maximal braking rate may be the jerk-bounded braking rate represented by $j_{max}$ in the CRSS formulas. In some embodiments, the sub-maximal braking rate may be any deceleration rate associated with, but less than, the maximum braking capability of the host vehicle. For example, the predetermined sub-maximal braking rate may be associated with a deceleration rate that is up to 50% of a deceleration rate associated with the maximum braking rate capability for the host vehicle. In another example, the predetermined sub-maximal braking rate may be associated with a deceleration rate that is up to 20% of a deceleration rate associated with the maximum braking rate capability for the host vehicle. In some embodiments, the maximum braking rate capability of the host vehicle may be determined such that the sub-maximal braking rate can be determined. The maximum braking rate capability may be determined based on any means consistent with this disclosure, including those discussed in relation to RSS. For example, the maximum braking rate capability of the host vehicle may be determined based on a sensed condition of a road surface. As another example, the maximum braking rate capability of the host vehicle may be determined based on a sensed weather condition.

In some embodiments, as discussed above, the predetermined sub-maximal braking rate may be a sub-maximal braking rate selected by a user. For example, the predetermined sub-maximal braking rate may be determined based on a user-selectable braking mode including: a mode in which a host vehicle brake is constantly applied at the predetermined sub-maximal braking rate until the host vehicle is stopped or a braking condition is determined to no longer exist; a mode in which a host vehicle brake is constantly applied at the predetermined sub-maximal braking rate for at least a portion of a time period during which a braking condition is determined to exist followed by an application of the host vehicle brake at a maximum braking rate for the host vehicle; and/or a mode in which a host vehicle brake is applied beginning at the predetermined sub-maximal braking rate and progressively increasing up to a maximum braking rate for the host vehicle.

Consistent with this disclosure, the host vehicle stopping distance may be determined using one or more of the CRSS formulas discussed above. For example, the host vehicle stopping distance may be determined based on the current speed of the host vehicle and the predetermined sub-maximal braking rate of the host vehicle. As another example, the host vehicle stopping distance may be determined based on the current speed of the host vehicle, the maximum acceleration that the host vehicle could achieve during a response period, and the predetermined sub-maximal braking rate of the host vehicle. In some embodiments, the host vehicle stopping distance may be greater than a sum of an acceleration distance, which corresponds to a distance the host vehicle can travel at a maximum acceleration capability of the host vehicle over a predetermined time period, and a maximum brake rate distance, which corresponds to a distance the host vehicle may travel while slowing from the current speed of the host vehicle to zero speed at a maximum braking rate capability of the host vehicle. In some embodiments, the host vehicle stopping distance may be greater than a sum of an acceleration distance, which corresponds to a distance the host vehicle can travel at a maximum acceleration capability of the host vehicle over a predetermined time period, and a sub-maximal brake rate distance, which corresponds to a distance the host vehicle may travel while slowing from the current speed of the host vehicle to zero speed at a predetermined sub-maximal braking rate capability of the host vehicle. In any embodiment, the predetermined time period may be a reaction time associated with the vehicle. For example, the predetermined time period may the time period between the processing device first detecting the target vehicle and the time that the host vehicle begins braking, as discussed above in relation to RSS.

In some embodiments, the host vehicle stopping distance may include a first distance over which the host vehicle is braked at the predetermined sub-maximal braking rate and a second distance over which the host vehicle is braked at the maximum braking rate capability of the host vehicle. For example, as discussed above, the host vehicle may brake at the sub-maximal braking rate according to CRSS for a first distance and then brake at the maximal braking rate for a second distance. In another example, the host vehicle may brake at the sub-maximal braking rate and gradually increase the sub-maximal braking rate until reaching the maximum braking rate and then continue braking at the maximum braking rate. The processing device may be configured to cause the host vehicle to brake at the predetermined sub-maximal braking rate over the first distance prior to braking the host vehicle at the maximum braking rate capability of the host vehicle over the second duration. For example, the host vehicle may brake at the sub-maximal braking rate according to CRSS for a first duration and then brake at the maximal braking rate for a second duration.

Another example of when the planned navigation action may be considered safe at step 5112 is when he host vehicle can be stopped using a predetermined sub-maximal braking rate within a host vehicle stopping distance that is less than the determined next-state distance summed together with a target vehicle travel distance determined based on the current speed of the target vehicle and the assumed maximum braking rate capability of the target vehicle, wherein the predetermined braking rate profile progressively increases from a sub-maximal braking rate to a maximal braking rate for the host vehicle. In some embodiments, the at least one processing device may be programmed to implement the planned navigational action if, for the determined current speed of the host vehicle and for a predetermined braking rate profile, the host vehicle can be stopped within a host vehicle stopping distance that is less than the determined next-state distance summed together with a target vehicle travel distance determined based on the current speed of the target vehicle and the assumed maximum braking rate capability of the target vehicle, wherein the predetermined braking rate profile progressively increases from a sub-maximal braking rate to a maximal braking rate for the host vehicle. The target vehicle stopping distance may be determined as discussed with respect to the above embodiments. The difference between this embodiment and the prior embodiment is that the braking profile in this embodiment may progressively increase up to the maximum braking rate for the host vehicle. The CRSS safe distance may include a distance within which (at current speeds for the host and target vehicles) the host vehicle can stop and not collide with the target vehicle when the host vehicle applies its brakes at a sub-maximal rate for at least some of the braking period, and the target vehicle brakes at its maximum rate.

In this embodiment, the braking rate profile may increase by any means consistent with this disclosure. For example, the predetermined braking rate profile may increase linearly from the sub-maximal braking rate to the maximal braking rate for the host vehicle. As another example, the predetermined braking rate profile may increase non-linearly from the sub-maximal braking rate to the maximal braking rate for the host vehicle. In this example, the predetermined braking rate profile may increase exponentially, logarithmically, or according to any other function or may increase sporadically. In any example, it remains possible that the braking profile never reaches the maximum braking capability. For example, the braking condition, in response to which the vehicle may have begun braking at the predetermined barking rate profile, may cease to exist before the vehicle reaches its maximum braking rate capability and the vehicle may cease braking in response.

Consistent with this disclosure, the at least one processing device may be configured to implement the planed navigational action if the determined host vehicle stopping distance is less, by at least a predetermined minimum distance, than the determined next-state distance summed together with a target vehicle travel distance determined based on the current speed of the target vehicle and the assumed maximum braking rate capability of the target vehicle. In some embodiments, the minimum distance may be $d_{min}$ as discussed above in relation to CRSS and RSS and may be predetermined or determined by any means consistent with this disclosure. In some embodiments, the predetermined minimum distance may correspond to a predetermined separation distance to be maintained between the host vehicle and other vehicles. For example, if a host vehicle and a target vehicle are traveling in the same direction and both come to a stop, the predetermined separation distance may be the minimum distance between the host vehicle and the target vehicle after both come to a stop. The predetermined separation distance may be a distance of any length. For example, the predetermined separation distance may be at least 1 m or other suitable minimum approach distance. In some embodiments, the predetermined distance may vary depending upon, for example, the speed at which the host vehicle is traveling, the location of the host vehicle (e.g., an urban road, a rural highway, etc.). For example, the $d_{min}$ may increase as host vehicle speed increases.

The embodiments discussed in relation to CRSS are exemplary only. One of ordinary skill in the art having the benefit of this disclosure may understand that CRSS may be used instead of or in association with RSS in any of the embodiments discussed in this disclosure. In some embodiments, a host vehicle may be capable of navigating under either the CRSS or RSS modes. For example, a fully autonomous vehicle may be configured to navigate under the rules of the CRSS model, but a passenger in the vehicle may disengage the CRSS model and choose to navigate under the RSS mode. Such a mode selection, for example, may enable the host vehicle to approach target vehicles more closely, while still maintaining a safe distance. The tradeoff, however, is that the RSS mode may be associated with higher deceleration rates than the CRSS mode and may be less comfortable to the passengers of the host vehicle. In some embodiments, an autonomous vehicle may be capable of navigating under each of the CRSS and RSS modes. For example, the vehicle may be configured to employ the CRSS model when traveling under first conditions (e.g., at high speeds, on a rural highway, etc.) and the RSS mode when traveling under second conditions (e.g., at low speeds, on an urban highway, etc.).

Consistent with this disclosure, the CRSS mode may be used to navigate a fully autonomous vehicle, may be used to navigate a partially autonomous vehicle (e.g., a vehicle with a human-operable mode and a selectively autonomous mode), or may be used as an underlying safety feature in a human operable vehicle (e.g., a human-operable vehicle may prevent or avoid situations that may be unsafe under the CRSS model).

Vision Zero Safety System for a Driver-Operated Vehicle

In some embodiments, a safety system (e.g., Vision Zero) may be employed in a host vehicle having autonomous or partially autonomous capabilities, but for which a human driver is allowed to operate in a driver-controlled mode. In such cases, the safety system can operate in the background. The human driver may be allowed to take any navigational action he or she wishes as long as the navigational action does not result in less than a CRSS or RSS distance relative to detected target vehicles. If the driver never takes a navigational action that would result in an approach relative to a target vehicle of less than the CRSS or RSS distance (depending on the selected mode of operation, for example), then the human driver may be unaware of the operation of the safety system. On the other hand, if a driver initiates a navigational action that would result in an approach relative to a target vehicle of less than a CRSS or RSS distance, then the safety system will take one or more actions to prevent the initiated navigational action from being completed. In other words, the vehicle may take control of the vehicle from the driver to avoid navigation into an unsafe situation involving an approach distance less than CRSS or RSS. The driver retakes control once he or she aborts attempts to navigate into a condition the vehicle senses as unsafe or when the driver initiates a different navigational action deemed by the host vehicle to be safe.

The disclosed safety system may take control of the vehicle to prevent a navigation action, may prevent a driver input associated with a potentially unsafe navigational action (e.g., one detected as having a result that would violate a CRSS or RSS envelope), inhibit certain navigational inputs, alert a driver, and/or a combination thereof. For example, the safety system may prevent a lateral motion of the vehicle if it would result in an unsafe cut-in (e.g., if the vehicle would cut in front of a target vehicle such that the distance between the vehicle and the target vehicle is less than the RSS safe distance). An example of an unsafe cut-in that may be prevented by the safety system is depicted in FIG. 30A. As another example, the safety system may prevent a navigational action that would result in a longitudinal motion that, in turn, would result in less than an RSS or CRSS distance between the host vehicle and a target vehicle (e.g., a leading target vehicle). An example of an unsafe longitudinal motion that may be prevented by the safety system is depicted in FIG. 28B. As another example, the safety system may prevent lateral or longitudinal motion of the host vehicle (in response to a driver input) that would result in less than a predetermined distance or a safe distance between the host vehicle and a pedestrian. Examples of unsafe motion relation to pedestrians that may be prevented by the safety system are depicted in FIGS. 44A and 44C.

Consistent with this disclosure, the safety system may prevent a human driver's attempted navigational maneuvers if they are unsafe. As used herein, "prevent" may include any means for making a human driver unable to perform the navigational maneuver. For example, if the unsafe navigational maneuver is a merge, the safety system may stop the merge by locking the steering wheel or other steering mechanism (e.g., such that the steering wheel cannot be turned in the direction of the merge), by applying an equal but opposite steering input to cancel out the driver's steering input, by intercepting or interrupting an electrical signal associated with a driver's steering input, or otherwise cause the driver's steering input to have no navigational response or less than the intended navigational response. As another example, if the unsafe navigational maneuver is an acceleration, the safety system may stop the acceleration by causing an acceleration input to have no effect (e.g., interception of an electric signal, locking the gas-pedal, applying the brake, etc.). The prevention may be sufficient to avoid or stop a navigational maneuver that would otherwise be unsafe (e.g., one that is determined to have a resulting approach to a target vehicle less than CRSS or RSS, etc.).

Consistent with this disclosure, the safety system may take over a vehicle to avoid an unsafe navigational maneuver attempted by a human driver. During a takeover period, the safety system may operate in an autonomous mode and fully control the host vehicle, until, for example, it si determined that a driver input would no longer result in an unsafe navigational action. As used herein, "take over" may include any operation of one or more autonomously controlled actuators by which the safety system may manipulate or control one or more of the steering, braking, acceleration, or other vehicle control systems. For example, if a driver input is determined to be associated with an unsafe merge, the safety system may temporarily take control of the steering mechanism of the vehicle such that the driver cannot provide additional steering input to cause the merge or so that a driver's input has no effect and the safety system may steer the vehicle in a direction to avoid the unsafe maneuver (e.g., counter steer against the initiated driver input on the steering wheel). As another example, if the unsafe maneuver is an acceleration, the safety system may take control of the acceleration mechanism such that the driver cannot provide additional input to the throttle, for example, or such that the driver's input has no effect and the safety system may decelerate, maintain the current speed, or cause the vehicle to coast to avoid the unsafe conditions. The safety system take over is designed to avoid navigational maneuvers that are determined by the system to be unsafe and to avoid collisions, especially those that may be the fault of the host vehicle.

As used herein, the term "displace," when used to refer to the safety system displacing a human driver, may refer to any of inhibiting, preventing, or taking control from the human driver.

As noted, the autonomous safety system may operate in the background until an unsafe condition or a driver input determined to be associated with an unsafe maneuver is detected. In such cases, the safety system may displace human driver control (at least temporarily). The unsafe condition may include, for example, a determination that a driver input is associated with a navigational maneuver that would place a host vehicle a distance from a target vehicle that is less than the CRSS or RSS safe distance. As an example, a processing device of the safety system may use the longitudinal and/or lateral safe distances developed under the RSS model and/or the CRSS model to construct a proximity buffer relative to the host vehicle (or detected target vehicles). In this example, a safe condition may include any condition where there is no object (e.g., target vehicle or VRU) within the proximity buffer. Conversely, an unsafe condition may include any condition where there is or would be an object within the proximity buffer. The proximity buffer may include a two-dimensional or three-dimensional area around a host vehicle. The dimension of the proximity buffer may be determined using the RSS and/or CRSS safe distance calculations described above. For example, a proximity buffer may include a distance in front of the host vehicle corresponding with, for example, a CRSS safe longitudinal distance or an RSS distance; a distance on either side of the host vehicle corresponding with, for example, a predetermined safe lateral distance; and/or a distance in the rear of the host vehicle corresponding with, for example, an RSS safe distance.

Figure 52A:
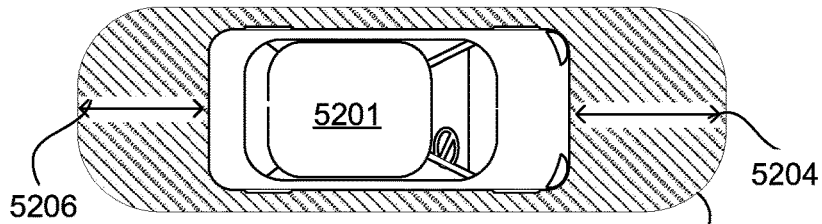
FIGS. 52A-52D illustrate example proximity buffers for a host vehicle consistent with the disclosed embodiments.

FIGS. 52A-52D are visual representations of exemplary proximity buffers consistent with this disclosure. FIG. 52A depicts proximity buffer 5202 around host vehicle 5201. In this example, proximity buffer 5202 is derived from a determined safe distance 5204 in front of host vehicle 5201 and from a determined safe distance 5206 behind host vehicle 5201. Determined safe distance 5204, which is the shortest safe distance among the examples of FIGS. 52A-52D, may be an RSS longitudinal safe distance. Accordingly, determined safe distance 5204 may be determined as described above. Similarly, determined safe distance 5206 may be an RSS longitudinal safe distance. The lateral safe distances that comprise the sides of proximity buffer 5202, are not labeled, but it is understood that they may be determined by any means consistent with this disclosure. Such lateral safe distances may be predetermined in order to maintain a minimum lateral spacing between the host vehicle and other vehicles or objects. Such a lateral safe distance may be 0.25 m, 0.5 m, 1.0 m, or more for example. In some embodiments, the sides of the proximity buffer may correspond with a predetermined lateral distance threshold, which may define a minimum safe lateral distance between a host vehicle and an object.

Figure 52B:
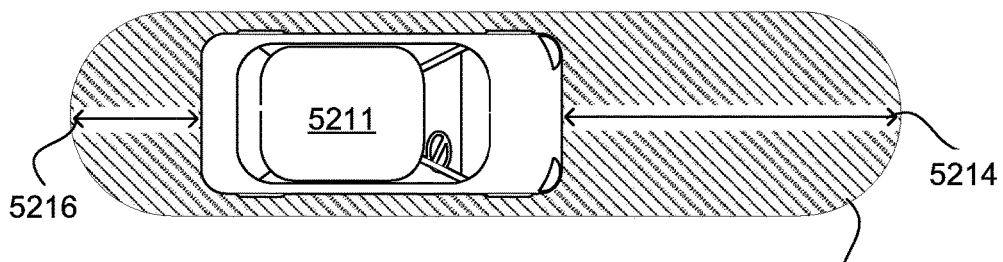

FIG. 52B depicts proximity buffer 5212 around host vehicle 5211. In this example, determined safe distance 5214 in front of host vehicle 5211 is longer than determined safe distance 5204 in front of host vehicle 5201. In some embodiments, determined safe distance 5214 may be longer than 5204 because, for example, determined safe distance 5214 may correspond to a CRSS safe distance. Determined safe distance 5214 may also correspond with an RSS safe distance together with a minimum approach distance, as described above. As noted above, determined safe distance 5214 may correspond with a CRSS safe distance that includes a braking distance associated with a sub-maximal braking rate. In some embodiments, determined safe distance 5214 may be longer than determined safe distance 5204 because host vehicle 5211 may have different braking characteristics or features, etc., as compared to host vehicle 5201. For example, both determined safe distance 5204 and determined safe distance 5214 may be an RSS safe distance and determined safe distance 5214 may be longer because host vehicle 5211 may be associated with a higher current speed and/or a lower maximum braking capability as compared to host vehicle 5211.

Figure 52C:
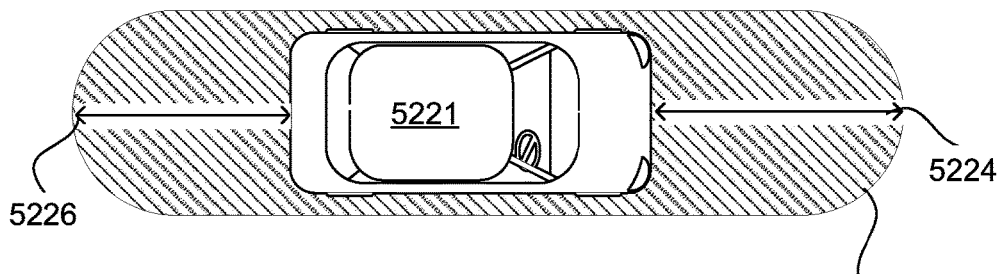

FIG. 52C depicts proximity buffer 5222 around host vehicle 5221. In this example, determined safe distance 5224 is longer than determined safe distance 5204 and shorter than determined safe distance 5214. In some embodiments, determined safe distance 5224 may be shorter than determined safe distance 5214 and longer than determined safe distance 5204 for any of the reasons described in relation to FIG. 52B. For example, determined safe distance 5224 may be an RSS safe distance that includes a minimum approach distance, as described in relation to the RSS model, but the maximum acceleration capability of host vehicle 5221 may be less than that of host vehicle 5211 and/or the predetermined approach distance may be less for host vehicle 5221 than for host vehicle 5211. As another example, a passenger or driver of host vehicle 5221 may have selected a first sub-maximal braking rate and a passenger or driver of host vehicle 5211 may have selected a second sub-maximal braking rate that is less than that of the first sub-maximal braking rate and, therefore, host vehicle 5211 may require a greater distance (e.g., determined safe distance 5214) to come to a stop safely. In this example, host vehicle 5221 has a longer determined safe distance 5226 behind the vehicle. Like determined safe distance 5224 in the front of host vehicle 5221, the length of determined safe distance 5226 may be longer than determined safe distance 5216 due to the model used to determine the distance (e.g., RSS and/or CRSS), a condition or characteristic of host vehicle 5221 (e.g., maximum acceleration capability, maximum braking capability, current speed, current braking capability, sub-maximal braking rate, etc.), and/or a condition of the road (e.g., a weather condition, a material of the road, etc.).

Figure 52D:
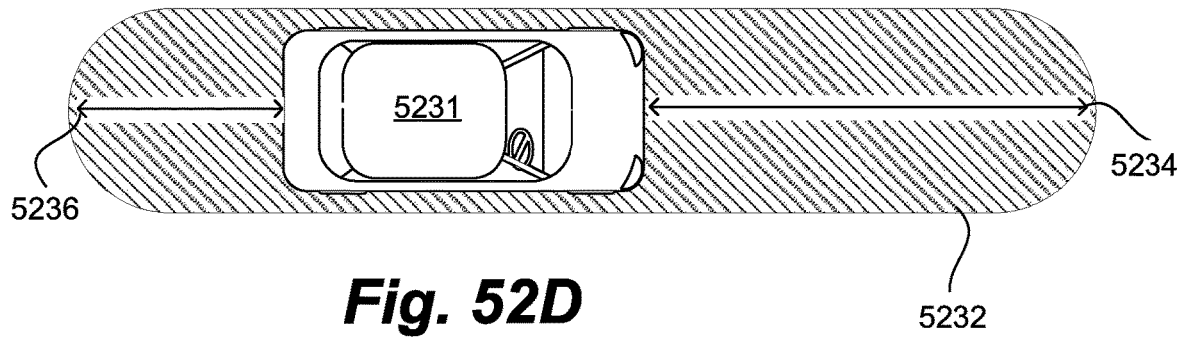

FIG. 52D depicts proximity buffer 5232 around vehicle 5231. Proximity buffer 5232 is larger than any of proximity buffer 5205, 5212, or 5222. In some embodiments, proximity buffer 5232 may larger than the other buffers because, for example, the CRSS model was used for both determined safe distance 5234 in the front of host vehicle 5231 and for determined safe distance 5236 behind host vehicle 5231. In some embodiments, the size of proximity buffer 5232 may be due to any of the factors discussed in relation to FIGS. 52A-52C.

Consistent with this disclosure, a host vehicle may have more than one proximity buffer. For example, a host vehicle may have a first proximity buffer associated with the RSS model (e.g., proximity buffer 5202) and a second proximity buffer associated with the CRSS model (e.g., proximity buffer 5232). In some embodiments, the safety system may displace a human driver if the first proximity buffer is breached. For example, if a host vehicle comes within a distance to a target vehicle that is less than the RSS safe distance, the safety system may displace the driver to prevent a collision. In the same embodiments, the safety system may alert the human driver if the second proximity buffer is breached but forego displacing the driver. For example, if a host vehicle comes within a distance of a target vehicle that is less than the CRSS safe distance, the safety system may alert the driver that the host vehicle is too close to the target vehicle by, for example, transmitting an audible warning over a speaker system; causing a seat, steering mechanism, or other component in a passenger compartment to vibrate; displaying an alert on a heads-up display or augmented reality display; or by any other means. In some embodiments, the safety system may displace the human driver if the second proximity buffer is breached. For example, if a host vehicle comes within a distance of a target vehicle that is less than a CRSS safe distance, the safety system may cause the vehicle to decelerate at a rate corresponding with the sub-maximal braking rate of the CRSS model. If the distance between the host vehicle and the target vehicle breaches the first proximity buffer by becoming closer than the RSS safe distance, the safety system may cause the vehicle to decelerate at a rate corresponding with the maximal braking rate of the host vehicle according to the RSS model. And, as described above, the safety system may also displace the human driver any time an input from the driver is determined as one that would cause an approach relative to another vehicle or an object less than an RSS or CRSS distance.

As described above, each of the RSS and CRSS models may calculate safe distances that are relative to the detected object. For example, each model may determine a braking capability of a target vehicle and use that braking capability to determine a safe distance. As such, the dimension of the proximity buffer may be different depending on the object detected in the environment of the host vehicle. As an example, an RSS safe distance between a host vehicle and a first target vehicle may be longer than the RSS safe distance between the host vehicle and a second target vehicle when the second target vehicle has a higher maximum braking capability than the first target vehicle (i.e., the second target vehicle may come to a stop in a shorter distance than the first target vehicle). As another example, an RSS or CRSS safe distance between a host vehicle and a pedestrian may be significantly longer than an RSS or CRSS safe distance between the host vehicle and any target vehicle because the minimum separation distance between the host vehicle and the pedestrian may be larger than that of the host vehicle and a target vehicle.

The safety system may displace the human driver for a duration corresponding with the unsafe condition, such as a breach of a proximity buffer or during a time period in which an unsafe driver input is detected (e.g., at least one driver input determined as one that would cause an approach relative to another vehicle or an object less than an RSS or CRSS distance). For example, the safety system may take control of the vehicle until the unsafe condition ceases to exists (e.g., the vehicle is a distance from a target vehicle that is larger than the CRSS or RSS safe distance).

Figure 53A:
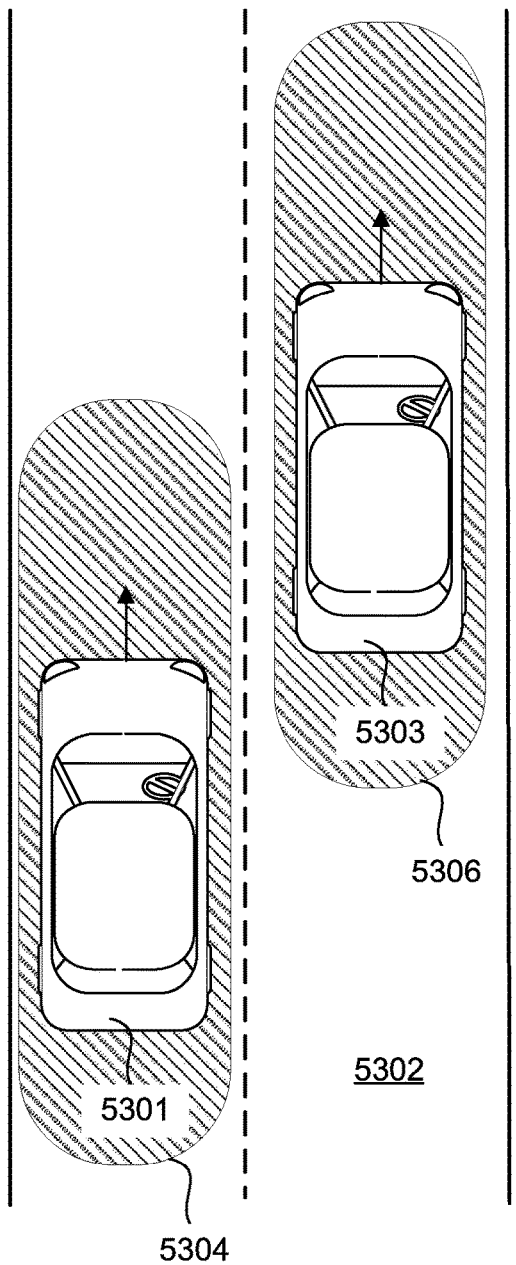
FIGS. 53A and 53B illustrate example scenarios including a proximity buffer consistent with the disclosed embodiments.
Figure 53B:
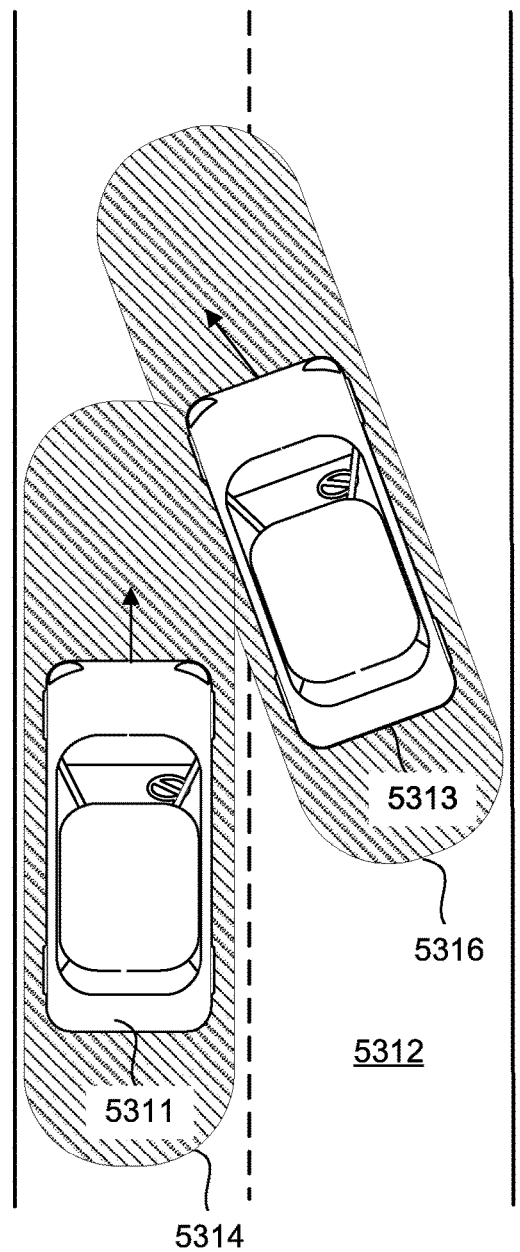

FIGS. 53A and 53B illustrate examples of safe and unsafe conditions between two vehicles. FIG. 53A depicts host vehicle 5301 and target vehicle 5303 traveling in a common direction along roadway 5302. In this example, host vehicle 5301 may include a safety system consistent with this disclosure and a proximity buffer 5304. Similarly, target vehicle 5303 may include a safety system consistent with this disclosure and have a proximity buffer 5306. In this example, if host vehicle 5301 is driven by a human driver, the human driver may continue navigating host vehicle 5301 (e.g., the human driver will not be displaced by the safety system), because there are no objects within proximity buffer 5304. The same may be true of a human driver navigating target vehicle 5303.

FIG. 53B depicts host vehicle 5311 and target vehicle 5313 traveling in a common direction along roadway 5312. In this example, host vehicle 5301 may include a safety system consistent with this disclosure and a proximity buffer 5314. Similarly, target vehicle 5313 may include a safety system consistent with this disclosure and have a proximity buffer 5316. In this example, if host vehicle 5311 is driven by a human driver, and the safety system of target vehicle 5313 detects a driver input determined to be one (or more) that would result in the cut-in shown in FIG. 53B, the safety system may displace the human driver and take control to prevent the action. For example, the safety system associated with vehicle 5313 may determine that the driver input would result in a situation in which a lateral safe distance may be breached, insufficient longitudinal spacing to the rear of vehicle 5313 would result after the maneuver (e.g., an RSS distance would not exist after the cut-in), etc. In such cases, the safety system would respond by preventing the driver input from resulting in the unsafe cut-in maneuver. In the same scenario of FIG. 53B, if vehicle 5313 did make the cut-in maneuver, the safety system of vehicle 5311 may displace the driver input, for example, if the driver did not brake to slow the vehicle in order to establish a CRSS or RSS distance associated with buffer 5314. In such situations, the unsafe driver input may correspond to a lack of change in input or, in other words, and unsafe maintaining of current input/control.

Figure 54A:
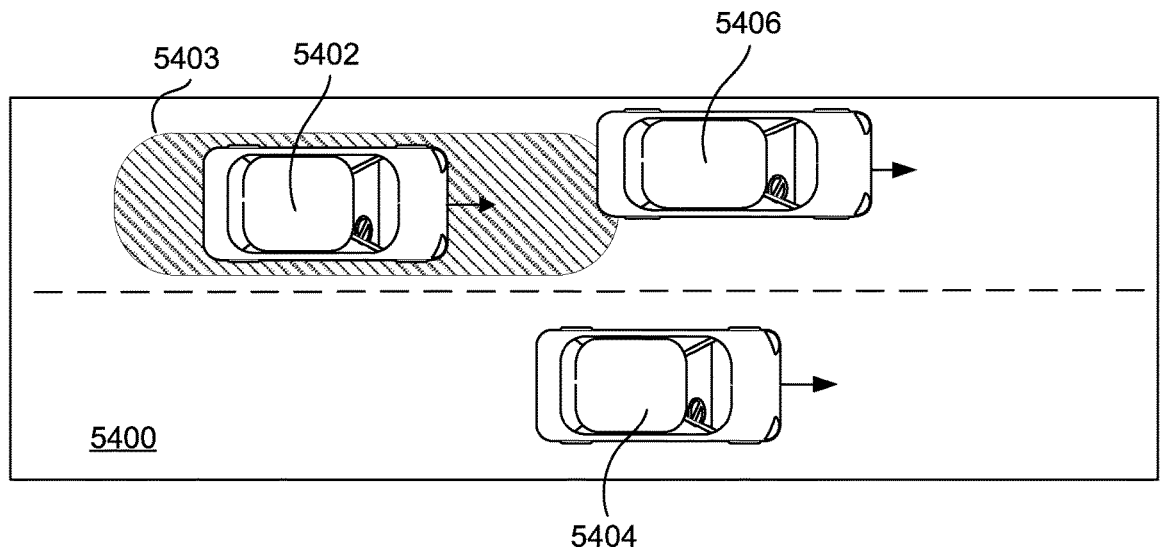
FIGS. 54A and 54B illustrate example scenarios including a proximity buffer consistent with the disclosed embodiments.
Figure 54B:
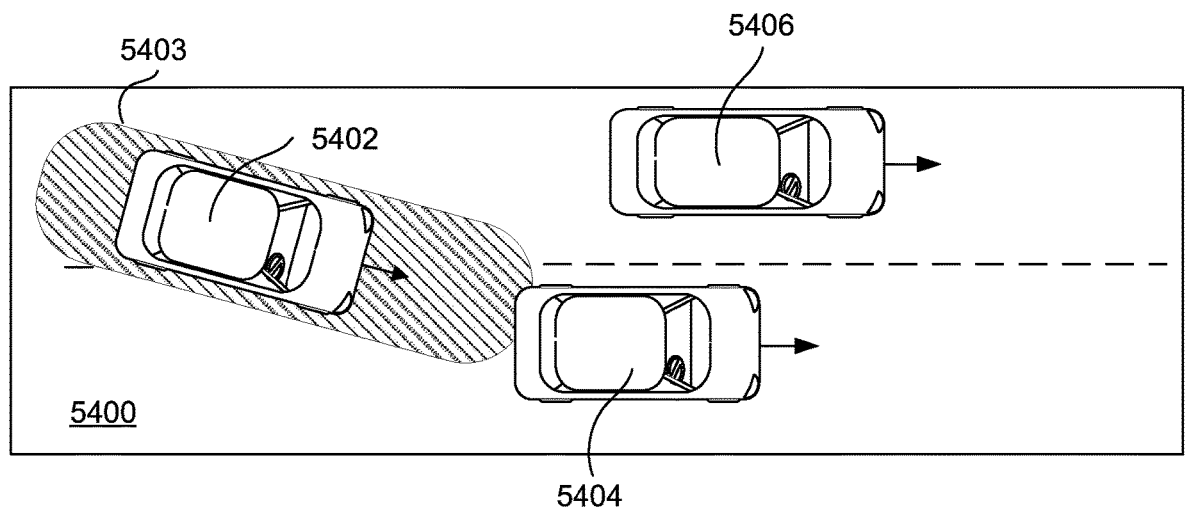

FIGS. 54A and 54B illustrate additional instances where a safety system consistent with this disclosure may displace a human driver. In FIGS. 54A and 54B, vehicle 5402, vehicle 5404, and vehicle 5406 are each traveling in a common direction on roadway 5400. In this example, roadway 5400 may be a highway. Vehicle 5402 may include a safety system consistent with this disclosure and may have a proximity buffer 5403. Proximity buffer 5403 may correspond with any of the RSS and/or CRSS models, as discussed above. For the purposes of illustration, proximity buffer 5403 is assumed to have a determined safe distance in the front of vehicle 5402 associated with the CRSS model.

In FIG. 54A, a human driver in vehicle 5402 may cause vehicle 5402 to approach the rear of vehicle 5406 as shown. If the driver attempts to cause vehicle 5402 to come within a distance of vehicle 5406 that is less than the CRSS safe distance (as shown by vehicle 5406 being within proximity buffer 5403), the safety system of vehicle 5402 may displace the driver to avoid an unsafe condition and to maintain the CRSS distance. For example, the safety system may take control and prevent or ignore the driver's acceleration input or may brake vehicle 5402. For example, the safety system may cause vehicle 5402 to decelerate at a rate corresponding with the sub-maximal braking rate of the CRSS model until vehicle 5402 is a distance from vehicle 5406 that is greater than proximity buffer 5402. As another example, before proximity buffer 5403 is breached, the safety system may determine a next-state position of vehicle 5402 (e.g., the position vehicle 5402 would be in if the driver's input were executed) and may displace the driver before vehicle 5402 is brought within a distance of vehicle 5406 that is less than the CRSS safe distance.

In FIG. 54B, a human driver in vehicle 5402 may attempt to cause vehicle 5402 to merge into the lane occupied by vehicle 5404. If the driver attempts a navigational action that may cause vehicle 5402 to come within a distance of vehicle 5404 that is less than the CRSS safe distance (as shown by the overlap between proximity barrier 5403 and vehicle 5404), the safety system may displace the human driver to prevent the navigational action. For example, if the human driver attempts to veer to the right, for example, by turning a steering wheel to the right, the safety system may determine that execution of the veer would result in the unsafe condition shown in FIG. 54B. The safety system may, in response, take over control and displace the human driver. For example, the safety system may inhibit the turning of the steering wheel to the right by exhibiting an equal force on the steering wheel to the left. As another example, the safety system may prevent the right veer by causing the right turn of the steering wheel to have no effect through mechanical and/or electrical interruption of the right turn input. As another example, the safety system may take over vehicle 5402 and steer to the left as needed to avoid the unsafe conditions that would arise if the right veer were executed. For any of these examples, the displacement may last until vehicle 5402 is retuned to safe conditions (e.g., to a position where neither of vehicles 5404 or 5406 are within proximity barrier 5403) and/or a next-state condition associated with vehicle 5402 is determined to be safe.

The examples depicted in FIGS. 53A-53B and 54A-54B are exemplary only. One of skill in the art having the benefit of this disclosure may understand that a safety system or similar navigational system may displace a human driver in any unsafe condition or in response to any input that may cause an unsafe condition.

In some embodiments, the safety system may store or transmit data relating to any instances wherein the safety system displaced the human driver. For example, the safety system may generate data relating to the unsafe condition that caused the safety system to displace the driver, the type of displacement that occurred (e.g., inhibition, prevention, or take over), the duration of the displacement, the outcome of the displacement (e.g., vehicle returned to safe conditions, vehicle stopped, vehicle involved in collision), or any other information relating to the displacement or the events occurring before or after the displacement. Consistent with this disclosure, the information may be used to determine whether the safety system, the RSS model, the CRSS model, or any other autonomous vehicle feature is performing as predicted. Such information may be transmitted from the host vehicle to a remote server over one or more networks. For example, the information may be transmitted to the automobile manufacturer, the safety manufacturer, or other party responsible for implementing the safety system for analysis. In some embodiments, the information may be displayed to the driver of the vehicle. For example, a report may be generated after each displacement event, after each trip, after receiving a request from the driver, or on a scheduled interval (e.g., daily, weekly, bi-weekly, monthly, etc.). It is contemplated that providing the driver information relating to the safety system and the unsafe conditions avoided may increase the amount of trust the driver has in the safety system (or in autonomous vehicles generally).

In some embodiments, the vehicle may include a means (e.g., switch, button, voice activated control, or other type of control) for deactivating or disengaging the safety system. For example, a driver may deactivate the safety system to prevent it from disengaging the driver or a driver may disengage the safety system during a displacement event to retake control of the host vehicle. It is contemplated that the control for deactivating or disengaging the safety system be independent from any of the control mechanisms of the vehicle associated with navigating the vehicle. For example, the vehicle may include a button that is not associated with the throttle, brake, steering wheel, or any other control mechanisms. In this example, the driver may only deactivate or disengage the safety system by pressing the button (or other safety system control). Unlike traditional ADAS systems (i.e., advanced driver assist systems such as lane-keeping systems, auto-braking systems, etc.), the disclosed safety system cannot be deactivate or disengaged by providing an input to a steering control, a braking control, or a throttle control. For example, if the safety system takes over the steering mechanism of the vehicle in order to perform a right turn, the driver cannot disengage the safety system by, for example, continuing to turn the wheel to the right (e.g., with an increase in force in an attempt to overcome or disengage the safety system). Rather, the driver would first need to activate the designated safety system override control to disengage the safety system. Similarly, if the disclosed safety system takes control to prevent a navigational action that would result in a longitudinal distance less than CRSS or RSS, the driver would not be able to override the safety system with input to the vehicle brake or throttle. Rather, the designated safety system control would need to be used.

It is understood that the safety system may be disengaged or deactivated by any appropriate control input, such as a lever, a knob, a virtual button, a voice command, a hand gesture, or the like. In some embodiments, the navigation system may include an image capture device inside the vehicle, which is configured to capture one or more images or videos of a human driver. At least one processing device may analyze the captured images and/or videos to recognize a hand gesture or other non-verbal command and may be programmed to deactivate or disengage the safety system in response to the hand gesture or other non-verbal command. In some embodiments, the navigation system may include one or more microphones configured to capture sound data. The at least one processing device may analyze the sound data using voice recognition processing (e.g., using a neural network, a trained or untrained system, etc.) and deactivate or disengage the safety system in response to sound data including a recognized command.

Consistent with this disclosure, the safety system may collect information relating to any instances where the safety system is deactivated or disengaged. For example, the safety system may record the navigational circumstances just prior to a deactivation of the safety system (e.g., the speed, acceleration, following distance, etc. of the host vehicle) and/or the time and place of the deactivation. In some embodiments, the safety system may continue to monitor the driving conditions of the driver even after it has been deactivated or disengaged and to store or transmit that data as described above.

Consistent with this disclosure, a navigation system for selectively displacing human driver control is disclosed. The navigation system may partially displace the driver, for example by preventing or inhibiting an action of the driver, or may fully displace the driver, for example by taking over the vehicle and performing navigational maneuvers independent from the driver. The navigation system may be a safety system or any other system disclosed herein. In some embodiments, the system may be fully housed within a host vehicle. In other embodiments, one or more components of the system may be located in a location remote from the host vehicle, such as in a server or other device. The system may include at least one processing device. The at least one processing device may be programmed to perform one or more methods, processes, operations, or functions consistent with this disclosure. The at least one processing device may be, for example, processing device 110.

Figure 55:
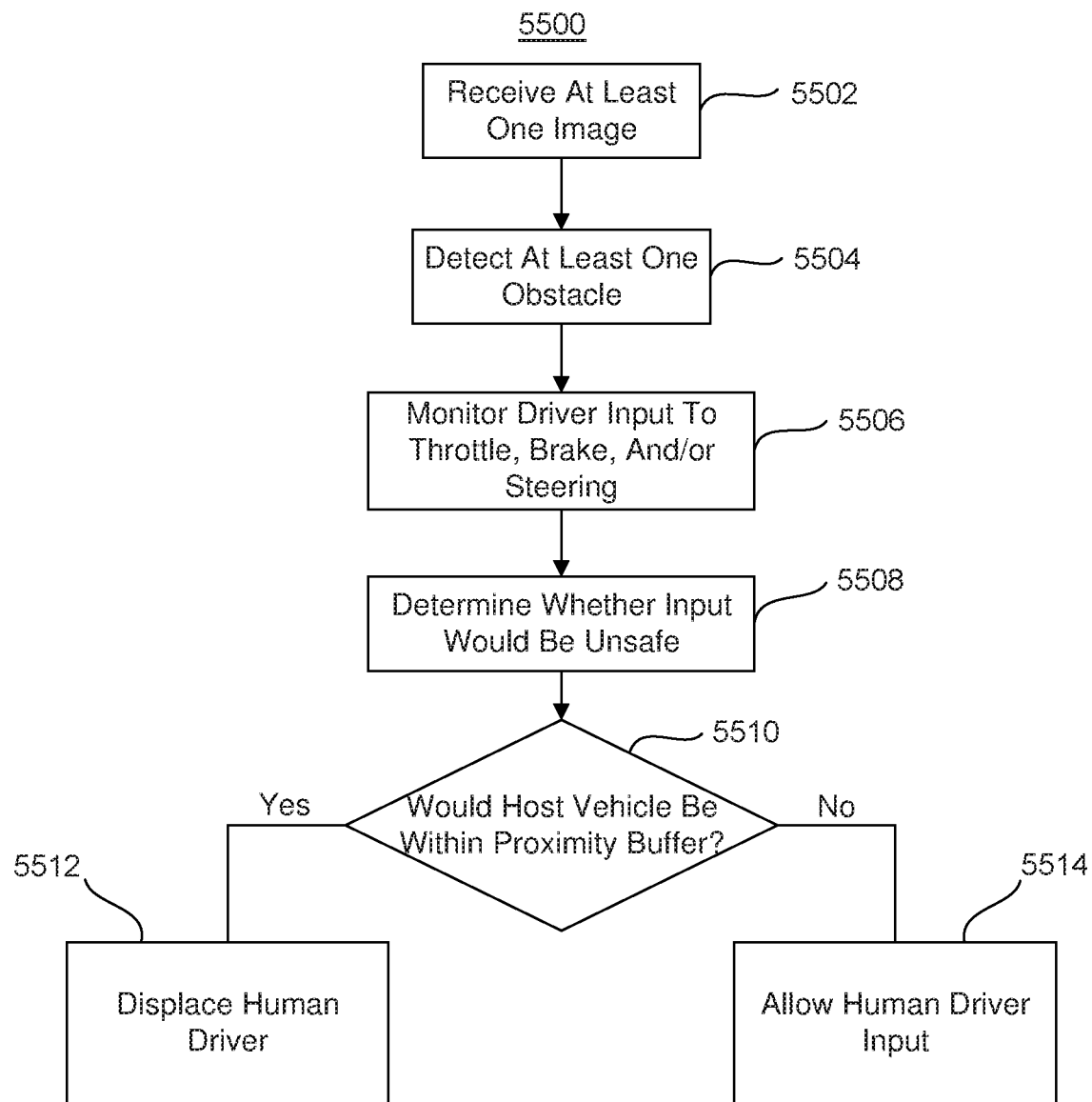
FIG. 55 provides a flowchart for selectively displacing a human driver control of a host vehicle consistent with the disclosed embodiments.

FIG. 55 is a flowchart depicting exemplary process 5500 for selectively displacing a human driver. Consistent with this disclosure, the at least one processing device in the navigational system may be programmed to perform all or part of process 5500. Process 5500 is exemplary only and one of ordinary skill in the art having the benefit of this disclosure may understand that process 5500 may include additional steps, may exclude one or more steps, or may be otherwise modified in ways consistent with this disclosure.

Process 5500 may include a step 5502 for receiving one or more images. The at least one image may represent, for example, the environment of a host vehicle. In some embodiments, the processing device may be programmed to receive at least one image representative of an environment of the host vehicle. The at least one image may be received from at least one image capture device. For example, the navigation system may include one or more image capture devices, such as image capture device 122, which may capture an image of the environment of the host vehicle. The image capture device may have a field of view corresponding with a field of view of the human driver. In some embodiments, the navigation system may include a plurality of image capture devices, each having a different field of view relative to the environment of the host vehicle. For example, at least one of the plurality of image capture devices may be configured to capture images representative of the environment of the host vehicle to a rear of the host vehicle; at least one of the plurality of image capture devices may be configured to capture images representative of the environment of the host vehicle to a side of the host vehicle; and/or at least one of the plurality of image capture devices may be configured to capture images representative of the environment of the host vehicle in front of the host vehicle; and so forth. For example, a first image capture device may have a field of view corresponding with an area in front of the host vehicle, a second image capture device may have a field of view corresponding with the right side of the host vehicle, and so forth. In the disclosed embodiments, the processing device may be programmed to receive a plurality of images. For example, in embodiments where the is determined to be forward of the host vehicle. As another example, the at least one obstacle may be a target vehicle determined to be in a lane different from the host vehicle. In some embodiments, the at least one obstacle may include a pedestrian or object in the roadway.

In some embodiments, the processing device may detect one or more obstacles in the environment using the outputs from one or more sensors associated with the host vehicle. The sensors may be any sensors disclosed herein. For example, the processing device may receive an output from a LIDAR system and/or a RADAR system and use that information to detect one or more obstacles in the vicinity of the host vehicle.

Process 5500 may include a step 5506 for monitoring driver input into a throttle mechanism, a braking mechanism, and/or a steering mechanism. Consistent with this disclosure, the at least one processing device may be programmed to monitor a driver input to at least one or a throttle control, a brake control, or a steering control associated with the host vehicle. The input may be monitored by any technique consistent with this disclosure. For example, one or more sensors may be configured to detect an electrical signal associated with any of the throttle, brake, or steering controls. In another example, one or more sensors may be configured to detect a mechanical input to any of the throttle, brake, or steering controls. The throttle control, brake control, and/or the steering control may be of any type presently known or subsequently developed. For example, the throttle control may include an accelerator pedal, the brake control may include a brake pedal, and the steering control may include a steering wheel. In another example, one or more host vehicle control systems may include at least one steering actuator to control a heading of the host vehicle, a braking actuator to cause application of a host vehicle braking device, or an acceleration actuator to cause application of a host vehicle throttle. For example, the throttle control system may include an acceleration actuator to cause application of the host vehicle throttle, the brake control system may include a braking actuator to cause application of the host vehicle brake pedal, and/or the steering control system may include at least one steering actuator to control a heading of the host vehicle. The driver input may be any active movement or other activation of one or more of the controls or an absence of movement or other activation. Continuing the above example, the driver input may include at least one a depression of the acceleration pedal, a depression of the brake pedal, a lack of depression of the brake pedal, a rotation of the steering wheel, or a non-rotation of the steering wheel.

Process 5500 may include a step 5508 for determining whether the driver input would result in a safe navigational action. As described, the driver input may result in safe conditions if the navigational change that would occur if the driver input were given effect would not cause the host vehicle to come within a distance from an object that is less than the proximity buffer around the host vehicle (e.g., within an RSS distance, a CRSS distance, or a predetermined minimum lateral buffer distance, among others). Consistent with this disclosure, the at least one processing device may be programmed to determine whether the driver input would result in the host vehicle navigating within a proximity buffer relative to the at least one obstacle. The at least one processing device may determine whether a proximity buffer may be breached by any techniques consistent with this disclosure. For example, the processing device may determine a current distance between the host vehicle and one or more objects (e.g., target vehicle or VRUs) and determine a next-state distance between the host vehicle and the one or more objects based on the current distance and the driver input. Such distances between objects may be determined, for example, based image analysis (e.g., scaling observations), LIDAR output, RADAR output, etc. As an example, referring to FIGS. 53A and 53B, if a human driver provides an input that would cause vehicle 5303 to veer left (e.g., by rotating a steering wheel of vehicle 5303), the processing device may determine that the next-state distance between vehicle 5303 and vehicle 5301 would be the unsafe condition depicted in FIG. 53B. As another example, referring to FIG. 54A, if a human driver of vehicle 5402 provides an acceleration input (e.g., by depressing an acceleration pedal), the processing device may determine that an acceleration of vehicle 5402 may cause vehicle 5402 to come within a distance of vehicle 5406 that is less than proximity buffer 5403 and is, therefore, unsafe. In such cases, the safety system may take control of the host vehicle and prevent the unsafe maneuver associated with the detected driver input.

Process 5500 may include a function 5510 that may dictate how the navigational system handles instances where the driver input would cause a host vehicle to breach a proximity buffer and instances where the driver input would not cause the host vehicle to breach a proximity buffer. In some embodiments, function 5510 may be include in step 5508 of process 5500. The proximity buffer may be any proximity buffer consistent with this disclosure, including those determined using the RSS and/or CRSS models. The proximity buffer may depend upon the detected obstacle or object in the environment of the host vehicle on which the RSS and CRSS models depend. In some embodiments, the proximity buffer may include one or more predetermined distances. For example, the proximity buffer may correspond with a predetermined lateral distance threshold. The lateral distance threshold may include a predetermined minimum distance between a host vehicle and an object located on either side of the host vehicle. As another example, the proximity buffer may correspond with a predetermined longitudinal distance. The longitudinal distance may be, for example, minimum distanced $d_{min}$ that is to be maintained between the host vehicle and an object, as described with respect to the RSS model.

Consistent with this disclosure, the at least one obstacle may include a target vehicle, and the proximity buffer relative to the target vehicle may be determined based on a detected current speed of the host vehicle, a maximum braking rate capability of the host vehicle, a determined current speed of the target vehicle, an assumed maximum braking rate capability of the target vehicle, and a determined maximum acceleration capability of the host vehicle. In such cases, the proximity buffer may include at least a sum of a host vehicle acceleration distance, determined as a distance over which the host vehicle will travel if accelerated at the maximum acceleration capability of the host vehicle over a reaction time associated with the host vehicle; a host vehicle stopping distance, determined as a distance required to reduce the current speed of the host vehicle to zero at the maximum braking rate capability of the host vehicle; and a target vehicle stopping distance, determined as a distance required to reduce the current speed of the target vehicle to zero at the assumed maximum braking rate capability of the target vehicle. For example, the proximity buffer may be determined using an RSS safe distance, which includes the acceleration distance and the stopping distance of the host vehicle as well as the stopping distance of the target vehicle. In some embodiments, the proximity buffer relative to the target vehicle may further be determined based on a predetermined minimum distance to be maintained between the host vehicle and the target vehicle. For example, the proximity buffer may include minimum distance $d_{min}$, as discussed above.

Consistent with this disclosure, the at least one obstacle may include a target vehicle, and the proximity buffer relative to the target vehicle may be determined based on a detected current speed of the host vehicle, a maximum braking rate capability of the host vehicle, a determined current speed of the target vehicle, an assumed maximum braking rate capability of the target vehicle, and a maximum acceleration capability of the host vehicle. In some embodiments, the proximity buffer relative to the target vehicle may be further determined based on a predetermined sub-maximal braking rate that is less than the maximum braking rate capability of the host vehicle, such that the proximity buffer includes at least a sum of a host vehicle stopping distance, determined as a distance required to reduce the current speed of the host vehicle to zero at the predetermined sub-maximum braking capability of the host vehicle, and a target vehicle stopping distance, determined as a distance required to reduce the current speed of the target vehicle to zero at the assumed maximum braking capability of the target vehicle. For example, the proximity buffer may be determined using a CRSS safe distance, which include a stopping distance of the host vehicle if the host vehicle decelerates at a rate corresponding with a predetermined sub-maximal braking rate and a stopping distance of the target vehicle if the target vehicle decelerates at a rate corresponding with its maximum braking rate capability. In some embodiments, the proximity buffer relative to the target vehicle may further be determined based on a predetermined minimum distance to be maintained between the host vehicle and the target vehicle. For example, the proximity buffer may include minimum distance $d_{min}$ as discussed above.

In any of the embodiments disclosed above, the target vehicle may be in front of, next to, or behind the host vehicle. For example, the target vehicle may be forward of the host vehicle and the at least one processing device may be configured to determine that a driver input could result in a change in the longitudinal distance between the target vehicle and the host vehicle. For example, the host vehicle may be a distance from the target vehicle that is greater than the distance of the proximity buffer in front of the host vehicle and the driver input may cause the host vehicle to be a distance from the target vehicle that is less than the distance of the proximity buffer. In some embodiments, the target vehicle may be determined to be in a lane different from the host vehicle, and the at least one processing device may be configured to determine that the driver input would result in a lateral movement of the host vehicle, such that after the lateral movement, the target vehicle will be forward of the host vehicle. For example, the driver input may cause the host vehicle to merge behind a target vehicle, which may be safe if the host vehicle would retain a distance from the target vehicle that is greater than the distance of the proximity buffer in front of the host vehicle and may be unsafe it the host vehicle would come within a distance of the target vehicle that is less than the distance of the proximity buffer in front of the host vehicle. In some embodiments, the target vehicle is determined to be in a lane different from the host vehicle, and the at least one processing device is configured to determine that the driver input would result in a lateral movement of the host vehicle, such that after the lateral movement, the host vehicle will be forward of the target vehicle. For example, the driver input may cause the host vehicle to cut-in in front of a target vehicle, which may be safe if the host vehicle would retain a distance that is greater than the proximity buffer in the rear of the vehicle or may be unsafe if the host vehicle would come within a distance of the target vehicle that is less than the proximity buffer in the rear of the host vehicle.

Consistent with this disclosure, the at least one obstacle may include a pedestrian or an object in a roadway, and the proximity buffer relative to the at least one obstacle may include at least a minimum distance to be maintained between the host vehicle and the at least one obstacle. As discussed above, the minimum distance may vary depending on the classification of the obstacle. For example, if the obstacle is a pedestrian, the minimum distance may be a distance at which there is a certainty, within a predetermined threshold, that the host vehicle will be able to avoid a collision with the pedestrian. As such, the minimum distance relative to a pedestrian may be the longest minimum approach distance consistent with this disclosure. In some embodiments, the proximity buffer relative to a pedestrian may be determined based on a current speed of the host vehicle, and the proximity buffer may increase with increasing host vehicle speed. Even in instances where the proximity buffer relative to a pedestrian is based on a current speed of the host vehicle, it is contemplated that the proximity buffer relative to the pedestrian would be longer than a stopping distance (and generally, significantly longer than a stopping distance) of the host vehicle. For example, a proximity buffer relative to a pedestrian may be a stopping distance of the host vehicle (calculated under the RSS or CRSS models) for a current speed of the host vehicle plus an additional minimum distance. As another example, a proximity buffer relative to a pedestrian may be 120% of a stopping distance of the host vehicle for a current speed of the host vehicle, or a different modification to the stopping distance (e.g., 110%, 150%, 200%, etc.).

Process 5500 may include a step 5514 for allowing the driver input if the input would not cause the host vehicle to come within a proximity buffer relative to an object. Consistent with this disclosure, the at least one processing device may be programmed to allow the driver input to cause a corresponding change in one or more host vehicle motion control systems, if the at least one processing device determines that the driver input would not result in the host vehicle navigating within the proximity buffer relative to the at least one obstacle. For example, the processing device may forego displacing the human driver if the processing device determines that the driver input would not cause the host vehicle to come within a proximity buffer relative to any obstacle (e.g., target vehicle or VRU). Several figures disclosed herein depict conditions where the safety system would not displace the driver, including FIG. 53A.

The one or more host vehicle motion control systems may be any systems consistent with this disclosure. For example, the one or more motion control systems may include throttling system 220, braking system 230, and/or steering system 240. In some embodiments, the one or more host vehicle control systems may include at least one steering actuator to control a heading of the host vehicle, a braking actuator to cause application of a host vehicle braking device, or an acceleration actuator to cause application of a host vehicle throttle. For example, throttling system 220 may include one or more acceleration actuators, braking system 230 may include one or more braking actuators, and steering system 240 may include one or more steering actuators.

Process 5500 may include a step 5512 for displacing the human if the driver input would cause the host vehicle to come within a proximity buffer relative to an object. Consistent with this disclosure, the at least one processing device may be programmed to prevent the driver input from causing the corresponding change in the one or more host vehicle motion control systems, if the at least one processing device determines that the driver input would not result in the host vehicle navigating within the proximity buffer relative to the at least one obstacle. Any of the plurality of examples of unsafe conditions disclosed herein may be the basis for the safety system to displace the human driver. For example, if the driver input would cause the host vehicle to come within a distance of an object that is less than the RSS safe distance (or CRSS safe distance, depending on which model is in use) the safety system may determine that the driver input is unsafe and may displace the driver and take over control.

Consistent with this disclosure, preventing the driver input from causing a corresponding change in the host vehicle may include preventing the driver input. In some embodiments, to prevent the driver input from causing the corresponding change in the one of more host vehicles motion control systems, the at least one processing device may be configured to prevent motion of at least one of the throttle control, the brake control, or the steering control under certain conditions, or to prevent further motion in response to a detected driver input. For example, if the driver input is an acceleration caused by depression of an acceleration pedal, the safety system may prevent the acceleration by locking the acceleration pedal such that it cannot be depressed. Similarly, if the driver input is a clockwise rotation of a steering wheel, the safety system may prevent the rotation by locking the steering wheel such that it cannot be turned or that it may only be turned in a direction that corresponds with safe conditions (e.g., lock the steering wheel from rotating clockwise, but allow a counter-clockwise rotation). In some embodiments, to prevent the driver from causing the corresponding change in the one or more host vehicle motion control systems, the at least one processing device may be configured to disable operability of at least one of the throttle control, the brake control, or the steering control. For example, if the driver input is a depression of a brake pedal, the safety system may prevent the input by decoupling (e.g., electronically or mechanically) the brake pedal from the rest of the braking system, such that depression of the brake pedal has no effect. Similarly, if the diver input is a rotation of a steering wheel, the safety system may prevent the input by decoupling the steering wheel such that rotation of the steering wheel (in at least the direction that would cause the unsafe conditions) has no effect. In some embodiments, prevention of the driver input from causing the corresponding change in the one or more host vehicle motion control systems may include at least one of preventing driver input to the steering wheel from resulting in a corresponding response by the at least one steering actuator, preventing driver input to the brake pedal from resulting in a corresponding response by the braking actuator, or preventing driver input to the accelerator pedal from resulting in a corresponding response by the acceleration actuator. For example, if the driver input is a depression of an acceleration pedal, rather than locking the pedal or decoupling the pedal, the safety system may allow the driver to provide the input, but prevent the input from having an effect, for example, by intercepting an electrical signal from the acceleration pedal before it reaches the acceleration actuator. In any embodiment, the prevention of the driver input may last for a period corresponding with the unsafe conditions. For example, the safety system may unlock the acceleration pedal when the processing device determines that an acceleration of the host vehicle will not cause the host vehicle to come within a distance of an object that is less than the distance of the proximity buffer.

Consistent with this disclosure, preventing the driver input from causing a corresponding change in the host vehicle may include inhibiting the driver input. In some embodiments, to prevent the driver input from causing the corresponding change in the one or more host vehicle motion control systems, the at least one processing device may be configured to prevent motion of at least one of the throttle control, the brake control, or the steering control in response to the driver input and to apply an impulse force to at least one of the throttle control, the brake control, or the steering control. For example, if the driver input is a clockwise rotation of a steering wheel, the safety system may inhibit the rotation by locking the steering wheel such that it cannot be rotated in a clockwise direction and by applying a force that causes the steering wheel to rotate in a counter-clockwise direction. In the same example, the safety system may inhibit the rotation by partially locking the steering wheel such that it can be rotated in a clockwise direction but the host vehicle does not respond fully to the clockwise rotation and the safety system may apply a force to the steering wheel in the counter-clockwise direction. In some embodiments, the at least one processing device may be configured to prevent motion of at least one of the throttle control, the brake control, or the steering control and to continue application of the impulse force to at least one of the throttle control, the brake control, or the steering control until driver input is received that would not result in the host vehicle navigating within a proximity buffer relative to the at least one obstacle. For example, continuing the above example, the safety system may continue inhibiting the rotation of the steering wheel in the clockwise direction until the human driver rotates the steering wheel in a counter-clock wise direction at a magnitude that is sufficient to cause the host vehicle to avoid an unsafe condition or return to a safe condition (e.g., where there are no obstacles within the proximity buffer). As another example, if the driver input is a depression of an acceleration pedal, the safety system may inhibit the input by supplying a force to the acceleration pedal that is opposite of the depression and may continue supplying the force until the driver stops depressing the acceleration pedal or begins depressing the brake pedal. In any embodiment, the inhibition may last until the host vehicle is in a safe position where there are no obstacles within the proximity buffer and there is no driver input that would cause the host vehicle to come within a distance of an obstacle that is less than the proximity buffer.

Consistent with this disclosure, preventing the driver input from causing a corresponding change in the host vehicle may include or may be associated with a takeover of control from the human driver. In some embodiments, the at least one processing device may be configured to control navigation of the host vehicle autonomously during intervals in which the at least one processing device prevents the driver input from causing the corresponding change in the one or more host vehicle motion control systems. For example, if the driver input is a clockwise rotation of a steering wheel, the safety system may prevent or inhibit the input, as described above, and take control of steering system 240 such that the driver input has no effect and the processing device is in control of the steering of the host vehicle. In some embodiments, if any driver input would cause an unsafe condition, the safety system may fully displace the human driver such that the processing device has fully autonomous control over the host vehicle, rather than just control of the system corresponding with the unsafe driver input. For example, if the unsafe driver input is a depression of the acceleration pedal, the A safety DAS system may take control of the acceleration system, the braking system, and the steering system such that the processing device may fully navigate the host vehicle. The safety system, and the processing device therein, may autonomously navigate the host vehicle according to any embodiment of this disclosure. In some embodiments, the at least one processing device may be configured to return navigational control of the host vehicle to a driver after driver input is received that would not result in the host vehicle navigating within a proximity buffer relative to the at least one obstacle. For example, during the period where the safety system is autonomously navigating the host vehicle, if the driver attempts to provide an input that would not cause an unsafe condition, the safety system may terminate the autonomous navigation and allow the human driver to take over control of the host vehicle.

Consistent with this disclosure, the at least one processing device may be programmed to alert a human driver. In some embodiments, the at least one processing device may alert the driver if the processing device determines that a driver input would result in an unsafe condition. The alert may be any alert consistent with this disclosure. For example, the vehicle may include a speaker system and the safety system may provide an audible alert over the speaker system. As another example, the vehicle may include one or more displays (e.g., a screen in the dash or entertainment system) and the safety system may provide a visual alert on the one or more displays. As another example, the vehicle may have a heads-up display or augmented reality display (e.g., on the front windshield of the vehicle) and the safety system may provide an alert on the heads-up display or the augmented reality display. The display may include, for example, an indication of which driver input would cause the unsafe condition, an indication of an input that would a safe condition, an indication that the safety system is displacing the driver, or the like.

Consistent with this disclosure, the at least one processing device may be programmed to collect and transmit data relating to instances when the safety system displaced the human driver. The data may include, for example, information relating to the driver input that was determined unsafe; the time, location, and duration of the displacement; the type of displacement (e.g., prevention, inhibition, or take-over);

the outcome of the takeover (e.g., a collision has been avoided); and any other information relating to the displacement. The data may be transmitted to one or more systems or devices. For example, the data may be transmitted to a device associated with the driver for use in informing the driver of avoided accidents, his or her driving abilities, or the like. As another example, the information may be transmitted to one or more systems for use in research relating to autonomous vehicles, road safety, human driving habits, or the like.

Consistent with this disclosure, the autonomous system for selectively displacing human driver control of a host vehicle may include a system override control for disabling the autonomous system for selectively displacing human driver control. The system override control may be different from the throttle control, the brake control, and the steering control. For example, having the system override control be different from the brake control, throttle control, and steering control requires that the driver provide an input to the override control that is different from a navigational input. In some embodiments, the system override control may be a handle, button, lever, or other physical device capable of receiving an input from a driver. For example, the override control may be a lever and the input that disables the autonomous system may be a pull or other displacement of the lever. In some embodiments, the system override control may be an audible phrase, a visual gesture, or other type of input that may be detected by one or more microphone and/or image capture device systems. For example, the system override control may include a hand gesture. The system override control may be any other means for deactivating or disengaging the system, as described above.

Consistent with this disclosure, the at least one processing device may be configured to track when the autonomous system for selectively displacing human driver control has been disabled through operation of the system override control. For example, the processing device may store date relating to the time and location at which the human driver activated the system override control and information relating to the duration that they system was disabled, including, for example, visual information (e.g., an image or video clip) relating to the disablement that is show on a display or instrument panel in the vehicle. In some embodiments, if the vehicle is involved in a collision, the processing device may be programmed to report whether the safety system was disabled prior to the collision. In some embodiments, the processing device may be programmed to monitor the driver input even if the system is disabled. For example, when disabled, the processing device may be configured to perform process 5500, except for step 5512. In this example, the processing device may collect and store data relating to whether the human driver caused unsafe conditions where the host vehicle was within the proximity buffer relative to an object and other information relating to navigation of the vehicle. The information may be used to determine liability if there is a collision. For example, if the processing device determines that the AD safety AS system was disabled when a collision occurred between the host vehicle and a target vehicle, then either the human driver of the host vehicle or the driver of the target vehicle may be liable. Similarly, if the safety system was disabled and the processing device determines that the human driver provided an input that would have been displaced if the safety system was not disabled, then the human driver of the host vehicle may be liable.

The examples and embodiments discussed above are exemplary only and are not limiting of the scope of the autonomous system for selectively displacing human driver control. One of ordinary skill in the art having the benefit of this disclosure may understand how to modify the autonomous system in any manner consistent with this disclosure.

Path Prediction to Compensate for Control Delay

The autonomous navigation systems disclosed herein may determine one or more navigational actions of a host vehicle and may implement the navigational action. As described above, the navigational actions may be based on one or more navigational policies, navigational goals, or the like. The navigation systems may include one or more sensors that provide outputs used for determining the navigational responses of the host vehicle. For example, the system may include a plurality of image capture devices configured to capture images of an environment of a host vehicle and at least one processor configured to analyze the images and determine a navigational response. However, there may be a period of delay between the time when the image (or other output from a sensor) is captured and the time when a navigational response is implemented to cause a maneuver in the host vehicle. In some cases, additional delay may exist between the time when the navigational response is implemented and the desired effect takes place, e.g., the steering wheel is turned, and the wheel turn in response. Although the delay period may be very short, the vehicle in most cases continues to move during the delay period. As a result the sensor outputs on which a particular navigational decision may be out-of-date, as they may be based on a past motion condition of the host vehicle, rather than on an actual motion condition at a time closer to or equal to a time at which vehicle actuators cause a change in vehicle state in response to implementation of a planned navigational action. As a result, the host vehicle may exhibit "sine wave" driving, where the vehicle may make oscillating corrections (e.g., brake, accelerator, brake, accelerator, etc.) due to implementation of navigational decisions based on sensor information not representative of actual conditions at the time of actuator response. As such, a system for predicting the motion of the vehicle after vehicle sensor measurements are made and before or simultaneous with an actuation time is disclosed. The disclosed system may avoid non-smooth, oscillating corrections that may result if no correction is made to account for changing vehicle motion during the sensor measurement, driving decision, and navigational action implementation times, among others.

The problem of controlling the speed of a vehicle may be formalized as follows. A velocity command signal $v_{cmd}(t)$ may be a goal velocity for a host vehicle. A navigation system may adjust the throttle and braking controls such that the actual speed of the vehicle, denoted $v(t)$, will be as close to possible to $v_{cmd}(t)$. Let $p(t) \in [-1, 1]$ be the position of a pedal where −1 corresponds with full brake, 1 corresponds with full throttle, and 0 means no brake and no throttle. Moving the pedal may change the velocity of the vehicle, and the goal of the controller may be to move the pedals such that the error signal, $e(t)=v_{cmd}(t)-v(t)$, will be small in absolute value. In the standard notation, $v_{cmd}(t)$ is the desired setpoint, $v(t)$ is the process variable, and $p(t)$ is the control variable.

A controller may run in discrete time, where the position of the pedal is moved every Δ seconds. The controller may be based on the following simple equations: for every l=kΔ, where k is a natural number, $$\bar{e}(t) := (1-\beta)\bar{e}(t-\Delta) + \beta e(t)$$

$$u(t) := K_p(e(t) + K_m(e(t) - \bar{e}(t)))$$

$$p_e(t) := p_e(t-\Delta) + u(t)\cdot\Delta$$

$$p(t) := p_g\left(v_{cmd}(t), \frac{v_{cmd}(t) - v_{cmd}(t-\Delta)}{\Delta}\right) + p_e(t)$$

where $p_e$ is an error correction function for the position of the pedal; $p_g(v,a)$ is a "guess" function, possibly constant, of the position of the pedal as a function of the current speed and acceleration commands (the guess function is elaborated upon below, note that there is no dependence on feedback of v or a, so $p_g$ works in a complete "open-loop" manner); $\bar{e}$ is a signal that gives a discounted average of past errors (and initialized to $\bar{e}(0)$–0). Observe that:

$$\bar{e}(k\Delta) = (1-\beta)\bar{e}((k-1)\Delta) + \beta e(k\Delta) =$$

$$(1-\beta)[(1-\beta)\bar{e}((k-2)\Delta) + \beta e((k-1)\Delta)] + \beta e(k\Delta) = \beta\sum_{i=0}^{k}(1-\beta)^i e((k-i)\Delta)$$

For simplicity, the above representations do not include aspects related to saturation (clipping the errors, the pedal position, the change of the pedal). One of ordinary skill in the art having the benefit of this disclosure may understand that saturation may be included in the above formulas.

The guess function $p_g(v,a)$ may be considered next. For example, a vehicle may be driven while recording the speed and position of the pedals as a function of time. The derivative of the speed may be taken as the actual acceleration (even though it may be noisy), and try to fit a function that gives the acceleration as a function of p(t) and v(t). Inverting this function provides the guess function $p_g(v,a)$.

The guess function may provide an advantage as it has no delay. If most of the information regarding the correct position of the pedal is in the desired acceleration and current speed, then the guess function may provide an estimation of the correct pedal position. The role of the controller is to lose the error due to additional variables (e.g., the pressure of the tires, the heat of the engine, the tail wind, etc.) by using $p_e$.

Most of the information depends upon v and a because the main forces acting on the vehicle are: Friction, which depends linearly on v; Lag (air resistance), which depends quadratically on v; Gravity, which changes with elevation in the form 9.8 sin(θ); Brake friction, which depends upon the position of the brake pedal; and Engine, which depends upon the position of the throttle pedal.

There may be several advantages of the guess function. First, the initial guess (in most cases) will be very close to the optimal position of the pedal, hence a negligible delay will result for an acceleration which is very close to the desired one. Second, the problem of learning the initial guess function is an offline problem (collecting examples from a human/autonomous driver and fitting a function to it). This may be readily adapted to another vehicle, and even adapted on the fly with an existing car (the number of parameters to fit (in our choice of fitting using a low degree polynomial) is much smaller than the number of examples we can collect, so there is no fear of overfitting). Third, empirically, the discounted integrator may provide a "no steady state error" property of an integrator, while having a much smaller delay because of the discounting that quickly forgets past errors. Moreover, in some embodiments, even the existing small delay may only be on the part of the controller which is closing the steady state error.

In some embodiments, the guess function may receive no feedback, and rather, depend on the comments. In some embodiments, this may make the pr term the only controller in a navigation system using the guess function. Analyzing $p_e$ separately:

$$p_e(k\Delta) = \sum_{j=0}^{k}\Delta u(j\Delta)$$

$$= \Delta K_p \sum_{j=0}^{k}[(1+K_m)e(j\Delta) - K_m\bar{e}(j\Delta)] =$$

$$= \Delta K_p \sum_{j=0}^{k}\left[(1+K_m)e(j\Delta) - K_m\beta\sum_{i=0}^{j}(1-\beta)^i e((j-i)\Delta)\right]$$

$$= \Delta K_p \left(\sum_{j=0}^{k}(1+K_m)e(j\Delta) - K_m\beta\sum_{j=0}^{k}\sum_{i=0}^{j}(1-\beta)^i e((j-i)\Delta)\right)$$

$$= \Delta K_p \left(\sum_{j=0}^{k}(1+K_m)e(j\Delta) - K_m\beta\sum_{r=0}^{k}e(r\Delta)\sum_{j=r}^{k}(1-\beta)^{j-r}\right)$$

$$= \Delta K_p \sum_{r=0}^{k}\left((1+K_m) - K_m\beta\sum_{j=r}^{k}(1-\beta)^{j-r}\right)e(r\Delta)$$

$$= \Delta K_p \sum_{r=0}^{k}\left((1+K_m) - K_m\beta\sum_{j=0}^{k-r}(1-\beta)^{j}\right)e(r\Delta)$$

$$= \Delta K_p \sum_{r=0}^{k}\left((1+K_m) - K_m\beta\frac{1-(1-\beta)^{k-r}}{\beta}\right)e(r\Delta)$$

$$= \Delta K_p \sum_{r=0}^{k}\left((1+K_m) - K_m(1-(1-\beta)^{k-r})\right)e(r\Delta)$$

$$= \Delta K_p \sum_{r=0}^{k}\left(1+K_m(1-\beta)^{k-r}\right)e(r\Delta)$$

In some embodiments, the controller operating according to the equations herein may depend on an integrator with coefficients that decay with time. It should be noted that the non-decaying term in the coefficient may be relative small as Km>>1. As discussed, this type of integrator may have a "no steady state error" property while suffering less delay from past errors because of the discounting effect. This may also be interpreted as something between the P and I terms in a regular PI controller: e.g., no discounting at all gives a classical I-term, while harsh discounting gives a classical P-term. As such, the controller may provide a distinct advantage over existing PI controllers.

Figure 56:
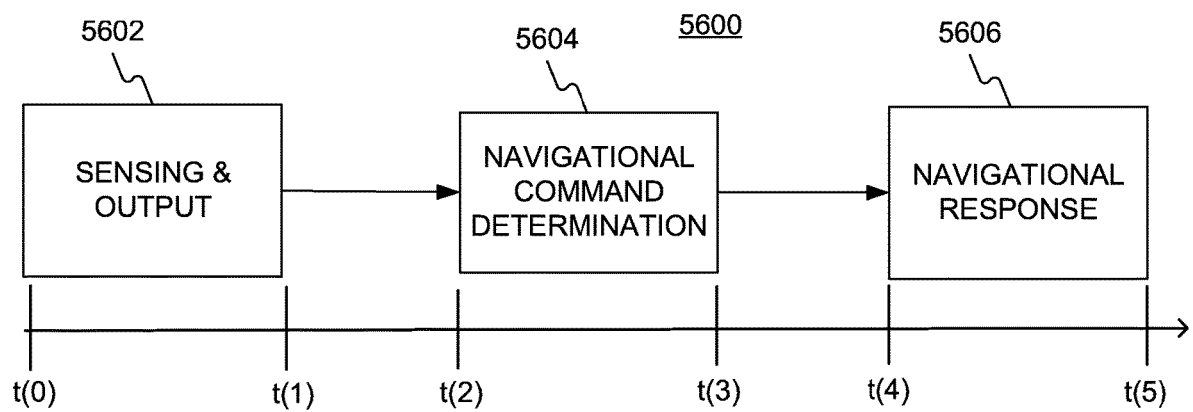
FIG. 56 is a flowchart showing an exemplary process for navigating a host vehicle consistent with the disclosed embodiments.

FIG. 56 depicts an overview of a process 5600 that may be performed by a navigation system. The following discussion illustrates how a controller account for a processing delay. Process 5600 may include a sensing and output stage 5602 in which the navigation system may collect data from one or more sensors and analyze the data to generate one or more outputs. For example, at sensing and output stage 5602 an image capture device 122 may capture one or more images and provide those images to at least one processing device programmed to analyze the images to detect obstacles in the environment of a host vehicle. Sensing and output stage 5602 may end with an output related to the one or more sensors, such as a determination that a target vehicle is in front of the host vehicle. Sensing and output stage 5602 may also include measurements by any sensors associated with a host vehicle (e.g., GPS, accelerometers, speedometers, tire pressure indicators, RADAR, LIDAR, etc.). Process 5600 may include a navigational command determination stage 5604 in which the navigation system may include at least one processing device programmed to use the output from sensing and output stage 5602 to determine one or more navigational commands for the host vehicle. For example, at least one processing device may determine a navigational command using, for example, one or more navigational policies along with the output from the sensor outputs. Navigational command determination stage 5604 may end with a navigational command being transmitted to one or more motion control systems (e.g., a throttle control system, a braking control system, a steering control system, etc.). Process 5600 may include a navigational response stage 5606 for causing the vehicle to perform a navigational maneuver consistent with the navigational command(s) from navigational command stage 5604. For example, navigational response stage 5606 may include activating a throttle actuator in response to a navigational command from navigational command determination stage 5604.

In this example, t(0) may represent an instant where a sensor measurement is made (e.g., the image capture device 122 captures a first image); t(1) may represent an instant where a sensor output is transmitted to one or more processing devices; t(2) may represent an instant the sensor output is received by the processor programmed to determine a navigational command based on one or more received sensor outputs; t(3) may represent an instant that the processor transmits a determined navigational command to one or more motion control systems; t(4) may represent an instant that the one or more motion control systems receive the transmitted navigational command; and t(5) may represent an instant that the navigational command is given effect (e.g., an actuator causes a throttle, brake, or steering response). Consistent with this disclosure, there may be a delay between any of the instances. For example, the total delay of process 5600 may be the difference between t(5) and t(0), which may be a range from, for example, one millisecond to several hundred milliseconds. For example, in some configurations of process 5600, the delay may be 150 milliseconds. The accumulated delay may include processing times for collecting, packaging, and transmitting a sensor output at stage 5602, for applying a driving policy, etc., to one or more received sensor outputs in order to generate a planned navigational action command at stage 5604, and for transmitting the or otherwise effecting the received navigational command at stage 5606.

During the accumulated delay or any part of the total delay, the host vehicle may continue navigating at the same or different speed, acceleration, and or path at which it was traveling at data acquisition time t(0). For example, if the brakes are being applied at the time of a sensor measurement, the vehicle speed may be lower than at sensor measurement time by the time a navigational command is implemented. Similarly, if an accelerator is being applied at the time of a sensor measurement, the vehicle speed may be higher than at sensor measurement time by the time a navigational command is implemented. When the navigational command is given effect at actuation time t(5), the vehicle may have traveled a significant distance and/or may have a different speed, acceleration, or path than was the basis for the navigational command. As such, the navigational command may cause a navigational response at actuation time t(5) that is not based on actual motion conditions of the vehicle at the time the navigational command is put into effect by the motion control system.

Figure 57A:
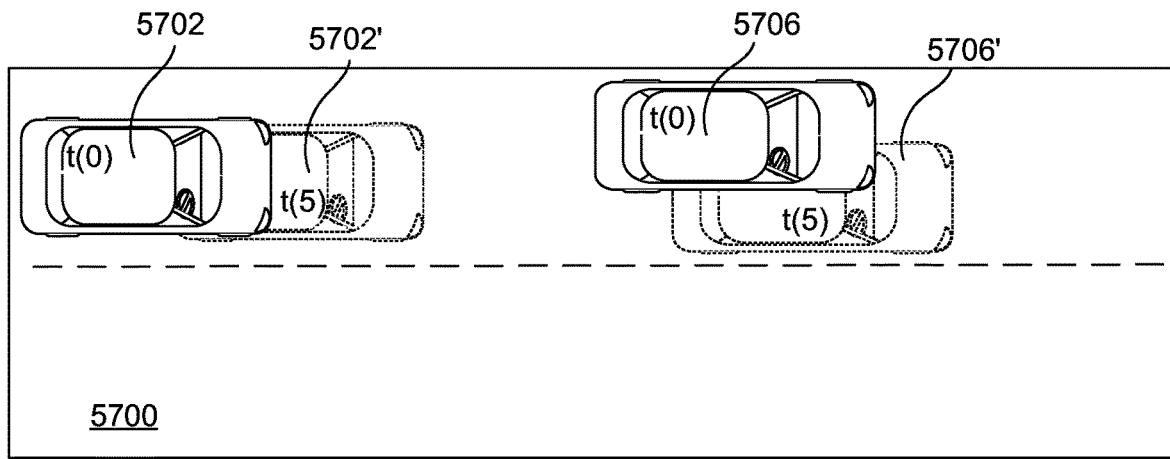
FIGS. 57A-57C illustrate example scenarios consistent with the disclosed embodiments.
Figure 57B:
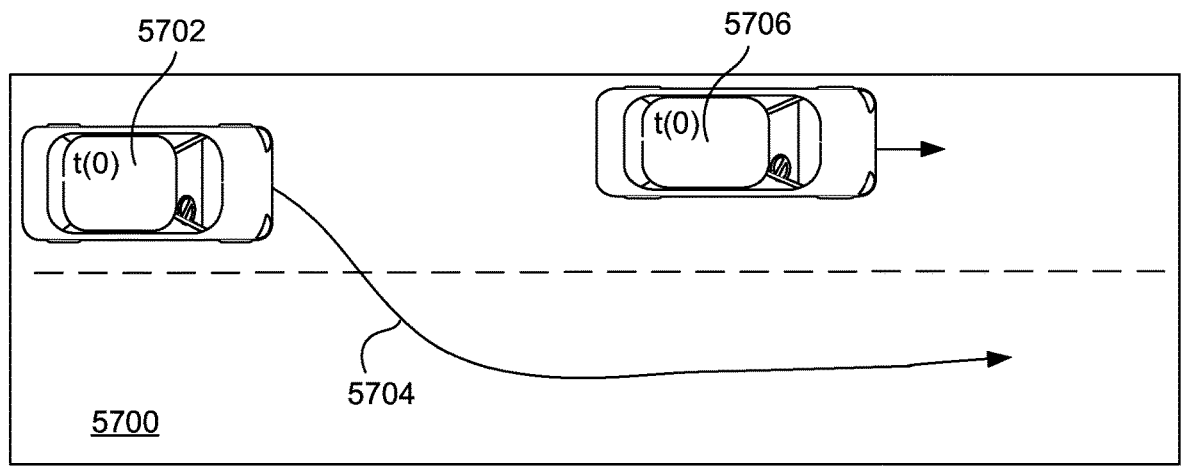
Figure 57C:
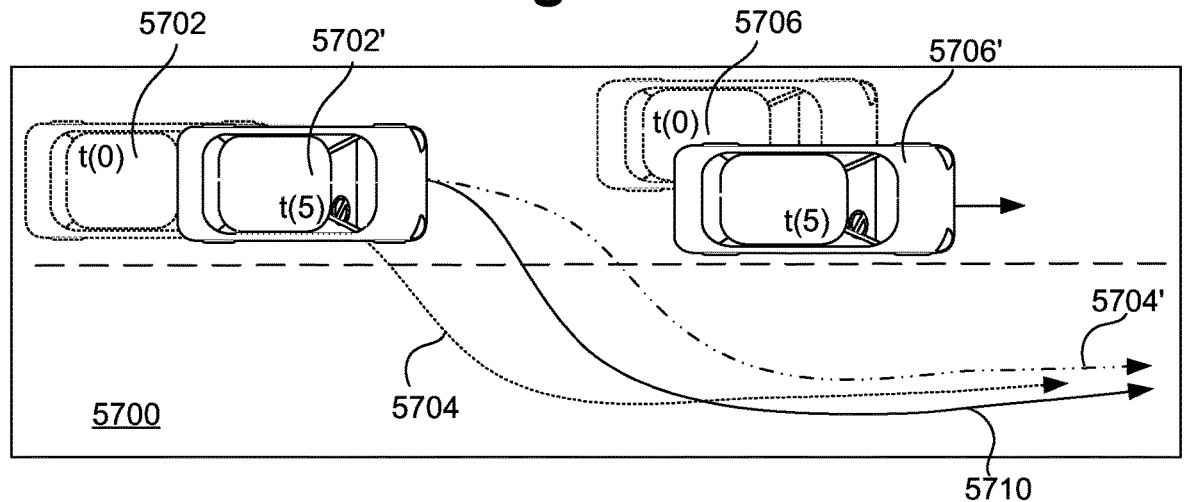

FIGS. 57A-57C illustrate conditions in which a prediction of vehicle path during a time between sensor measurements and actuation may be useful. FIGS. 57A-57C each depict a host vehicle 5702 and a target vehicle 5706 on roadway 5700 at an data acquisition time t(0). Data acquisition time t(0) may be the instant in which one or more sensors on host vehicle 5702 captures information relating to target vehicle 5706. FIGS. 57a and 57C also depict host vehicle 5702' and target vehicle 5706' at a delay time t(5). Delay time t(5) may be the instant when the host vehicle performs a navigational maneuver or otherwise implements a navigational command, as discussed in relation to FIG. 56.

FIG. 57A depicts host vehicle 5702 at initial time t(0) and the same host vehicle 5702' at delay time t(5). As depicted, there is a slight positional difference between host vehicle 5702 at initial time t(0) and host vehicle 5702' at delay time t(5). The difference in position may be attributed to the distance that host vehicle 5702 traveled during the response period Δt (not shown), which is the difference between delay time t(5) and initial time t(0). Similarly, host vehicle 5706 may have traveled a distance during response period Δt. In this example, a navigational command determined based on the position of host vehicle 5702 and target vehicle 5706 at initial time t(0) may not cause an ideal navigational response at delay time t(5) because the position of host vehicle 5702' and target vehicle 5706' is different at delay time t(5) than at initial time t(0).

FIG. 57B depicts an exemplary path 5704 that may correspond with a desired trajectory of host vehicle 5702. For example, the at least one processor in the navigational system of host vehicle 5702 may determine that host vehicle 5702 should pass target vehicle 5706 and may generate a navigational command consistent with path 5704. In this example, path 5704 is generated based on the conditions at initial time t(0). For example, path 5704 may be based on the speed, acceleration, maximum braking capability, and position of target vehicle 5706 at initial time t(0) and the speed, acceleration, position, and one or more navigational policies associated with host vehicle 5702 at initial time t(0).

FIG. 57C depicts the different paths 5704, 5704', and 5710 that host vehicle 5702, 5702' may travel. Path 5704 is the desired path determined under the conditions of initial time t(0), as shown in FIG. 57B. In this example, at delay time t(5), host vehicle 5702' is in a position where it cannot follow path 5704 because the starting point of path 5704 is behind the front of vehicle 5702' at delay time t(5). As such, host vehicle 5702' at time t(5) cannot follow path 5704 generated at time t(0). Path 5704' may be the trajectory that vehicle 5702' would travel if it were to perform the navigational maneuvers consistent with path 5704. In other words, path 5704' is the trajectory that would result if host vehicle 5702' were to perform at delay time t(5) the navigational commands generated for host vehicle 5702 at initial time t(0). In this example, path 5704' is much closer to target vehicle 5706' at delay time t(5) than path 5704 would be to target vehicle 5706 at initial time t(0). In some embodiments, the distance between path 5704' and target vehicle 5706' may be considered an unsafe distance (e.g., the distance may breach a proximity buffer of host vehicle 5702'). Path 5710 may be a path for host vehicle 5702' that was generated at initial time t(0) based on a predicted path of host vehicle 5702 and target vehicle 5706. For example, at initial time t(0), the navigational system of host vehicle 5702 may predict a position of target vehicle 5706 at delay time t(5) (which may be the position depicted by target vehicle 5706') and may predict a position of host vehicle 5702 at delay time t(5) (which may be the position depicted by host vehicle 5702') and may generate navigational commands consistent with path 5710, which will be implemented at delay time t(5). As shown by this example, path 5710 based on the predicted conditions may provide a distinct safety advantage over path 5704'.

The examples above are illustrative only and not limiting on the scope of the embodiments. For example, while FIGS. 57A-57C depict a predicted path for a host vehicle passing a target vehicle, the predicted path may be associated with any navigational maneuver of the host vehicle and may relate to any obstacle (e.g., a VRU, a plurality of host vehicles, a road characteristic, etc.). As an example, a predicted path may be generated for a host vehicle entering a turn in a roadway. Any other navigational maneuver may benefit from the predicted path analysis and/or the guess function as described above.

In some embodiments, the delayed response may cause an over-correction or unnecessary navigational response by the host vehicle. For example, if a target vehicle in front of a host vehicle is traveling with a low velocity but with a high acceleration, an image captured at time t(0) may be used to determine that the host vehicle may need to stop or swerve to avoid colliding with the target vehicle. However, at time t(5), the target vehicle may have traveled a significant distance due to its high acceleration and the host vehicle may avoid colliding with the target vehicle by, for example, coasting or braking at a sub-maximal braking rate. In this example, if the host vehicle is equipped with a system programmed to determine a predicted path based on conditions predicted for time t(5) rather than based on the present conditions at time t(0), the host vehicle may more accurately and comfortably respond to the detected target vehicle. In some embodiments, the delayed response may cause the host vehicle to perform an inadequate navigational response, which may cause the host vehicle to enter unsafe conditions. For example, if a target vehicle is traveling at a safe distance but decelerating quickly and a host vehicle is accelerating towards the target vehicle, the distance determined based on sensed conditions at time t(0) may be significantly longer than an actual distance at time t(5) when the host vehicle implements a navigational command determined based on the conditions at time t(0). As such, the host vehicle may not brake, swerve, or otherwise avoid unsafe conditions as programmed.

Consistent with this disclosure, a navigation system for navigating an autonomous host vehicle according to at least one navigational goal of the host vehicle is disclosed. The navigation system may be any navigation consistent with this disclosure, including but not limited to the disclosed Vision Zero safety system. The system may be within or in communication with the host vehicle. The system may include one or more sensors configured to collect data relating to an environment of the host vehicle. For example, the navigation system may include one or more image capture devices, LIDAR systems, RADAR systems, accelerometers, or the like. The system may include at least one processor programmed to perform one or more methods, processes, operations, or functions consistent with this disclosure. The at least one processor may be, for example, processing device 110 or any other processing device consistent with this disclosure.

Figure 58:
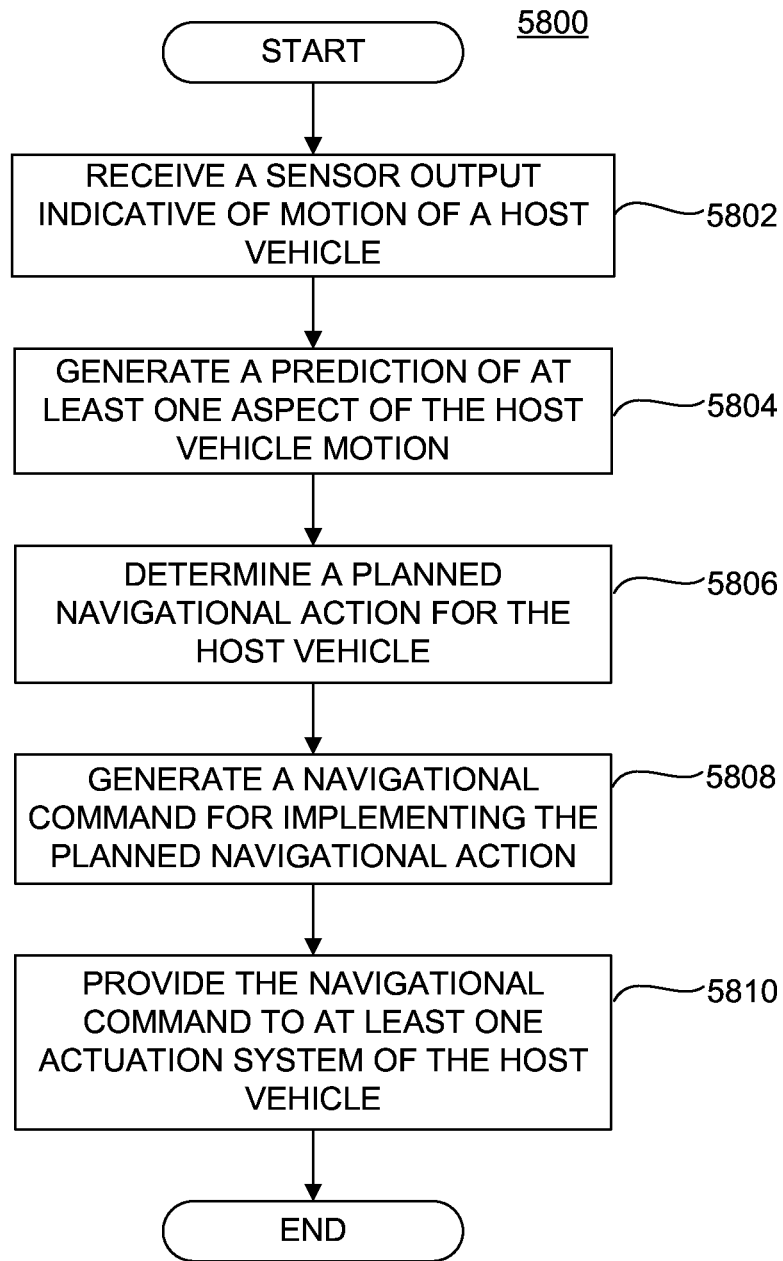
FIG. 58 is a flowchart showing an exemplary process for navigating a host vehicle consistent with the disclosed embodiments.

FIG. 58 is a flowchart depicting an exemplary process 5800 for navigating an autonomous host vehicle according to at least one navigational goal of the host vehicle. Consistent with this disclosure, the at least on processor may be programmed to perform all or part of process 5800. Process 5800 is exemplary only and one of ordinary skill in the art having the benefit of this disclosure may understand that process 5800 may include additional steps, may exclude one or more steps, or may be otherwise modified in ways consistent with this disclosure.

Process 5800 may include a step 5802 for receiving a sensor output indicative of motion of a host vehicle. Consistent with this disclosure, the at least one processor may be programmed to receive a sensor output indicative of at least one aspect of motion of the host vehicle relative to an environment of the host vehicle. The output may be received from one or more sensors. The one or more sensors may include any sensors disclosed herein including, for example, an image capture device, a sensing system, an accelerometer, a GPS unit, or the like. For example, the one or more sensors may include a speed sensor, an accelerometer, a camera, a LIDAR system, or a RADAR system. The output may include or convey any information relating to the host vehicle, the environment of the host vehicle, an obstacle in the environment of the host vehicle, and so forth. For example, the output may include a current speed and/or acceleration of the host vehicle, a heading direction of the host vehicle, a position of the host vehicle, etc. As another example, the output may include an identification of a detected target vehicle, a position of the target vehicle, a speed of the target vehicle, and an assumed braking capability of the target vehicle, as detected based on analysis of one or more images, LIDAR, or RADAR, for example. The output may be determined according to any method, process, function, or operation consistent with this disclosure.

In some embodiments, the sensor output may be generated at a first time that is later than a data acquisition time, when a measurement or data acquisition on which the sensor output is based is acquired, and earlier than a second time at which the sensor output is received by predetermined or determined amount. For example, if braking system 230 receives a navigational command at time t(4), the motion prediction time may be a time after time t(4) that corresponds with an average actuator response time of braking system 230.

The motion prediction time may be any time period after the data acquisition time. In some embodiments, the motion prediction time may be after the data acquisition time and earlier than or equal to an actuation time. For example, the motion prediction time may be at least 100 milliseconds after the data acquisition time. In another example, the motion prediction time may be at least 200 milliseconds after the data acquisition time. In another example, the motion prediction time may be 50-300 milliseconds after the data acquisition time, 75-275 milliseconds after the data acquisition time, 100-250 milliseconds after the data acquisition time, 150-200 milliseconds after the data acquisition time, or the like.

In some embodiments, the prediction of at least one aspect of host vehicle motion may be based, at least in part, on the received sensor output, and on an estimation of how the at least one aspect of host vehicle motion changes over a time interval between the data acquisition time and the motion prediction time (i.e., a time at which a vehicle motion based on earlier acquired sensor output(s) is predicted). For example, if the at least one aspect of the host vehicle motion is an acceleration of the host vehicle, the prediction may include a distance traveled by the host vehicle if it traveled at the detected acceleration during the time between the motion prediction time. The prediction may be based on the received sensor output and any other information consistent with this disclosure. For example, the prediction may be based on an output from an image sensor (such as a detection of a target vehicle) and a previously determined road characteristic, weather condition, or other factor that may affect a future condition relative to the host vehicle. In some embodiments, the prediction may include an estimate of the at least one aspect of the host vehicle motion at a later time (e.g., at time t(5)). As a result, a navigational decision may be based on an estimation of vehicle motion that may be closer to actual motion values corresponding to the acquired sensor outputs sensed at the initial time (e.g., at time t(0)).

In some embodiments, the prediction of at least one aspect of host vehicle motion may include a prediction of at least one of a speed or an acceleration of the host vehicle at the motion prediction time. The at least one aspect may include, for example, a speed, acceleration, position, yaw, or other aspect of the host vehicle motion. For example, if the acceleration and/or speed of the host vehicle is determined at time t(1) based on sensor output(s) acquired at data acquisition time t(0), the at least one processor may determine a predicted future speed and future acceleration of the host vehicle at time t(5) or at another motion prediction time. For example, the at least one processor may assume that the host vehicle accelerated from time t(0) to time t(5) or another motion prediction time at the same acceleration rate determined at time t(0) and, therefore, may determine that the host vehicle has a speed at time t(5) that is greater than that at time t(0). Accordingly, the at least one processor may predict a speed and/or acceleration at the motion prediction time in order to determine a navigational action appropriate to the estimated speed at time t(5) or other motion prediction time.

In some embodiments, the prediction of at least one aspect of host vehicle motion may include a prediction of a path of the host vehicle at the motion prediction time. For example, if the host vehicle is traveling on a path at time t(0), the at least one processor may use the information from the one or more sensors to predict a path on which the host vehicle will be traveling at time t(5) (e.g., a changed heading direction, etc.). As an example, if the sensor output indicates that the host vehicle is traveling in a straight, forward path at a constant speed, the at least one processor may predict that the host vehicle will be on the same straight path at time t(5) but may be further along the path. As another example, if the sensor output indicates that the host vehicle is traveling a curvilinear path associated with a certain rotation of a steering wheel, the at least one processor may predict that the host vehicle may be on a path associated with the same rotation of the steering wheel or a path associated with an increased rotation of the steering wheel. In such cases, the predicted path may be based on a detected rate of change in a steering controller or may be based on a detected yaw rate, a detected centripetal acceleration, a detection of road curvature ahead of the vehicle, etc. In some embodiments, the prediction of the path of the host vehicle at motion prediction time may include a target heading direction for the host vehicle. For example, the target heading may include a direction in which the host vehicle is to travel. As an example, if the output from the sensor indicates that there is an obstacle that host vehicle needs to avoid, the target heading may be a direction in which the host vehicle needs to travel to avoid the obstacle. The target heading direction may be a direction corresponding with the cardinal directions or may be based on a predetermined coordinate system. For example, a direction may be North, Northeast, East, Southeast, South, or the like or may be indicated by an expected heading angle (e.g., relative to a current heading angle determined at the time of sensor measurements). In another example, a heading direction may be expressed based on a degree on a horizontal or vertical axis through the body of the host vehicle, a yaw rate, or the like. In some embodiments, the one or more sensors may include a camera, and the prediction of the path of the host vehicle at the motion prediction time may be based on at least one image captured by the camera. For example, the path may include a virtual trajectory through the environment captured in the image and may include a representation of the path over or on the image. As another example, the prediction of the path may include, for example, a route between two obstacles detected in the images.

In some embodiments, the prediction of the path of the host vehicle at the motion prediction time may be based on at least a determined speed for the host vehicle and a target trajectory for the host vehicle included in a map of a road segment on which the host vehicle travels. For example, the predicted path may be generated according to a semantic high-definition mapping technology, such as REM, discussed above. As an example, the road segment on which the host vehicle is traveling may be associated with a plurality of trajectories which may be used to navigate autonomous vehicles on the road segment and the predicted path may include a position on one of the target trajectories associated with the road segment. As another example, if the host vehicle is determined to be traveling according to a predetermined target trajectory, the predicted path at the motion prediction time may include a position, speed, and/or acceleration along the same target trajectory. In some embodiments, the target trajectory may include a predetermined three-dimensional spline representative of a preferred path along at least one lane of the road segment. For example, the three-dimensional spline may include a plurality of landmarks, road features, and other objects that define the target trajectory on the road segment. In this example, the predicted path may include a prediction of which landmarks, road features, or other objects may be in the proximity of the host vehicle at the motion prediction time. For example, if the host vehicle is determined to be on a target trajectory based on the host vehicle's position between a first and second landmark, the predicted path may include a position on the target trajectory that is between the landmarks. If the host vehicle is navigating according to a target trajectory in a REM map, then localization along the target trajectory at a certain point in time (e.g., at time t(0)) may be used to predict a path at a later time. For example, if the speed of the host vehicle is known and the host vehicle's position relative to a REM target trajectory is known at time t(0), then at a later time (e.g., at time t(5), which may be determined based on known processing time delays, then the position of the host vehicle may be estimated relative to the REM target trajectory. And, if the position on the REM target trajectory is known, the heading direction at that location may be determined from the map (as the heading direction may correspond to a direction the host vehicle will travel at Lime t(0) in order to continue following the REM target trajectory).

In some embodiments, the prediction of at least one aspect of host vehicle motion (e.g., speed) may be based on at least one of a determined brake pedal position, a determined throttle position, determined air resistance opposing host vehicle motion, friction, or grade of a road segment on which the host vehicle travels. For example, the prediction may be based on the pedal position as defined in the guess function and other formulas disclosed above. The guess function may be determined empirically by observing resulting vehicle speeds, for example, in response to brake pedal and/or throttle pedal position. For example, a vehicle may slow according to a certain deceleration profile corresponding to a certain brake pedal position. Similarly, a vehicle may accelerate according to a certain acceleration profile corresponding to a certain throttle pedal position.

As another example, if the output of the sensors includes a speed and/or acceleration of the host vehicle, the at least one processor may predict a future speed and/or acceleration using the initial speed and/or acceleration and the resistive forces like friction or air resistance (or gravity based on road grade). In some embodiments, the at least one aspect of host vehicle motion may be determined by determining an overall force on the host vehicle and modifying the current speed and/or acceleration of the host vehicle based on the overall force. In this example, the overall force may include a sum of the assistive forces (e.g., throttle, acceleration, gravity when traveling down-hill, etc.) and the resistive forces (e.g., wind-resistance, friction, gravity when traveling up-hill, etc.) and a current speed of the host vehicle may be used to predict a future speed using the overall force.

In some embodiments, the prediction of at least one aspect of host vehicle motion may be based on a predetermined function associated with the host vehicle. The predetermined function may enable prediction of future speed and acceleration of the host vehicle based on a determined current speed of the host vehicle and a determined brake pedal position of a determined throttle position for the host vehicle. For example, the prediction of at least one aspect of host vehicle motion may include using the guess function to predict a future speed, acceleration, and/or position of the host vehicle. For example, as described above, the position of the brake and throttle pedal may be defined by $p(t) \in [-1, 1]$ where $-1$ corresponds with full brake, 1 corresponds with full throttle, and 0 corresponds with no brake and no throttle and the at least one processor may use the guess function to predict an aspect of host vehicle motion based on the pedal position.

In some embodiments, the prediction of at least one aspect of host vehicle motion at the motion prediction time may account for a mismatch between a data acquisition rate associated with the one or more sensors and a control rate associated with a rate that the at least one processor generates a navigational command. For example, one or more sensors may acquire data at a slower rate than the at least one processor may process the data to generate a navigational command based on the data. As a particular example, one or more cameras may acquire images at 10 Hz, but the at least one processor may generate navigational commands based on the images at a rate of 50 Hz. As a result, a new image on which navigational decisions may be based may be available only for every fifth processing event. In such cases, vehicle motion may be predicted for those processing events (occurring at up to 50 Hz) that may occur between image capture events (which occur at 10 Hz).

Process 5800 may include a step 5806 for determining a planned navigational action for the host vehicle. The planed navigational action may be based on, for example, the prediction of the host vehicle motion and/or a navigational goal of the host vehicle. Consistent with this disclosure, the at least one processor may be programmed to determine a planned navigational action for the host vehicle based, at least in part, on the at least one navigational goal of the host vehicle (e.g., navigating along an intended route from point A to point B) and based on the generated prediction of the at least one aspect of host vehicle motion. The planned navigation action may be any navigational action described herein, including an acceleration, a deceleration, a turn, a veer, a plurality of navigational maneuvers, or the like. For example, the planned navigational action may include at least one of a speed change or a heading change for the host vehicle. As another example, the planned navigational action may include a desired trajectory or path for the host vehicle to follow. For example, the navigational action may be determined according to any of the embodiments described herein. In certain cases, however, the navigational actions in the presently disclosed embodiments may be determined based on predicted aspects of the host vehicle motion at times later than a sensor measurement time. For example, rather than determining a target trajectory for the host vehicle using raw sensed conditions, the processing device may determine a target trajectory based on those sensed conditions and resulting changes in vehicle motion predicted to occur after acquisition of the sensed conditions. Using the predicted vehicle motion may have several advantages over other embodiments. For example, referring to FIG. 57C, if the target trajectory is determined based on the sensed conditions from time t(0), host vehicle 5702' would travel path 5704', which comes within a distance of target vehicle 5706' that may be unsafe (e.g., may be within a proximity buffer and/or less than an RSS or CRSS safe distance) whereas if the target trajectory is determined based on the predicted conditions, host vehicle 5702' would travel path 5710, which maintains safe conditions with respect to target vehicle 5706'. Additionally, by predicting vehicle speed at a motion prediction time later than sensor measurement time, and closer to or equal to an actuator time, a host vehicle may drive more smoothly and with less or without sine wave/oscillating corrections that may be uncomfortable to passengers.

In some embodiments, the navigational goal of the host vehicle may include translation from a first location to a second location. For example, the first location may be a starting point and the second location may be a destination. In this example, the predicted aspects of host vehicle motion may be used to determine one or more navigational actions consistent with the navigational goal (e.g., one or more actions that may cause the host vehicle to become closer to the destination along a selected route or target trajectory). As another example, the first location may be a first position on a target trajectory and the second location may be a second position on the target trajectory. In this example, the navigational action may be any navigational maneuver that would cause the host vehicle to travel along the target trajectory towards the second position, as discussed above in relation to the REM maps and associated navigation. In some embodiments, the navigational goal of the host vehicle may include a change of lane from a current lane occupied by the host vehicle to an adjacent lane. For example, the navigational goal may be path 5704, as described in relation to FIG. 57B. In this example, the processing device may use the predicted aspects of host vehicle motion to determine a navigational action that corresponds with the goal, such as by developing path 5710 for the host vehicle to follow.

In some embodiments, the navigational goal of the host vehicle may include maintaining a proximity buffer between the host vehicle and a detected target vehicle. As discussed above, the proximity buffer may be determined based on a detected current speed of the host vehicle, a maximum braking rate capability of the host vehicle, a determined current speed of the target vehicle, and an assumed maximum braking rate capability of the target vehicle. The proximity buffer relative to the target vehicle may be further determined based on a maximum acceleration capability of the host vehicle, such that the proximity buffer includes at least a sum of a host vehicle acceleration distance, determined as a distance over which the host vehicle will travel if accelerated at the maximum acceleration capability of the host vehicle over a reaction time associated with the host vehicle; a host vehicle stopping distance, determined as a distance required to reduce the current speed of the host vehicle to zero at the maximum braking rate capability of the host vehicle; and a target vehicle stopping distance, determined as a distance required to reduce the current speed of the target vehicle to zero at the assumed maximum braking rate capability of the target vehicle. For example, the host vehicle may have an safety system configured to maintain a proximity buffer between the host vehicle and one or more obstacles, as described above. In this embodiment, the proximity buffer may be based on an RSS safe distance. In some embodiments, the proximity buffer may be based on a CRSS safe distance, as discussed in relation to FIGS. 52A-52D. The planned navigation action in this example may be any navigational maneuver that would maintain the proximity buffer.

Process 5800 may include a step 5808 for generating a navigational command for implementing the planned navigational action. Consistent with this disclosure, the at least one processor may be programmed to generate a navigational command for implementing at least a portion of the planned navigational action. The navigational command may be any instruction for causing one or more maneuvers consistent with this disclosure. For example, the command may include instructions for causing a braking system to apply the brake at a certain level or for causing a throttling system to accelerate at a certain level. In some embodiments, the navigational command may include at least one of a pedal command for controlling a speed of the host vehicle or a yaw rate command for controlling a heading direction of the host vehicle. For example, the navigational command may include instructions for causing a throttle pedal to be depressed by an amount corresponding with an acceleration determined for the planned navigational action. The navigational commands may include any other command or instruction consistent with this disclosure. For example, the command may include a semantic or non-semantic command for causing the host vehicle to change heading, accelerate, decelerate, change speed, coast, stop, or the like.

The examples of navigational actions, navigational goals, and navigational commands described above are for illustration only. One of ordinary skill in the art having the benefit of this disclosure may understand that any of the embodiments described herein may be modified to determine a planned navigational action using the predicted aspects of host vehicle motion. For example, the embodiments discussed relation to the REM model, the RSS model, and the CRSS model and embodiments discussed in relation to FIGS. 13-15 and 18 may be modified using the predicted aspects of host vehicle motion.

Process 5800 may include a step 5810 for providing the navigational command to at least one actuation system of the host vehicle. Consistent with this disclosure, the at least one processor may be programmed to provide the navigational command to at least one actuation system of the host vehicle, such that the at least one actuation system receives the navigational command at a third time that is later than the second time and earlier or substantially the same as an actuation time at which a component of the at least one actuation system responds to the received command. For example, referring to FIG. 56, the navigational command may be provided to an actuation system at time t(4), which is prior to or at substantially the same time as time t(5) at which the command is implemented by one or more actuators. The actuation system may be any system that is configured to cause one or more responses to the navigational command. For example, the at least one actuation system may include one or more of a throttle actuation system, a braking actuation system, or a steering actuation system. As a particular example, the throttle actuation system may include throttling system 220, the braking actuation system may include braking system 230, and the steering actuation system may include steering system 240.

As described above, the actuation system may cause a navigational response at time t(5) based on motion aspects predicted for actuation time t(5) that is more accurate, precise, and/or safe than a response at actuation time t(5) that is based directly on motion aspects sensed at time t(0). This is because the predicted motion aspects may be more similar to the actual conditions at actuation time t(5) than the sensed motion aspects at time t(0). In some embodiments, the motion prediction time may be after the data acquisition time and earlier than or equal to the actuation time. The closer the motion prediction time is to the actual actuation time, the more accurate, precise, and safe the navigational action may be. For example, at actuation time t(5) the one or more actuation systems may cause a navigational action corresponding with the planned navigational action that is based on the predicted aspects of host vehicle motion, which may correspond to execution of a navigational action that closely matches the planned navigational action if the motion prediction time is close to the actuation time. For example, the motion prediction time may be substantially similar to actuation time t(5) and the predicted motion aspects associated with the motion prediction time may be substantially similar to the actual motion aspects at actuation time t(5).

The embodiments disclosed herein are exemplary and any other means for predicting one or more aspects of host vehicle motion and for causing a navigation response based on the prediction may be consistent with this disclosure.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/ AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for a host vehicle, the system comprising:
at least one processor comprising circuitry and a memory, wherein the memory includes instructions that when executed by the circuitry cause the at least one processor to:
  receive at least one image acquired by an image capture device, the at least one image being representative of an environment of the host vehicle;
  detect at least one obstacle in the environment of the host vehicle based on an analysis of the at least one image;
  determine a current velocity of the host vehicle and a predicted path for the host vehicle;
  monitor a driver input to at least one of a throttle control, a brake control, or a steering control associated with the host vehicle;
  determine a proximity buffer relative to the at least one obstacle, the proximity buffer being determined based on a sum of at least:
    a host vehicle acceleration distance, determined as a distance over which the host vehicle will travel if the host vehicle accelerated from the current velocity at a maximum acceleration capability of the host vehicle over a reaction time associated with the host vehicle, and
    a host vehicle stopping distance, determined as a distance required to reduce a determined speed of the host vehicle to zero at a maximum braking rate capability of the host vehicle, the determined speed corresponding to a speed of the host vehicle if the host vehicle accelerated at the maximum acceleration capability of the host vehicle over the reaction time associated with the host vehicle; and
  determine, based on the predicted path, whether the driver input would result in the host vehicle navigating within the proximity buffer relative to the at least one obstacle.

2. The system of claim 1, wherein the host vehicle acceleration distance is determined based on the current velocity multiplied by the reaction time added to the reaction time squared multiplied by one half of the maximum acceleration capacity.

3. The system of claim 1, wherein the memory further includes instructions that when executed by the circuitry cause the at least one processor to:
  allow the driver input to cause a corresponding change in one or more host vehicle motion control systems, if the at least one processing device determines that the driver input would not result in the host vehicle navigating within the proximity buffer relative to the at least one obstacle; and
  prevent the driver input from causing the corresponding change in the one or more host vehicle motion control systems, if the at least one processing device determines that the driver input would result in the host vehicle navigating within the proximity buffer relative to the at least one obstacle.

4. The system of claim 1, wherein the memory further includes instructions that when executed by the circuitry cause the at least one processor to alert a driver if the at least one processing device determines that the driver input would result in the host vehicle navigating within the proximity buffer relative to the at least one obstacle.

5. The system of claim 1, wherein the proximity buffer is further determined based on a predetermined sub-maximal braking rate that is less than the maximum braking rate capability of the host vehicle.

6. The system of claim 1, wherein the at least one obstacle includes a pedestrian or an object in a roadway, and the proximity buffer relative to the at least one obstacle includes at least a minimum distance to be maintained between the host vehicle and the at least one obstacle.

7. The system of claim 1, wherein determining whether the driver input would result in the host vehicle navigating within the proximity buffer relative to the at least one obstacle comprises determining an acceleration vector of the host vehicle due to the driver input.

8. The system of claim 1, wherein the at least one obstacle is one of a pedestrian or a target vehicle.

9. The system of claim 8, wherein the memory further includes instructions that when executed by the circuitry cause the at least one processor to:
  determine an obstacle velocity and an obstacle predicted path of one of the pedestrian or the target vehicle; and
  use the determined obstacle velocity and the obstacle predicted path to determine the proximity buffer.

10. The system of claim 9, wherein the host vehicle stopping distance comprises a difference between:
  a square of a sum of the determined velocity of the host vehicle and the reaction time multiplied by the maximum acceleration capacity, and
  a square of the obstacle velocity, and
  wherein the host vehicle stopping distance further comprises dividing the difference by twice a value of the maximum braking rate capability.

11. The system of claim 9, wherein the proximity buffer is further determined by an assumed maximum braking capability of the target vehicle.

12. The system of claim 9, wherein the proximity buffer is further determined by a target vehicle stopping distance, and wherein the target vehicle stopping distance is determined as a distance required to reduce a current speed of the target vehicle to zero at the assumed maximum braking capability of the target vehicle.

13. The system of claim 9, wherein the target vehicle is determined to be forward of the host vehicle, and wherein the at least one processor is further programmed to determine that the driver input would result in a change in a longitudinal distance between the target vehicle and the host vehicle.

14. The system of claim 9, wherein the target vehicle is determined to be in a lane different from the host vehicle, and wherein the at least one processor is further programmed to determine that the driver input would result in a lateral movement of the host vehicle, such that after the lateral movement, the target vehicle will be forward of the host vehicle.

15. The system of claim 9, wherein the target vehicle is determined to be in a lane different from the host vehicle, and wherein the at least one processor is further programmed to determine that the driver input would result in a lateral movement of the host vehicle, such that after the lateral movement, the host vehicle will be forward of the target vehicle.

16. A method for navigating a host vehicle, the method comprising:
  receiving at least one image acquired by an image capture device, the at least one image being representative of an environment of the host vehicle;
  detecting at least one obstacle in the environment of the host vehicle based on an analysis of the at least one image;
  determining a current velocity of the host vehicle and a predicted path for the host vehicle;
  monitoring a driver input to at least one of a throttle control, a brake control, or a steering control associated with the host vehicle;
  determining a proximity buffer relative to the at least one obstacle, the proximity buffer being determined based on a sum of at least:
    a host vehicle acceleration distance, determined as a distance over which the host vehicle will travel if the host vehicle accelerated from the current velocity at a maximum acceleration capability of the host vehicle over a reaction time associated with the host vehicle, and
    a host vehicle stopping distance, determined as a distance required to reduce a determined speed of the host vehicle to zero at a maximum braking rate capability of the host vehicle, the determined speed corresponding to a speed of the host vehicle if the host vehicle accelerated at the maximum acceleration capability of the host vehicle over the reaction time associated with the host vehicle; and
  determining, based on the predicted path, whether the driver input would result in the host vehicle navigating within the proximity buffer relative to the at least one obstacle.

17. A non-transitory computer-readable medium storing instructions that, when executed by a processor, cause the processor to perform operations comprising:
  receiving, at least one image acquired by an image capture device, the at least one image being representative of an environment of a host vehicle;
  detecting at least one obstacle in the environment of the host vehicle based on an analysis of the at least one image;
  determining a current velocity of the host vehicle and a predicted path for the host vehicle;
  monitoring a driver input to at least one of a throttle control, a brake control, or a steering control associated with the host vehicle;
  determining a proximity buffer relative to the at least one obstacle, the proximity buffer being determined based on a sum of at least:
    a host vehicle acceleration distance, determined as a distance over which the host vehicle will travel if the host vehicle accelerated from the current velocity at a maximum acceleration capability of the host vehicle over a reaction time associated with the host vehicle, and
    a host vehicle stopping distance, determined as a distance required to reduce a determined speed of the host vehicle to zero at a maximum braking rate capability of the host vehicle, the determined speed corresponding to a speed of the host vehicle if the host vehicle accelerated at the maximum acceleration capability of the host vehicle over the reaction time associated with the host vehicle; and
  determining, based on the predicted path, whether the driver input would result in the host vehicle navigating within the proximity buffer relative to the at least one obstacle.

18. The non-transitory computer-readable medium of claim 17, wherein the operations further comprise:
  allowing the driver input to cause a corresponding change in one or more host vehicle motion control systems, if the processor determines that the driver input would not result in the host vehicle navigating within the proximity buffer relative to the at least one obstacle; and
  preventing the driver input from causing the corresponding change in the one or more host vehicle motion control systems, if the processor determines that the driver input would result in the host vehicle navigating within the proximity buffer relative to the at least one obstacle.

* * * * *